United States Patent

[11] 3,579,200

[72] Inventors Robert H. Davis
Raleigh;
Jerry S. Harris, Cary, N.C.

[21] Appl. No. 846,011
[22] Filed July 30, 1969
[45] Patented May 18, 1971
[73] Assignee International Business Machines Corporation
Armonk, N.Y.

[54] DATA PROCESSING SYSTEM
45 Claims, 49 Drawing Figs.

[52] U.S. Cl. .......... 340/172.5, 340/146.1
[51] Int. Cl. .......... G06f 11/08, H041 1/00
[50] Field of Search .......... 340/172.5, 146.1; 235/157

[56] References Cited
UNITED STATES PATENTS

| | | | |
|---|---|---|---|
| 3,146,456 | 8/1964 | Silliman et al. | 340/146.1X |
| 3,341,824 | 9/1967 | Wissick et al. | 340/172.5 |
| 3,409,877 | 11/1968 | Alterman et al. | 340/172.5 |
| 3,439,329 | 4/1969 | Betz et al. | 340/146.1 |
| 3,444,528 | 5/1969 | Lovell et al. | 340/172.5 |
| 3,517,171 | 6/1970 | Avizienis | 340/172.5X |

*Primary Examiner*—Paul J. Henon
*Assistant Examiner*—R. F. Chapuran
*Attorneys*—Ewin M. Thomas, Ralph L. Thomas and Thomas and Thomas

ABSTRACT: A data processing system including a plurality of terminals connected to a transmission medium for sending and receiving data and control signals between terminals is provided, and each terminal includes a master control connected by bus means having data lines and control lines to a plurality of satellite controls and input-output devices. A first parity checking device checks the parity of the signals on the control lines from each satellite to the master control, and a second parity checking device checks the parity of the signals on the control lines from the master control to the satellite controls. Even or odd parity may be used, but odd parity is preferred. Each satellite control includes a plurality of circuits interconnected to perform the control function of such satellite control, and each one of the plurality of circuits has an output line connected to an odd number of other such circuits, whereby a malfunction in any one of said plurality of circuits affects an odd number of control lines from such satellite control which thereby forces the first parity checking device to detect a malfunction. Each satellite control, for the odd parity case, supplies a control signal on a single given control line when it is not active, whereby the first parity checking device checks the status of each satellite control during both the active and the inactive states.

INVENTORS
ROBERT H. DAVIS
JERRY S. HARRIS

BY Thomas & Thomas
ATTORNEYS

KEYBOARD SATELLITE CONTROL

MPLC

SERDES SATELLITE CONTROL

DATA PROCESSING SYSTEM

BACKGROUND OF THE INVENTION 1. This invention relates to a network of data processing systems for processing data between a plurality of terminals and more particularly to such data processing systems wherein each terminal incorporates a flexible control arrangement with self-diagnostic techniques.

2. In earlier types of data processing systems for processing data between a plurality of input-output devices at a terminal the control arrangement was complex and usually provided relatively little or no flexibility in operation. When faults or malfunctions occurred at a terminal, they were difficult to locate, and hence the cost of maintenance was increased. The use of the equipment at a terminal was lost for the down time which was extensive in many cases. As the size of a network of such data processing systems increased and as each terminal also was expanded, these problems became more critical. It is to the problem of making such data processing systems more efficient and flexible in operation that this invention is directed, and further the invention is directed to reducing the down time from malfunctions to a minimum by certain diagnostic features.

SUMMARY OF THE INVENTION

It is a feature of this invention to provide an improved data processing system which has an efficient control arrangement and which permits a high degree of flexibility in operation.

According to another feature of this invention an improved data processing system is provided wherein a flexible control arrangement includes a self-diagnostic capability.

It is a further feature of this invention to provide an improved data processing system with a flexible control arrangement and a self-diagnostic capability for detecting faults and malfunctions by utilizing parity checking of control lines as well as data lines.

It is a further feature of this invention to provide an improved data processing system with a self-diagnostic capability which includes parity checking of control lines when the associated equipment is active and inactive.

It is a further feature of this invention to provide an improved data processing system with a control arrangement which affords a high degree of flexibility in operation wherein a master control is provided which is selectively connected to any one of a plurality of satellite controls, and each satellite control is connected to a specific input-output device which is manipulated by the associated satellite control under the direction of the master control. The status of the master control is constantly monitored by all satellite controls whereby each satellite control may be informed of operations pending or operations taking place in other satellite controls so that early appropriate action (anticipated or not, as the case may be) may be taken as part of the flexibility thus provided.

It is another feature according to this invention to provide an improved data processing system wherein a master control at each terminal supervises a plurality of associated satellite controls on a time shared basis for the purpose of initiating changes by starting new operations or terminating old operations while providing continuous monitoring of the master control by each satellite control to provide timely and efficient initiation of such changes in a flexible control arrangement.

It is another feature of this invention to provide an improved data processing system which includes a master control at each terminal which supervises a plurality of satellite controls which in turn operate associated input-output devices wherein self-diagnostic capability is provided by parity checking equipment on control lines and data lines from point to point in the system, and the diagnostic capability is enhanced by interconnecting the control circuits of the satellite controls in a manner to cause a parity error in case of a malfunction in any such circuit in each satellite control or its associated input-output device. Moreover, it is another feature of this invention to further enhance the diagnostic capability by utilizing one group of circuits in each satellite control to generate control signals on a given number of output lines, depending upon whether even or odd parity is used, when each satellite control is not active and by utilizing a different group of circuits to generate output signals on one or more control lines when each satellite control is active. Yet another feature of this invention is to improve the diagnostic capability by employing a bistable storage circuit in at least one satellite control with pulse operated means coupled to said bistable storage circuit for setting it during a first time period and with further means operated by said bistable storage circuit during a subsequent second time period whereby the bistable storage circuit is set and checked in the first time period to insure its correct operation during the second time period to operate the further means.

In a preferred arrangement according to this invention a data processing system is provided which includes a plurality of terminals interconnected by a transmission medium for exchanging data signals and control signals between terminals. Each terminal includes a plurality of input-output devices each of which is connected to an associated one of a plurality of satellite controls. A master control in each terminal continuously supplies control signals along an output bus to all of the satellite controls, and the master control supplies data signals to selected ones of said input-output devices along the output bus. Selected ones of the input-output devices supply data along an input bus to the master control. The satellite controls at each terminal are accessed or selectively connected via the input bus to the master control, preferably in sequential succession, thereby to give each satellite control an opportunity to send control signals to the master control. When a given input-output device requires service, it operates the associated satellite control which, when accessed by the master control, sends control signals to the master control, and the master control responds by establishing control signals on appropriate control lines to such satellite control which then operates the associated input-output device. Data storage is provided in the master control to receive and send data signals between input-output devices at each terminal. The master control includes control storage for receiving control signals on the input bus from each satellite control when it is accessed and for supplying control signals on the output bus to all of the satellite controls at each terminal. A first parity checking device checks the parity of the control signals on the input bus to the master control during each access by each satellite control, and a second parity checking device checks the parity of the control signals on the output bus from the master control to each satellite control during each access. The diagnostic capability of detecting malfunctions is improved by checking the parity of the control signals on the input bus from each satellite control as it is accessed by the master control. Even or odd parity may be used, but odd parity is preferred. When odd parity is used, each accessed satellite control supplies an odd number of control signals on the input bus to the master control, and if odd parity is not found by the first parity checking device, a malfunction in the accessed satellite control or its associated input-output equipment is indicated. If odd parity is not found by the second parity checking device, a malfunction in the master control is indicated. The diagnostic capability for detecting malfunctions is improved further by providing control signals from each accessed satellite control on the input bus to the master control when the satellite control is not active as well as when it is active, whereby the diagnostic capability is provided at all times for each satellite control. In the preferred odd parity case, for instance, each accessed satellite control preferably supplies a control signal on a single given control line for checking purposes when it is not active, and each accessed satellite control supplies a control signal on a different control line, in combination with other control signals on other control lines with the total control signals being an odd number, when such satellite control is active whereby the parity checking arrangement checks the status of each satellite control at all times i.e.

for the active and not active states. Each satellite control includes a plurality of circuits which are interconnected to perform the control function of such satellite control, and in order to further enhance the diagnostic capability, such circuits have their individual output lines connected to an odd number of other such active circuits, for the odd parity case, whereby a malfunction in any particular circuit affects an odd number of control lines from such satellite control when it is accessed which thereby insures detection of a parity error by the first parity checking device. A still further improvement of the diagnostic capability is provided by using a first group of said plurality of circuits in each satellite control to generate a control signal on said single given control line which indicates that the satellite control is not active and a second group of circuits in said plurality of circuits to generate a control signal on said different control line which indicates that the satellite control is active, whereby a greater number of circuits in each satellite control are checked by the parity checking arrangement. A still further improvement of the diagnostic capability is provided by employing a bistable storage circuit in at least one satellite control with pulse operated means coupled to the bistable storage circuit for setting it during a first access of the satellite control by the master control, and further means is operated by the bistable storage circuit during the next access of the satellite control by the master control whereby the bistable storage circuit is set and checked in the first access of the satellite control by the master control to insure its correct operation during the second access of the satellite control by the master control to operate the further means.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The invention is illustrated with respect to a communication network which is particularly adapted for use in a data processing system. It is pointed out that the invention is applicable to other types of systems, and a communication network is arbitrarily selected by way of illustration, not limitation. A communication network according to this invention permits a greater rate of data processing by providing for rapid and reliable detection of any circuit malfunction and the designation of its precise location so that rapid repairs may be made.

Figure 1:
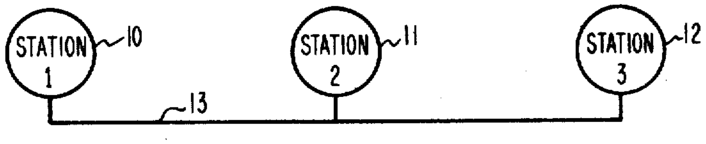
FIG. 1 is a block diagram illustrating a data processing network including three terminals interconnected by transmission medium.

A communication network is generally illustrated in FIG. 1 as including stations 1 through 3 which are designated by the respective reference numerals 10 through 12, and the transmission and reception of data is accomplished on a transmission medium, designated by the reference numeral 13, which may be telephone lines, telegraph lines, radio link or other type of transmission equipment. Each station may include various types of input-output devices customarily used in a data processing system such as keyboard, printer, and the like. Each station in a given installation may have additional equipment or less equipment as may be required to perform its particular functions. Each station is provided with a self-diagnostic arrangement which inherently provides real-time error detection, and upon detecting an error, each station automatically indicates the defective equipment. It is arbitrarily presumed for the purposes of illustration herein that each station includes control apparatus, a keyboard, a printer, and suitable equipment for sending and receiving data. The control arrangement at each station includes a master control which accesses and services a plurality of associated satellite controls, and each satellite control manipulates an associated input-output device or other type of apparatus. Data storage, control storage, timing signals and diagnostic programs are disposed in the master control. Each station is self-checking, and the self-checking feature provides the ability to detect any malfunction as it occurs in a station. Once a malfunction is detected and its location indicated by the master control at a given station, repairs readily may be made locally. Any intrastation transfer of data from one input-output device to another is made via the associated satellite controls of such input-output devices and the master control. This requires storage of this information for a given cycle time of the scanner in the master control, and each satellite control thus has an opportunity to operate on the available information. Control storage disposed in the master control permits interstation exchange of such control information. When an input-output device at a station monitors the control status of the master control, it is able to detect sequences, operational conditions, or both sequences and operational conditions of other services which are pertinent to its operation. The intrastation arrangement permits the master control to access and service each satellite control in turn. If an error or malfunction occurs but it does not originate in the master control, it is readily known that the malfunction lies in the accessed satellite control or its associated input-output device.

Figure 2:
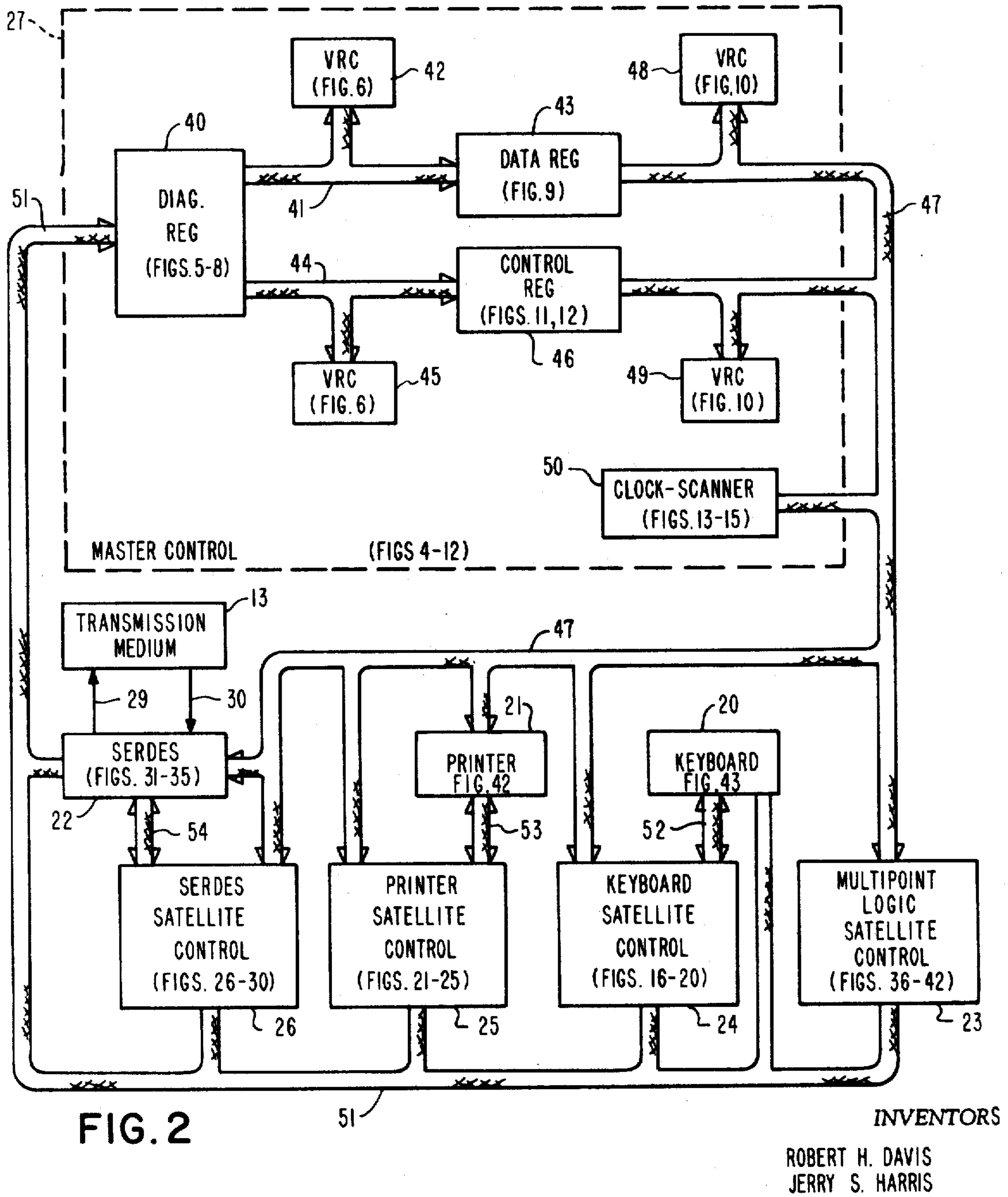
FIG. 2 is a block diagram of each of the terminals shown in FIG. 1.

Reference is made to FIG. 2 which illustrates in block form the basic equipment which is arbitrarily presumed, for purposes of illustration herein, to be included at each station. The basic equipment in FIG. 2 includes a keyboard 20, a printer 21, and suitable transmit-receive equipment 22. Suitable control and checking equipment also is provided which includes a multipoint logic satellite control 23, a keyboard satellite control 24, a printer satellite control 25, and a serializer-deserializer (Serdes) satellite control 26 and a master control 27. The transmission medium is designated by the block 13, and it may include telephone lines, telegraph lines, a radio link or other suitable transmission apparatus as explained earlier. Signals representing information to be transmitted are forwarded from the Serdes 22 on a line 29 to the transmission medium 13, and signals representing information received from the transmission medium 13 are supplied on a line 30 to the Serdes 22.

The master control 27 includes a diagnostic register 40 which supplies data signals along a cable 41 to a vertical redundancy check (VRC) circuit 42 and to a data register 43. The diagnostic register 40 supplies control signals along a cable 44 to a vertical redundancy check (VRC) circuit 45 and to a control register 46. Signals from the data register 43 and the control register 46 are supplied to an output cable or bus 47. Signals from the data register are checked in a vertical redundancy check (VRC) circuit 48, and signals from the control register 46 are checked in a vertical redundancy check (VRC) circuit 49. Timing signals for each station are supplied by a clock-scanner 50 along the bus 47 to the various component parts of the system.

Output signals from the master control 27 are supplied on the output bus 47 to the satellite control circuits 23 through 26. These satellite control circuits are supplied with data and control signals, as needed, and in response to such signals they supply output signals along a cable or bus 51 to the input of the diagnostic register 40 of the master control 27. The various satellite controls operate their associated devices such as the keyboard 20, the printer 21, and the Serdes 22. The multipoint logic satellite control 23 serves as a coordinating unit for operation of equipment within the station as well as coordinating the transmission between stations. The keyboard 20 and the keyboard satellite control 24 exchange control signals along a cable 52. When one of its keys is depressed, the keyboard sends a corresponding group of coded signals via the cable 51 to the master control 27. The printer 21 and the printer satellite control 25 exchange control signals along a cable 53. The Serdes 22 receives signals from the master control 27 on the bus 47 for transmission on the transmission medium 13, and the Serdes 33 receives signals from the transmission medium 13 and supplies them along the cable or bus 51 to the master control 27.

Figure 3:
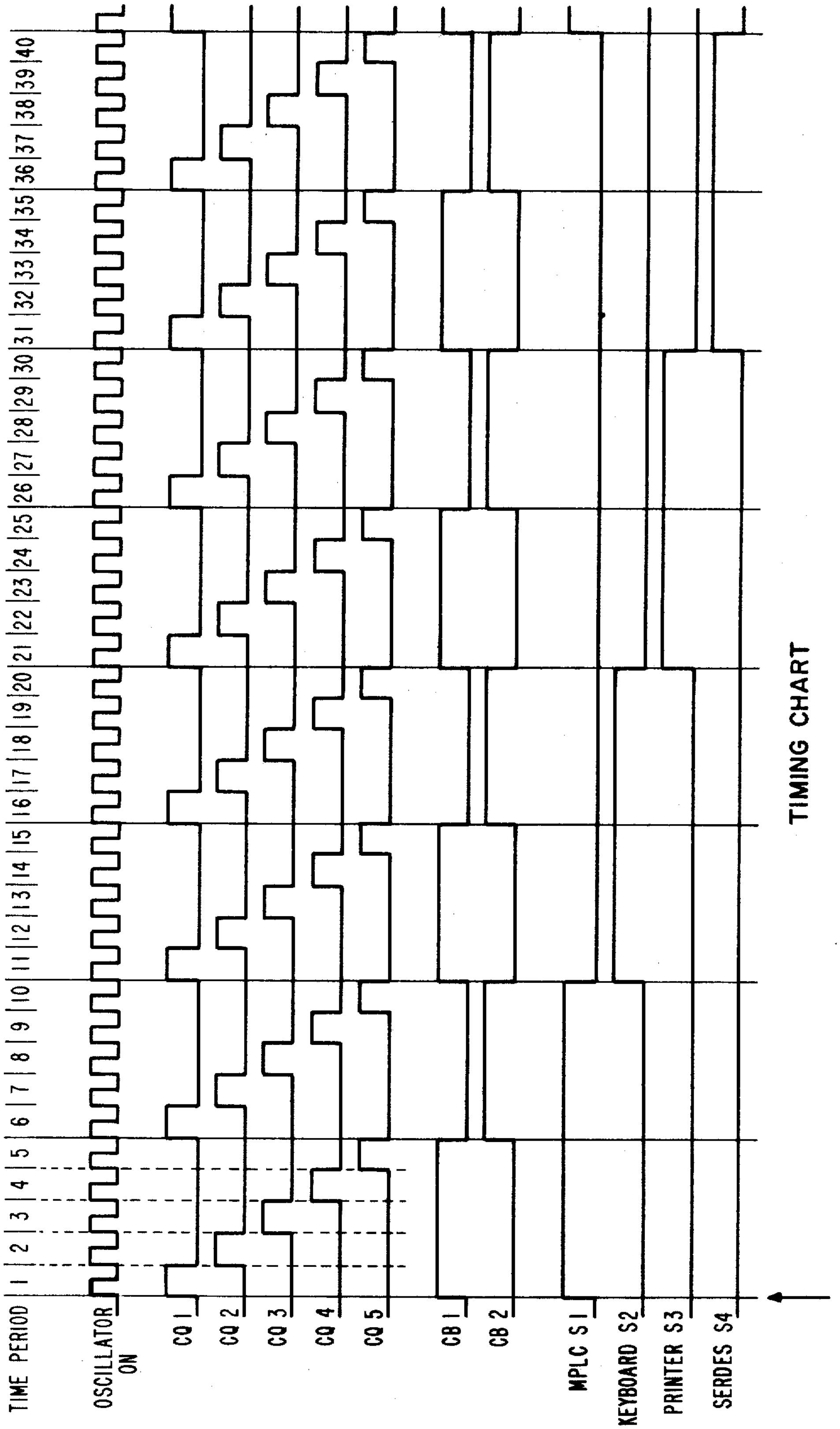
FIG. 3 is a timing diagram which is helpful in explaining the operation of each terminal.

Reference is made next to FIG. 3 which is a timing chart showing the types of pulse control signals, the time duration of each, and the phase relationship of the various types of pulse control signals generated and used at each station. The basic oscillator pulses are shown and numbered according to time slots 1 through 40 in the upper portion of the drawing. Pulses CQ1 through CQ5 occur in a continuous train, as shown, and they are generated in response to the oscillator pulses. Pulses CB1 and CB2 occur in a continuous train at a lower repetition rate, and they are generated in response to the pulses CQ1. The pulses S1 through S4 occur in a continuous train at a still lower repetition rate, and they are generated in response to the CB1 pulses. The phase relationship and the time duration of the various pulses are readily apparent by inspection of FIG. 3 and the manner of generating the pulses is explained more fully hereinafter with respect to a detailed description of the clock-scanner 50 which is shown in block forms in FIG. 2. FIG. 3 illustrates one complete cycle of the clock-scanner 50. The pulses S1 through S4 in FIG. 3 define and control the access cycles of the respective satellite controls 23 through 26 in FIG. 2 by the master control 27; the pulses CQ1 through CQ5, CB1 and CB2 are used by the master control; and some or all of these pulses may be used by each of the satellite control devices 23 through 26 when each is accessed by the master control 27 or when each is updated by its associated input-output device.

Since a principal feature of this invention is to provide a self-diagnostic system which provides real-time error detection and the location of such error with respect to a functionally replaceable unit, each station of the system is made automatically self-diagnostic, and for this purpose the replaceable functional components of each station are categorized as master control, satellite, or remote unit. A remote unit is an input-output device such as the keyboard 20 or the printer 21. As pointed out above, data storage, control storage, timing signals and diagnostic controls are disposed in the master control 27 at each station, and the master control is self-checking. A self-checking unit is defined as one which has the inherent ability to detect that a failure has occurred internally in such unit. The master control monitors the satellite controls, and an error in a given satellite is manifested in the master control as being at the station where such error occurs. Data and control transfers take place between the master control and the satellite controls or the remote units. Only one satellite control or its associated remote unit may exchange data or control information with the master control at any one instant of time, and any malfunction in a satellite control or its associated remote unit is detected by the diagnostic feature of the master control as the malfunction occurs. Since only one satellite control or its associated remote unit is accessed by the master control in a given time increment and error detection takes place in such given time increment, any detected failure is known to be located in such satellite or its associated remote unit. Satellite controls may include internal functions that are performed by circuits which are self-checking. Such circuits are considered fail-safe from the system point of view, and this is helpful, by the process of elimination, in defining that a malfunction is located elsewhere unless there is an indication to the contrary. Such remote unit is operated under control of its associated satellite control, and the satellite control signifies to the master control if there is a malfunction in the remote unit. The fail-safe feature may be used within a satellite control which has a function not easily monitored by the master control. For example, the Serdes 22 in FIG. 2 may receive information correctly from the master control but fail to send such information correctly to another station. The Serdes 22 is therefore provided with data transfer equipment in the form of a serial shift register which is self-checking, and if an error in shifting is made, the master control is notified by the self-checking equipment through the associated Serdes satellite control 26. When receiving data, the Serdes is assigned a parity bit to conform with received data, and the parity is predicted as each bit is shifted into the Serdes. A constant parity check makes it possible to determine when a data bit fails to shift from one position to the next or to determine if an extra bit is introduced into the Serdes. When no error is indicated, the shifting operation in the Serdes is assumed to be correct. A line error in the transmission medium 13 is indicated when the parity of a character in the Serdes is incorrect after reception of a character has been completed. Thus it is seen that the accuracy of the operation of the Serdes is monitored by the master control at each station. Since data is transferred from one satellite control to another via the master control, the data storage in the master control must contain an adequate number of positions to handle the machine data code. One extra storage bit is provided for the storage of parity information. Control storage is also provided in the master control, and this enables the transfer of control information from one satellite control to another. When one satellite control receives the opportunity to observe the control status of another satellite control through the master control, it is able to detect sequences and/or conditions which are necessary for its operation as pointed out above. This is valuable as a feature since each satellite control may direct the setting or resetting of control bits in the master control. More specifically, under certain given sets of conditions in the master control, one satellite control may be able to evaluate the current situation of another and react accordingly during its access by the master control to initiate or terminate its operation.

The diagnostic function at each station is disposed in the master control where it monitors the performance of all of the satellite controls at each station in order to provide error detecting capabilities for the entire station. The self-checking feature of the master control enables it to distinguish an internal malfunction of its own from a malfunction in a satellite control or its associated remote unit.

Each satellite control is an entity which is replaceable upon detection of an error. Each satellite control contains all circuitry necessary to perform its function, indicate to the master control unit any control changes, and to store any error indication occuring during its access time by the master control. An I/O satellite control and its associated remote unit may be added or removed at a given station without adversely affecting the operation of such station or the communication network. The absence of a device at a station does not disturb the error detection and location scheme of that station. The ability to add or remove a satellite control and its associated remote unit at any station is permissible because the master control is capable of various levels of supervision. Communication terminals, for example, obtain the flexibility of various levels of line control, block-error control, or both.

The exchange of data and control information between the master control and its associated satellite controls at each station is made under a given system discipline. More specifically, all data transfers include a parity or check bit which is employed to verify the correctness of the data. At certain times each satellite control may not be actively functioning on the data or control information. However, the system discipline is maintained in the event a control action is required by any particular satellite control. Each satellite control sends a plurality of control signals to the master control when it is normally operating. One control bit is designated "satellite active," and this bit is activated whenever each satellite control is operative. Another control bit designated "satellite inactive" is activated whenever each satellite is not operative. Either a satellite active or a satellite inactive signal is always forwarded to the master control when each satellite control is accessed, and these signals are used to maintain a given parity of the number of control signals sent to the diagnostic register of the master control.

According to another feature of this invention each satellite control insures error detection involving the satellite control-remote unit interface. Remote unit-satellite control relationships are difficult to analyze because of the varied number and type of remote units employed. An important function of each satellite control is to interpret the data and control information for its associated remote unit. Consistent with this responsibility the satellite control determines from the available information in which area a malfunction originates and then indicates to the master control whether a malfunction is associated with the remote unit or the satellite control itself. Furthermore, each satellite control operates on information from the remote unit and alerts the master control to current conditions which may require subsequent control action by the master control for such pending operations of the remote unit.

The remote units consist of a class of equipment normally located outside of the physical structure containing the master control and the associated satellite control devices. As pointed out earlier, the remote units consist of input-output devices which include electromechanical units, electronic units and communication attachment devices. Internal error-checking equipment functions in the remote unit to check for valid characters before transmission to or after receipt from a satellite control. A data-feedback system in the electromechanical devices guarantees the accurate reading or writing of each character. Some examples of this feedback system are the echo-check, read-after-writing, and double-reading. Echo-check is used in paper tape punches, for example, to detect the return movement of the punch mechanism and to compare the bit configuration with the input data. Read-after-writing involves reading paper tape or magnetic tape at the read station immediately after the write station and comparing the two operations for equality. Usually a buffer is required to store the data while the tape moves from the write station to the read station. The double-reading technique involves two read stations and a device for comparing the data from both stations. The double-reading technique does not detect errors in the input media, but errors in the input media are detected by using fail-safe checking circuitry.

In the satellite control-remote unit control interface, a feedback system is employed to allow the satellite control to determine if the remote unit is functioning properly. For every action control signal or combination of action control signals from a satellite control, the remote unit generates a reaction control signal. The satellite control monitors the reaction control signals as a check on the operation on the remote unit. The satellite must indicate to the master control that its lines to the remote unit are correct.

The master control 27 in FIG. 1 serves as a self-diagnostic, error-locating device for its station. The master control accesses each satellite control in turn to give data and/or control information and to receive data and/or control information for monitoring purposes and for control purposes. If an error occurs in the master control, a satellite control, or a remote unit, the fact that the error occurs and the location of the error is indicated by the master control so that the defective unit may be readily replaced and normal operation resumed.

Figure 4:
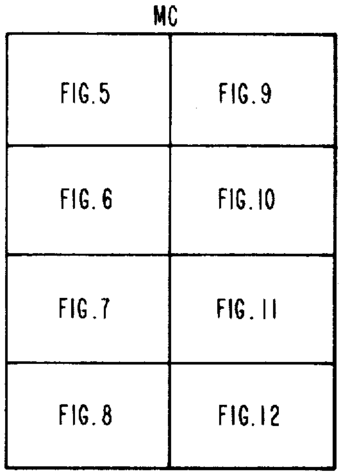
FIGS. 4 through 12 illustrate in detail the master control shown in block form in FIG. 2.
Figure 5:
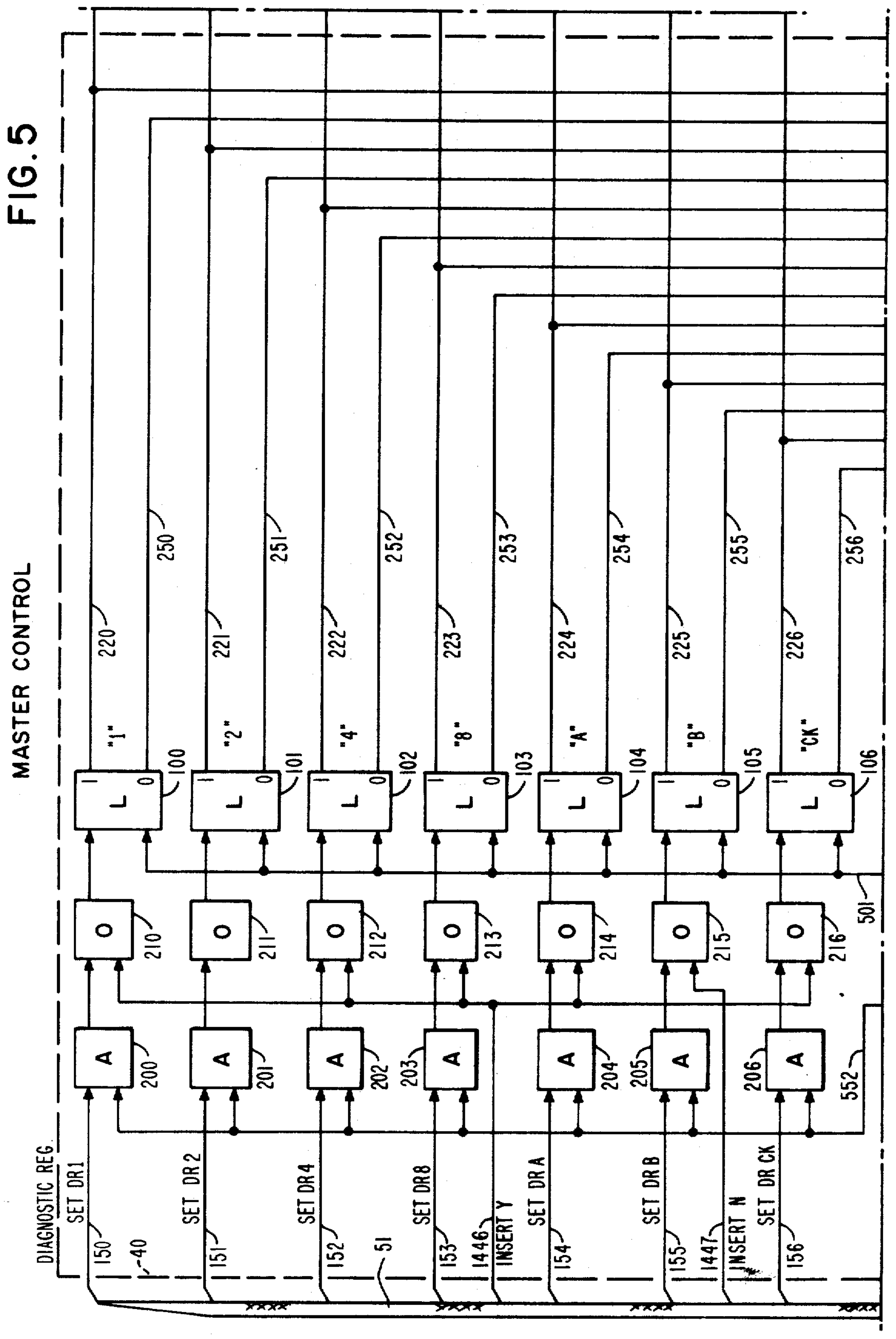
Figure 6:
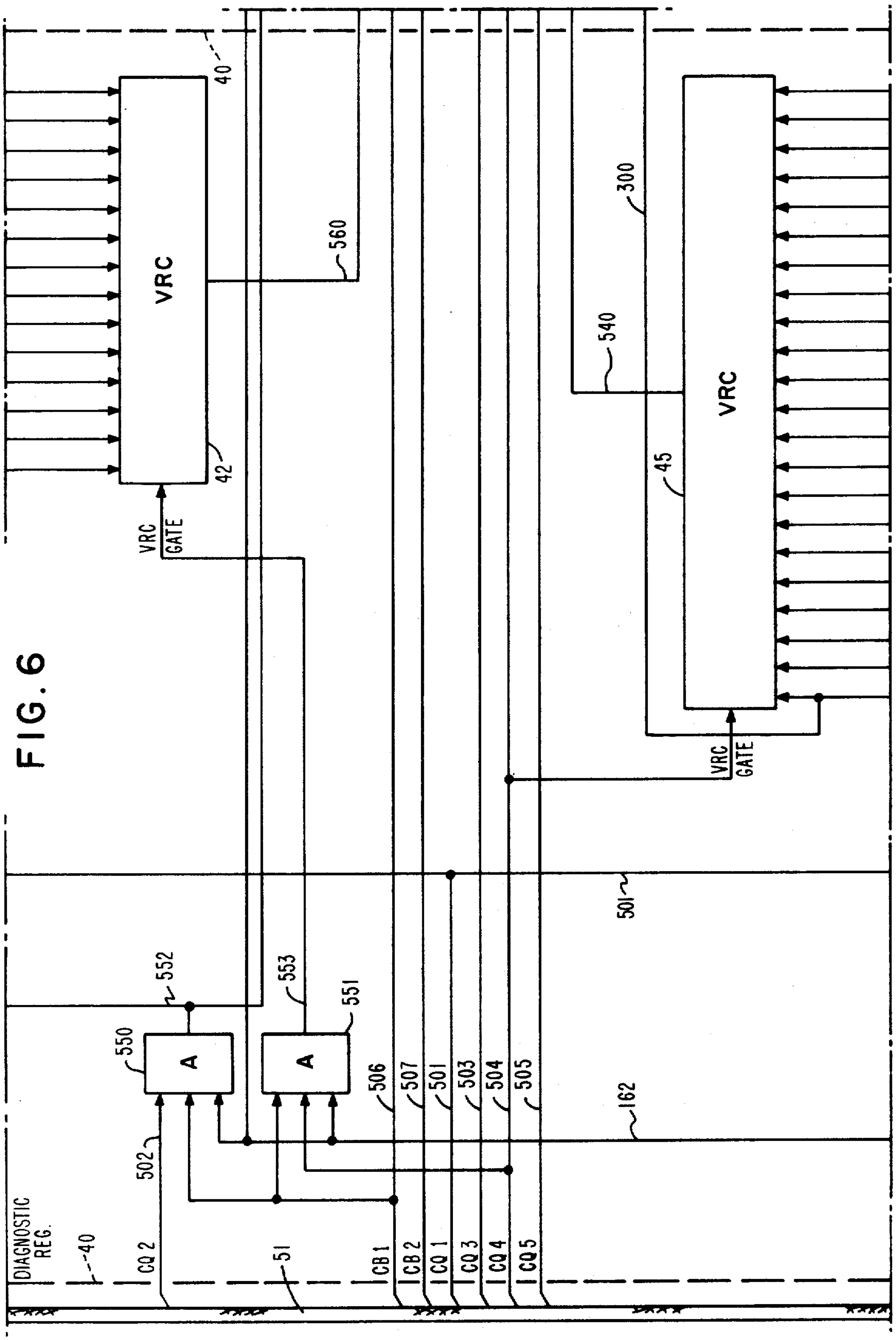
Figure 7:
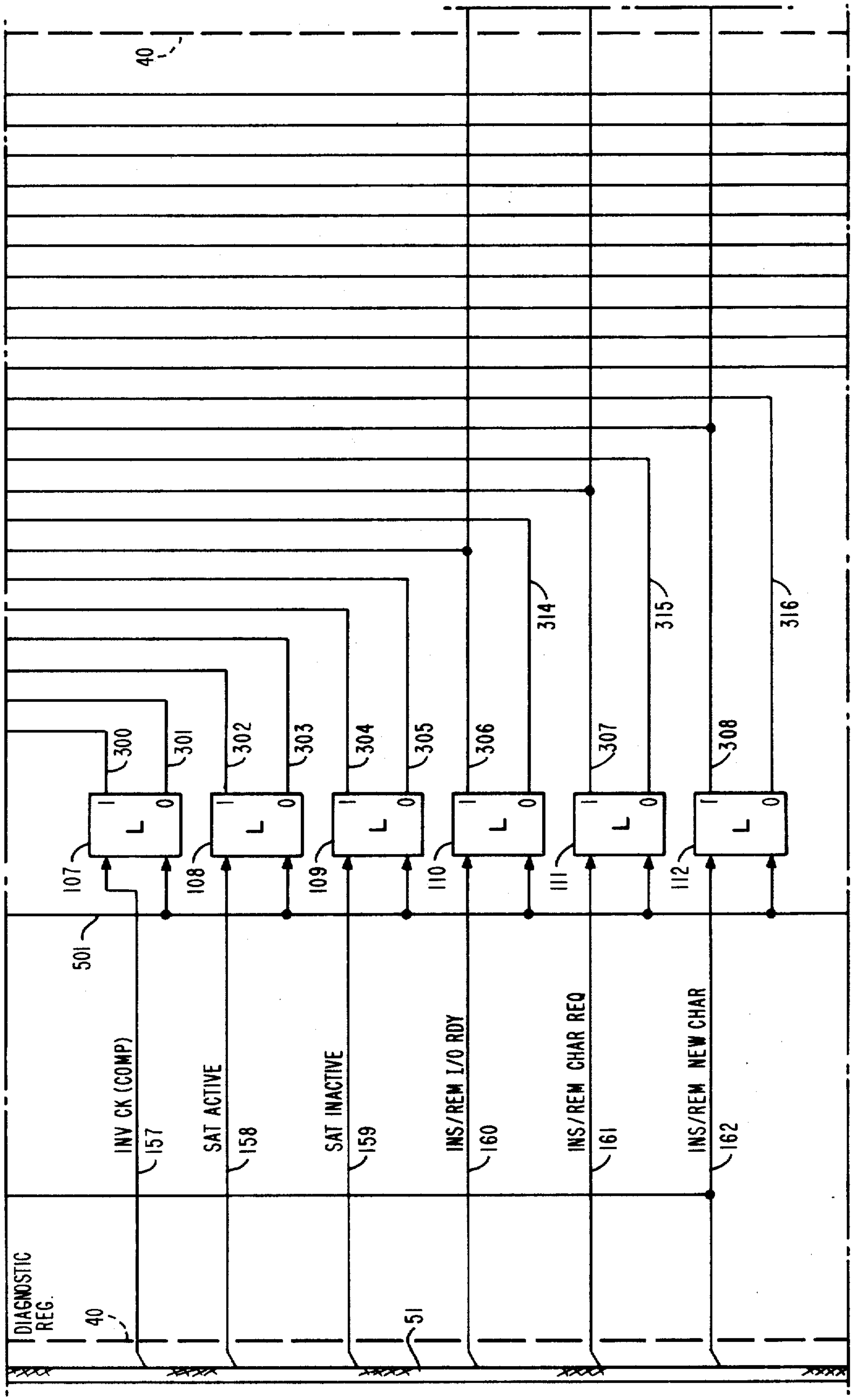
Figure 8:
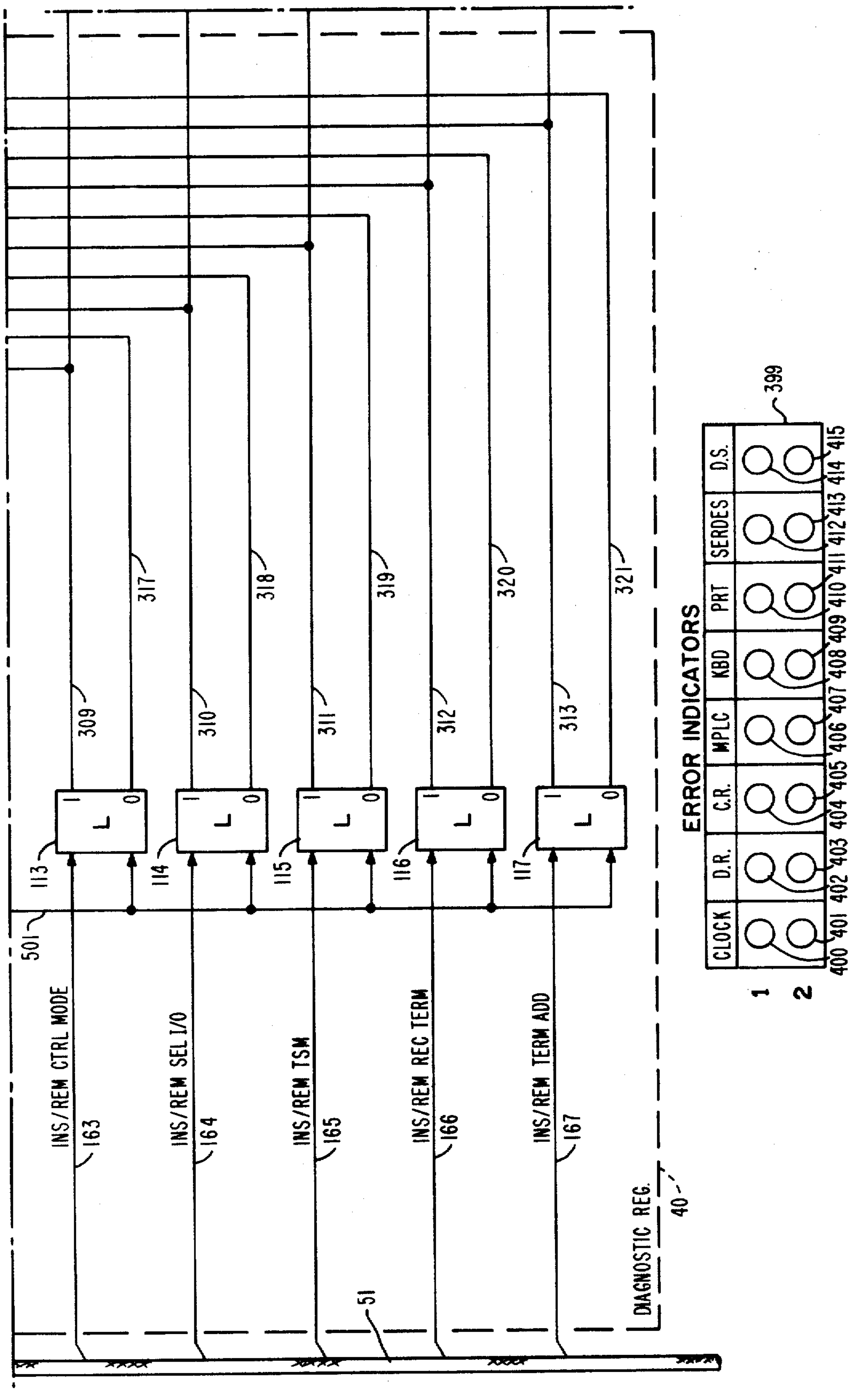

Next the construction and operation of the master control 27 in FIG. 2 is described in greater detail, and for this purpose reference is made to FIGS. 5 through 12 which should be arranged with respect to each other as illustrated in FIG. 4. The diagnostic register 40 in FIGS. 5 through 8 includes latches 100 through 117 which are reset by a CQ1 pulse signal on a line 501. Signals on input lines 150 through 167 from the cable 51 in FIGS. 5 through 8 are supplied to the diagnostic register 40. Input signals on the lines 150 through 156 are supplied through respective AND circuits 200 through 206 and associated OR circuits 210 through 216 to the one input side of respective latches 100 through 106. The signals on the lines 150 through 156 represent data which is passed by the associated AND circuits 200 through 206 and OR circuits 210 through 216 and stored in respective latches 100 through 106. Signals on the input lines 157 through 167 in FIGS. 7 and 8 represent control information which is stored in respective latches 107 through 117. A signal on the input line 157 in FIG. 7 is applied to the one input side of the flip-flop 107. The content of the latch 107 represents a check bit which is employed to maintain odd parity for the control information stored in the latches 108 through 117 in FIGS. 7 and 8. Signals representing control information on the lines 158 through 167 are applied to the one input side of respective latches 108 through 117 in FIGS. 7 and 8. The function performed by the control signals on the lines 158 through 167 is signified by the legend on each line. For the data signals a binary weighted code 1, 2, 4, 8, A, B, C, is employed. These bits are represented by signals on the respective lines 150 through 156 in FIG. 5, and they are stored, after passing through associated AND circuits 200 through 206 and OR circuits 210 through 216 in respective latches 100 through 106. The signals on the one output side of the latches 100 through 106 are conveyed on respective lines 200 through 226 through associated AND circuits 230 through 236 to the input side of corresponding latches 240 through 246 in FIG. 9 which constitute the data register 43. The output signals from the latches 100 through 106 in FIG. 5 are supplied to a vertical redundancy check (VRC) circuit 42 in FIG. 6. The lines 220 through 226 convey signals from the one output side of respective latches 100 through 106 to the VRC 42, and the lines 250 through 256 convey the zero output side of respective latches 100 through 106 to the VRC 42. The VRC 42 performs a parity check to determine if the data stored in the latches 100 through 105 is compatible with the check bit stored in the latch 106.

Figure 9:
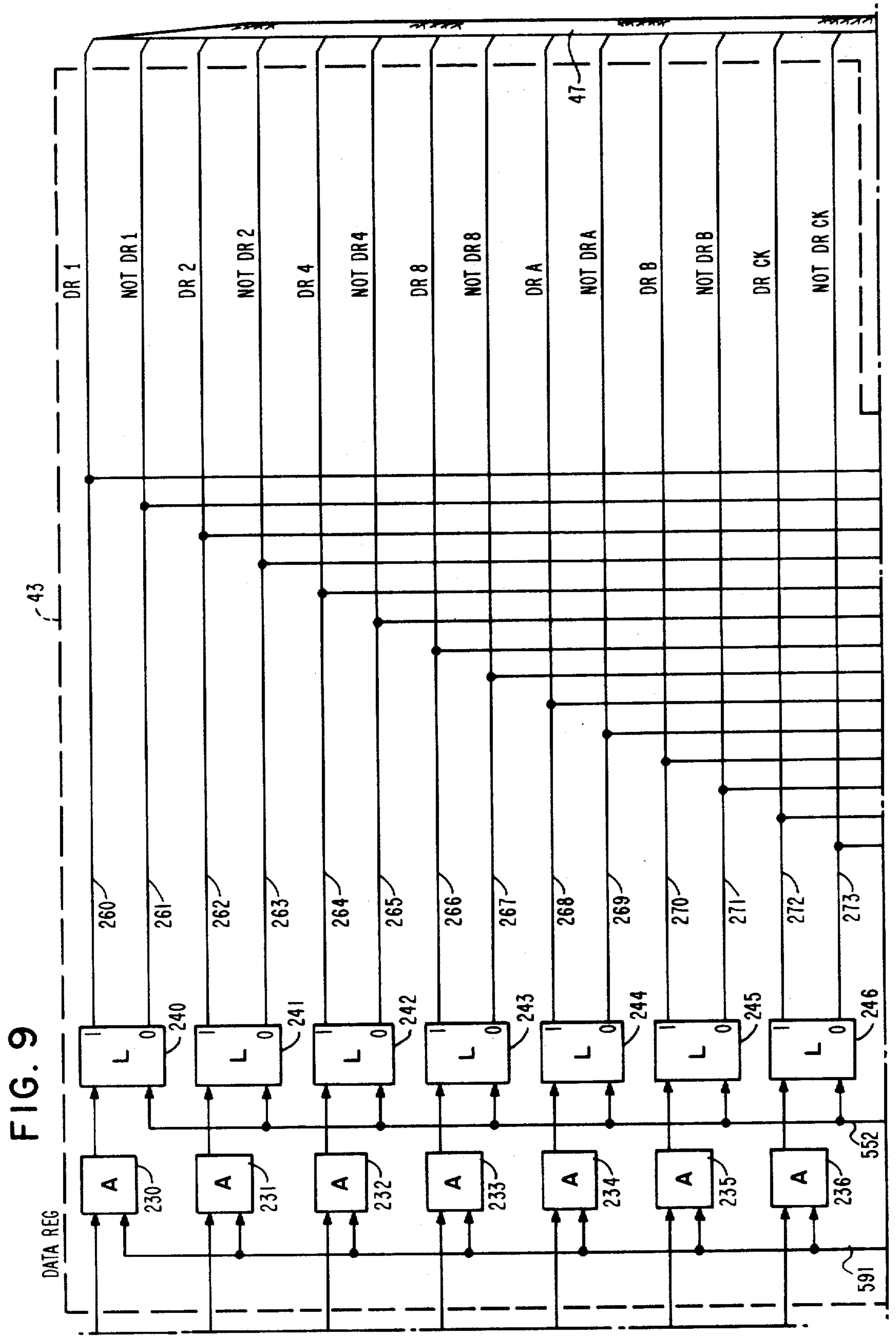

Output signals from the latches 240 through 246 in FIG. 9 are conveyed on output lines 260 through 273 to the cable 47 and to the VRC 48 which performs a parity check on the data supplied to the bus 47. The VRC 42 and the VRC 48 insure that the data signals received from the bus 51 in FIG. 5 is correctly transmitted to the bus 47 in FIG. 9 by the diagnostic register 40 and the data register 43. If an error is detected by the VRC 42 or the VRC 48, it is indicated in the master control, as explained more fully hereinafter.

Output signals from the latches 107 through 117 in FIGS. 7 and 8 are conveyed on associated output lines 300 through 321 to the VRC 45 in FIG. 6. This VRC performs a parity check on the control signals, and if an error is detected, this is signified by the master control in a manner explained more fully hereinafter. The content of the latch 107 serves as a parity check bit for the control information stored in the latches 108 through 117. The content of the latches 107 through 109 is used for parity checking purposes only, not for control of the accessed satellite control. The latches 108 and 109 signify the status of the accessed satellite control, and this is monitored by the master control, as part of the total parity check of the latches 107 through 117 to verify that the status of each accessed satellite control is correct at all times, including those periods when it is active as well as those periods when it is inactive.

The output signals from the one output side of the latches 110 through 117 are conveyed on respective output lines 306 through 313 through associated AND circuits 330 through 337 to the one input side of respective latches 340 through 347 when setting these latches, and the signals on the lines 306 through 313 are supplied through associated AND circuits 350 through 357 to the zero input side of corresponding latches 340 through 347 when resetting these latches. The output signals from the latches 340 through 347 are supplied on output lines 370 through 385 in FIGS. 11 and 12 to the bus 47 and to the VRC 49 in FIG. 10 where a parity check is made on the control information supplied to the bus 47. The VRC 45 in FIG. 6 and the VRC 49 in FIG. 10 serve to insure that control data from the bus 51 in FIGS. 7 and 8 is correctly transmitted to the bus 47 in FIGS. 11 and 12 in its passage through the diagnostic register 40 and the control register 46. Otherwise an error is indicated, as explained more fully hereinafter. Control lines 386 and 387 in FIG. 12 are selectively energized by operation of a job switch 388. If the control line 386 is energized with the switch in the position shown, the station operates in the home mode. If the switch 388 is connected to the control line 387, the station is operated in the line mode or not the home mode. When a station is operated in the home mode, it is not permitted to communicate with other stations in the network. For example, if station 1 in FIG. 1 is placed in the home mode, it cannot exchange information with station 2 or station 3. If the switch 388 in FIG. 12 is operated to energize the control line 387, the master control 46 is placed in the line mode, and such station may exchange information with other stations in the network. When operated in the home mode, a station may permit exchange of information between its remote units. For example, if the master control 27 in FIG. 2 is placed in the home mode, the keyboard 20 may be manipulated to operate the printer 21. If the master control 27 in FIG. 2 is placed in the line mode, the exchange of information between the remote units 20 and 21 is inhibited, but such remote units may exchange information with other stations in the network. In such case the keyboard 20 in FIG. 2 may not then operate the printer 21 at the same station, but the keyboard 20 may be manipulated to operate a printer 21 at another station in the network.

An error indicator panel 399 in FIG. 8 is provided in the master control of each station to signify the location of a detected malfunction A pair of indicator lights is provided for each unit monitored and the use of two lights instead of one light increases the reliability of properly indicating any error which may occur. Indicator lights 400 through 415 are disposed as shown. If a malfunction occurs in the clock, for example the indicator lights 400 and 401 are lighted, as explained more fully hereinafter.

Figure 13:
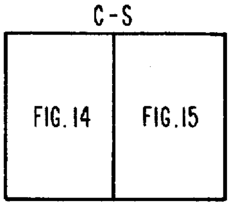
FIGS. 13 through 15 illustrate in detail the clock-scanner shown in block form in FIG. 2.
Figure 14:
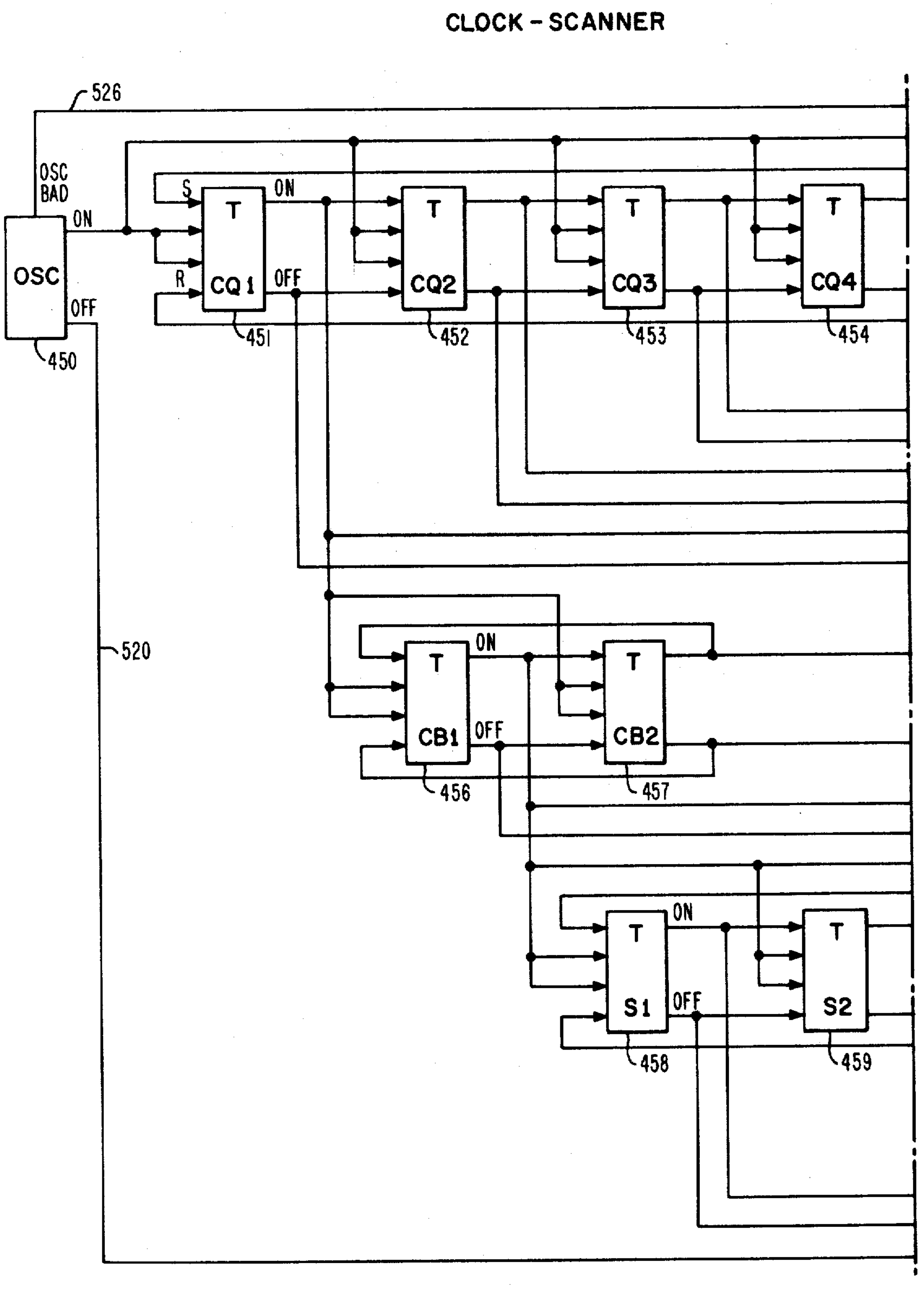
Figure 15:
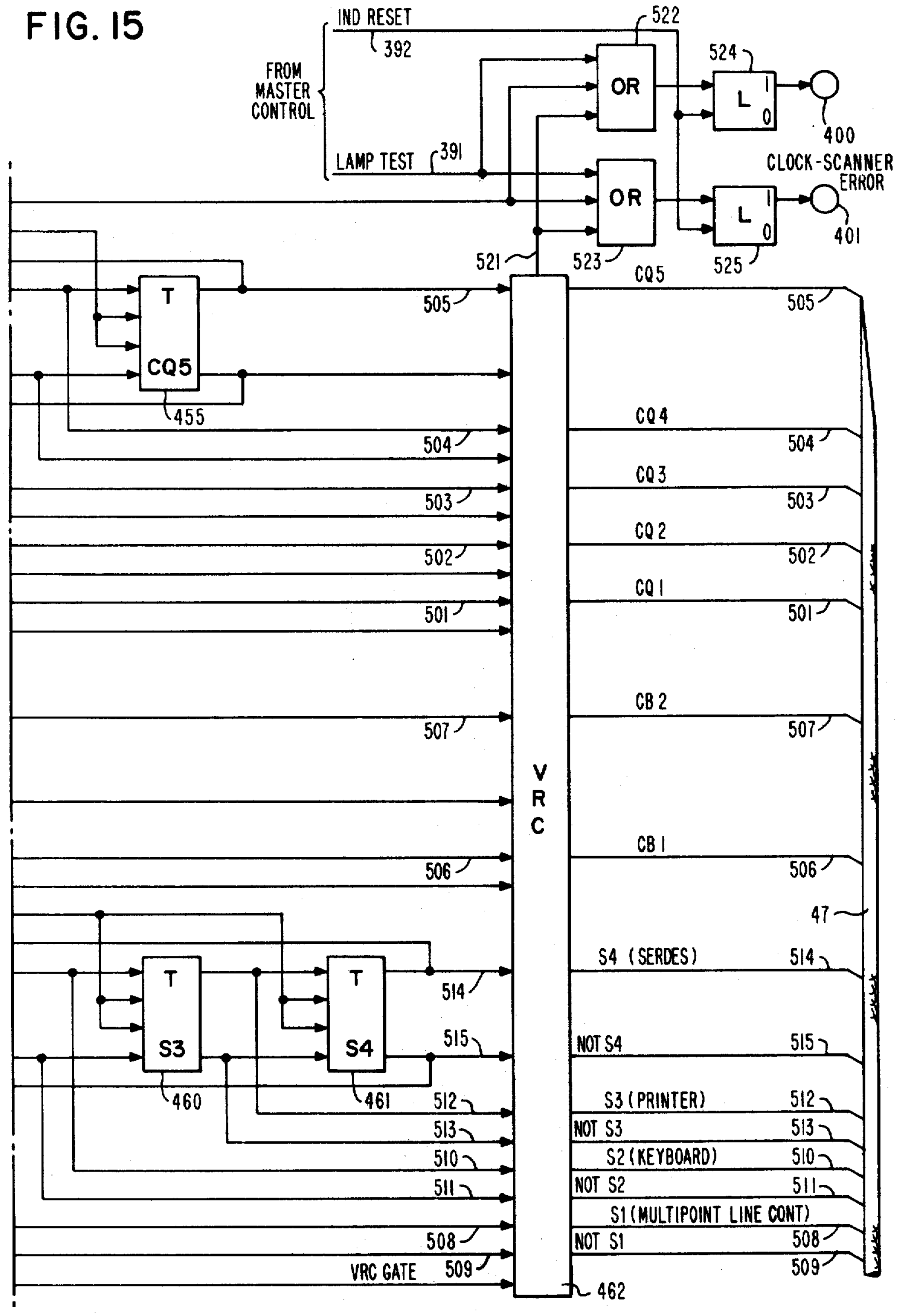

Reference is made next to FIGS. 14 and 15 which, when arranged with respect to each other as indicated in FIG. 13, illustrate in detail the clock-scanner 50 shown in block form in FIG. 2. An oscillator 450 in FIG. 14 supplies pulse signals in FIGS. 14 and 15 to triggers 451 through 455 which are connected in tandem in a closed ring. The trigger 451 is set in the on state by one oscillator pulse, and the next oscillator pulse turns the trigger 451 off and turns on the trigger 452. In response to succeeding clock pulses the on state is shifted from trigger to trigger around the chain of triggers 451 through 455 in repetitive fashion. The output from the on side of the trigger 451 is connected to a second ring of triggers consisting of triggers 456 and 457. The output from the on side of the trigger 456 is connected as an input to a third ring of triggers consisting of triggers 458 through 461. The second ring of triggers and the third ring of triggers are operated in repetitive fashion with one trigger in each ring of triggers providing one output pulse which is positive, all remaining triggers in each chain supplying a negative output. The output signals from the on side of the triggers 451 through 457 are supplied on respective output lines 501 through 507 to a VRC 462, and these lines pass through the VRC 462 to the cable 47. The output signals from the off side of the triggers 451 through 457 are connected to the VRC 462 only. The output signals from the on and the off sides of the triggers 458 through 461 are supplied on associated output lines 508 through 515 to the VRC 462, and these output lines also pass through the VRC 462 to the cable 47. The triggers 451 through 461 have both of their outputs connected to the VRC 462, and the VRC 462 serves to perform a parity check on the status of these triggers in the time period between oscillator pulses supplied to the trigger 451. The positive oscillator pulses depicted in FIG. 3 are taken from the on side of the oscillator 450 and supplied to the trigger 451. In between the positive oscillator pulses shown in FIG. 3 there are positive oscillator pulses taken from the off side of the oscillator 450 and supplied on a line 520 to the VRC 462. The positive pulse on the line 520 operates the VRC to perform a parity check on both outputs of each of the triggers 451 through 461. If an error is detected, the VRC supplies a positive output signal on a line 521 to OR circuits 522 and 523, and they in turn supply this signal to the one input side of associated latches 524 and 525. When the latches 524 and 525 are set to the one state, the associated indicator lamps 400 and 401 are lighted, thereby signifying an error. As pointed out earlier, the indicator lights 400 and 401 are disposed in the indicator panel 399 of the master control. The use of two OR circuits, two latches, and two indicator lamps in FIG. 15 increases the reliability of properly indicating any malfunction which may occur in the clock-scanner 48.

If the oscillator 450 malfunctions, a positive signal is supplied on a line 526 to the OR circuits 522 and 523, and the latches 524 and 525 are operated to energize the indicator lamps 400 and 401. For test purposes the lamps 400 and 401 may be lighted by a positive signal on the line 391. The lamp test signal on the line 391 serves to test the operability of the indicator lamps associated circuits, and this signal may be initiated by an operator at the master control. An indicator reset signal on the line 392 is initiated by an operator at the master control to extinguish the indicator lights 400 and 401 by resetting the latches 424 and 425.

The signals taken from the on side of the triggers 451 through 455 on respective output lines 501 through 505 are designated as pulses CO1 through CO5 in FIG. 3. Output signals taken from the on side of the triggers 456 and 457 in FIG. 14 on respective lines 506 and 507 are designated as pulses CB1 and CB2 in FIG. 3. Output signals from the on side of the triggers 458 through 461 on respective output lines 508, 510, 512 and 514 in FIGS. 14 and 15 are designated as pulse signals S1 through S4 in FIG. 3. Output signals from the off side of the triggers 458 through 461 on respective lines 509, 511, 513, and 515 represent respectively not S1, not S2, not S3, and not S4, and these signals are supplied along the bus 47 for use in various parts of the system.

It is pointed out by way of summary that the clock-scanner 50 in FIGS. 14 and 15 is self-checking. If the clock-scanner malfunctions, the indicator lights 400 and 401 are lighted. If one of the triggers 451 through 461 malfunctions, the VRC 462 detects this and lights the indicator lamps 400 and 401. If either one of the indicator lamps 400 or 401 fails to light in response to an error signal, the other indicator light is able to indicate the malfunction. In order to increase the probability of at least one lamp being lighted in response to a malfunction, the pair of lamps 400 and 401 are provided along with duplicate circuits. More specifically, the OR circuit 522, the latch 524 and the lamp 400 are operated by error signals on the lines 521 and 526. Likewise, the OR circuit 523, the latch 525 and the lamp 401 are operated by error signals on the lines 521 and 526. By the use of such duplicate circuits the probability of avoiding a malfunction in the indicator circuitry is minimized. Furthermore, the probability of a malfunction is further diminished by providing for lamp test signals on the line 391 which may be supplied periodically by an operator at the master control to test the operability of the indicator circuitry including the lamps 400 and 401. The operator deenergizes the indicator lamps by supplying an indicator reset signal on the line 392 from the master control to reset the latches 524 and 525, thereby to extinguish the indicator lamps 400 and 401.

Figure 10:
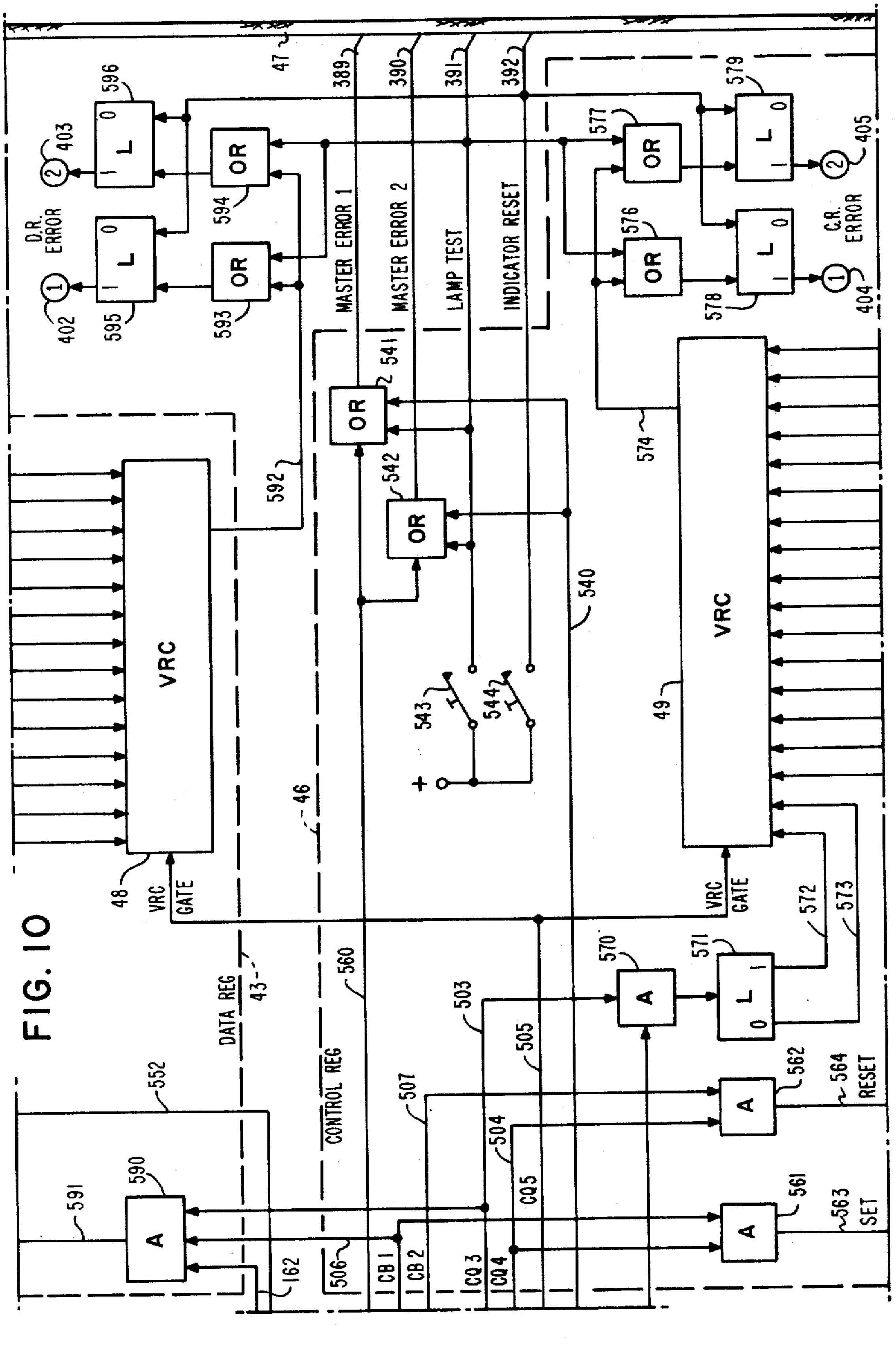

Reference is made next to FIGS. 6 and 10 for a description of the timing, control functions, and checking features of the master control. Referring first to FIG. 6, timing pulses CQ1 through CQ5, CB1 and CB2 are supplied on respective lines 501 through 507 from the bus 51 to the control logic in FIGS. 6 and 10. The VRC 45 in FIG. 6 receives a gating pulse CQ4 on the line 504, and if an error is detected, an output signal is supplied from the VRC 45 on a line 540 to OR circuits 541 and 542 in FIG. 10 and these OR circuits pass such signals along respective output lines 389 and 390 to the bus 47. The use of duplicate OR circuits 541 and 542, increases the reliability of passing an error signal on the line 540 to the output lines 389 and 390, designated respectively master error 1 and master error 2. If one OR circuit should fail to operate, the other OR circuit insures that the error signal is passed along its associated output line. A switch 543 is manually operated to the closed position to generate a lamp test signal on the line 391, and signals on this line are applied to the OR circuits 541 and 542 to generate a false master error 1 signal on the line 389 and a false master error 2 on the line 390 whenever an operator desires to check the operation of the error response equipment disposed throughout the system. The switch 543 is released to remove the lamp test signal. A switch 544 is closed to generate an indicator reset signal on the line 392 which serves to reset the various indicator circuits, including the indicator lights on the panel 399 in FIG. 8.

AND circuits 550 and 551 in FIG. 6 are described next. The AND circuit 550 receives a positive input signal on the line 162 whenever a new character is to be inserted or removed, and positive input pulses are applied on the input lines 502 and 506, such pulses being CQ2 and CB1, respectively. It is readily seen from the timing chart in FIG. 3 that a positive output signal from the AND circuit 550 is developed, if at all, during time periods 2, 12, 22, or 32 of each clock-scanner cycle. It is further observed that time period 2 occurs during the second oscillator pulse of the S1 signal; the time period 12 occurs during the second oscillator pulse of the S2; the time period 22 occurs during the second oscillator pulse of the S3 signal; and the time period 32 occurs during the second oscillator pulse of the S4 signal. The signals S1 through S4 control the successive access cycles of the master control to the multipoint logic satellite control 23, the keyboard satellite control 24, the printer satellite control 25, and the Serdes satellite control 26, respectively. A pulse output signal from the AND circuit 550 is applied on a line 552 in FIG. 6 to the AND circuits 200 to 206 in FIG. 5, thereby to gate information to the respective latches 100 through 106. Thus it is seen that new data may be inserted in the latches 100 through 106 of the diagnostic register early in the access time period allotted to each satellite control. The output pulse signal from the AND circuit 550 on the line 552 is applied also to the zero input side of the latches 240 to 246 in FIG. 9, thereby to clear these latches for the subsequent reception of new data from the latches 100 through 106 in FIG. 5. Furthermore, resetting the latches 240 through 246 serves to remove the data supplied on the bus 47 to the satellite control previously accessed, and this cancellation takes place on the second oscillator pulse of a new access cycle.

The AND circuit 551 in FIG. 6 receives positive input signals on the lines 162, 504, and 506. A positive output signal from the AND circuit 551 is developed, if at all, on the output line 553 in response to pulses CB1 and CQ4 which combination makes it possible to provide an outputs signal from and AND circuit 551 at time periods 4, 14, 24, and 34 in FIG. 3. The output signal on the line 553 is applied to the VRC 42 thereby to check the data in the latches 100 through 106 in FIG. 5 during the fourth oscillator pulse which occurs during each of the signals S1 through S4. Thus it is seen that the AND circuit 550 causes new data to be inserted, if such is the case, during the second oscillator pulse of each access period, and the AND circuit 551 causes such data to be checked during the fourth oscillator pulse of each access period.

If the VRC 42 detects an error, a positive output signal is generated on a line 560 and supplied to the OR circuits 541 and 542 to generate the signals master error 1 and master error 2, respectively. If an error occurs in the data check by the VRC 45, a positive output signal is developed on the line 540 and supplied to the OR circuits 541 and 542 to generate the signals master error 1 and master error 2, respectively.

The line 501 in FIG. 6 receives a positive pulse at CQ1 time to reset the latches 100 through 106 in FIG. 5 and the latches 107 through 117 in FIGS. 7 and 8. This insures that these latches are cleared prior to the insertion of new data which occurs, if at all, at CQ2 time in the latches 100 through 106, as explained above. The insertion of new data in the control latches 107 through 117 in FIGS. 7 and 8 is described subsequently with respect to each satellite control.

Figure 11:
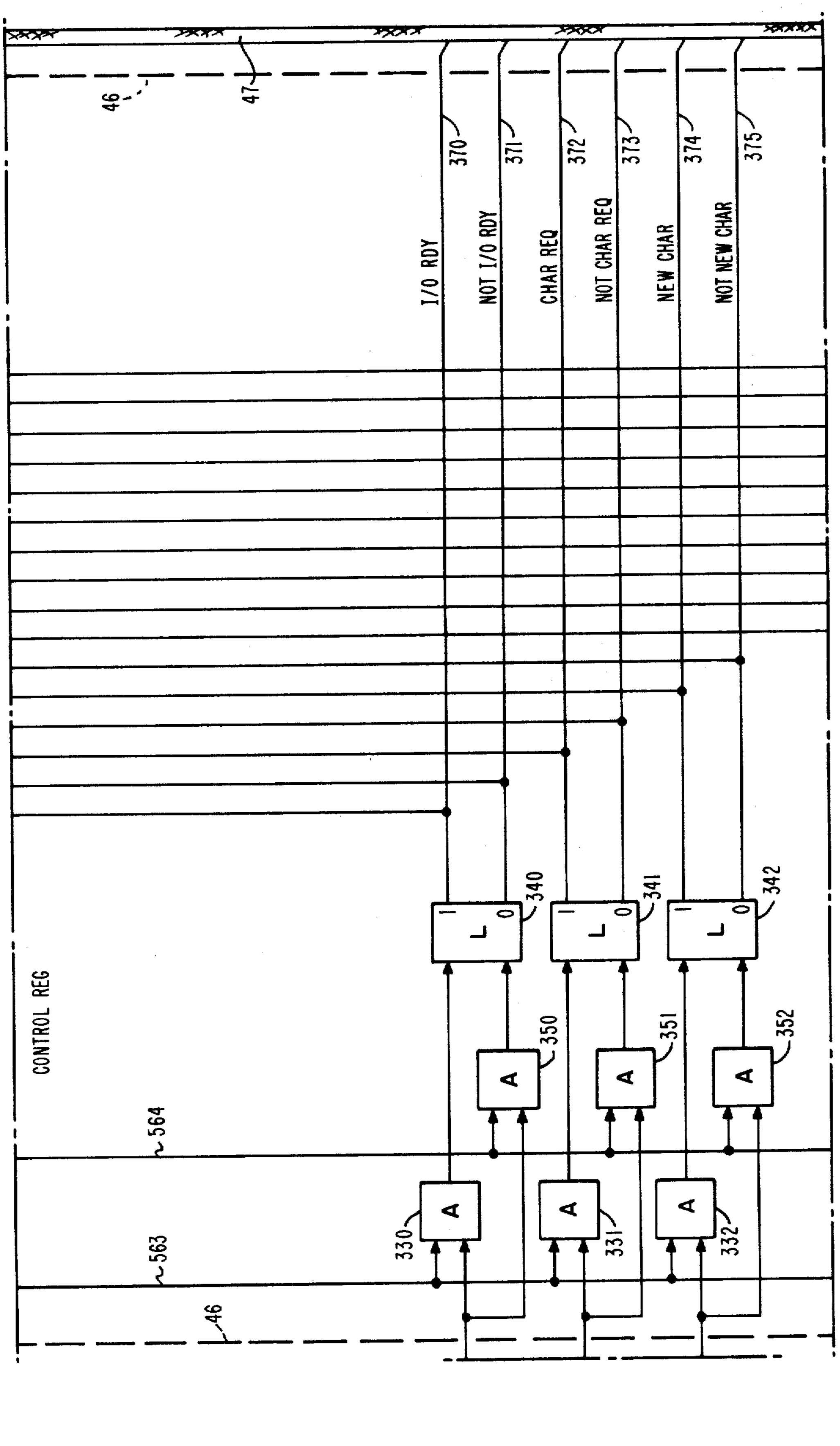
Figure 12:
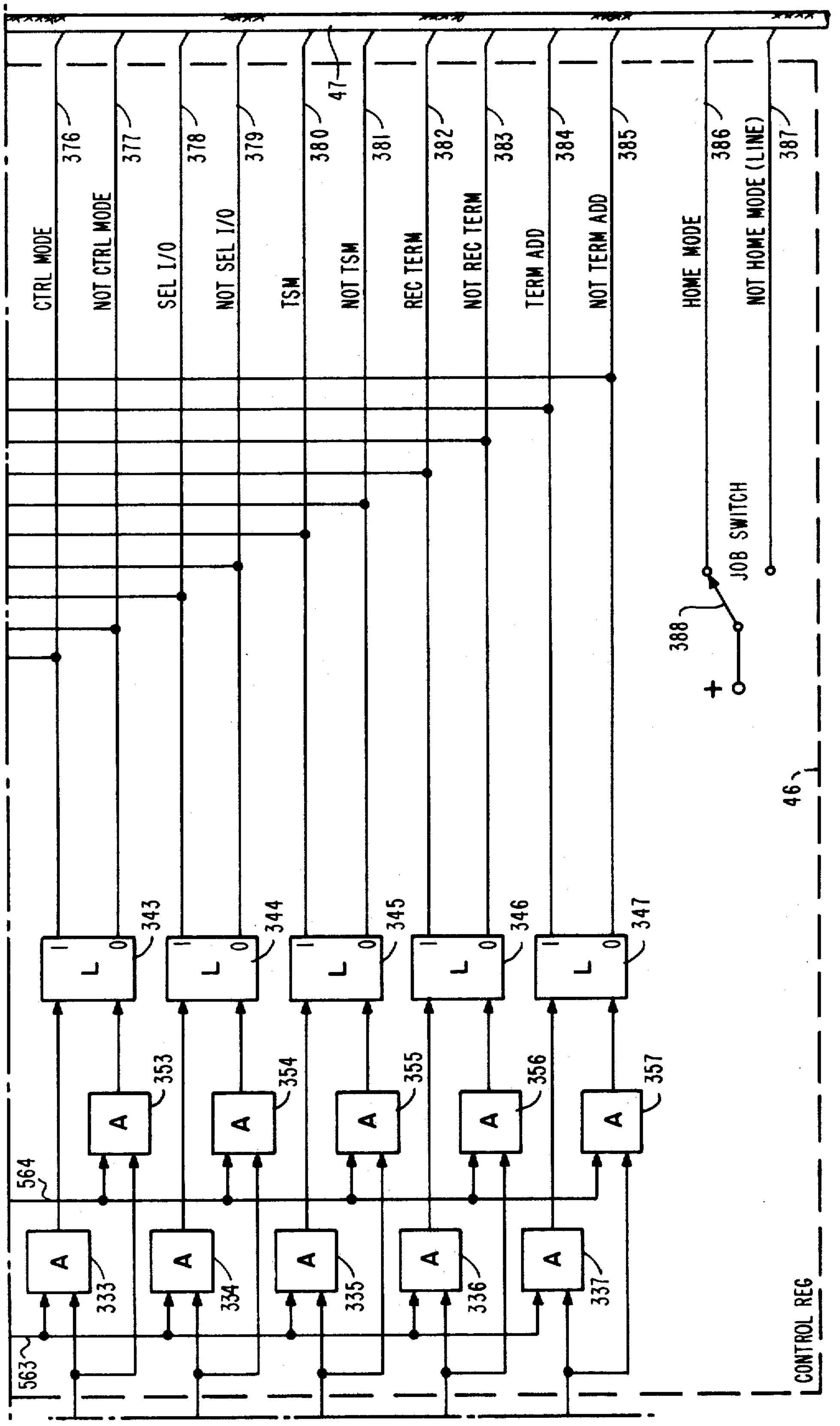

Referring next to FIG. 10, AND circuits 561 and 562 serve to control the set and reset operations of the latches 340 to 347 in FIGS. 11 and 12. The AND circuit 561 provides a positive output pulse on the line 563 in response to pulses CB1 and CQ4 on respective input lines 506 and 504, and this positive output signal is supplied to AND circuits 330 through 337 in FIGS. 11 and 12 which in turn pass control information from respective latches 110 through 117 in FIGS. 7 and 8 to corresponding latches 340 through 347 in FIGS. 11 and 12. This transfer takes place at time periods 4, 14, 24, and 34 in FIG. 3. More specifically, this transfer takes place during the fourth oscillator pulse of each access cycle where the signals S1 through S4 define each of the four access cycles of the master control to the four satellite controls.

The AND circuit 562 in FIG. 10 provides an output signal on a line 564 in response to input pulses CB2 and CQ4 on respective lines 507 and 504, and the positive output signal is supplied to the AND circuits 350 through 357 in FIGS. 11 and 12. These AND circuits respond to the control signal on the line 564 and signals from the one output side of associated control latches 110 through 117 in FIGS. 7 and 8 to reset corresponding latches 340 through 347 in FIGS. 11 and 12. The AND circuits 350 through 357 permit resetting of any one or more of the latches 340 through 347 provided the associated one of the latches 110 through 117 is set. This resetting operation takes place, if at all, at time periods 9, 19, 29, or 39 in FIG. 3. It is pointed out that these times occur at the next to last oscillator pulse in each access period where each access period is defined by the signals S1 through S4. Thus the resetting operation of the control register 46 takes place during the last portion of each access cycle in preparation of the commencement of the next access cycle.

An AND circuit 570 in FIG. 10 receives a signal level on the line 300 from the one output side of the latch 107 in FIG. 7 and a pulse signal CQ3 on the line 503 in FIG. 10, and when both such signals are positive, the AND circuit 570 supplies a positive output signal to the binary or complement input of a latch 571. The one and zero outputs of the latch 571 are supplied on respective lines 572 and 573 to the VRC 49. The VRC 49 receives the same information supplied to the VRC 45 with the exception that the two bits labeled as satellite active and satellite inactive in respective latches 108 and 109 have been removed, and the invert check bit in the latch 107 is replaced by the latch 571. The VRC 45 in FIG. 6 checks for odd parity, as does the VRC 49 in FIG. 10. If the VRC 49 detects an error, it supplies a positive output signal on a line 574 to OR circuits 576 and 577. These OR circuits pass any input signal to the one input side of respective latches 578 and 579. When these latches are set to the one state, they energize indicator lights 404 and 405. These indicator lights are disposed physically in the indicator panel 399 in FIG. 8, as explained earlier.

An AND circuit 590 in FIG. 10 responds to pulse signals CB1 and CQ3 on respective input lines 506 and 503 and a signal level on the input line 162 which is energized with a positive level whenever a new character is to be inserted or removed. In response to positive signals on these input lines, the AND circuit 590 provides a positive output signal to the AND circuits 230 through 236 in FIG. 9, thereby to pass information from the latches 100 through 106 in FIG. 5 to the latches 240 through 246 in FIG. 9. This transfer takes place, if at all, at time periods 3, 13, 23, or 33 in FIG. 3. Thus it is seen that the data inserted in the flip-flops 240 through 246 in FIG. 9 takes place during the early part of an access cycle defined by the signals S1 through S4.

Information stored in the latches 240 through 246 in FIG. 9 is checked by the VRC 48 in FIG. 10 in response to a CQ5 pulse on the line 505. If a parity error is detected, the VRC 48 supplies a positive output signal on a line 592 to OR circuits 593 and 594 which in turn supply this signal to the one input side of respective latches 595 and 596. This causes both of these latches to be set to the one state and thereby energize associated indicator lights 402 and 403 which are physically disposed on the indicator panel 399 in FIG. 8 as pointed out above.

Figure 19:
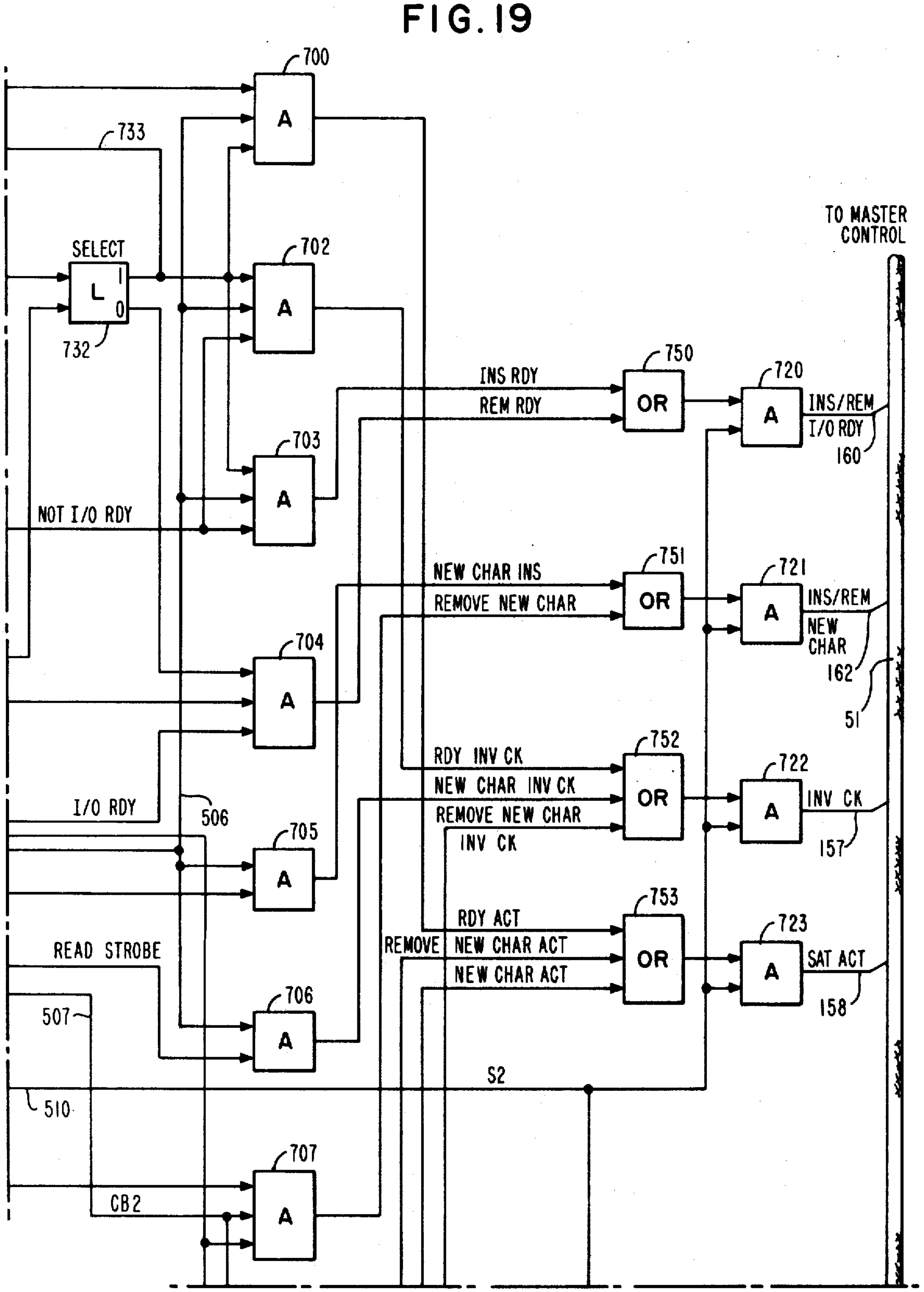

In the ensuing description reference is made from time to time to various codes sent and received throughout various parts of the system. Their identity and function is set forth in Table 1 below along with the recognizing unit of the system.

the AND circuit 735 is connected to the zero input side of the select latch 732 in FIG. 19.

Figure 17:
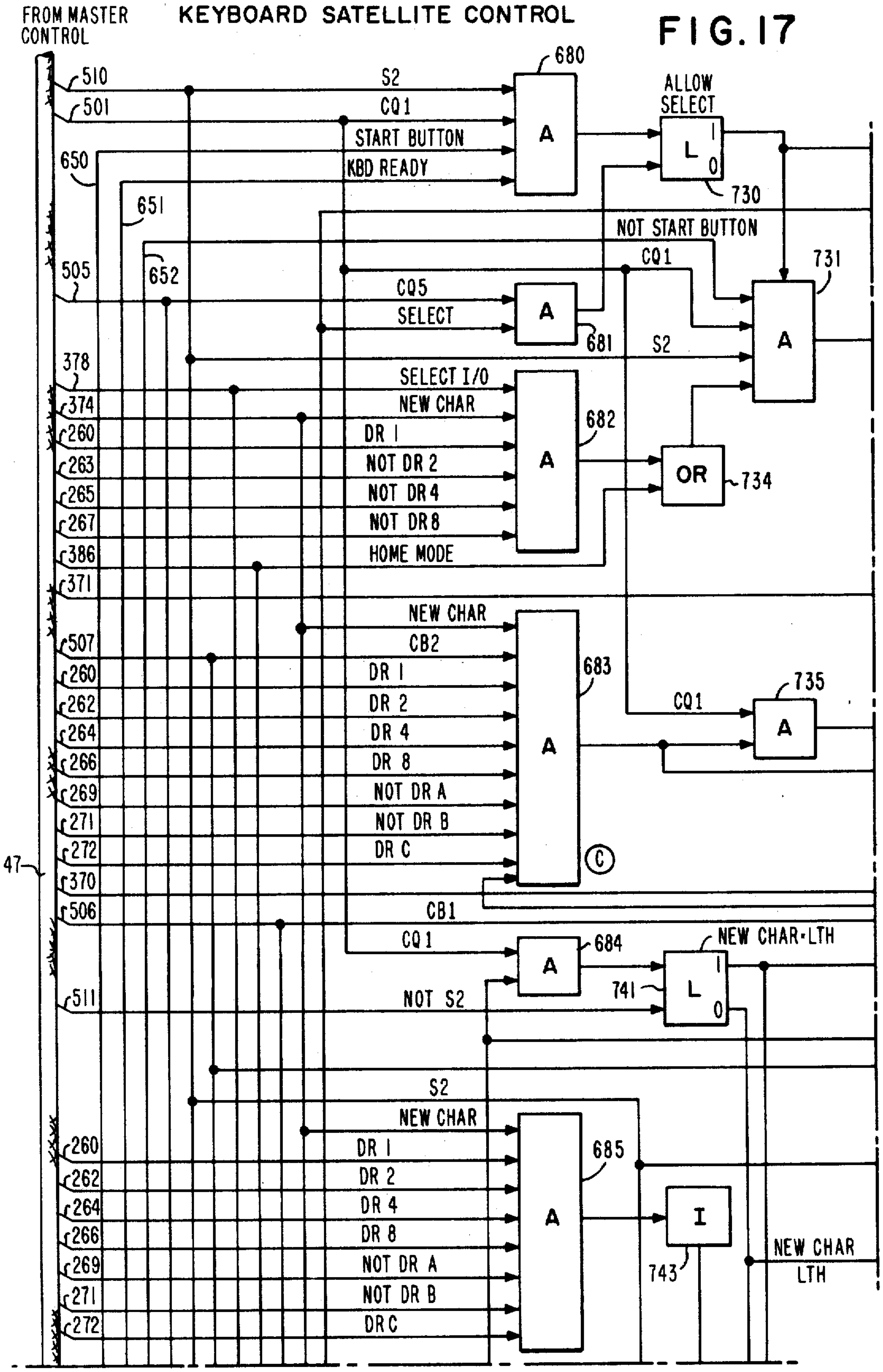

The AND circuit 684 in FIG. 17 responds to positive signals on input lines 655 and 501 to provide a positive output signal to the one input side of a new character latch 741. The latch 741 supplies a positive output signal from its one output side to the AND circuit 705 in FIG. 19 and an AND circuit 742 in FIG. 18.

The AND circuit 685 in FIG. 17 receives positive input signals on input lines 260, 262, 264, 266, 269, 271, 374, and 272 and supplies a positive output signal to an inverter 743. This inverter supplies an output signal to the AND circuit 708 in FIG. 20.

It is pointed out that the AND circuits 682, 683, and 685 in FIG. 17 respond to selection signals from the data register 43 and control signals from the control register 46. The data signals supplied to the AND circuit 682 are numeric signals from the data register 43, and when positive, they signify that the keyboard is to be selected. The data signals supplied to the

TABLE 1

| | Binary representation | | | | | | | | |
|---|---|---|---|---|---|---|---|---|---|
| | 1, | 2, | 4, | 8, | A, | B, | C | Function | Recognized by— |
| Code symbol: | | | | | | | | | |
| A | 1 | 0 | 0 | 0 | 1 | 1 | 0 | Terminal 1 addressed | MPLC 23 at Station 1. |
| B | 0 | 1 | 0 | 0 | 1 | 1 | 0 | Terminal 2 addressed | MPLC 23 at Station 2. |
| C | 1 | 1 | 1 | 1 | 0 | 0 | 1 | End of MSG (EOM) | MPLC 23 plus 24 or 25 at Station Addressed. |
| D | 0 | 0 | 1 | 0 | 1 | 1 | 0 | Terminal 3 addressed | MPLC 23 at Station 3. |
| N | 0 | 0 | 0 | 0 | 0 | 1 | 0 | No | MPLC at Receiving Station. |
| Y | 1 | 0 | 1 | 1 | 1 | 0 | 1 | Yes | MPLC 23 at Sending Station. |
| 1 | 1 | 0 | 0 | 0 | 0 | 0 | 0 | Keyboard addressed | MPLC 23 and KBD CNTL 24. |
| 5 | 1 | 0 | 1 | 0 | 0 | 0 | 1 | Printer addressed | MPLC 23 and PRT CNTL 25. |

Figure 16:
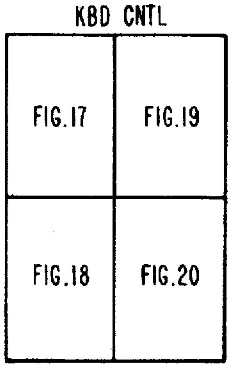
FIGS. 16 through 20 illustrate in detail the keyboard satellite control shown in block form in FIG. 2.

Reference is made next to FIGS. 17 through 20 which illustrate in detail the keyboard satellite control 24 shown in block form in FIG. 2. FIGS. 17 through 20 should be arranged as indicated in FIG. 16. Signals from the master control 27 are supplied on the bus 47 which is disposed at the left in FIGS. 17 and 18, and these signals are supplied on lines designated with the same reference numerals employed in FIGS. 9 through 12. Control signals are supplied from the keyboard 20 along the cable 52 in FIG. 18 on lines 650 through 656, and the signals on these lines are supplied to various logic elements, as shown. Output signals from the keyboard satellite control 24 are supplied to the bus 51, disposed at the right in FIGS. 19 and 20, and these control signals are supplied to the diagnostic register 40 of the master control. Output signals are supplied on the lines 657 and 658 in FIG. 20 to the keyboard 20.

Figure 18:
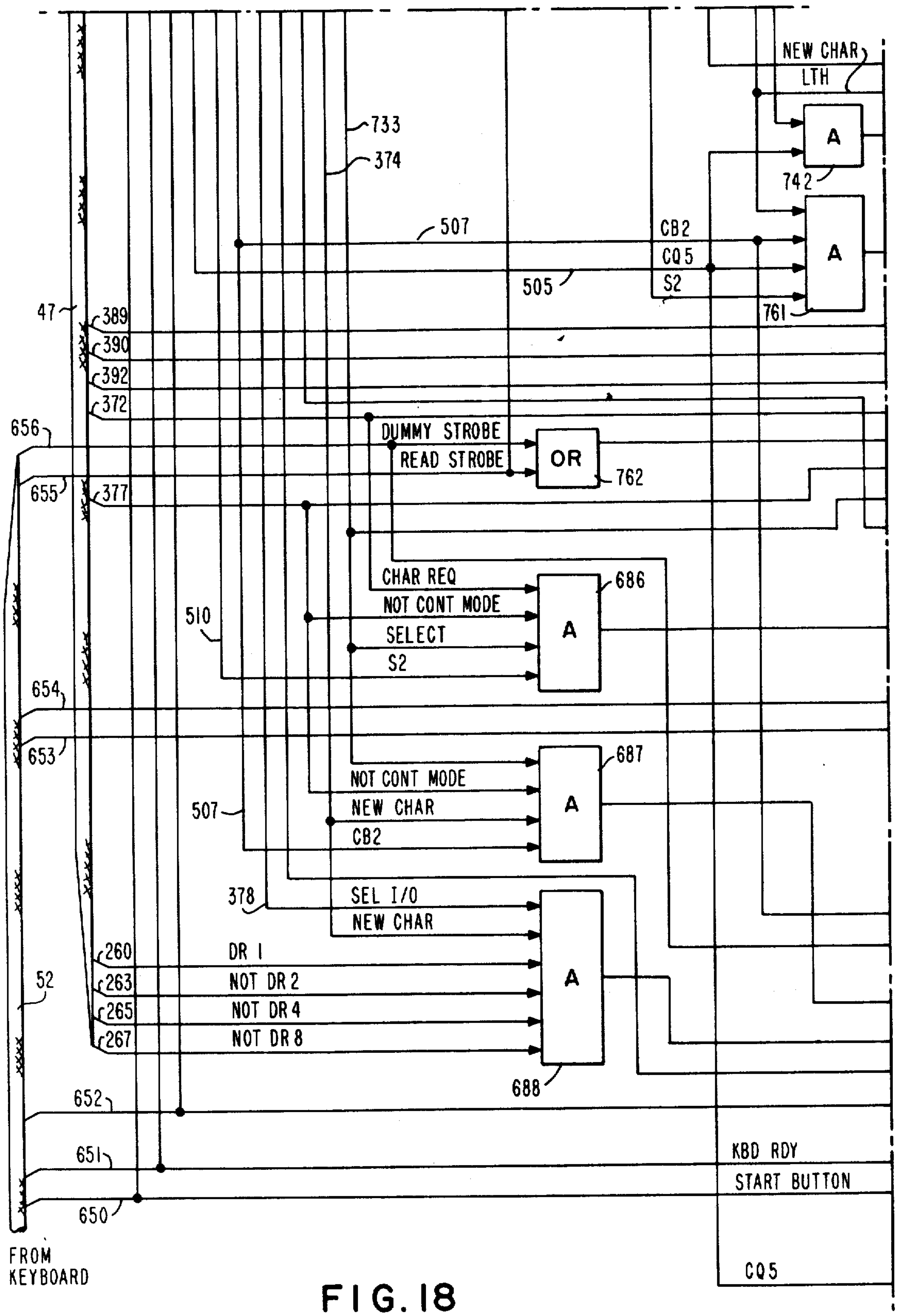
Figure 20:
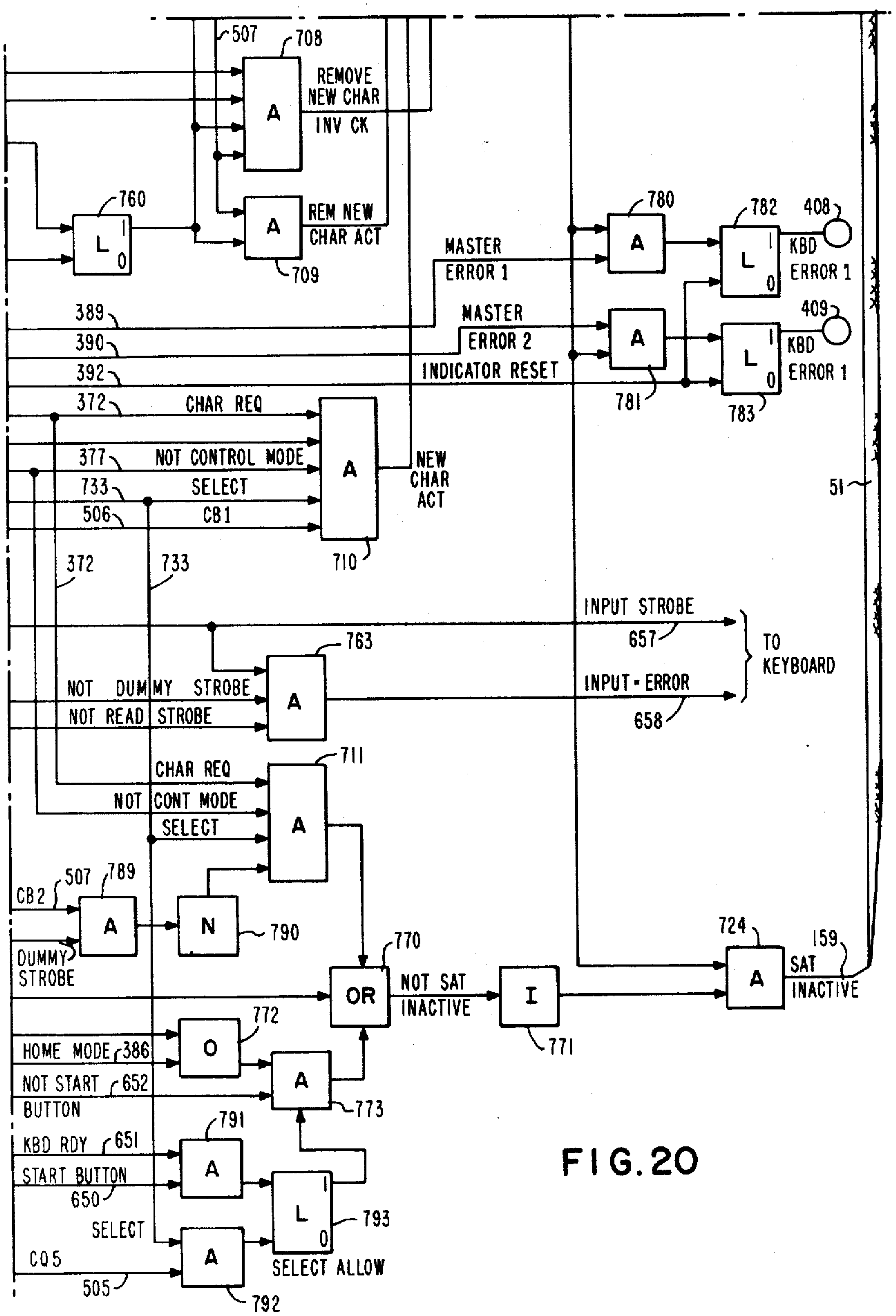

Referring more specifically to FIGS. 17 and 18, AND circuits 680 through 688 receive input control signals, as shown, and in general these AND circuits control, directly or indirectly, AND circuits 700 through 711, 773 and 789 in FIGS. 19 and 20, which in turn control associated AND circuits 720 through 724 in FIGS. 19 and 20. The AND circuit 680 in FIG. 17 responds to input signals on lines 501, 510, 650 and 651, and when all of these signals are positive, an output signal is supplied to the one input side of an allow select latch 730 which in turn supplies a positive output signal from its one output side to the AND circuit 700 in FIG. 19 and to an AND circuit 731 in FIG. 17. The AND circuit 731 in FIG. 17 has its output line connected to the one input side of a latch 732 in FIG. 19. When in the one state, this latch supplies a positive level on its output line 733 to condition one input of each of the AND circuits 700 through 703 in FIG. 19 and the AND circuit 681 in FIG. 17. The AND circuit 681 has its output connected to the zero input side of the allow select latch 730.

The AND circuit 682 responds to signals on its input lines 260, 263, 265, 267, 374 and 378 and supplies an output signal to an OR circuit 734 which in turn supplies its output signal to the AND circuit 731. The OR circuit 734 has a second input line 386 which is energized with a positive signal when the station is in the home mode.

The AND circuit 683 in FIG. 17 responds to signals on the input lines 260, 262, 264, 266, 269, 271, 272, 374, 507, and the one output side of the latch 760, and it provides an output signal to an AND circuit 735. The AND circuit 735 receives a second input signal on the line 501 at CQ1 time. The output of AND circuits 683 and 685 represent code C, and they signify end of message as indicated in Table 1 above.

The AND circuits 700 through 710 in FIGS. 19 and 20 have their output lines connected to associated inputs of OR circuits 750 through 753 which in turn are connected to corresponding AND circuits 720 through 723. These AND circuits receive a second input on the line 510, and this input is energized with a positive signal during S2 time. The positive signal during S2 time represents the time period when the keyboard satellite control is accessed by the master control, and control signals supplied to the AND circuits 720 through 723 in FIG. 19 and the AND circuit 724 in FIG. 20 supply output control signals via bus 51 to the associated stages 107 through 117 of the diagnostic register 40 in FIGS. 7 and 8. Output signals from appropriate bits in the latches 340 through 347 of the control register 46 in FIGS. 11 and 12 are returned to the keyboard satellite control in FIGS. 17 through 20 via the bus 47. Changes in the signals to or from the keyboard satellite control may take place during the access time interval of the S2 signal.

Referring next to FIG. 18, signals from the AND circuit 742 set a latch 760 in FIG. 20 to the one state, and signals from an AND circuit 761 in FIG. 18 reset the latch 760 in FIG. 20. The one output side of the latch 760 is supplied to the AND circuits 707 through 709.

An OR circuit 762 in FIG. 18 receives read strobe signals on the line 655 or dummy strobe signals on the line 656 and supplies output signals to the AND circuits 710 and 711 in FIG. 20. The AND circuit 686 in FIG. 18 responds to input signals (1) character request on the line 372, (2) not control mode on the line 377, (3) select on the line 733, and (4) an S2 signal on the line 510 to provide an output signal designated input strobe on the line 657 which is supplied to the keyboard whenever a new character is needed. The signal on the line 657 is supplied also to an AND circuit 763, and this AND circuit receives additional inputs designated not read strobe on the line 653 and not dummy strobe on the line 654. A positive output signal on the line 658 from the AND circuit 763 indicates an error, and this signal is supplied to the keyboard.

The AND circuit 687 in FIG. 18 responds to input signals (1) select on the line 733, (2) not control mode on the line 377, (3) new character on the line 374, and (4) a CB2 pulse on the line 507, and this AND circuit supplies an output signal to an OR circuit 770 in FIG. 20. This OR circuit in turn supplies an output signal through an inverter 771 to the AND circuit 724, and the output of the AND circuit 724 is the control signal designated satellite inactive which is applied on the line 159 to the master control.

The AND circuit 688 in FIG. 18 responds to input signals (1) select I/O on the line 378, (2) new character on the line 374, data bits from the data register, (3) DR1 on the line 260, (4) not DR2 on the line 263, (5) not DR4 on the line 265, and (6) not DR8 on the line 267. The AND circuit 688 supplies an output signal to an OR circuit 772 in FIG. 20 which in turn supplies an output signal to an AND circuit 773, and this AND circuit in turn supplies an output signal through the OR circuit 770, the inverter 771 and the AND circuit 724 to the output line 159.

AND circuits 780 and 781 in FIG. 20 respond to respective signals master error 1 on the line 389 and master error 2 on the line 390, and if either of these inputs is positive, a positive output signal is supplied by one of these AND circuits during S2 time to a respective one of the latches 782 and 783. The positive outputs from the AND circuits 780 and 781 are applied to the one input sides of the associated latches 782 and 783, and this causes these latches to be set, thereby energizing associated indicator lamps 408 and 409 which are physically disposed in the error indicator panel 399 in FIG. 8 as mentioned earlier. These latches are reset to their zero states by an indicator reset signal on the line 392 in FIG. 20.

The AND circuit 708 in FIG. 20 responds to input signals (1) new character from the zero output side of the new character latch 741 in FIG. 17, (2) a signal from the inverter 743 in FIG. 17, (3) a signal from the one output side of the latch 760 in FIG. 20, and (4) a CB2 pulse on the line 507, and this AND circuit supplies an output signal designated remove new character, invert check to the OR circuit 752 in FIG. 19 which in turn controls the operation of the AND circuit 722 to provide an output signal on the line 157 to the master control.

The AND circuit 709 in FIG. 20 responds to an input signal CB2 pulse on the line 507 and on input signal from the one output side of the latch 760, and this AND circuit provides an output signal designated remove new character, active. This output signal is supplied through the OR circuit 753, the AND circuit 723, and along the output line 158 to the master control.

The AND circuit 710 in FIG. 20 responds to input signals (1) character request on the line 372, (2) the output signal from the OR circuit 762 in FIG. 18, (3) not control mode on the line 377, (4) select on the line 733, and (5) a CB1 pulse on the line 506, and the output of the AND circuit 710, designated new character, active, is supplied through the OR circuit 753 in FIG. 19, the AND circuit 723, and along the line 158 to the master control.

The AND circuit 711 in FIG. 20 responds to input signals (1) character request on the line 372, (2) not control mode on the line 377, (3) select on the line 733, and (4) an input signal from an inverter circuit 790, and this AND circuit supplies an output signal through the OR circuit 770, the inverter 771, the AND circuit 724 and along the line 159 to the master control.

An AND circuit 789 receives input signals which are (1) dummy strobe on the line 656 and (2) a CB2 pulse on the line 507, and output signals from this AND circuit are inverted by an inverter circuit 790 and supplied to the AND circuit 711.

An AND circuit 791 in FIG. 20 receives input signals from the keyboard which are (1) start button on the line 650 and (2) keyboard ready on the line 651, and the output of this AND circuit sets a select allow latch 793 to the one state. The one output side of the latch 793 is supplied to the AND circuit 773 which in turn supplies an output signal through the OR circuit 770, the inverter 771, the AND circuit 724 and along the line 159 to the master control. An AND circuit 792 in FIG. 20 responds to input signals which are (1) select on the line 733 and (2) a CQ5 pulse on the line 505, and the output of this AND circuit is supplied to the zero input side of the select allow flip-flop 793. A positive pulse from the AND circuit 792 resets the latch 793.

Figure 21:
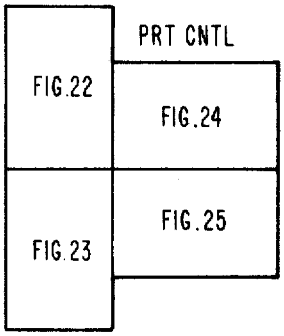
FIGS. 21 through 25 illustrate in detail the printer satellite control shown in block form in FIG. 2.

Reference is made next to FIGS. 21 through 25 which illustrate in detail the printer satellite control shown in block form in FIG. 2. FIGS. 22 through 25 should be arranged as illustrated in FIG. 21. Control signals from the master control are supplied along the bus 47 which is disposed at the left in FIGS. 22 and 23 of the printer satellite control, and output signals from the printer satellite control 25 are supplied to the master control along the bus 51 which is disposed at the right in FIGS. 24 and 25. Signals are supplied from the printer 21 along the bus 53, disposed at the left in FIG. 22, to the printer satellite control 25, and data and control signals from the printer satellite control 25 are supplied to the printer 21 along that portion of the bus 53 disposed in the center portion of FIGS. 24 and 25.

Figure 22:
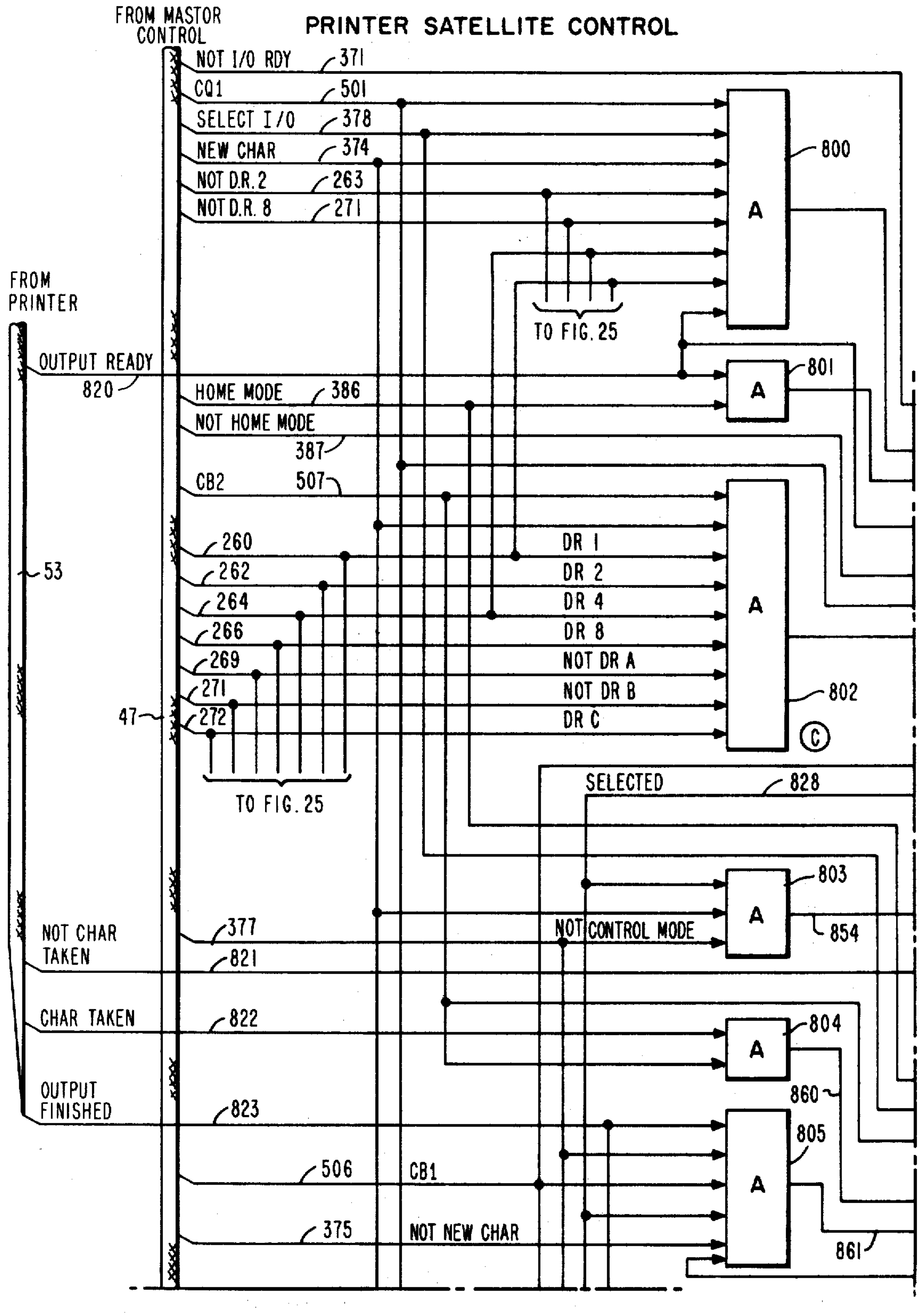
Figure 23:
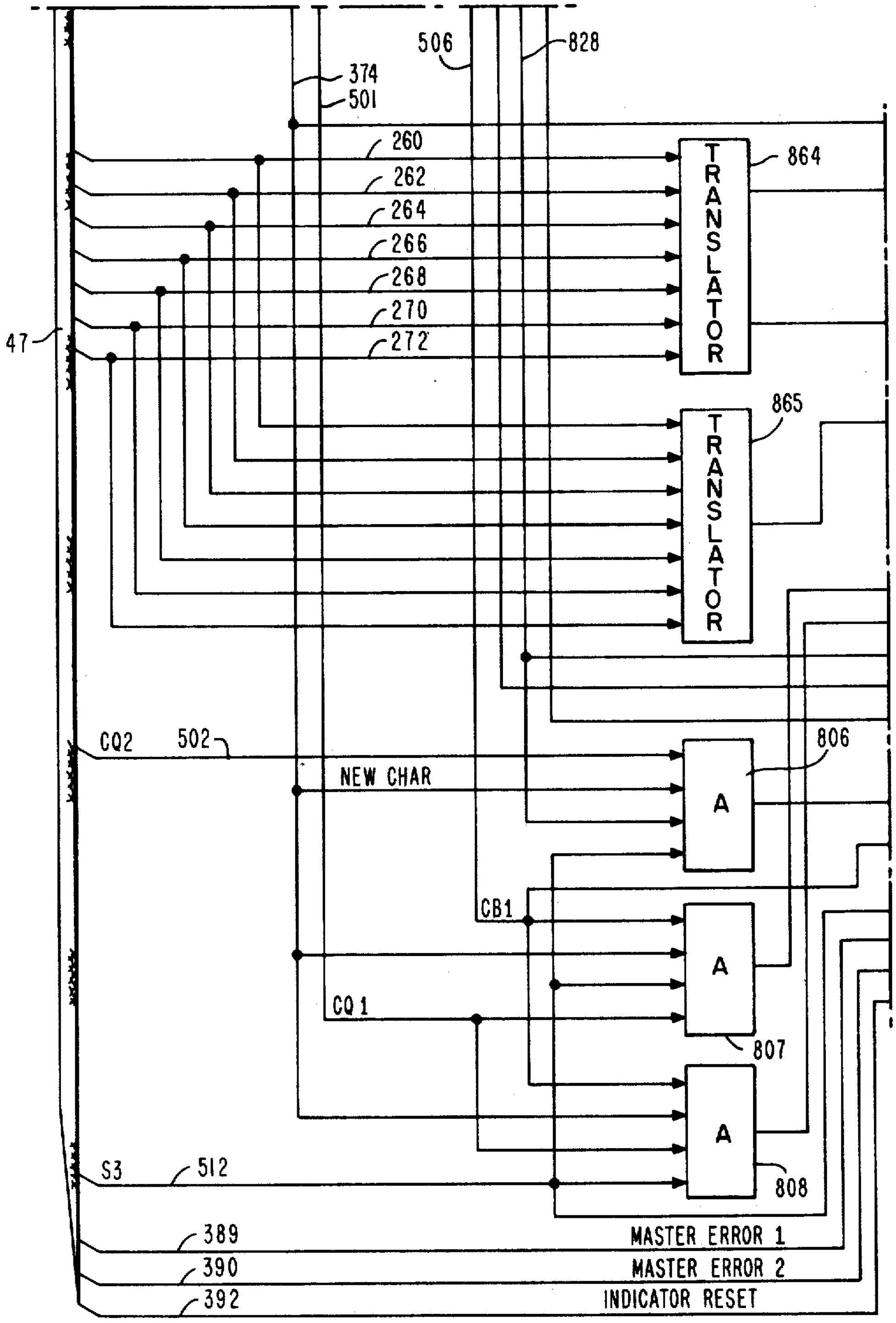

Referring more specifically to FIGS. 22 and 23, AND circuits 800 through 808 serve the function of interpreting the control signals received from the master control. The AND circuit 800 in FIG. 22 responds to input signals CQ1 on the line 501, select I/O on the line 378, new character on the line 374, and signals on the data register on the lines 263, 271, 260, 264, and output ready on the line 820, and it supplies an output signal to an OR circuit 809 in FIG. 24 which in turn supplies an output signal to the one input side of a select latch 810.

The cable 53 in FIG. 22 conveys signals from the printer on lines 820 through 823. The AND circuit 801 in FIG. 22 responds to input signals labeled output ready on the line 820 and home mode on the line 386, and this AND circuit supplies an output signal to the OR circuit 809 in FIG. 24.

Figure 24:
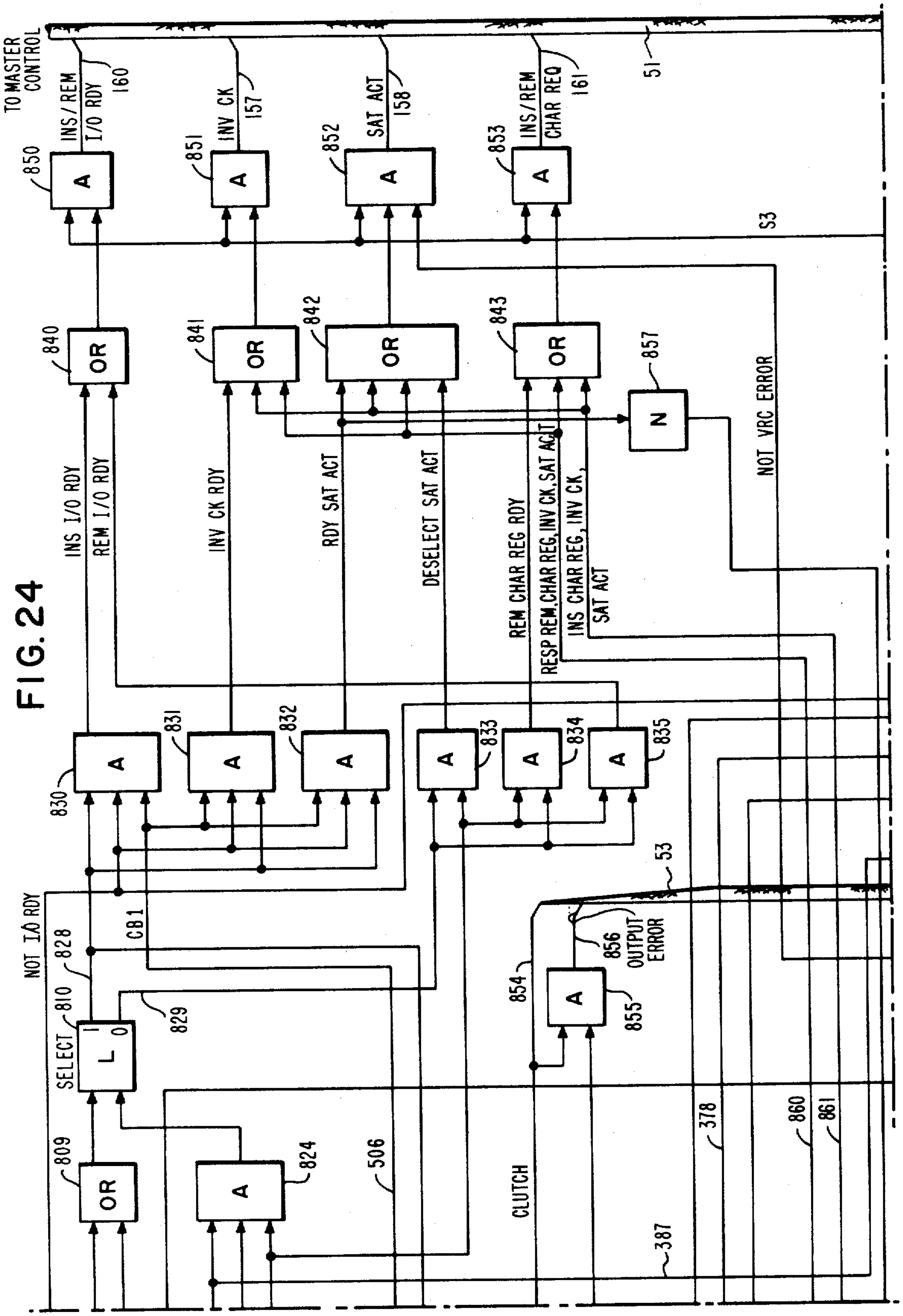

The AND circuit 802 in FIG. 22 responds to the input signals CB2 pulse on the line 507, new character on the line 374, and signals from the data register on lines 260, 262, 264, 266, 269, 271, and 272. The AND circuit 802 supplies an output signal to an AND circuit 824. The AND circuit 824 responds to input signals labeled not home mode on the line 387, CQ1 pulse on the line 501, and the output from the AND circuit 802, and the AND circuit 824 has its output connected to the zero input side of the select latch 810. The latch 810 is set by a positive signal from the OR circuit 809, and it is reset by positive signal from the AND circuit 824. The latch 810 is designated the select latch and signals from the one output side are conveyed on a line 828 to AND circuits 830 through 832 in FIG. 24, AND circuits 803 and 805 in FIG. 22, the AND circuit 806 in FIG. 23, and AND circuit 838 and 839 in FIG. 25. Signals from the zero output side of the select latch 810 in FIG. 24 are supplied on a line 829 to AND circuits 833 through 835. The AND circuits 830 through 832 in FIG. 24 respond to input signals labeled not I/O ready on the line 371, CB1 pulse on the line 506, and the one output side of the select flip-flop 810, and these AND circuits supply output signals to corresponding OR circuits 840 through 842 which in turn supply output signals to corresponding AND circuits 850 through 852. The AND circuit 832 additionally feeds the inverter 857. The AND circuits 850 through 852 supply output signals on corresponding lines 160, 157, and 158 along the bus 51 to the master control.

The AND circuits 833 through 835 in FIG. 24 receive input signals from the zero output side of the select flip-flop 810 and the AND circuit 802 in FIG. 22, and the AND circuits 833 through 835 supply output signals to corresponding OR circuits 842, 843, and 840 which in turn supply output signals to corresponding AND circuits 852, 853 and 850. The AND circuits 850, 852, and 853 supply output signals on associated lines 160, 158 and 161 along the bus 51 to the master control.

The AND circuit 803 in FIG. 22 responds to input signals labeled not control mode on the line 377, new character on the line 374, and selected on the line 828, and the AND circuit 803 supplies an output signal on a line 854 through the bus 53 to the printer. An output signal on the line 854 is applied also to an AND circuit 855 which responds to a second input labeled not character taken response on the line 821, and the AND circuit 855 supplies an output signal labeled output error along a line 856 through the bus 53 to the printer.

The AND circuit 804 in FIG. 22 responds to input signals designated character response taken on the line 822 and a CB2 pulse on the line 507, and it supplies an output signal on a line 860 to the OR circuits 840 through 843 in FIG. 24.

The AND circuit 805 in FIG. 22 responds to inputs signals labeled output finished on the line 823, not control mode on the line 377, CB1 pulse on the line 506, selected on the line 828, and not new character on the line 375, and the output of the inverter 857, and the AND circuit 805 supplies an output signal on a line 861 to the OR circuits 841 through 843 in FIG. 24.

Referring next to FIG. 23, translators 864 and 865 receive signals from the data register on the lines 260, 262, 264, 266, 268, 270, and 272, and they perform the function of converting received data to a different code required by the printer. The output from the translator 864 passes through a set of AND circuits, but only AND circuits 866 and 867 of this group are shown. The output from these AND circuits are supplied to an associated group of latches, but only latches 868 and 869 are shown. The output signals from this set of latches is checked by a VRC 870, and the output signals are supplied through the bus 53 to the printer which uses this data for a printing operation. The translator 865 is employed to determine a parity bit for the translated data, and signals representing this parity bit are supplied through an AND circuit 871 to a latch 872. The parity latch 872 is used by the VRC 870 to check the correctness of the data as it is supplied to the printer.

The AND circuit 806 in FIG. 23 responds to input signals labeled CQ2 pulse on the line 502, new character on the line 374, selected on the line 828, and an S3 pulse on the line 512, and the AND circuit 806 supplies an output signal to the AND circuits 866, 867, and 871, thereby to control the gating of the translated data to the printer.

Figure 25:
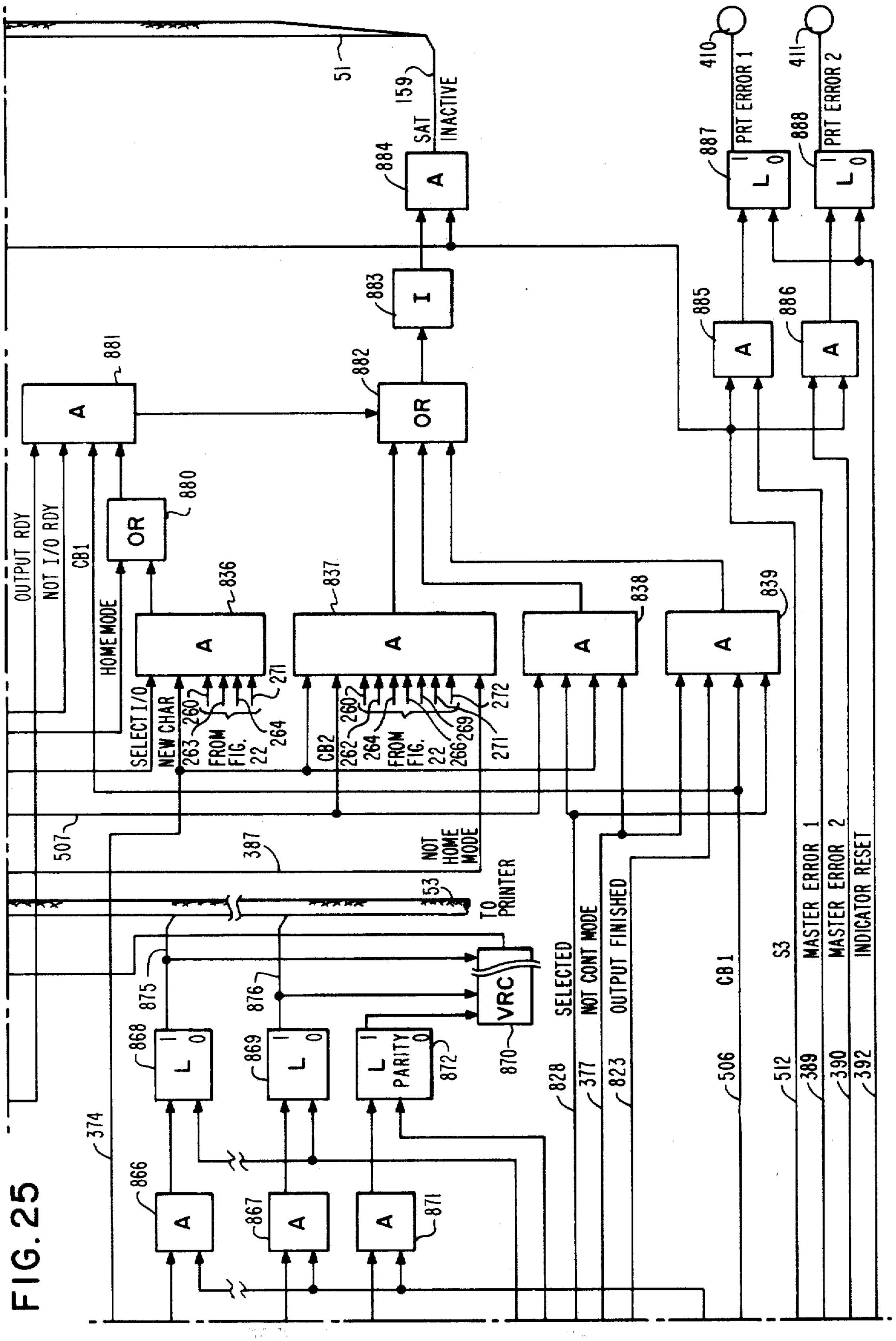

The AND circuit 807 in FIG. 23 responds to input signals designated CB1 pulse on the line 506, new character on the line 374, an S3 pulse on the line 512, and a CQ1 pulse on the line 501, and the AND circuit 807 supplies an output signal to the zero input side of the latches 868 and 869 in FIG. 25, thereby to reset these latches.

The AND circuit 808 in FIG. 23 receives as input signals a CB1 pulse on the line 506, a new character signal on the line 374, a CQ1 pulse on the line 501, and an S3 pulse on the line 512, and the AND circuit 808 supplies an output signal to the zero input side of the parity latch 872 in FIG. 25, thereby to reset this latch.

Referring next to FIG. 25, an AND circuit 836 receives input signals labeled select I/O on the line 378, new character on the line 374, and data signals from the data register on the lines 260, 263, 264, and 271, and the AND circuit 836 supplies an output signal through an OR circuit 880 to an AND circuit 881.

An AND circuit 837 in FIG. 25 receives input signals designated new character on the line 374, a CB2 pulse on the line 507, not home mode on the line 387 and data bits from the data register on the lines 260, 262, 264, 266, 269, 271, and 272. The output of the AND circuit 837 supplies an output signal to an OR circuit 882. An AND circuit 838 in FIG. 25 receives as input signals a CB2 pulse on the line 507, selected on the line 828, new character on the line 374, and not control mode on the line 377, and the AND circuit 838 supplies an output signal to the OR circuit 882. The AND circuit 839 in FIG. 25 receives input signals labeled not control mode on the line 377, output finished on the line 823, CB1 pulse on the line 506, and selected on the line 828, and the AND circuit 839 supplies an output signal to the OR circuit 882. If the OR circuit 882 receives a positive signal on any one of its input lines, it supplies a positive output signal through an inverter 883 to an AND circuit 884 which in turn supplies an output signal on the line 159 through the bus 51 to the master control.

AND circuits 885 and 886 in FIG. 25 receive master error 1 and master error 2 signals on respective input lines 389 and 390. These AND circuits are also supplied with an S3 signal on the line 512 as a second input. The AND circuits 885 and 886 supply output signals to the one input sides of respective latches 887 and 888. When these latches are set to the one state, associated indicator lamps 410 and 411 are lighted to signify an error as earlier explained. These latches are reset by an indicator reset signal on input line 392.

Figure 26:
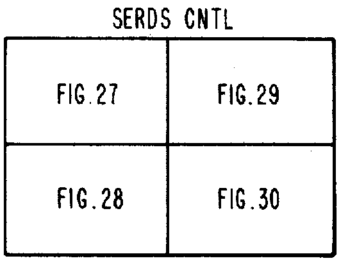
FIGS. 26 through 30 illustrate in detail the serdes satellite control shown in block form in FIG. 2.

Reference is made next to FIGS. 27 through 30 which illustrate in detail the Serdes satellite control shown in block form in FIG. 2. FIGS. 27 through 30 should be arranged with respect to each other as illustrated in FIG. 26. The Serdes 22 in FIG. 2 exchanges signals with the Serdes satellite control 26 along the cable 54. That portion of the cable 54 disposed at the left in FIGS. 27 and 28 conveys signals from the Serdes 22 to the Serdes satellite control, and the signals are supplied on the lines 1050 through 1061 to the logic circuits in FIGS. 27 through 30. Signals are supplied from the Serdes satellite control in FIG. 27 on lines 1070 through 1078 through that portion of the cable 54 in the upper part of FIG. 27 to the Serdes 22. Signals from the master control are supplied to the Serdes satellite control 26 along the cable or bus 47 which is disposed at the left in FIGS. 27 and 28, and signals are supplied from the Serdes satellite control to the master control along the bus 51 which is disposed at the right in FIGS. 29 and 30.

Figure 27:
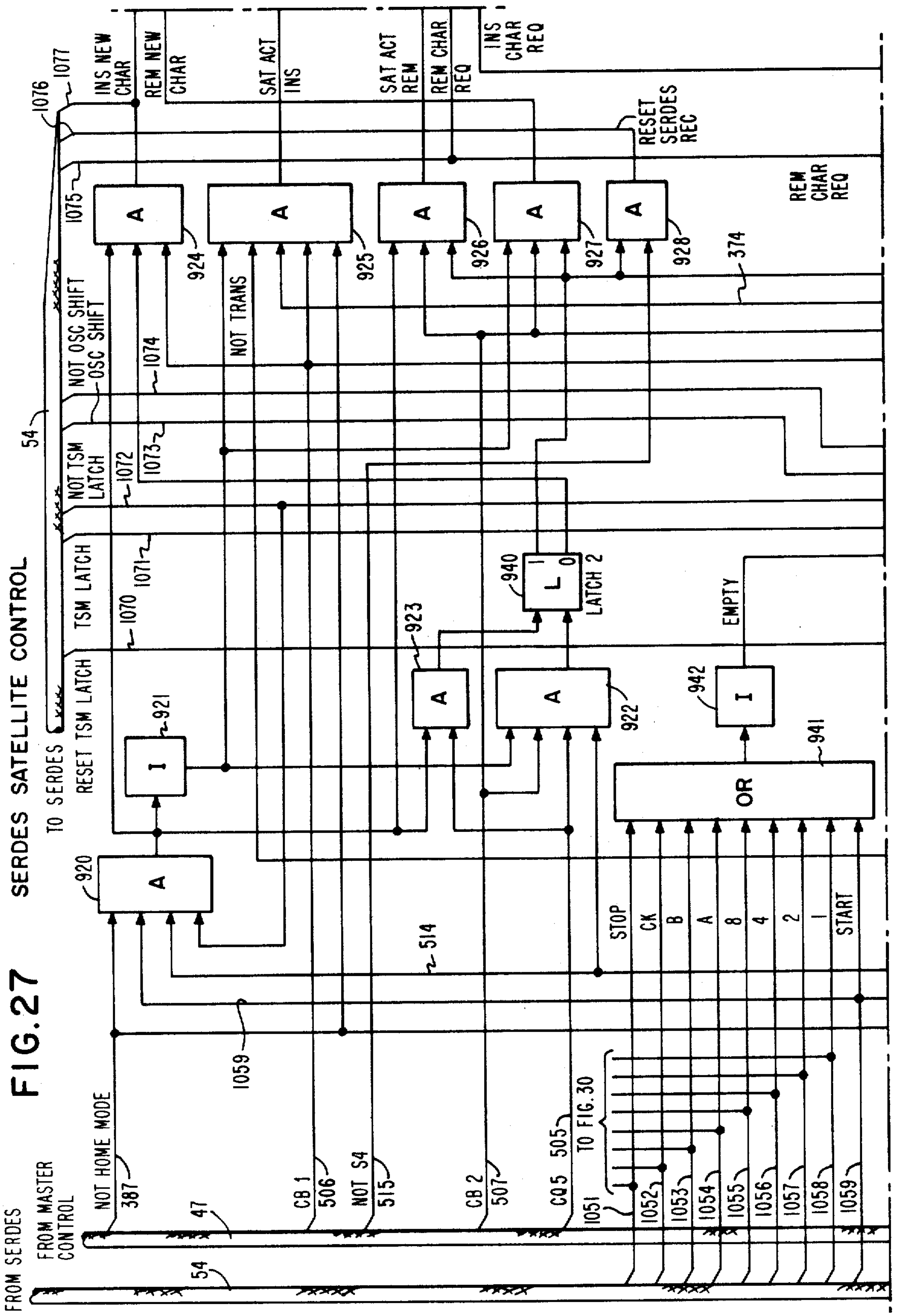

Referring more specifically to FIG. 27, an AND circuit 920 receives input signals labeled not home mode on the line 387, Serdes start on the line 1059, a pulse S4 on the line 514, and not transmit latch on the line 1072, and the output of the AND circuit 920 is supplied through an inverter 921 to an AND circuit 922. The output from the AND circuit 920 is supplied also to an AND circuit 923, an AND circuit 924, and an AND circuit 926. The output from the inverter 921 is applied also to AND circuits 925 and 924. The AND circuit 923 responds to CQ5 pulses on the line 505 and the output of the AND circuit 920, and the AND circuit 923 supplies an output signal to the one input side of a latch 940. The zero output side of the latch 940 is supplied to the AND circuit 924, and the one output side of the latch 940 is supplied to the AND circuits 926 through 928, the trigger 972 in FIG. 28, and the OR circuit 993 in FIG. 30. The AND circuit 922 in FIG. 27 receives as inputs S4 pulses on the line 514, CQ5 pulses on the line 505, CB2 pulses on the line 507, and the output from the inverter 921, and this AND circuit supplies an output signal to the zero input side of the latch 940.

Figure 28:
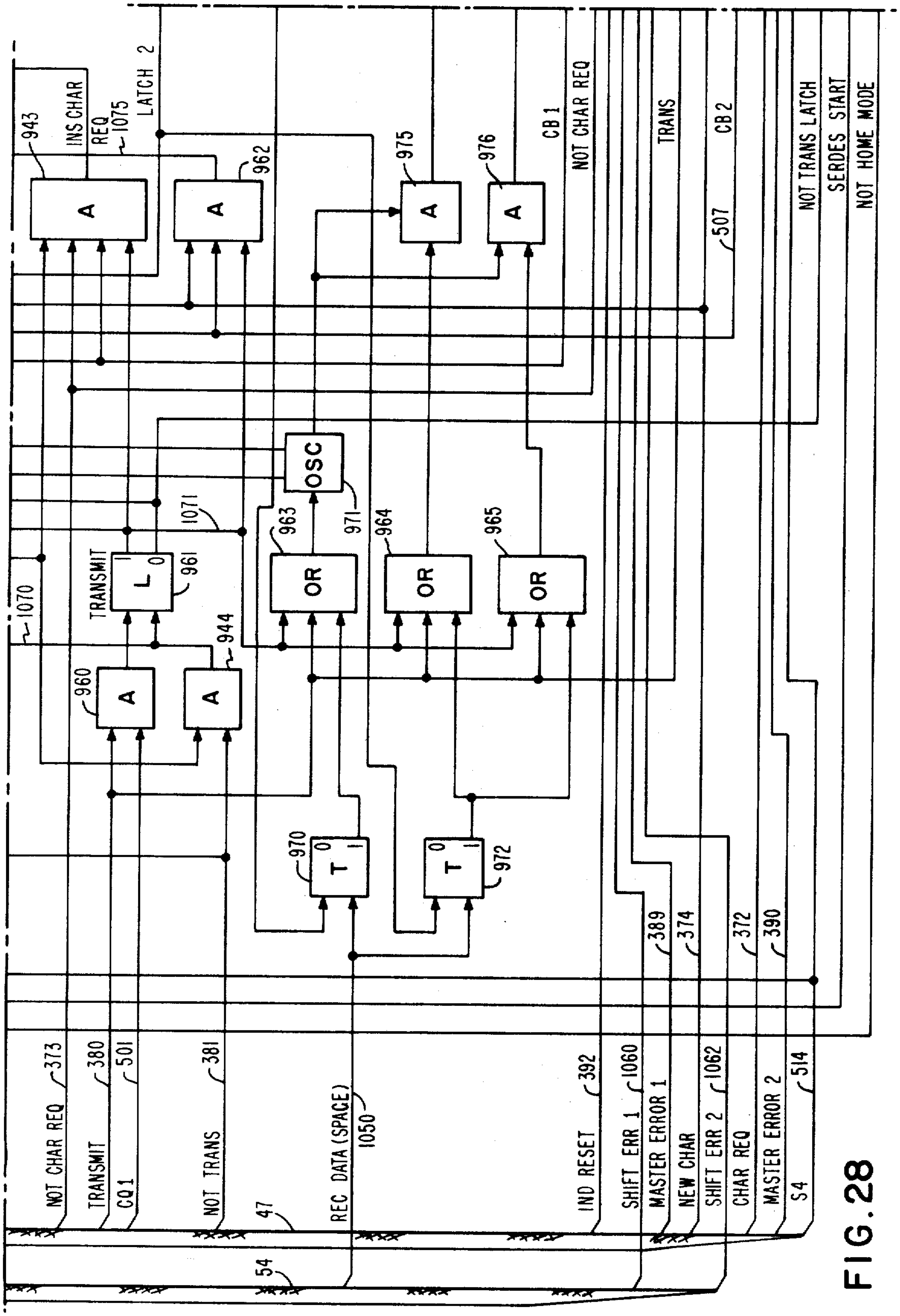

An OR circuit 941 in FIG. 27 receives input signals from the Serdes on the input lines 1051 through 1059, and the output of this OR circuit is supplied through an inverter 942 to AND circuits 943 and 944 in FIG. 28. When the output signal from the inverter 942 is positive, it indicates that all signals on the input lines 1051 through 1059 are negative, thereby signifying that the shift register in the Serdes is empty.

The AND circuits 924 through 927 in FIG. 27 and the AND circuit 943 in FIG. 28 receive the various input signals as shown, and their outputs are connected as shown to OR circuits 950 through 953 which in turn provide output signals to the respective AND circuits 954 through 957. The outputs of the AND circuits 954 through 957 are conveyed on respective output lines 162, 161, 157, and 158 through the bus 51 to the master control.

An AND circuit 960 in FIG. 28 receives input signals labeled transmit on the line 380 and CQ1 pulses on the line 501, and the output of this AND circuit is supplied to the one input side of a latch 961, designated transmit latch. The one output side of this latch is supplied on the line 1071 via the bus 54 to the Serdes, and the one output side of the transmit latch 961 is supplied also to AND circuits 943, 962, and OR circuits 963 through 965.

The AND circuit 944 in FIG. 28 receives input signals labeled not transmit on the line 381 and the output of the inverter 942 in FIG. 27, and the output of the AND circuit 944 is supplied on the line 1070 to the zero input side of the transmit latch 961. The output of the AND circuit 944 is supplied also on the line 1070 via the bus 54 to the Serdes.

A trigger 970 in FIG. 28 is set to the one state by input signals on the line 1050 from the Serdes. The one output side of the trigger 970 is supplied through the Or circuit 963 to an oscillator 971. The trigger 970 is reset to the zero state by output signals from the AND circuit 924 in FIG. 27.

A trigger 972 in FIG. 28 is set to the one state by input signals on the line 1050 from the Serdes, and signals from the one output side of this trigger are supplied through OR circuits 964 and 965 which in turn supply output signals to corresponding AND circuits 975 and 976. The trigger 972 in FIG. 28 is reset to the zero state by signals from the zero output side of the latch 940 in FIG. 27.

Figure 29:
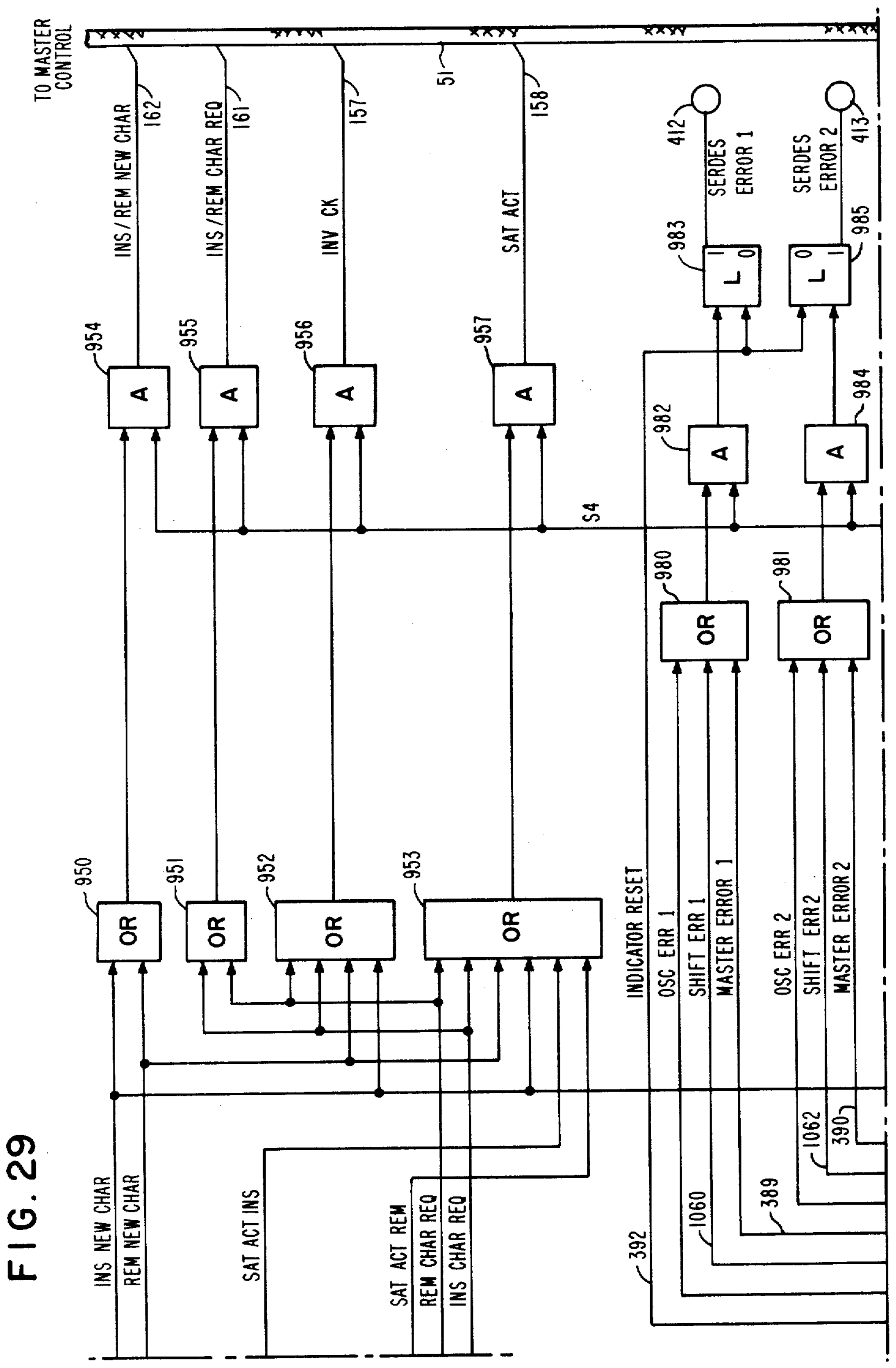

The AND circuit 943 in FIG. 28 receives input signals designated not character request on the line 373, CB1 pulses on the line 506, signals from the one output side of the latch 961, and signals from the inverter 942 in FIG. 27, and the output of the AND circuit 943 is supplied to OR circuits 951 through 953 in FIG. 29.

The AND circuit 962 in FIG. 28 receives input signals labeled new character on the line 374, CB2 pulses on the line 507, and signals from the one output side of the latch 961, and the output of the AND circuit 962 is supplied on the line 1075 via the bus 54 in FIG. 27 to the Serdes. The output from the AND circuit 962 is supplied also to the OR circuits 951 through 953 in FIG. 29.

The AND circuits 975 and 976 in FIG. 28 receive input signals from the oscillator 971, and these AND circuits receive input signals from associated OR circuits 964 and 965. The output of the AND circuit 975 is designated oscillator error 1, and it is applied to an OR circuit 980 in FIG. 29. The output of the AND circuit 976 in FIG. 28 is designated oscillator error 2, and it is applied to an OR circuit 981 in FIG. 29.

The OR circuit 980 in FIG. 29 responds to the input signals labeled master error 1 on the line 389, shift error 1 on the line 1060 and oscillator error 1 from the AND circuit 975 in FIG. 28 and the output of the OR circuit 980 in FIG. 29 is supplied to an AND circuit 982 the output of which is connected to the one input side of a latch 983. When set, the latch 983 supplies a signal on its one output side which lights the indicator lamp 412, thereby signifying an error. The OR circuit 981 in FIG. 29 receives input signals labeled master error 2 on the line 390, shift error 2 on the line 1062 and oscillator error 2 from the AND circuit 976 in FIG. 28. The output of the OR circuit 981 is supplied to an AND circuit 984 which has its output connected to the one input side of a latch 985. When set to the one state, the latch 985 supplies a signal from its one output side which lights the indicator lamp 413, thereby signifying an error. The AND circuits 982 and 984 receive S4 pulses as a second input, and error signals are not permitted to energize the indicator lamps 412 and 413 except when the Serdes satellite control is accessed by S4 pulses. The latches 983 and 985 are reset to the zero state by an indicator reset signal on the line 392.

Figure 30:
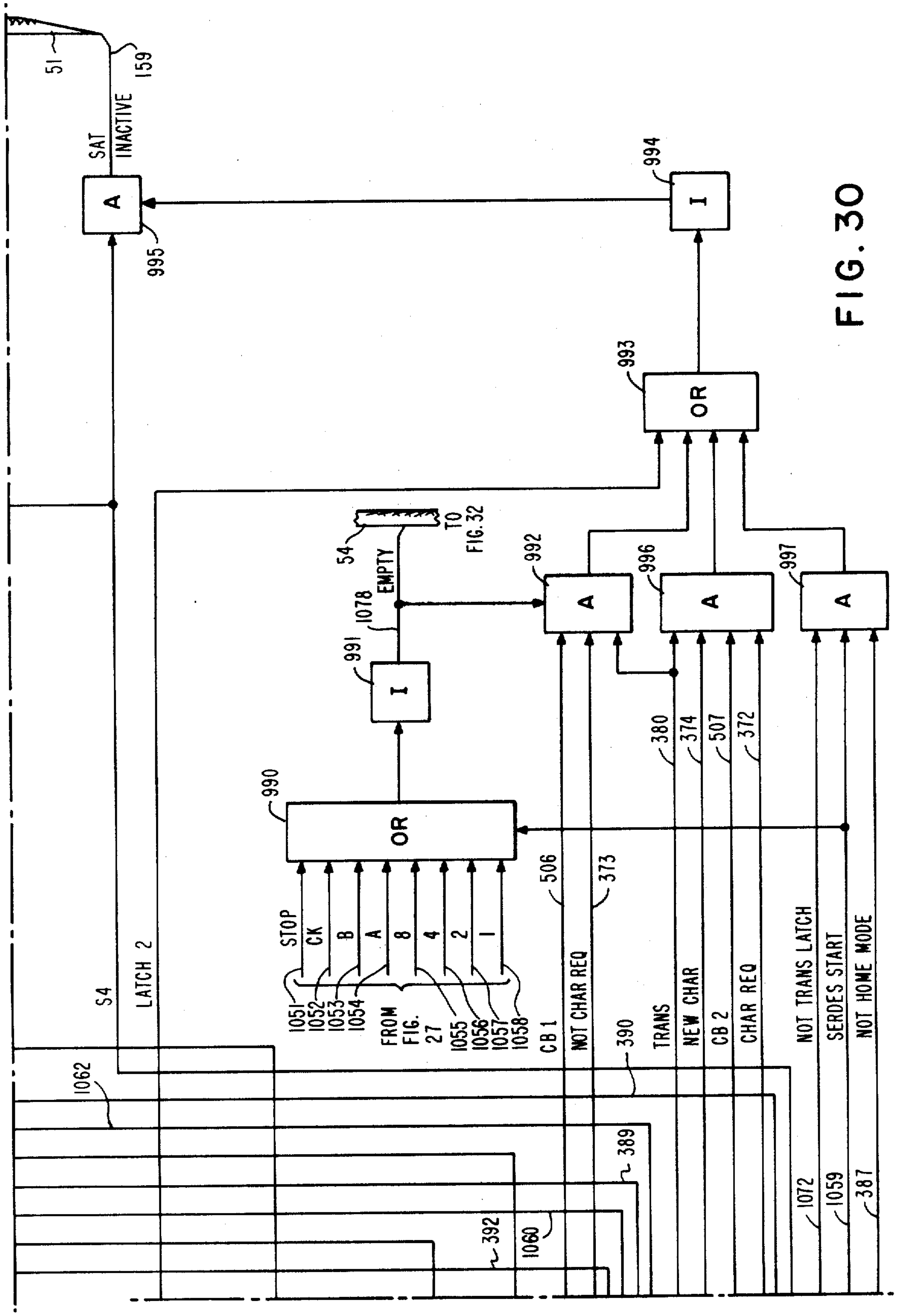

An OR circuit 990 in FIG. 30 receives signals on input lines 1051 through 1059 from FIG. 27, and output signals from the OR circuit 990 are supplied through an inverter 991 to an AND circuit 992. The AND circuit 992 responds to input signals designated not character request on the line 373, CB1 pulses on the line 506, transmit signals on the line 380, and output signals from the inverter circuit 991, and the output signals from the AND circuit 992 are supplied through an OR circuit 993, and an inverter circuit 994 to an AND circuit 995. The output of the AND circuit 995 is supplied on the line 159 via the cable 51 to the master control. An AND circuit 996 in FIG. 30 responds to input signals labeled transmit on the line 380, new character on the line 374, CB2 pulses on the line 507, and character requests on the line 372, and the output of the AND circuit 996 is supplied to the OR circuit 993. An AND circuit 997 in FIG. 30 responds to input signals designated not transmit latch on the line 1072, Serdes start on the line 1059, and not home mode on the line 387, and the output of the AND circuit 997 is connected to the OR circuit 993. The OR circuit 993 responds to signals from the AND circuits 992, 996 and 997 and signals from the one output side of the latch 940 in FIG. 27. If any one of the input signals to the OR circuit 993 is positive, a positive output signal is supplied by the OR circuit through the inverter circuit 994 which in turn supplies a negative output signal to the AND circuit 995, thereby deconditioning this AND circuit. If all input signals to the OR circuit 993 are negative, then the inverter 994 supplies a positive signal to the AND circuit 995 which passes such signals when an S4 pulse is received. The output of the AND circuit 995 indicates that the Serdes satellite control is inactive, and it signifies this by supplying a positive signal on the line 159 to the master control.

Figure 31:
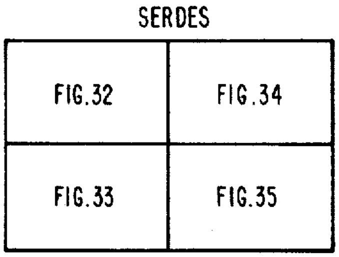
FIGS. 31 through 35 illustrate in detail the serdes shown in block form in FIG. 2.
Figure 32:
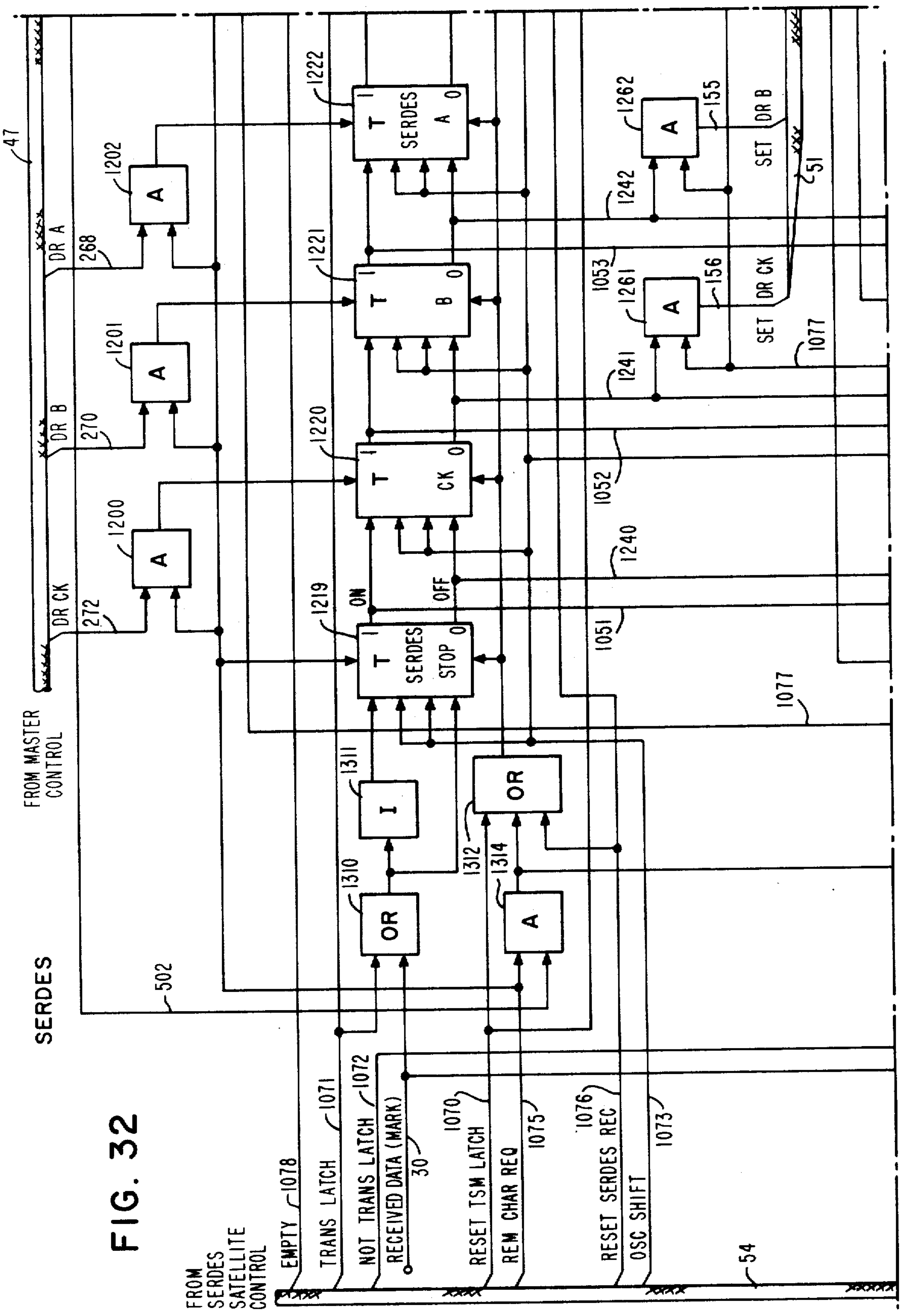
Figure 33:
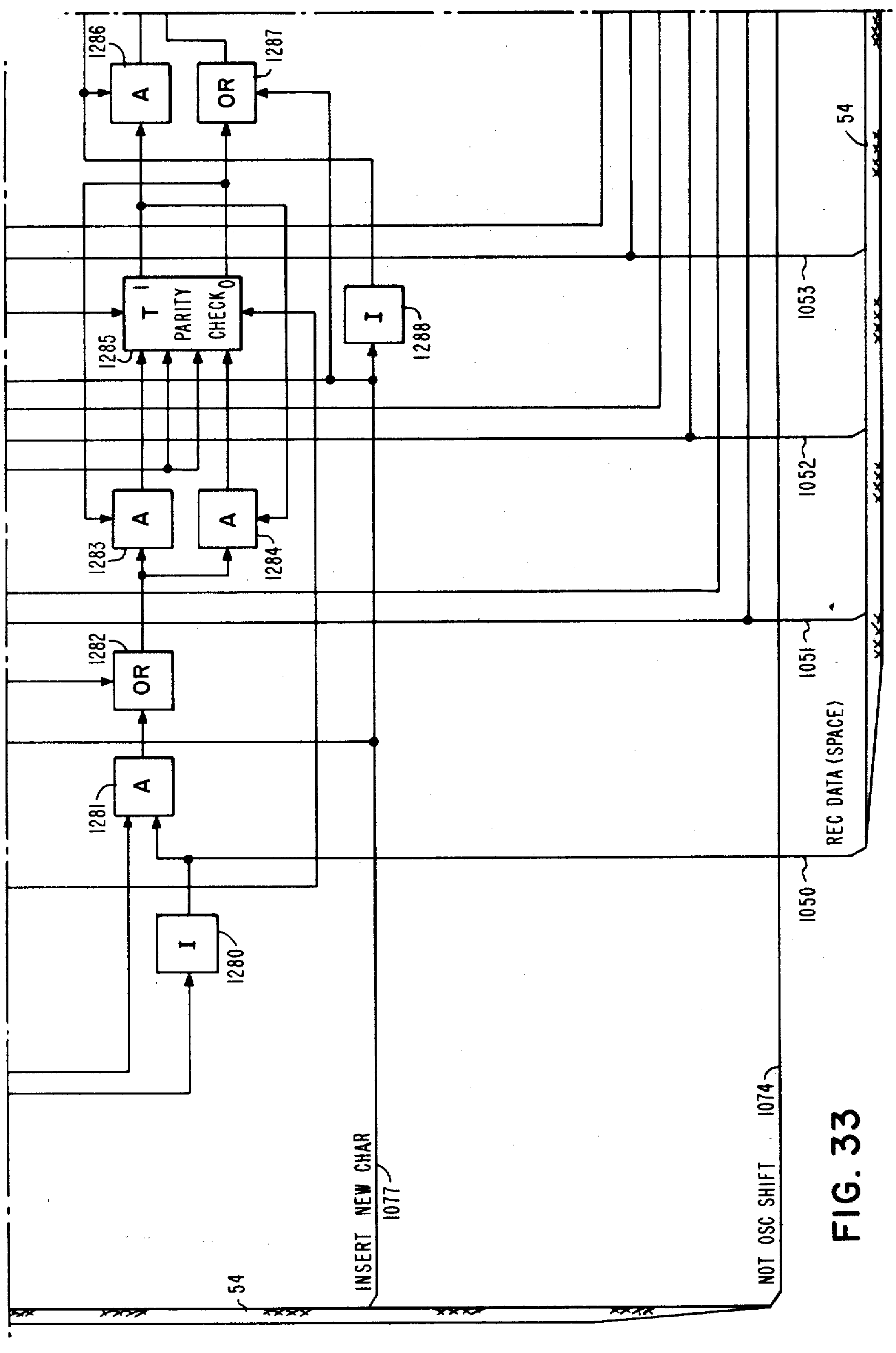
Figure 34:
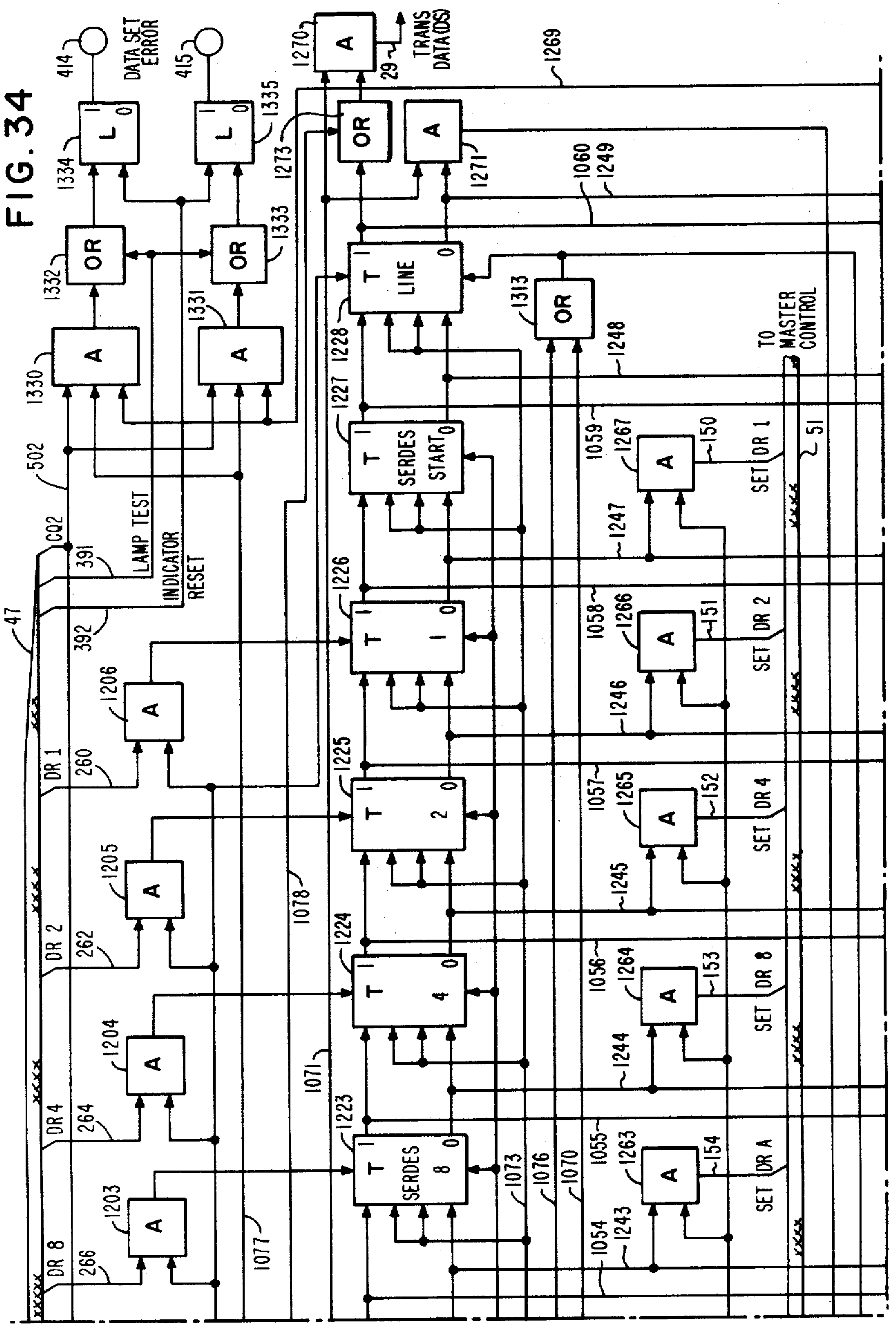

Reference is made next to FIGS. 32 through 35 which, when arranged as indicated in FIG. 31, illustrate in detail the serializer-deserializer (Serdes) 22 illustrated in block form in FIG. 2. Signals from the Serdes satellite control 26 in FIGS. 27 through 30 are received by the Serdes 22 via the cable 54, disposed at the left in FIGS. 32 and 33, on lines 1070 through 1078. Signals from the data register 43 of the master control are received via the bus 47, disposed at the top in FIGS. 32 and 34, on lines 260, 262, 264, 266, 268, 270, and 272, and these signals are supplied to respective AND circuits 1200 through 1206. These AND circuits receive a second input signal on the line 1075 which is designated remove character request. The outputs of the AND circuits 1200 through 1206 are supplied to the set input of corresponding triggers 1220 through 1226, thereby transferring the content of the data register 43 in the master control 27 to the triggers 1220 through 1226 of FIGS. 32 and 34. Additional trigger 1219 in FIG. 32 and triggers 1227 and 1228 in FIG. 34 are provided. The triggers 1219 through 1228 constitute a shift register. Data is shifted out to the right of the shift register through the trigger 1228 when transmitting, and data is received into the shift register from the left through the trigger 1219 when receiving data. The outputs from the one output side of the triggers 1219 through 1227 are supplied on respective lines 1051 through 1059 via the cable 54, disposed at the bottom of FIGS. 33 and 35, to the Serdes satellite control 26. Signals from the one output side of the triggers 1219 through 1228 on respective lines 1051 through 1060 and signals from the zero output side of the triggers 1219 through 1228 on respective output lines 1240 through 1249 are supplied to a vertical redundancy check circuit 1260 in FIG. 35 for the purpose of checking the accuracy of the information held in these triggers. Signals from the zero output side of the triggers 1220 through 1226 are supplied on respective lines 1241 through 1247 to corresponding AND circuits 1261 through 1267, and these AND circuits receive an input signal on the input line 1077 designated insert new character. Output signals from the AND circuits 1261 through 1267 are conveyed on respective lines 156 through 150 via the bus 51, disposed at the bottom of FIGS. 32 and 34, to the diagnostic register 40 of the master control.

An input signal on the line 1071 in FIG. 32 is designated transmit latch, and this signal is applied to AND circuits 1270 and 1271 in FIG. 34. The output signals from the AND circuits 1270 are supplied as data signals to the transmission medium 13 in FIG. 1, and the output of the AND circuit 1271 is supplied to an OR circuit 1282 in FIG. 33. An input signal on the line 1072 in FIG. 32, designated not transmit latch, is supplied to an AND circuit 1281 in FIG. 33, and an input signal on the input line 30 in FIG. 32, designated receive data (mark), is supplied through an inverter circuit 1280 in FIG. 33 to the AND circuit 1281. The output of the AND circuit 1281 is supplied to the OR circuit 1282. The output of the OR circuit 1282 is supplied to AND circuits 1283 and 1284 the outputs of which are applied to the respective one and zero inputs of a trigger 1285. The respective one and zero outputs of the trigger 1285 are connected to an AND circuit 1286 and an OR circuit 1287. The outputs of the AND circuit 1286 and the OR circuit 1287 are connected to the vertical redundancy check circuit 1260 in FIG. 35. An input signal on the input line 1077 in FIG. 33, designated insert new character, is supplied through an inverter 1288 to the AND circuit 1286. The output of the inverter 1288 is supplied also to AND circuits 1289 and 1290 in FIG. 35, and these AND circuits receive a positive output signal from the vertical redundancy check circuit 1260 whenever an error is detected in the information supplied thereto. The AND circuits 1289 and 1290 supply output signals through respective OR circuits 1291 and 1292 to the one input side of respective triggers 1293 and 1294. Output signals from the one output side of the triggers 1293 and 1294 are supplied on respective lines 1060 and 1061 via the cable 54 to the Serdes satellite control 26. An input signal on the line 1074 in FIG. 33, designated not oscillator shift, is applied to the OR circuits 1291 and 1292 in FIG. 35, thereby to set the error triggers 1293 and 1294 to the one state.

Signals on the input lines 30 and 1071 in FIG. 32 are applied also to an OR circuit 1310 the output of which is supplied through an inverter 1311 to the one input side of the trigger 1219. The output of the OR circuit 1310 is supplied also to the zero input side of the trigger 1219. The input line 1070 in FIG. 32, designated reset transmit latch, is supplied to an OR circuit 1312 the output of which is connected to the reset input of the triggers 1219 through 1227. The input signal on the line 1070 is supplied also to an OR circuit 1313 in FIG. 34, and the output of this OR circuit is applied to the reset input of the trigger 1228, and to the set side of trigger 1285.

The input line 1075 in the FIG. 32, designated remove character request, is supplied to an AND circuit 1314. The AND circuit 1314 receives a CQ2 pulse on the line 502. The output of this AND circuit is connected to the OR circuit 1312, and to the reset input of the trigger 1285 in FIG. 33.

Input signals on the line 1076 in FIG. 32, designated reset Serdes receive, is supplied to the OR circuit 1312 and the OR circuit 1313, and their output signals causes the triggers 1219 through 1228 to be reset.

Input signals on the line 1073 in FIG. 32, designated oscillator shift, are supplied to the triggers 1219 through 1228, and this signal causes information in these triggers to be shifted one position to the right.

AND circuits 1330 and 1331 in FIG. 34 have their outputs connected through associated OR circuits 1332 and 1333 to the one input side of corresponding latches 1334 and 1335. The one output side of the latches 1334 and 1335 are connected to associated indicator lights 414 and 415. The AND circuits 1330 and 1331 in FIG. 34 receive as input signals CQ2 pulse on the line 502, insert new character on the line 1077, and an error output signal from the vertical redundancy check circuit 1260 in FIG. 35. If all of these signals are positive, the AND circuits 1330 and 1331 supply a positive output pulse through associated OR circuits 1332 and 1333 to set the latches 1334 and 1335, thereby lighting the indicators 414 and 415. The OR circuits 1332 and 1333 may receive a positive signal on the input line 391, designated lamp test, from the master control, and this signal causes the latches 1334 and 1335 to light the associated indicators 414 and 415. An indicator reset signal on input line 392 from the master control resets the latches 1334 and 1335.

Figure 36:
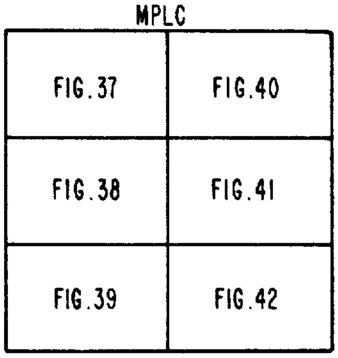
FIGS. 36 through 42 illustrate in detail the multipoint logic satellite control shown in block form in FIG. 2.
Figure 37:
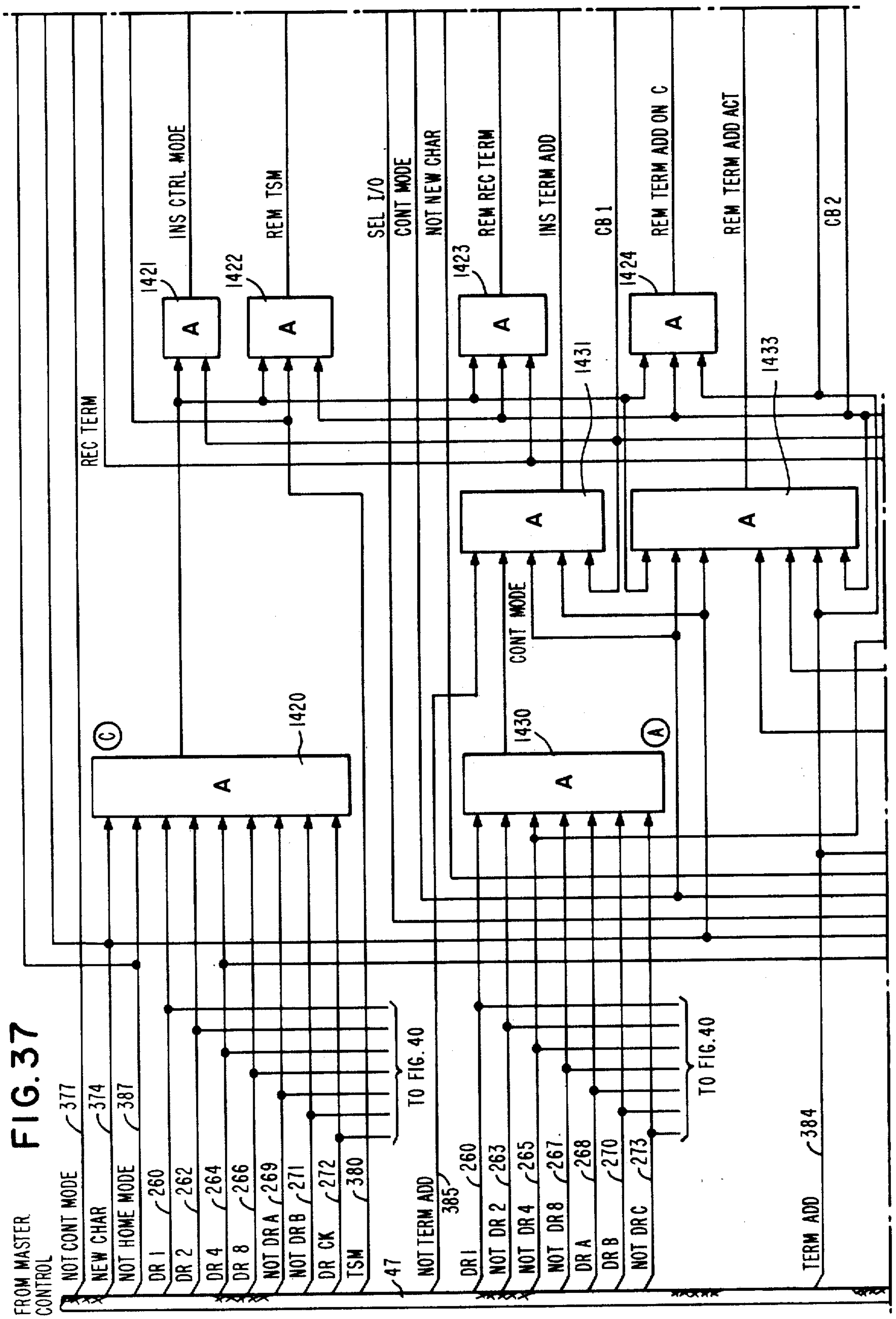

Reference is made next to FIGS. 37 through 42 which illustrate in detail the multipoint logic satellite control 23 shown in block form in FIG. 2. FIGS. 37 through 42 should be arranged with respect to each other as indicated in FIG. 36. Referring more specifically to FIG. 37, an AND circuit 1420 receives input signals from the data register on lines 260, 262, 264, 266, 269, 271, and 272 representing respectively 1, 2, 4, 8, Not A, Not B, and C. This is code C, and as indicated in Table 1 above it signifies end of message. The AND circuit 1420 also receives as input signals new character on the line 374 and not home mode on the line 387. The output from the AND circuit 1420 is supplied to AND circuits 1421 through 1424 and the AND 1433.

An AND circuit 1430 in FIG. 37 receives input signals from the data register on the lines 260, 263, 265, 267, 268, 270, and 272, and when these lines are energized with positive signals, they represent 1, $\bar{2}$, $\bar{4}$, $\bar{8}$, A, B, and $\bar{C}$. This combination of bits represents code A, and this code selects terminal 1 as indicated in Table 1 above. The output from the AND circuit 1430 is supplied to an AND circuit 1431.

The AND circuit 1431 receives input signals labeled not terminal addressed on the line 385, control mode on the line 376, a CB1 pulse on the line 506, new character on the line 374, and the output of the AND circuit 1430. The output signal from the AND circuit 1431 is designated insert terminal addressed. The AND circuit 1433 receives input signals designated control mode on the line 376, new character on the line 374, receive terminal on the line 382, not TSM on the line 381, terminal addressed on the line 384, a CB2 pulse on the line 507, and a signal from the AND circuit 1420. The output from the AND circuit 1433 is designated remove terminal addressed.

The AND circuit 1421 in FIG. 37 receives an input signal from the AND circuit 1420 and a CB1 pulse on the line 506. The output of the AND circuit 1421 is designated insert control mode. The AND circuit 1422 in FIG. 37 receives inputs labeled transmit on the line 380, a CB2 pulse on the line 507, and the output of the AND circuit 1420. The output of the AND circuit 1422 is designated remove transmit.

The AND circuit 1423 in FIG. 37 receives inputs labeled receive terminal on the line 382, a CB2 pulse on the line 507, and the output from the AND circuit 1420. The output of the AND circuit 1423 is designated remove receive terminal. The AND circuit 1424 in FIG. 37 receives input signals labeled terminal addressed on the line 384, CB2 pulse on the line 507, and the output from the AND circuit 1420. The output of the AND circuit 1424 is designated remove terminal addressed on code C.

Figure 38:
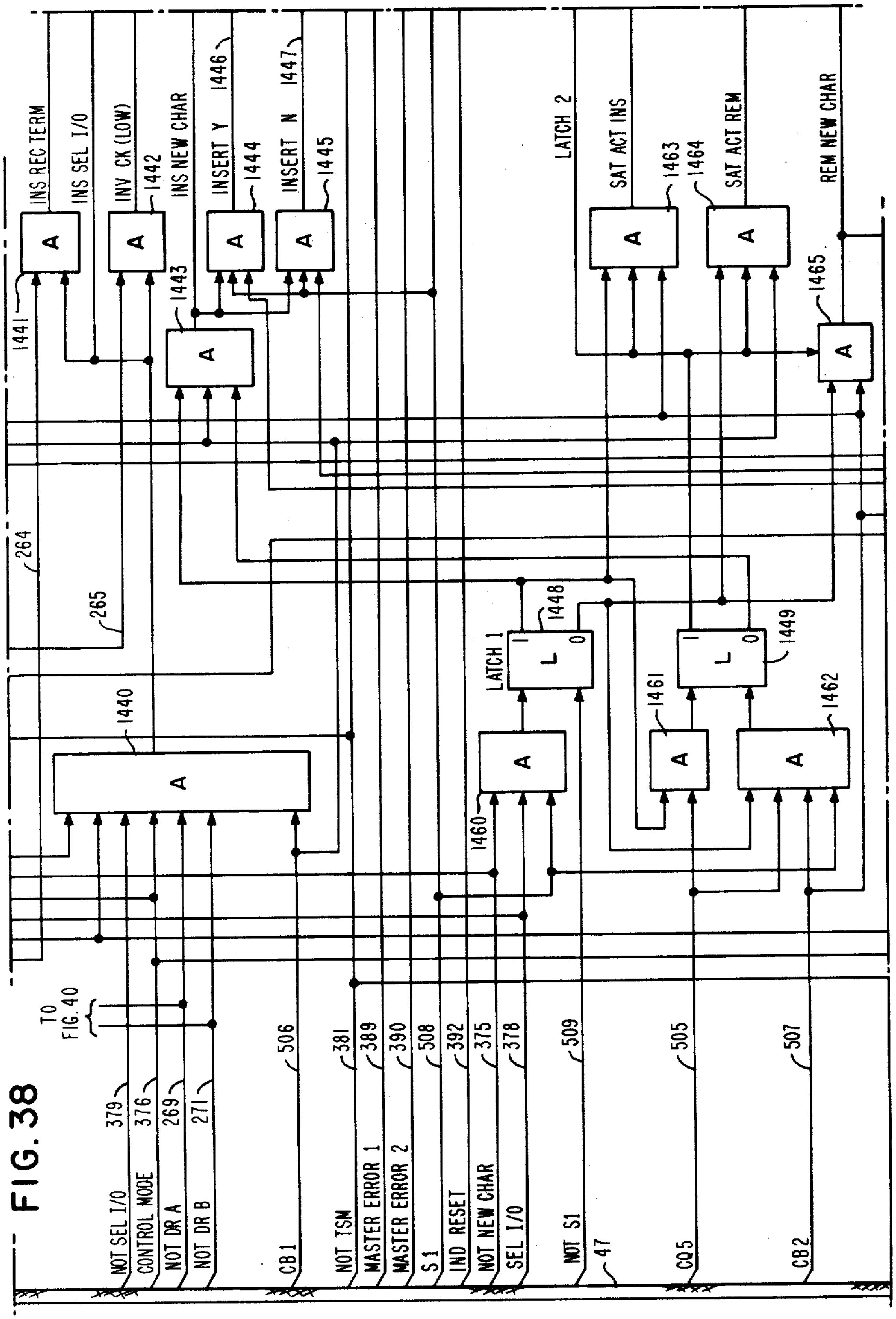

Referring next to FIG. 38, an AND circuit 1440 receives input signals labeled terminal addressed on the input line 384, new character on the line 374, not select I/O on the line 379, control mode on the line 376, alphabetic bits from the data register not A on the line 269 and not B on the line 271, and CB1 pulses on the line 506. The output of the AND circuit 1440 is supplied to AND circuits 1441, 1442 and to the OR circuits 1565 and 1568 in FIG. 42. The AND circuit 1441 receives a second signal DR4 from the data register on the line 264. The output of the AND circuit 1441 is designated insert receive terminal. A signal not DR4 on the line 265 from the data register is supplied as a second input to the AND circuit 1442. The output of the AND circuit 1442 is designated invert check (low). An AND circuit 1443 in FIG. 38 supplies an output signal to AND circuits 1444, 1445 and to OR circuits 1554 in FIG. 41, 1567 through 1569, and circuit 1571 on FIG. 42. The AND circuit 1444 receives a second input on the line 370 designated I/O ready, and a third input S1 on the line 508.

Figure 41:
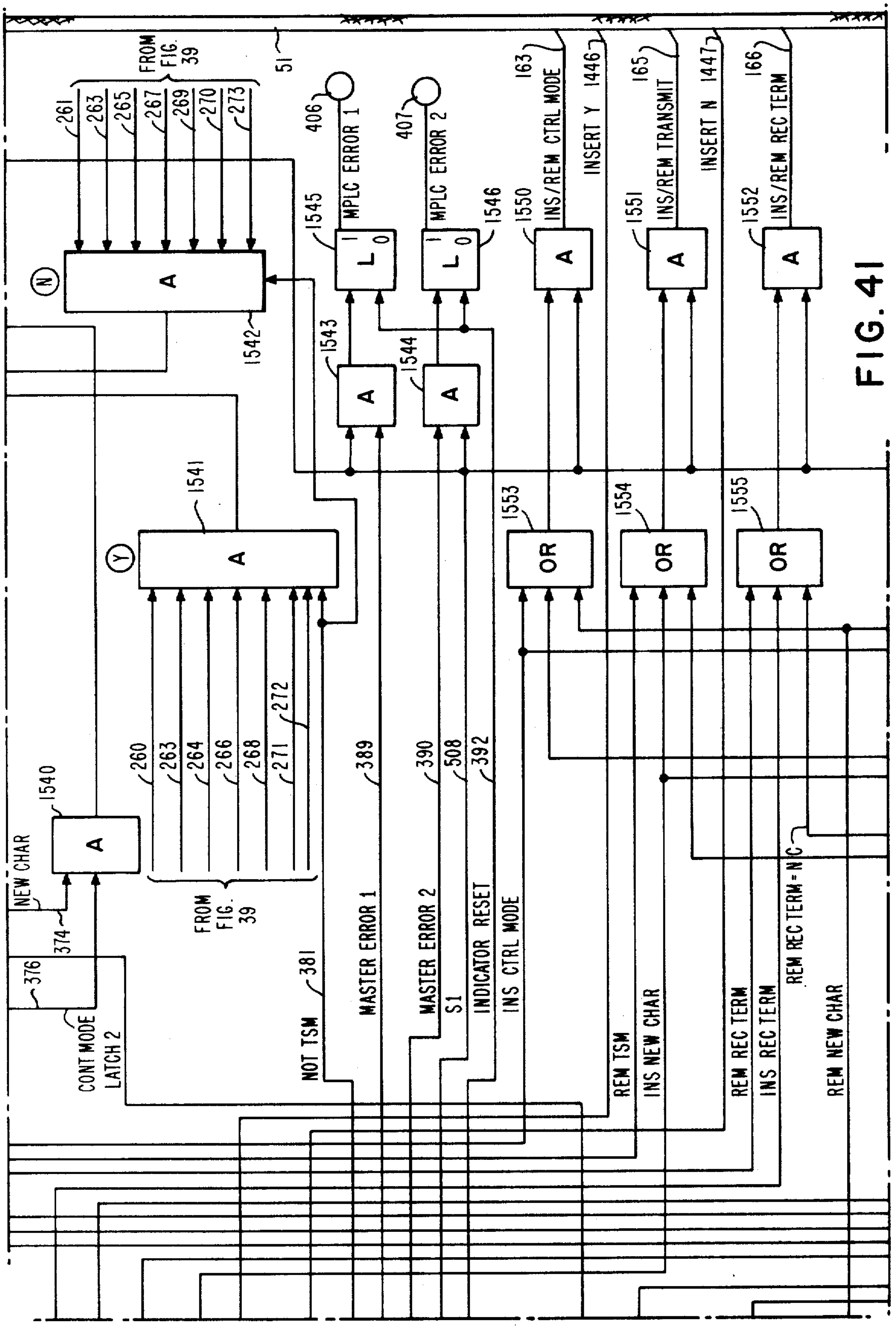

A positive output signal from the AND circuit 1444 on a line 1446, designated insert Y, is conveyed through FIG. 41 via the bus 51 to the data portion of the diagnostic register 40 in FIG. 5 where code Y is inserted, signifying yes. Actually, the positive signal on the line 1446 in FIG. 5 passes through the OR circuits 210, 212 through 214 and 216 and sets respective latches 100, 102 through 104 and 106 to the one state. The AND circuit 1445 in FIG. 38 receives a second input not I/O ready on the line 371, and the signal S1 on line 508, and a positive output signal from the AND circuit 1445 is conveyed on a line 1447 through FIG. 41 via the bus 51 to the diagnostic register 40 in FIG. 5 of the master control where code N is inserted in the data portion of the diagnostic register 40, signifying no. Actually, the positive signal on the line 1447 in FIG. 5 sets the latch 105 to the one state after passing through the OR circuit 215. The AND circuit 1443 in FIG. 38 receives input signals from the one output side of a latch 1448 and the zero output side of a latch 1449 and CB1 pulses on the line 506. The output of the AND circuit 1443 in FIG. 38 is designated insert new character.

AND circuits 1460 and 1461 in FIG. 38 have their outputs connected to the one input side of respective latches 1448 and 1449. An AND circuit 1462 in FIG. 38 has its output connected to the zero input side of the latch 1449. The AND circuit 1460 receives input signals labeled not new character on the line 375, select I/O on the line 378, and S1 pulses on the line 508. The AND circuit 1461 in FIG. 38 receives as inputs CQ5 pulses on the line 505 and signals from the one output side of the latch 1448. The AND circuit 1462 receives as input signals the zero output side of the latch 1448, CQ5 pulses on the line 505, CB2 pulses on the line 507, and S1 pulses on the line 508.

AND circuits 1463 through 1465 in FIG. 38 receive as input signals various combinations of the outputs of the latches 1448 and 1449. The AND circuits 1463 receive as inputs the one output side of the latch 1448, the one output side of the latch 1449, and CB2 pulses on the line 507. The output of the AND circuit 1463 is designated satellite active insert. An AND circuit 1464 receives as inputs the zero output side of the latch 1448, the one output side of the latch 1449, and CB1 pulses on the line 506. The output of the AND circuit 1464 in FIG. 38 is designated satellite active remove. The AND circuit 1465 in FIG. 38 receives as inputs the zero output side of the latch 1448, the one output side of the latch 1449, and CB2 pulses on the line 507. The output of the AND circuit 1465 is designated remove new character.

Figure 39:
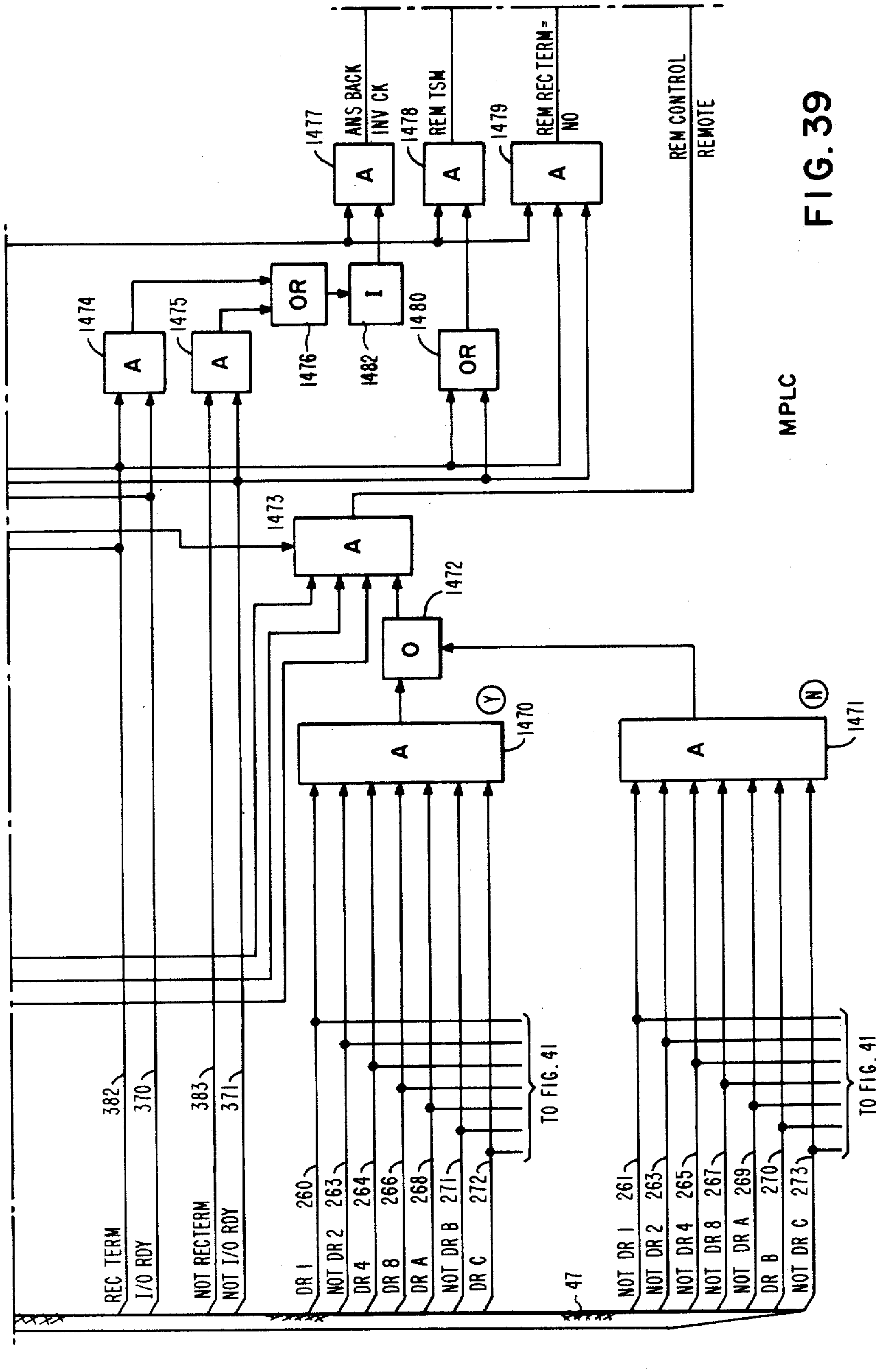

Referring next to FIG. 39 an AND circuit 1470 receives input signals representing code Y on input lines 260, 263, 264, 266, 268, 271, and 272, and an AND circuit 1471 receives signals representing code N on input lines 261, 263, 265, 267, 269, 270, and 273. The outputs from the AND circuits 1470 and 1471 are supplied through an OR circuit 1472 to an AND circuit 1473. The AND circuit 1473 receives additional inputs labeled not transmit on the line 381, control mode on the line 376, new character on the line 374, and CB2 on the line 507. The output of the AND circuit 1473 is designated remove control remote.

AND circuits 1474 and 1475 in FIG. 39 provide output signals through an OR circuit 1476 then through an inverter 1482 to an AND circuit 1477. The AND circuit 1474 receives inputs labeled receive terminal on the line 382 and I/O ready on the line 370. The AND circuit 1475 receives inputs labeled not receive terminal on the line 383 and not I/O ready on the line 371. The AND circuit 1477 receives the output of the inverter circuit 1482 and the output of the AND circuit 1465 in FIG. 38. The output of the AND circuit 1477 is designated answer back invert check. The output of the AND circuit 1465 in FIG. 38 is supplied also to AND circuits 1478 and 1479 in FIG. 39. The AND circuit 1478 receives a second input from an OR circuit 1480 which in turn receives input signals labeled receive terminal on the line 382 and not I/O ready on the line 371. The output of the AND circuit 1478 is designated remove transmit. The AND circuit 1479 in FIG. 39 receives as inputs the output of the AND circuit 1465 in FIG. 38, receive terminal on the line 382, and not I/O ready on the line 371. The output of the AND circuit 1479 is designated remove receive terminal.

Figure 40:
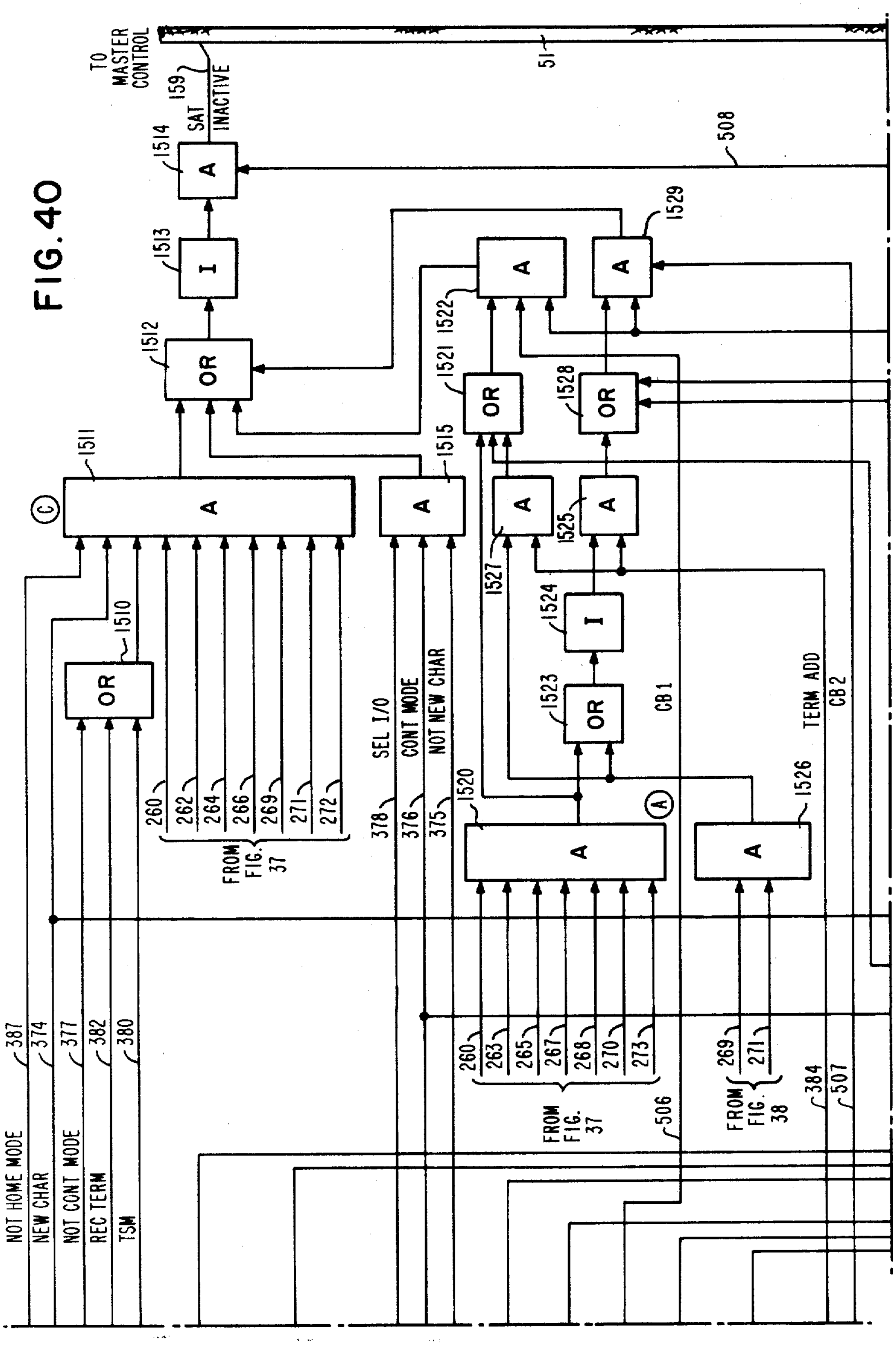

Reference is made next to FIG. 40. An OR circuit 1510 receives input signals labeled not control mode on the line 377, receive terminal on the line 382, and transmit on the line 380. The output of the OR circuits 1510 is supplied to an AND circuit 1511 the output of which is supplied through an OR circuit 1512 and an inverter 1513 to an AND circuit 1514. The output of the AND circuit 1514 is supplied on the line 159, designated satellite inactive, via the bus 51 to the master control. The AND circuit 1511 receives input signals labeled not home mode on the line 387, new character on the line 374, the output of the OR circuit 1510, and information signals representing code C from the data register of the master control on lines 260, 262, 264, 266, 269, 271, and 272.

An AND circuit 1515 in FIG. 40 receives inputs labeled select I/O on the line 378, control mode on the line 376, and not new character on the line 375. The output of the AND circuit 1515 is supplied to the OR circuit 1512. An AND circuit 1520 in FIG. 40 receives signals from the data register representing code A on the lines 260, 263, 265, 267, 268, 270, and 272. The output of the AND circuit 1520 is supplied through an OR circuit 1521 to an AND circuit 1522. The output of the AND circuit 1520 is supplied also through an OR circuit 1523 and an inverter circuit 1524 to an AND circuit 1525. The OR circuit 1521 also receives as an input, the one output side of the latch 1449 in FIG. 38.

An AND circuit 1526 in FIG. 40 receives alphabetic information from the data register designated not A on the line 269 and not B on the line 271. The output of the AND circuit 1526 is supplied to the OR circuit 1523 and to an AND circuit 1527. The AND circuit 1527 receives a second input labeled terminal addressed on the line 384. The output of the AND circuit 1527 is supplied through the OR circuit 1521 to the AND circuit 1522. The AND circuit 1525 receives the output of the inverter circuit 1524 and the signal designated terminal addressed on the line 384. The output of the AND circuit 1525 is supplied through an OR circuit 1528 to an AND circuit 1529. The AND circuit 1529 receives as input signals CB2 pulses on the line 507, the output from the OR circuit 1528, and an output signal from an AND circuit 1540 in FIG. 41, and the output of the AND circuit 1529 is supplied to the OR circuit 1512. The AND circuit 1522 in FIG. 40 receives as input signals CB1 pulses on the line 506, the output of the AND circuit 1540 in FIG. 41, and the output from the OR circuit 1521 in FIG. 40, and the output of the AND circuit 1522 is supplied to the OR circuit 1512.

The AND circuit 1540 in FIG. 41 receives as input signals control mode on the line 376, and new character on the line 374. The output of the AND circuit 1540 is supplied to the AND circuit 1522 and 1529 in FIG. 40, as pointed out above. An AND circuit 1541 in FIG. 41 receives input signals designated not transmit on the line 381, and signals from the data register representing code Y on the lines 260, 263, 265, 266, 268, 271, and 272. An AND circuit 1542 receives input signals labeled not transmit on the line 381, and signals from the data register representing code N on lines 261, 263, 265, 267, 269, 270, and 273. Output signals from the AND circuits 1541 and 1542 are conveyed to the OR circuits 1528 in FIG. 40.

AND circuits 1543 and 1544 in FIG. 41 have their outputs connected to the one input side of respective latches 1545 and 1546, and when these latches are set to the one state, associated indicated lamps 406 and 407 are lighted. The latches 1545 and 1546 are reset by an indicator reset signal on the line 392. The AND circuits 1543 and 1544 each receive S1 signals on the line 508. The AND circuit 1543 receives also master error 1 signals on the line 389, and the AND circuit 1544 receives as a second input master error 2 signals on the line 390.

Each of the AND circuits 1550 through 1552 receive S1 signals on the line 508. Also, each of the AND circuits 1550 through 1552 receive a second input signal from respective OR circuits 1553 through 1555. The AND circuit 1550 provides an output signal on the line 163 designated insert-remove control mode which is forwarded via the bus 51 to the master control. The AND circuit 1551 provides an output signal insert-remove TSM on line 165. The AND circuit 1552 provides an output signal on the line 166, designated insert-remove receive terminal, via the bus 51 to the master control.

The OR circuit 1553 in FIG. 41 receives as input signals the output of the AND circuit 1421 in FIG. 37, the output of the AND circuit 1473 in FIG. 39, and the output of the AND circuit 1465 in FIG. 38. The OR circuit 1554 in FIG. 41 receives as input signals the output of the AND circuit 1422 in FIG. 37, the output of the AND circuit 1443 in FIG. 38, and the output of the AND circuit 1478 in FIG. 39. The OR circuit 1555 in FIG. 41 receives as input signals the output of the AND circuit 1423 in FIG. 37, the output of the AND circuit 1441 in FIG. 38, and the output of the AND circuit 1479 in FIG. 39.

Figure 42:
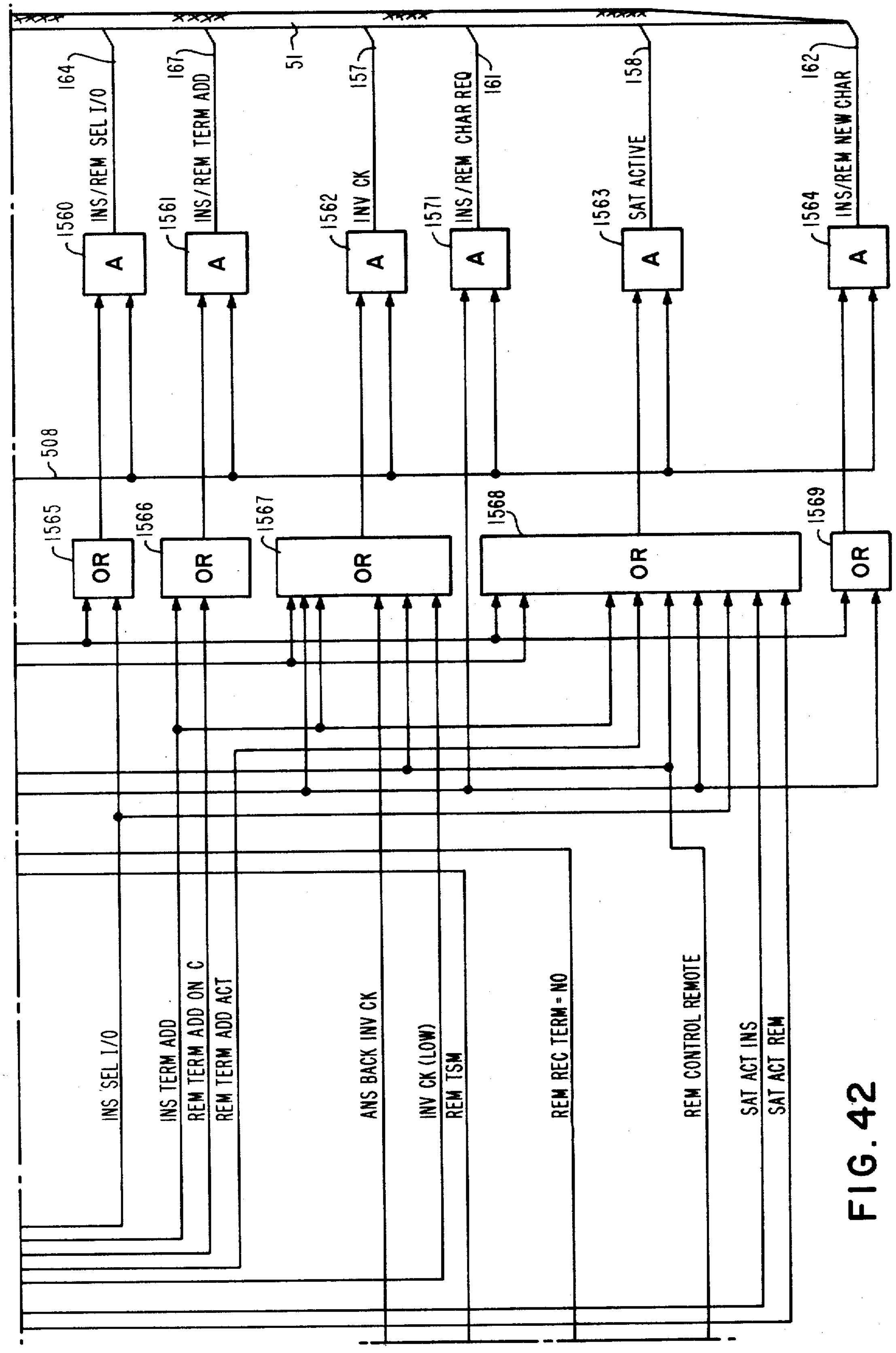

Referring next to FIG. 42, each of the AND circuits 1560 through 1564 receives S1 signals on the line 508. The AND circuits 1560 through 1564 receive a second input from corresponding OR circuit 1565 through 1569. The output of the AND circuit 1560 on the line 164, designated insert-remove select I/O, is supplied via the cable 51 to the master control, and the output of the AND circuit 1561 on the line 167, designated insert-remove terminal addressed, is supplied via the bus 51 to the master control. The output of the AND circuit 1562 on the line 157, designated invert check, is supplied via the bus 51 to the master control, and the output of the AND circuit 1563 on the line 158, designated satellite active, is supplied via the bus 51 to the master control. The output of the AND circuit 1564 on the line 162, designated insert-remove new character, is supplied via the bus 51 to the master control.

The OR circuit 1565 in FIG. 42 receives as input signals the output of the AND circuit 1465 in FIG. 38 and the output of the AND circuit 1440 in FIG. 38. The OR circuit 1566 in FIG. 42 receives as input signals the output of the AND circuit 1431 in FIG. 37, and the output of the AND circuit 1424 in FIG. 37. The OR circuit 1567 in FIG. 42 receives as input signals the output of the AND circuit 1421 in FIG. 37, the output of the AND circuit 1431 in FIG. 37, the output of the AND circuit 1443 in FIG. 37, the output of the AND circuit 1477 in FIG. 39, the output of the AND circuit 1473 in FIG. 39, and the output of the AND circuit 1442 in FIG. 38. The AND circuit 1568 in FIG. 42 receives as inputs the output of the AND circuit 1465 in FIG. 38, the output of the AND circuit 1421 in FIG. 37, the output of the AND circuit 1431 in FIG. 37, the output of the AND circuit 1433 in FIG. 37, the output of the AND circuit 1473 in FIG. 39, the output of the AND circuit 1443 in FIG. 38, the output of the AND circuit 1440 in FIG. 38, the output of the AND circuit 1463 in FIG. 38, and the output of the AND circuit 1464 in FIG. 38. The OR circuit 1569 in FIG. 42 receives as inputs the output of the AND circuit 1465 in FIG. 38, and the output of the AND circuit 1443 in FIG. 38.

The output of the AND 1571 in FIG. 42, labeled insert-remove character request on the line 161, is positive when the S1 pulse on the line 508 is coincident with the output of the AND circuit 1443 in FIG. 38.

Figure 43:
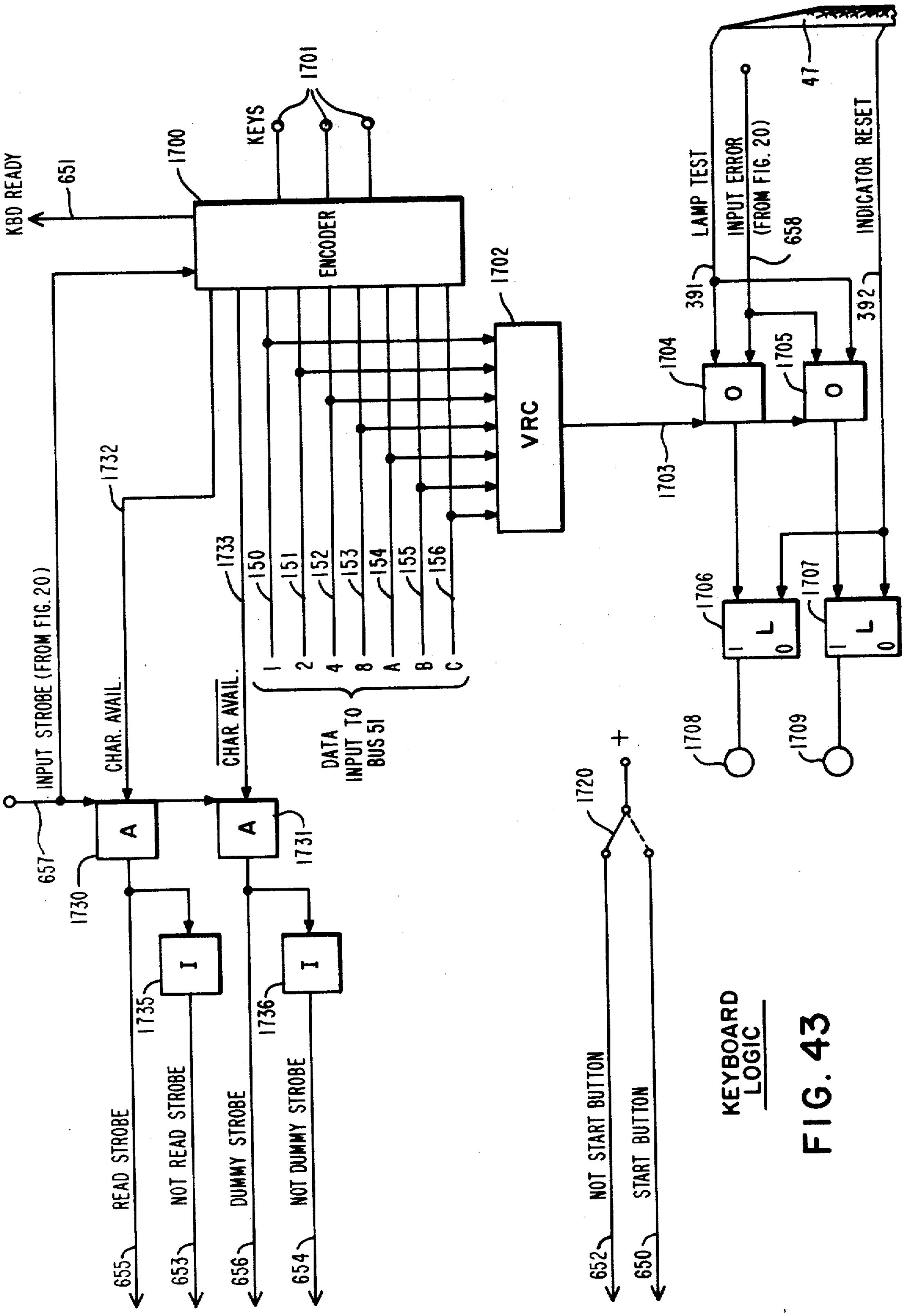
FIG. 43 illustrates in detail the logic circuitry for the keyboard shown in block form in FIG. 2.

Reference is made next to FIG. 43 which illustrates the logic of the keyboard 20 shown in block form in FIG. 2. The keyboard includes an encoder 1700 in FIG. 43 which responds to the depression of keys 1701 to provide a combination of signals on the output lines 150 through 156. When a given one of the keys 1701 is depressed, it causes the encoder to provide a given combination of signals on the output lines 150 through 156. The signals on the output lines 150 through 156 are supplied via the bus 51 to the diagnostic register 40 of the master control, and these output signals are supplied also to a VRC 1702 in FIG. 43 which checks the combination of signals for the correct parity. If an error is detected, the VRC 1702 supplies a signal on an output line 1703 to OR circuits 1704 and 1705. These OR circuits are connected to the one input side of associated latches 1706 and 1707. These latches have their one output sides connected to associated indicator lights 1708 and 1709, Any error detected by the VRC 1702 causes the latches 1706 and 1707 to set whereby the indicator lamps 1708 and 1709 are lighted. A lamp test signal on the line 391 from the cable 47 in FIG. 43 is utilized to test the operation of the OR circuits 1704, 1705, the latches 1706, 1707 and the indicator lamps 1708 and 1709. An input signal on the line 658, designated input error, is received from FIG. 20 of the keyboard satellite control 24 whenever a keyboard error is detected by the keyboard satellite control. This signal on the line 658 likewise sets the latches 1706 and 1707 and thereby lights the indicator lamps 1708 and 1709. A signal on the input line 392, labeled indicator reset, is supplied to the zero input sides of the latches 1706 and 1707, and this signal serves to reset the latches, thereby extinguishing the indicator lamps 1708 and 1709. The signal on the input line 392 is supplied by an operator whenever a test has been completed, or if an error has occurred, this signal may appear when the error has been noted by an operator.

A start button 1720 in FIG. 43 is normally positioned as shown to complete a circuit which generates a positive signal labeled not start button on the line 652. However, when it is necessary to initiate operation of the keyboard, the start button 1720 is positioned to generate a positive signal on the line 650 labeled start button. This signal is used by the keyboard satellite control to initiate operations involving the keyboard.

AND circuits 1730 and 1731 in FIG. 43 respond to input signals on the line 657 designated input strobe. The AND circuit 1730 receives an input signal on the line 1732 from the encoder 1700. The line 1732 is energized with a positive signal whenever any one of the keys 1701 is depressed, thereby signifying that a character is available from the encoder 1700. The AND circuit 1731 receives a positive signal on a line 1733 whenever none of the keys 1701 is depressed, thereby signifying that a character is not available. The levels on the lines 1732 and 1733 are complementary. That is, if the line 1732 is energized with a positive signal level indicating that a character is available, the line 1733 is energized with a negative signal level. Whenever the line 1733 is energized with a positive signal level, signifying that a character is not available, the line 1732 is energized with a negative signal level. One or the other of the AND circuits 1730 or 1731 always passes the input strobe signal on the line 657. The output signal on the line 655 from the AND circuit 1730 is designated read strobe, and this signal is supplied to the keyboard satellite control. This signal is also supplied through an inverter 1735 to an output line 653 which is designated not read strobe. The output of the AND circuit 1731 is supplied on the line 656, designated dummy strobe, to the keyboard satellite control, and this line is also connected to an inverter 1736. The output of the inverter 1736 is supplied on the line 654 to the satellite control, and this signal is designated not dummy strobe. The encoder 1700 provides, at all times that power is applied, a level on the line 651, designated keyboard ready.

Figure 44:
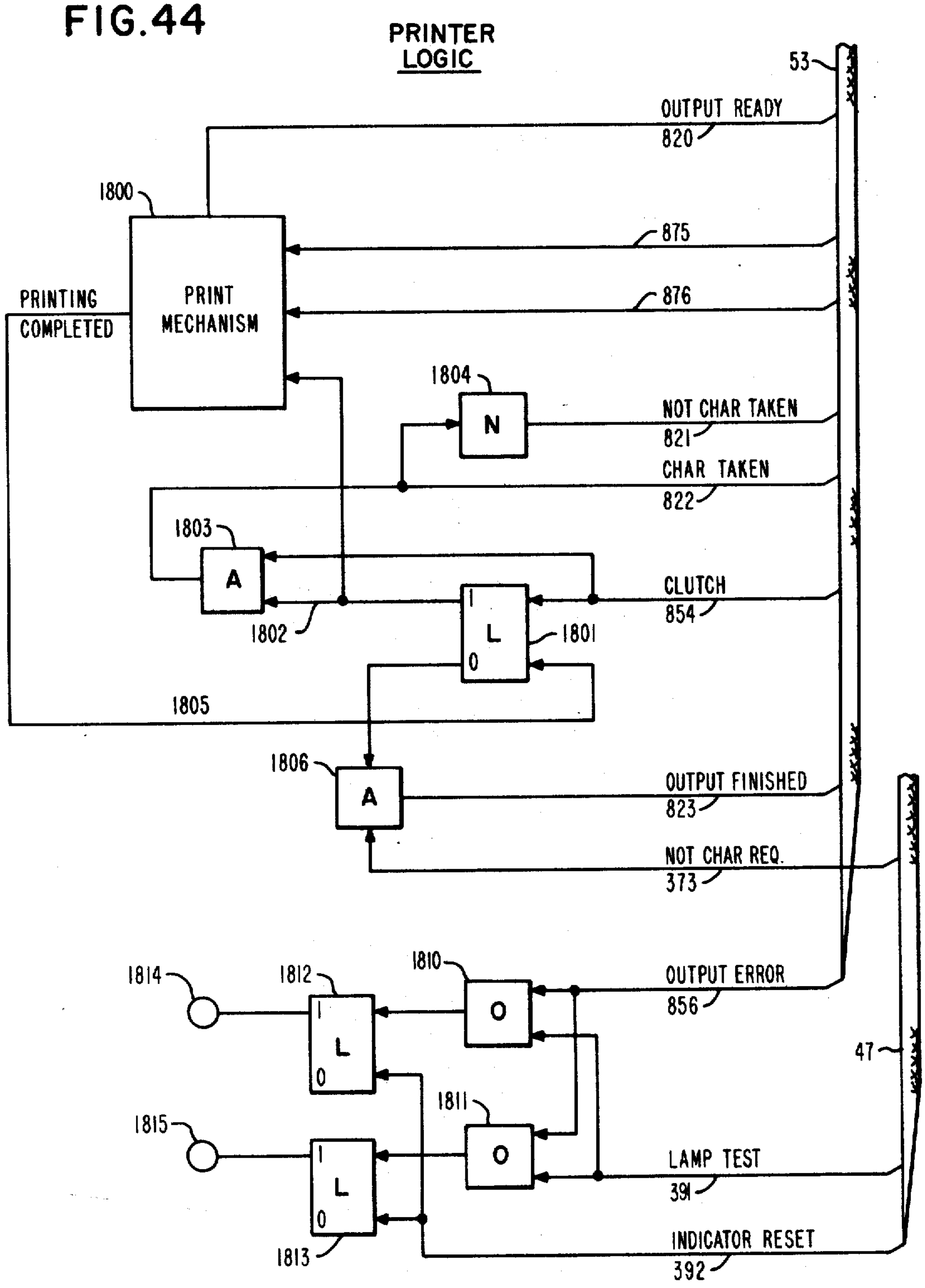
FIG. 44 illustrates in detail the logic circuitry for the printer shown in block form in FIG. 2.

Reference is made next to FIG. 44 which illustrates the logic of the printer 21 shown in block form in FIG. 2. The printer 21 in FIG. 44 includes a print mechanism 1800 which receives data signals from the printer satellite control 25 on a group of lines via the cable 53, but only lines 875 and 876 of this group are shown in the interest of simplicity. Signals on these lines are supplied by respective latches 868 and 869 in FIG. 25. Data signals on these lines operate the print mechanism to select a character for a printing operation. Whenever a printing operation is to take place, a positive signal is supplied on the line 854, labeled clutch, to the one input side of a latch 1801. When this latch is set, it supplies a signal on a line 1802 to the print mechanism which causes the printing of the selected character by the print mechanism. The signal on the line 1802 is supplied also to an AND circuit 1803, and this AND circuit also receives the clutch signal on the line 854. The output of the AND circuit 1803, labeled character taken, is supplied on the line 822 to the printer satellite control via the cable 53. The output signal on the line 822 is supplied also through an inverter 1804, and the output of this inverter on the line 821, designated not character taken, is supplied to the printer satellite control via the cable 53.

When a printing operation is completed by the print mechanism 1800, it supplies a signal on a line 1805, labeled printing completed, to the zero input side of the latch 1801, thereby resetting this latch. A signal from the zero output side of this latch is supplied through an AND circuit 1806 on a line 823, designated output finished, via the cable 53 to the printer satellite control. This signal signifies that the printing operation has been completed. The AND circuit 1806 receives a second input on the line 373 labeled not character request.

The print mechanism 1800 in FIG. 44 supplies a signal on the line 820, labeled output ready to the printer satellite control, and a positive signal on this output line signifies to the printer satellite control that the print mechanism is ready to print. For example, this signal signifies to the printer satellite control that the print mechanism has paper and the power is on. If the power fails, or if the paper runs out, the signal on the line 820 changes to a negative level, thereby informing the printer satellite control so that further printing operations may be terminated until the deficiency is corrected.

Whenever the printer satellite control supplies an output error signal on the line 856 to the printer 21 in FIG. 44, this signal is passed by OR circuits 1810 and 1811 to the respective one input sides of associated latches 1812 and 1813. When set to the one state, these latches light associated indicator lights 1814 and 1815. If a lamp test signal is supplied on the line 391 via the bus 47 to the printer 21 in FIG. 44, it is passed by the OR circuits 1810 and 1811 to set associated latches 1812 and 1813 to the one state, thereby lighting associated indicator lamps 1814 and 1815. The latches 1812 and 1813 are reset by an indicator reset signal on the line 392 from the bus 47.

The operation of the system in FIG. 2 is discussed next. The operation of the system in the home mode is described first, and then the operation of the system in the line mode is discussed. Let it be assumed for purposes of discussing the operation of the system in the home mode that the keyboard is to be operated in conjunction with the printer. As characters are generated by the keyboard, they are supplied to the printer which prints out the information. When the system is in the home mode, the Serdes and the multipoint logic satellite control are not operative. Rather, they are in the standby status, but they can become operative if line mode operation is initiated.

In the home mode condition prior to the commencement of operations by the keyboard and printer, it is assumed (1) that the latches 340 through 347 of the control register 46 in FIGS. 11 and 12 are reset and that the latch 571 in FIG. 10 is set, and (2) that the latches 107 through 117 of the diagnostic register 40 are reset. It is pointed out that the latches 340 through 347 in FIGS. 11 and 12 and the latch 571 in FIG. 10 present a content with odd parity to the VRC 49 in FIG. 10. The printer 21 and the printer satellite control 25 must complete certain preliminary operations before the keyboard 20 and the associated keyboard satellite control 24 can be utilized. Next the printer 21 and the printer satellite control 25 are discussed.

First, the printer satellite control 25 supplies a positive signal on the line 160, designated I/O ready, in FIG. 24. This takes place because, assuming the printer 21 is inventor with paper and power is on, it supplies a positive signal on the line 820 in FIG. 44 via the bus 53 to the AND circuit 801 in FIG. 22. The job switch 388 in FIG. 12 is set as indicated to supply a positive signal to the line 386, designated home mode. The signal on the line 386 is supplied via the bus 47 in FIG. 12 to the AND circuit 801 in FIG. 22. Since both inputs to this AND circuit are positive signals levels, it supplies a positive output signal through the OR circuit 809 in FIG. 24 to set the select latch 810 to the one state. The output signal from the one side of this latch on the line 828 is supplied to the AND circuits 830, 831 and 832. The AND circuit 830 in FIG. 24 receives a positive signal level on the line 371, designated not I/O ready, from the zero output side of the latch 340 in FIG. 11. When the AND circuit 830 in FIG. 24 receives a CB1 pulse, it supplies a positive output signal through the OR circuit 840 to the AND circuit 850. When the AND circuit 850 receives a positive pulse at S3 time, it supplies a positive output signal on the line 160 via the bus 51 to the one input side of the latch 110 in FIG. 7. This sets the latch 110 to the one state, thereby conditioning the AND circuit 330 in FIG. 11 to pass a positive signal to the one input side of the latch 340 whenever the AND circuit 561 in FIG. 10 receives a CB1 pulse and CQ4 pulse. When the latch 340 in FIG. 11 changes its state, a negative output signal is supplied on the output line 371, designated not I/O ready, via the bus 47 to the AND circuit 830 in FIG. 24, thereby deactivating this AND circuit.

It is pointed out that the inputs to the AND circuit 830 are identical to the inputs to the AND circuits 831 and 832. The AND circuits 830 through 832 each serve specific functions, and they serve further as a part of the error detection and checking arrangement according to this invention. The output of the AND circuit 831 serves to make proper changes in the parity bit held in latch 107 in FIG. 7 of the diagnostic register 40. More specifically, odd parity is maintained in the diagnostic register latches 107 through 117 in FIGS. 7 and 8 at all checked times. This change in parity is discussed next. Since the output of the AND circuit 830 sets the latches 110 in FIG. 7 and 340 in FIG. 11 as pointed out above, this makes the content of the control register stages 340 through 347 in FIGS. 11 and 12 disagree with the parity indication of binary in the latch 571 in FIG. 10. Note that the latch is in the one state because it was set initially. In order to prevent the VRC 49 in FIG. 10 from indicating a parity error, it is necessary to change the parity content of the latch 571 from the binary one to the binary zero state, thereby to provide bits with an odd parity to the VRC 49 in FIG. 10. To accomplish this, the positive output of the AND circuit 831 in FIG. 24 is supplied through the OR circuit 841 to the AND circuit 851. When the S3 pulse operates the AND circuit 850, it also operates the AND circuit 851. The positive output signal from the AND circuit 851 passes along the line 157 via the cable 51 to set the latch 107 in FIG. 7 to the one state. The positive output from the one side of this latch is supplied to the AND circuit 570 in FIG. 10, and this AND circuit in turn provides a positive output pulse at CQ3 time to the complement input of the latch 571, thereby resetting this latch to the zero state.

Since the control register 46 now contains a binary one in the latch 340 and zeros in the latches 341 through 347, the parity indication in the latch 571 should be a zero in order to maintain odd parity. The VRC 49 in FIG. 10 receives a positive signal from the one output side of only one latch at CQ5 time i.e. the latch 340 in FIG. 11. Thus no parity discrepancy at CQ5 time is detected by the VRC 49 since an odd number of binary one's are presented for the parity check.

Simultaneously as the AND circuits 830 and 831 in FIG. 24 supply output signals to perform the operations described above, the AND circuit 832 supplies a positive output signal through the OR circuit 842 to the AND circuit 852 in FIG. 24. The AND circuit 852 receives a positive signal from the VRC 870 in FIG. 25 whenever the parity indication in the latch 872 agrees with the content of the latches 868 and 869. It is assumed at this time that the VRC 870 supplies a positive output signal, indicating no parity error, to the AND circuit 852 in FIG. 24. When the S3 pulse is applied to the AND circuit 852 in FIG. 24, this AND circuit supplies output signal on the line 158, designated satellite active, which is supplied via the bus 51 to the one input side of the latch 108 in FIG. 7.

Simultaneously as the AND circuits 830 through 832 in FIG. 24 are operated to provide positive output signals, the AND circuit 881 in FIG. 25 is operated to provide a positive output signal. This is seen by noting that the positive signal, not I/O ready, on the line 371 is supplied as an input to the AND circuit 881; a positive signal on the line 820, designated output ready, from the printer 21 in FIG. 44 is supplied to the AND circuit 881 in FIG. 25; and a positive signal on the line 386, designated home mode, is supplied by the master control through the OR circuit 880 in FIG. 25 to the AND circuit 881. When a CB1 pulse is generated, it causes the AND circuit 881 to supply a positive output signal through the OR circuit 882 to the inverter 883. The inverter 883 responds to the positive input signal level and supplies a negative output signal level to the AND circuit 884 which prevents this AND circuit from supplying a positive output signal on the line 159, designated satellite inactive, when the S3 pulse is generated. The negative signal level on the line 159 prevents the latch 109 in FIG. 7 from being set to the one state. Since latches 107, 108, and 110 in FIG. 7 are set to the one state by the operation of the AND circuits 830, 831, and 832 in FIG. 24 as explained above and since the latches 109 and 111 through 117 are in the zero state, it is seen therefore that the number of binary ones stored in the latches 107 through 117 is an odd number (three latches). The VRC 45 checks for odd parity, and hence it properly determines that the latches 107 through 117 hold an odd number of bits at CQ4 time.

It is pointed out that the foregoing sequence of events take place during a CB1 pulse or the first half of an S3 pulse. More specifically, this can be seen by referring to FIG. 3 wherein it is shown that an S3 pulse commences with time period 21 and terminates with time period 30. The foregoing events take place during CB1 time between time period 21 and time period 25 in FIG. 3. It is pointed out that the latches 107, 108 and 110 in FIG. 7 are changed for reasons pointed out above, and at CQ4 time the content of the latches 107 through 117 in FIGS. 7 and 8 are checked for odd parity by the VRC 45. If odd parity exists, the VRC 45 supplies a negative output signal on the line 540 to the OR circuits 541 and 542 in FIG. 10 at CQ4 time, and this signal is ineffective to generate a positive master error 1 or master error 2 signal on the lines 389 and 390 in FIG. 10. If the VRC 45 determines that the parity for the content of the latches 107 through 117 is not odd, an error has occurred, and the VRC 45 generates a positive output signal on the line 540 to signify this. The positive signal on the line 540 passes through the OR circuits 541 and 542 to generate master error 1 and master error 2 signals, and such positive levels on the lines 889 and 890 are supplied via the bus 47 to the AND circuits 885 and 886 in FIG. 25. The AND circuits 885 and 886 supply positive output signals during the S3 pulse to respective latches 887 and 888 which in turn operate the indicator lamps 410 and 411 to manifest the error. After the parity check is made by the VRC 45 in FIG. 6 at CQ4 time of the S3 pulse, the latches 107 through 117 in FIGS. 7 and 8 are reset at CQ1 time which occurs at time period 26 in the chart of FIG. 3.

Next, the events which take place during the latter half of the S3 pulse are considered, and this time period is defined by a CB2 pulse. More specifically, the events under consideration take place between the beginning of the time period 26 and the end of time period 30 in FIG. 3. When the CB1 signal terminates, the outputs of the AND circuits 830 through 832 in FIG. 24 and the AND circuit 881 in FIG. 25 change from a positive level to a negative level, and the output signals on the lines 157, 158, and 160 change from a positive level to a negative level simultaneously as the output signal from the AND circuit 884 changes from a negative level to a positive level. During the CB2 pulse a CQ1 positive pulse resets the latches 107 through 117 in FIGS. 7 and 8. This is the first event which takes place during the second half of the S3 pulse.

The positive output signal from the AND circuit 884 in FIG. 25 is supplied on the line 159 via the cable 51 to the one input side of the latch 109 in FIG. 7, thereby setting this latch to the one state. It is the only latch in the group of latches 107 through 117 which is set to the one state at this time. Therefore, the number of these latches set to the one state is an odd number, and the VRC 45 correctly certifies odd parity when the parity check is made at CQ4 time. It is pointed out that the latch 340 in FIG. 11 remains set from the previous operation, and it is the only one of the latches 340 through 347 which is set to the binary one state at this time. Consequently, the VRC 49 certifies that odd parity is correct when the parity check is made at CQ5 time of the latter half of the S3 pulse. During the latter half of the S3 pulse the satellite inactive line 159 is rendered positive, and this signifies that all other control lines from the printer satellite control should be negative. This is the case because, as pointed out earlier, the output of the AND circuits 850, 851 and 852 are rendered negative upon the termination of the CB1 pulse.

Upon termination of the S3 pulse, the printer satellite control loses access to the master control. The S4 pulse causes the master control to access the Serdes satellite control, but as explained earlier, this control satellite is inactive. However, it will bring up its satellite inactive line. More specifically, the AND circuit 995 in FIG. 30 provides a positive output signal on the output line 159 to set the latch 109 in FIG. 7 during the existence of an S4 pulse. The remaining ones of the latches 107 through 117 in FIGS. 7 and 8 continue in the zero state, and the parity checks by the VRC 45 at both CQ4 times certify that there is no discrepancy on the control lines between the master control and the Serdes satellite control. The parity of the control register 46 is checked also at both CQ5 times, and odd parity exists since no change has occurred since the printer satellite control terminated its access. Upon the termination of the S4 pulse, the Serdes satellite control loses access to the master control.

The next pulse following the S4 pulse is an S1 pulse, and the master control accesses the multipoint logic satellite control during the S1 pulse. The multipoint logic satellite control 23 is inactive. Hence, all control lines should have negative signal levels except the line 159 labeled satellite inactive. The AND circuit 1514 in FIG. 40 supplies a positive output signal on its output line 159 in response to the S1 signal. Again, the latch 109 in FIG. 7 is set, all other latches of the group of latches 107 through 117 being reset. The VRC 45 in FIG. 6 certifies that the parity is odd at both CQ4 times. Also, the parity of the content of the latches 340 through 347 in FIGS. 11 and 12 is checked at both CQ5 times by the VRC 49, and odd parity exists since these latches remain in the same condition as they were when the printer satellite control terminated its access to the master control.

Upon the termination of the S1 pulse, the multipoint logic satellite control loses access to the master control. The S1 pulse is followed by an S2 pulse which causes the master control to access the keyboard satellite control 24. Assuming that the start button has not been depressed at the keyboard, the keyboard satellite control 24 remains inactive, and the only one of its control lines with a positive signal level is the satellite inactive line 159. This sets the latch 109 in FIG. 7, all the remaining latches 107 through 117 being reset. The parity checks at both CQ4 times by the VRC 45 certify that the parity is odd. Likewise, parity checks at both CQ5 times by the VRC 49 certify that the parity is odd since no change has taken place in the latches 340 through 347. The master control may continue to access the various satellite controls, and the foregoing sequence of events is repetitively performed with the exception of the printer satellite control, which provides the line satellite inactive until one of the satellite controls becomes active. In the home mode this change to the active status is initiated by the keyboard 20 or the printer 21.

The printer satellite control at some subsequent time must initiate a character request before the keyboard can supply data. The character request is generated by a positive signal from the AND circuit 853 in FIG. 24 during the CB1 period of an S3 pulse. In order to generate this signal it is necessary for the AND circuit 805 to be conditioned by all inputs. These inputs are considered next.

The printer mechanism 1800 in FIG. 44 supplies a positive signal on the line 1805, designated printing completed, which resets the latch 1801, and this latch supplies a positive output signal from the zero output side to the AND circuit 1806. This AND circuit receives a second input signal on the line 373 labeled not character request which is positive except when a positive character request signal is present. A positive signal on the line 823, designated output finished, in FIG. 44 is conveyed via the cable 53 to the AND circuit 805 in FIG. 22. The output of the AND circuit 832 in FIG. 24 has a negative level. It is recalled that this AND circuit was deconditioned by a negative signal level on its input lines 371, designated not I/O ready, as explained earlier. The negative signal level from the AND circuit 832 is inverted to a positive signal level by the inverter 857 and supplied to the AND circuit 805 in FIG. 22. The latch 343 in FIG. 12 supplies a positive signal level on its zero output side along the line 377 via the cable 47 to the AND circuit 805 in FIG. 22. The AND circuit 805 receives a positive signal on the line 506 at CB1 time. The AND circuit 805 receives a positive signal level on the line 828 from the one output side of the select latch 810 in FIG. 24. The latch 342 in FIG. 11 supplies a positive output signal on its zero output side along the line 375 via the cable 47 to the AND circuit 805 in FIG. 22. Thus it is seen that all input levels to the AND circuit 805 are positive, and this AND circuit supplies a positive output signal on the line 861 to the OR circuits 841 through 843 in FIG. 24. The positive output signal passed by the OR circuit 843 is supplied to the AND circuit 853, and this AND circuit supplies a positive output signal during the S3 pulse on the line 161, designated insert/remove character request, via the cable 51 to the one input side of the latch 111 in FIG. 7. Thus it is seen how a character request is initiated by the printer satellite control 25.

Simultaneously as the positive character request signal is supplied on the line 161 in FIG. 24, the AND circuits 851 and 852 supply positive output signals on their associated lines 157 and 158. This follows because the positive output signal from the AND circuit 805 in FIG. 22 on the line 861 is supplied to the OR circuits 841 and 842 simultaneously as it is supplied to the OR circuit 843. THe positive output signals on the lines 157 and 158 are applied to the one input sides of associated latches 107 and 108 in FIG. 7, thereby setting these latches. When the latch 107 is set to the one state, its one output side on the line 300 conditions one input of the AND circuit 570 in FIG. 10. This AND circuit supplies a positive output signal to the complement input of the latch 571 when a CQ3 pulse arrives. This causes the latch to undergo a change in state. It is recalled that this latch earlier was reset to the zero state. It now is changed to the one state.

It is necessary to insure that the output of the AND circuit 884 in FIG. 25 is a negative level, signifying that the satellite is not inactive. The AND circuit 839 in FIG. 25 receives positive input signals on all of its inputs at this time. The input line 377, designated not control mode, is positive at this time. The line 823, designated output finished, from the printer has a positive signal level at this time as previously explained. The input line 828 from the one output side of the select flip-flop 810 in FIG. 24 has a positive signal level at this time. A positive CB1 pulse on the line 506 causes the output of the AND circuit 839 to apply a positive pulse through the OR circuit 882 to the inverter 883 which inverts this positive level to a negative level on the input of the AND circuit 884. Consequently, the output signal on the line 159 is at a negative level at this time, and this insures that the latch 109 in FIG. 7 is not set at this time.

Thus, it is seen that during the first half of an S3 pulse, the latches 107, 108 and 111 in FIG. 7 are set to the one state with all remaining latches in the group 107 through 117 being in the zero state. It is pointed out that an odd number of latches are set to the one state (three latches), and a parity check by the VRC 45 at CQ4 time of the CB1 pulse certifies that odd parity exists. Otherwise, a master error 1 and a master error 2 signal are generated as explained earlier.

The latch 111, being in the one state, supplies a positive output signal on the line 307 to the AND circuit 331 in FIG. 11, and this AND circuit receives a positive pulse from the AND circuit 561 in FIG. 10 at CQ4 time of a CB1 pulse. At this time the AND circuit 331 supplies a positive output signal to the one input side of the latch 341 in FIG. 11, thereby setting this latch. When the VRC performs a parity check at CQ5 time, it certifies correct odd parity because the latches 571 in FIG. 10 and 340 and 341 in FIG. 11 are set to the one state with the remaining latches 342 through 347 in FIGS. 11 and 12 being in the zero state. Thus the control lines 370 (designated I/O ready) and 372 (designated character request) have positive signal levels which are supplied via the bus 47 to the remainder of the system. The latches 107 through 117 in FIGS. 7 and 8 are cleared when the next CQ1 pulse is generated during CB2 time in the latter half of the S3 pulse. Upon termination of the CB1 pulse the AND circuit 805 in FIG. 22 is deactivated, and as a consequence the OR circuits 841, 842 and 843 do not provide a positive signal to their associated AND circuits 851, 852 and 853. However, the AND circuit 884 in FIG. 25 generates a positive output signal on the line 159, designated satellite inactive. Next, the conditions essential to insure this are considered.

The AND circuits 839 and 881 in FIG. 25 receive a negative signal level on the input line 506 because the CB1 pulse is in its negative phase as shown in FIG. 3. The AND circuits 837 and 838 receive a negative level on the input line 374 from the one output side of the latch 342 in FIG. 11. Thus it is seen that all input lines supply a negative signal level to the OR circuit 882, and the negative output level is converted by the inverter 883 to a positive signal level which is supplied to the AND circuit 884. The AND circuit 884 receives a positive signal level on the line 512 at this time. Thus, a positive output signal is provided on the line 159 from the AND circuit 884 in FIG. 25 to the one input side of the latch 109 in FIG. 7. This is the only one of the latches in the group of latches 107 through 117 in FIGS. 7 and 8 which is set during the CB2 time of this S3 pulse. When the parity is checked by the VRC 45 in FIG. 6 at the next CQ4 time, it certifies that the parity of the latches 107 through 117 in FIGS. 7 and 8 is correctly odd. When the VRC 49 in FIG. 10 checks the parity of the content of the latches 340 through 347 in FIGS. 11 and 12 at CQ5 time, it finds the parity odd because (1) the latches 340 and 341 in FIG. 11 are set, (2) the latches 342 through 347 in FIGS. 11 and 12 are reset, and (3) the latch 571 in FIG. 10 is set. Thus odd parity is correctly certified by the VRC 49 in FIG. 10.

Access to the master control by the printer satellite control ends upon termination of the S3 signal. The S4 signal causes the Serdes to be accessed, but as explained earlier, it is inactive. Likewise, the multipoint logic satellite control 23 is inactive, and the S1 signal is ineffective to make changes. The S2 signal causes the master control to access the keyboard satellite control. If the start button the the keyboard 20 is depressed prior to the commencement of the next S2 signal, this causes the keyboard satellite control 24 to become active. In effect this causes the AND circuit 723 in FIG. 19 to be conditioned, and it supplies a positive signal on the output line 158, termed satellite active. Simultaneously the AND circuit 724 is deconditioned, and it supplies a negative signal on its output line 159, termed satellite inactive. The events which cause these two actions are discussed next. It normally takes a number of S2 signals for the foregoing events to materialize, and this is pointed out in the ensuing description in conjunction with the events as they take place.

If the start button 1720 in FIG. 43 is depressed, a positive signal is supplied on the line 650 in FIG. 43 to the AND circuit 680 in FIG. 17. The encoder 1700 in FIG. 43 supplies a positive signal on the output line 651 whenever the keyboard is ready to be operated. It is presumed that the keyboard is ready for operation, and power is on. Therefore, a positive signal is supplied on the output line 651 from the encoder 1700 in FIG. 43, and this signal is supplied to the AND circuit 680 in FIG. 17. Positive signals on the input lines 501 and 510 are supplied to the AND circuit 680 in FIG. 17 at S2 time and CQ1 time. Thus, the AND circuit supplies a positive output signal to the one input side of the allow select latch 730, thereby setting this latch. The one output side of this latch conditions one input of the AND circuit 731 in FIG. 17 and one input of the AND circuit 700 in FIG. 19. The AND circuit 700 cannot be fully conditioned until the select latch 732 in FIG. 19 is set to the one state, and this cannot take place until the AND circuit 731 in FIG. 17 is fully conditioned. One input to the AND circuit 731 is not start button on the line 652. This means that the start button must be released before this line can come up. Referring again to FIG. 43, when the start button 1720 is released, it returns to the position shown, thereby supplying a positive output signal on the line 652 to the AND circuit 731 in FIG. 17. The rate at which S2 signals occur is quite high as compared to the speed at which an operator manually depresses and releases the start button 1720 in FIG. 43. Accordingly, numerous S2 signals may occur before the start button is released and a positive signal applied on the line 652, designated not start button. The line 501 to the AND circuit 731 is energized with a positive pulse at CQ1 time, and the line 510 to the AND circuit 731 is energized with a positive pulse at CQ1 time, and the line 510 to the AND circuit 731 is conditioned with a positive signal at S2 time. The remaining input to the AND circuit 731 is from the OR circuit 734, and one input to this OR circuit is the line 386, designated home mode, which is energized with a positive signal as previously explained. Consequently, this positive signal is supplied through the OR circuit 734 to the AND circuit 731. The positive output signal from the AND circuit 731 is used to set the select latch 732 in FIG. 19. When this latch is set to the one state, a second input to the AND circuit 700 is energized with a positive signal. The last input to the AND circuit 700 is the line 506 which is energized with a positive signal at CB1 time. Thus a positive signal is supplied from the AND circuit 700 through the OR circuit 753 to the AND circuit 723 in FIG. 19. Since this AND circuit receives a positive signal on the line 510 at S2 time, it passes a positive output signal on the line 158 at CB1 time, and this signal sets the latch 108 in FIG. 7.

The one output side of the latch 732 in FIG. 19 is supplied also on the line 733 to the AND circuit 681 in FIG. 17, and this AND circuit passes a positive signal at CQ5 time to the zero input side of the latch 730, thereby resetting this latch.

When the latch 730 in FIG. 17 was set, the latch 793 in FIG. 20 also was set simultaneously. This is readily seen by noting that the lines 650 and 651 connected to the AND circuit 680 in FIG. 17 are also connected to the AND circuit 791 in FIG. 20. Hence, the positive output signal from the AND circuit 791 sets the latch 793 to the one state, thereby conditioning one input to the AND circuit 773. This AND circuit receives a positive signal on the input line 652 when the start button is released, and it receives a positive signal on the home mode line 386 through the OR circuit 772. Consequently, the AND circuit 773 supplies a positive output signal through the OR circuit 770 to the inverter 771. The inverter 771 in turn supplies a negative signal to the AND circuit 724, thereby deconditioning this AND circuit and providing a negative output level on the line 159. The negative level on the line 159 prevents the latch 109 in FIG. 7 from being set.

The latch 793 in FIG. 20 is reset by a positive signal from the AND circuit 792, and this AND circuit receives a positive pulse on its input line 505 at CQ5 time. The AND circuit 792 receives a positive input signal on the line 733 from the one output side of the latch 732 in FIG. 19. Thus it is seen that the latch 793 is reset at CQ5 time during the S2 time in which the select latch 732 is set. The foregoing events take place during the first half (CB1 time) of the S2 time periods, and it is during this period that the latch 108 in FIG. 7 is set. The remaining latches in the group of latches 107 through 117 in FIG. 7 and 8 are reset. Accordingly, a parity check by the VRC 45 in FIG. 6 at CQ4 time shows that the content of the latches 107 through 117 in FIG. 7 and 8 has odd parity. The VRC 49 in FIG. 10 checks the parity of the content of the latches 340 through 347 in FIGS. 11 and 12 at CQ5 time. Since no changes have taken place in these latches, the parity remains odd as previously described.

During the second half of each S2 signal, the positive signal on the line 158, termed satellite active, is removed, and a positive signal is established on the line 159 termed satellite inactive. The conditions leading to these two events are described next. It is recalled that the allow select latch 730 in FIG. 17 is reset at CQ5 time of the first half of the S2 signal. Accordingly, the one output side of this latch supplies a negative signal to the AND circuit 700, thereby deconditioning this AND circuit and removing the positive signal supplied through the OR circuit 753 to the AND circuit 723. Consequently, the output of the AND circuit 723 becomes a negative signal. It is pointed out that this latch 108 in FIG. 7 is reset at CQ1 time of a CB2 pulse by a positive pulse on the line 501. In fact, all of the latches 107 through 117 in FIGS. 7 and 8 are reset at CQ1 time.

The latch 793 in FIG. 20 is reset by a positive signal from the AND circuit 792 at CQ5 time of a CB1 pulse during S2 time. Consequently, the AND circuit 773 is deconditioned by the one output side of the latch 793, and the negative output signal from the AND 773 supplied through the OR circuit 770 to the inverter 771 is converted to a positive signal level at the input of the AND circuit 724 in FIG. 20. Hence, the output from this AND circuit becomes a positive signal on the line 159, and this signal sets the latch 109 in FIG. 7. This is the only one of the latches 107 through 117 in FIG. 7 and FIG. 8 which is set to the one state during the latter half (CB2 time) of the S2 time periods. Consequently, the VRC 45 in FIG. 6 correctly finds an odd parity for the content of the latches 107 through 117 at CQ4 time during the latter half of the S2 pulse. The VRC 49 in FIG. 10 checks the parity of the content of the latches 340 through 347 in FIGS. 11 and 12 at CQ5 time, and it finds the parity is odd since these latches have not undergone any changes since the last parity check.

The printer satellite control 25, the Serdes satellite control 26, and the multipoint logic satellite control 23 are inactive, and when accessed by their respective S3, S4 and S1 signals, they merely bring up their satellite inactive lines on which the master control performs a parity check by the VRC 45 in FIG. 6. This insures that any failures which may take place in these devices are detected by the master control even though such devices are inactive. As the master control sequentially accesses the printer satellite control 25, the Serdes satellite control 26 and the multipoint logic satellite control 23, these devices continue to perform in this fashion repetitively. The keyboard satellite control 24 is likewise repetitively accessed, but until a key is depressed, it performs in the following manner in a repetitive fashion.

Each time the keyboard satellite control 24 is accessed by the master control 27, the satellite active line 158 in FIG. 19 is energized with a positive level during the CB1 time of each S2 access period, and the satellite inactive line 159 in FIG. 20 is energized with a positive level during CB2 time of each S2 access period. The parity is checked twice in the master control during each access, as previously explained. Next the events which cause satellite active and satellite inactive conditions to occur are described.

First, the satellite active conditions are discussed. The AND circuit 686 in FIG. 18 is conditioned during each access of the keyboard satellite control because the character request line 372 has a positive level which is supplied by the latch 341 in FIG. 11; the not control mode line 377 has a positive level supplied by the zero output side of the latch 343 in FIG. 12; the select line 733 has a positive level supplied by the one output side of the select latch 732 in FIG. 19; and the line 510 has a positive signal supplied by the S2 pulse. The output of the AND circuit 686 is supplied on the line 657 to the AND circuits 1730 and 1731 in FIG. 43. Assuming a key has not been depressed on the keyboard, a positive signal is supplied on the not character available line 1733 to the AND circuit 1731, and this AND circuit provides a positive output signal on the line 656, termed dummy strobe. The positive signal on the line 656 is supplied via the cable 52 through the OR circuit 762 in FIG. 18 to the AND circuit 710 in FIG. 20. This AND circuit provides a positive output signal because all inputs are energized with positive levels. It is noted that the inputs to the AND circuit 686 in FIG. 18, except for the S2 signal on the line 510, are supplied also to the AND circuit 710 in FIG. 20. Additionally, the line 506 supplies CB1 pulses to the AND circuit 710. Thus the AND circuit 710 supplies a positive output signal through the OR circuit 753 to the AND circuit 723 in FIG. 19. The AND circuit 723 supplies a positive output signal on the line 158, designated satellite active, which sets the latch 108 in FIG. 7 during CB1 time of each S2 access period.

Next, the conditions are considered which insure that the AND circuit 724 in FIG. 20 supplies a negative output signal on the line 159, designated satellite inactive. The AND circuit 711 in FIG. 20 receives the same inputs, except for the S2 signals on the line 510, which are supplied to the AND circuit 686 in FIG. 18. The AND circuit 711 in FIG. 20 receives one additional input from the inverter circuit 790. During the first half (CB1 time) of the access period defined by each S2 signal the line 507 to the AND circuit 789 has a negative level because the CB2 signal is in its negative phase as shown in FIG. 3. This causes the AND circuit 789 to provide a negative output to the inverter 790 which in turn supplies a positive output signal to the AND circuit 711. The AND circuit 711 in turn supplies a positive output signal through the OR circuit 770 to the inverter 771. This inverter in turn supplies a negative signal level to the AND circuit 724, thereby insuring that the output from this AND circuit is a negative level on the satellite inactive line 159 during CB1 time of each access period S2. During the latter half of the access period S2 the line 507 supplies a positive signal during CB2 time to the AND circuit 789 in FIG. 20, and the dummy strobe line 656 supplies a positive signal level to the AND circuit 789, as explained above. The positive output signal of the AND circuit 789 is inverted by the inverter 790, and it supplied as a negative signal level to the AND circuit 711, thereby deconditioning this AND circuit. Accordingly, the output of the AND circuit 711 is a negative signal level which is supplied to the OR OR circuit 770. The inverter 771 in FIG. 20 in turn supplies a positive signal level to the AND circuit 724 during CB2 time of the access period S2. The AND circuit 724 in turn supplies a positive output signal on the satellite inactive line 159 to the master control during CB2 time which sets the latch 109 shortly after the latches 107 through 117 are reset.

During the CB2 period of each access time S2 it is necessary to insure that the output of the AND circuit 723 in FIG. 19 is a negative level. This is accomplished by the AND circuits 700 in FIG. 19 and 709 and 710 in FIG. 20. The AND circuit 710 provides a negative output level during the CB2 time of an S2 pulse. Note that one of the inputs to the AND circuit 710 is a CB1 pulse on the line 506, and the level on this line is a negative one during the period CB2. Consequently, the positive level on the output of the AND circuit 710 during CB1 time is changed to a negative level during CB2 time. The AND circuit 700 in FIG. 19 provides a negative output level during CB2 time because one of its inputs is a CB1 pulse. The AND circuit 709 provides a negative output because the latch 760 is reset and cannot be set until a read strobe occurs, as explained subsequently. Thus, all inputs to the OR circuit 753 in FIG. 19 are negative during the CB2 period of an S2 pulse, and this prevents the AND circuit 723 from passing a positive output signal to its satellite active line 158 during CB2 time. The above-described sequence of events in the keyboard satellite control 24 takes place repetitively during each S2 access time until a key is depressed, and at such time a different sequence of events takes place.

Let it be assumed next that a key is depressed on the keyboard. Numerous events take place, some of them simultaneously. First, the insert/remove new character line 162, the invert check line 157, and satellite active line 158 are energized with positive signals during the first half (CB1 time) of the access period S2, and the satellite inactive line 159 is energized with a negative signal during the first half of the access period S2. During the second half of the access time S2 the lines insert/remove new character 162 and the invert check line 157 are energized with negative signals. The sequence of events which establish these conditions and the results effected are discussed in greater detail at this point.

First the events which take place during the first half of the access period S2 are described. As explained above, a positive signal on the line 657, designated input strobe, in FIG. 18 is supplied by the AND circuit 686 to the keyboard 20 in FIG. 43. Since it is assumed that a key has been depressed, the line 1732, termed character available, is energized with a positive signal by the encoder 1700, and the positive signal level on the line 657 is passed by the AND circuit 1730 to the line 655. The positive signal on the line 655 is conveyed via the cable 52 to the OR circuit 762 in FIG. 18, the AND circuit 684 in FIG. 17, and the AND circuit 706 in FIG. 19. The positive output signal from the OR circuit 762 in FIG. 18 is supplied to the AND circuit 710 in FIG. 20, and this AND circuit, for reasons previously explained, supplies a positive output signal at this time through the OR circuit 753 to the AND circuit 723. Consequently, the AND circuit 723 supplies a positive output signal on its output line 158, designated satellite active.

The AND circuit 684 in FIG. 17 receives the positive read strobe signal on the line 655 and a positive signal on the line 501 at CQ1 time, and this AND circuit supplies a positive output signal to the one input side of the new character latch 741 in FIG. 17, thereby setting this latch. The one output side of the latch 741 in FIG. 17 supplies a positive signal to the AND circuit 742 in FIG. 14 and to the AND circuit 705 in FIG. 19.

The AND circuit 742 is considered subsequently. The AND circuit 705 receives a positive input signal on the line 506 during CB1 time. Consequently, this AND circuit supplies a positive output signal through the OR circuit 751 in FIG. 19 to the AND circuit 721 which in turn supplies a positive output signal on its output line 162, designated insert/remove new character.

The AND circuit 706 in FIG. 19 receives the positive read strobe signal on the line 655 and a positive signal on the line 506 at CB1 time. The AND circuit 706 supplies a positive output signal through the OR circuit 752 in FIG. 19 to the AND circuit 722 which in turn supplies a positive output signal on the invert check line 157.

The satellite inactive line 159 in FIG. 20 must be maintained at negative level during the CB1 time of the S2 access period. This function is performed by the AND circuit 711 which, as previously explained, receives a positive input level on each of its inputs during the CB1 time. The positive level from the AND circuit 711 in FIG. 20 is supplied through the OR circuit 770 to the inverter 771 which converts this positive input level to a negative output level which is supplied to the AND circuit 724. Consequently, the AND circuit 724 continues to maintain a negative output level during the CB1 period of the S2 access time.

Next the data transfer from the keyboard to the master control is described. Referring more specifically to FIG. 43, when one of the keys 1701 is depressed, the encoder 1700 responds to the positive input strobe signal on the line 657 to establish on the output lines 150 through 156 a combination of signals representative of the character indicated by the depressed key. The combination of data signals on the lines 150 through 156 are checked for odd parity in the VRC 1702 in FIG. 43, thereby to insure that if the encoder is not working properly, such a malfunction is detected and indicated by the lamps 1708 and 1709. The output signals on the lines 150 through 156 are supplied via the bus 51 to that portion of the diagnostic register in FIG. 5. The AND circuit 550 in FIG. 6 supplies a positive output signal at CQ2 time of the first half (CB1 time) of the access period S2. The positive output signal from the AND circuit 550 is supplied on the line 552 to the AND circuits 200 through 206 which in turn pass positive input signals through respective OR circuits 210 through 216 to set corresponding latches 100 through 106, thereby to store the data supplied from the keyboards. It is pointed out that the latches 100 through 106 in FIG. 5 are reset to the zero state at CQ1 time by positive pulse on the line 501. The transfer of data takes place to these latches at CQ2 time of a CB1 pulse. At CQ4 time the AND circuit 551 in FIG. 6 responds to a positive CB1 pulse on the line 506 and the positive insert/remove new character signal on the line 162 to supply a positive output signal on the line 553 to operate the VRC 42 thereby to check the parity of the information stored in the latches 100 through 106 in FIG. 5. This parity check is made to determine if a malfunction occurred in the data path between the keyboard and the master control as well as whether a malfunction occurred in the AND circuits 200 through 206, in the OR circuits 210 through 216, or in the latches 100 through 106 in FIG. 5.

The positive output signal on the line 552 from the AND circuit 550 in FIG. 6 gates the new data through the AND circuits 200 through 206 in FIG. 5, then through the OR circuits 210 through 216 to the latches 100 through 106, and the positive output signal from the AND circuit 550 resets the latches 240 through 246 in FIG. 9. Both of these operations take place simultaneously during CQ2 time. The content of the latches 100 through 106 in FIG. 5 is transferred through the AND circuits 230 through 236 in FIG. 9 to the latches 240 through 246 at CQ3 time of the first half of the access period S2. This transfer takes place under control of the AND circuit 590 which supplies a positive output signal on the line 591 to the AND circuits 230 through 236 in FIG. 9. The inputs to the AND circuit 590 are all positive at this time, and they include (1) the insert/remove new character signals on the line 162, (2) a positive pulse on the line 506 at CB1 time, and (3) a positive pulse at CQ3 time on the line 503.

At CQ5 time the positive pulse on the line 505 operates the VRC 48 in FIG. 10 to perform a parity check on the content of the latches 240 through 246 in FIG. 9. This parity check is made to determine whether a malfunction occurred in the transfer of this data from the latches 100 through 106 in FIG. 5 through the AND circuits 230 through 236 to the latches 240 through 246 in FIG. 9.

The foregoing sequence of events takes place during the CB1 period of the S2 access time. Next, the control functions which take place during CB1 time are discussed. It is recalled that the AND circuits 721 through 723 in FIG. 19 supply positive output signals on their respective lines 162, 157 and 158 as explained above. These control signals are supplied to respective latches 112, 108 and 107 in FIG. 7, thereby setting these respective latches. The remaining ones of the latches 107 through 117 in FIGS. 7 and 8 are in the reset condition at this time. The one output side of the latch 107 in FIG. 7 is a positive signal which is conveyed on the line 300 through the AND circuit 570 at CQ3 time to the complement input of the latch 571 in FIG. 10. The latch 571 is in the one state prior to the arrival of the positive signal from the AND circuit 570. Consequently, the positive signal from the AND circuit 570 causes the latch 571 to be complemented thereby changing this latch from the one state to the zero state. This latch supplies the proper parity signal to the VRC 49 via the respective output lines 572 and 573.

The latch 108 in FIG. 7 supplies a positive output signal from the one output side on the line 302 to the VRC 45 in FIG. 6. The latch 112 in FIG. 7 supplies a positive output signal from the one output side on the line 308 to the VRC 45 in FIG. 6 and to the AND circuits 332 and 352 in FIG. 11. The AND circuit 332 in FIG. 11 passes the positive signal on the input line 308 to the one input side of the latch 342 at CQ4 time of the CB1 pulse, thereby setting this latch. It is noted that the AND circuit 561 in FIG. 10 receives the CQ4 signal on the line 504 and the CB1 signal on the line 506. Consequently the AND circuit 561 supplies a positive output signal on the line 563 to the AND circuit 332 in FIG. 11.

The VRC 45 in FIG. 6 checks the parity of the content of the latches 107 through 117 at CQ4 time of the CB1 pulse. At this time the latches 107, 108, and 112 are set. Accordingly, the VRC 45 in FIG. 6 correctly determines that odd parity exists for the content of the latches 107 through 117 in FIGS. 7 and 8.

At CQ5 time of the CB1 pulse, a positive signal is supplied on the line 505 to the VRC 49 in FIG. 10, and this causes the VRC 49 to check the parity of the content of the latches 340 through 347. As pointed out above, the content of the latch 571 represents parity, and this latch is now in the zero state supplying a positive signal on the line 573 to the VRC 49. The latches 340 through 342 in FIG. 11 supply positive signals from their one output sides on respective lines 370, 372, and 374 to the VRC 49 in FIG. 10 and to the bus 47 in FIG. 11. The latches 343 through 347 in FIG. 12 continue in the zero state. Thus, the VRC 49 in FIG. 10 finds the latches 340 through 342 in the one state, and it certifies by a negative signal on the output line 574 at CQ5 time that odd parity exists.

Referring again to FIG. 20, the latch 760 is set at CQ5 time of the CB1 period of the access interval S2. This is done late in the CB1 portion of the S2 access time in order to prepare for the ensuing CB2 portion of the access time S2. This latch is set to the one state by a positive signal from the AND circuit 742 in FIG. 18. The inputs to this AND circuit are (1) the one output side of the new character latch 741 in FIG. 17, discussed hereinabove, and a CQ5 signal on the line 505.

Next, the events which take place during the CB2 portion of the access time S2 are considered. The levels on the output lines 157 and 162 change from a positive to a negative level at the commencement of the CB2 interval. This is readily seen by noting that the AND circuits 705 and 706 in FIG. 19 receive a CB1 signal as one of the inputs. Consequently, each of the AND circuit 705 and 706 supply a negative level through the associated OR circuits 751 and 752 to respective AND circuits 721 and 722 in FIG. 19. As a result the output levels from the AND circuits 721 and 722 on respective lines 162 and 157 are negative levels during the CB2 interval.

The AND circuit 710 in FIG. 20 is responsible during the CB1 interval for supplying a positive signal through the OR circuit 753 in FIG. 19 to the AND circuit 723. However, during the CB2 time interval this AND circuit supplies a negative output signal to the OR circuit 753. On the other hand, the AND circuit 709 in FIG. 20 now receives a positive signal from the one output side of the latch 760, as pointed out above, and a positive signal on the line 507 during the CB2 interval. The positive output signal from the AND circuit 709 is supplied through the OR circuit 753 to the AND circuit 723, and this AND circuit supplies a positive output signal on the satellite active line 158 during the CB2 time interval.

The AND circuit 789 in FIG. 20 is responsible during the CB1 interval for supplying a negative level to the inverter 790 which in turn supplied a positive level to the AND circuit 711. The positive level from the AND circuit 711 passed through the OR circuit 770 to the inverter 771 which changed the positive input level to a negative output level to the AND circuit 724. During the CB2 interval however, the input line 507 to the AND circuit 789 has a positive level, but the input line 656, termed dummy strobe, to the AND circuit 789 has a negative level. Consequently, during the CB2 interval the AND circuit 789 in this instance again supplies a negative output signal to the inverter circuit 790 which in turn supplies a positive signal to the AND circuit 711. The remaining inputs to the AND circuit 711 are positive, and hence the output of the AND circuit 711 is a positive signal level which is supplied through the OR circuit 770 to the inverter 771 which converts this positive input level to a negative output level to the AND circuit 724. Consequently, the AND circuit 724 supplies a negative output level during the CB2 period to the master control. Thus it is seen that a positive level is sustained on the satellite active line 158 from the AND circuit 723 in FIG. 19 throughout the CB1 and the CB2 interval of the access time S2, and simultaneously a negative level is sustained on the satellite inactive line 159 from the AND circuit 724 in FIG. 20 during the CB1 and CB2 intervals of the access time S2. It is pointed out that this mode of operation of the keyboard satellite control 24 is in response to a depressed key, and the operation differs from that previously explained when the keyboard satellite control was waiting for a key to be depressed.

During the CB2 time interval the output line 158 from the AND circuit 723 in FIG. 19 is the only one of the control lines from the keyboard satellite control which is positive. All other output signal levels on the control lines from the satellite control to the master control have negative signal levels. Consequently, the positive signal level on the output line 158 in FIG. 19 is effective to set the latch 108 in FIG. 7 to the one state. The remaining ones of the latches 107 through 117 are in the reset state. When the VRC 45 in FIG. 6 checks the parity of the content of the latches 107 through 117 in FIGS. 7 and 8 at CQ4 time of the CB2 time period, it promptly finds odd parity. When the VRC 49 in FIG. 10 checks the parity of the content of the latches 340 through 347 in FIGS. 11 and 12 at CQ5 time of the CB2 time period, it verifies that an odd parity exists since there has been no change during the CB2 time interval in the content of the latches 340 through 347. It is recalled that at the end of the CB1 interval the latches 340 through 342 were left in the one state, the remaining latches 571 in FIG. 10 and 343 through 347 in FIG. 12 were left in the reset state. Thus the VRC 49 correctly verifies odd parity.

Upon completing the foregoing access to the keyboard satellite control during the S2 pulse, the master control then accesses the printer satellite control with the next S3 pulse. During this S3 pulse the printer satellite control 25 accepts the data from the data register 43 of the master control 27, then translates it and forwards the translated data to the printer 21. The printer 21 responds to the translated data and prints out the appropriate character. This sequence of events which carries out these functions are discussed next, commencing first with the printer satellite control 25.

The positive signal on the line 374, labeled new character, from the master control 27 in FIG. 11 is applied to the AND circuit 803 in FIG. 22. This AND circuit provides a positive output signal, labeled clutch, via the cable 53 to the printer 21 in FIG. 44. A second input to the AND circuit 803 in FIG. 22 is a positive signal from the one output side of the select latch 810 on the line 828, and a third input is a positive level on the line 377, designated not control mode. With all inputs positive the AND circuit 803 in FIG. 22 presents a positive clutch on the line 854 to the one input of the latch 1801 in FIG. 44 and the AND circuit 1803. The one output side of latch 1801 supplies a positive signal along the line 1802 to the print mechanism which recognizes this signal as a command to print. Additionally, during the first half (CB1 time) of the S3 pulse provided by master control the printer satellite control translates the data provided by master control on line 260 through 273 in FIG. 10 into the required output code for the printer mechanism 1800 in FIG. 44. Translation is done by two individual translators 864 and 865 in FIG. 23 of the printer satellite control. The translator 864 provides a combination of positive output signals to the AND circuits 866 through 867 when the significant data is to set appropriate ones of the latches 868 through 869. Latches 868 through 869 are reset by a positive output from the AND circuit 807 in FIG. 23. The conditions which make the output of the AND circuit 807 positive are (1) a positive signal on the line 501 designated CQ1 from the bus 47, (2) a positive signal on the line 374 labeled new character, (3) a positive level on the line 506 during CB1 time, and (4) a positive S3 pulse on the line 512. The AND circuit 806 in FIG. 23 provides a positive output signal to condition AND circuits 866 through 867 and 871 in FIG. 25 to pass positive signals from the translators 864 and 865 to the latches 868 through 869 and 872. The AND circuit 806 in FIG. 23 is conditioned by positive input signals which are (1) a CQ2 pulse on the line 502, (2) a new character signal along the line 374, (3) a signal along the line 828 from the one output side of the latch 810 in FIG. 24, and (4) an S3 pulse on the line 512. All of these input signals are positive at CQ2 time of the first half of the S3 access pulse. The latches 868 and 869 in FIG. 25 therefore are reset by a positive output signal from AND circuit 807 at CQ1 time of the CB1 half of the S3 access pulse, and they are set by positive signals supplied from the translator 864 in FIG. 23 through the AND circuits 866 and 867 in FIG. 25 at CQ2 time during the first half of the access pulse S3. The latch 872 in FIG. 25, designated parity latch, is reset by a positive output from the AND circuit 808 in FIG. 23. Note that the inputs to the AND circuit 808 in FIG. 23 are identical to the inputs to the AND circuit 807 previously discussed. Latch 872 in FIG. 25 is set by a positive pulse to its one side from the AND circuit 871 in FIG. 25. The translator 865 in FIG. 23 performs an independent translation of the input data on the lines 260 through 272 from the input bus 47, and the translator 865 thereby generates an individual parity bit. If the number of binary ones from translator 864 are even, then the output of translator 865 must be a binary one to provide odd parity. However, if the number of binary ones from the translator 864 is odd, the output of translator 865 must be a binary zero to provide odd parity. A binary one is represented by a positive level, and a binary zero is represented by a negative level. The outputs of latches 868, 869 and 872 are checked by the VRC 870 in FIG. 25 to verify that the parity of the translated data is correct. Signals from the one output side of the latches 868 and 869 in FIG. 25 are sent on lines 875 and 876 via the cable 53 to the print mechanism 1800 in FIG. 44. The print mechanism 1800 then begins a mechanical print cycle, and the printed character is determined by the data on the lines 875 through 876. The positive output signal from the one side of the latch 1801 in FIG. 44 along the line 1802 actually indicates the printing operation. After the selected character is printed, the print mechanism 1800 supplies a positive signal on the line 1805 which resets the latch 1801, thereby deconditioning the AND circuit 1803 and partially conditioning the AND circuit 1806.

During the first half of the S3 access pulse, the master control receives a positive signal on the line 159, designated satellite inactive. This positive level is provided by the AND circuit 884 in FIG. 25. The output of the inverter 883 is a positive level since all of the inputs to the OR circuit 882 are at a negative level, thereby making the output of the OR circuit 882 negative. The AND circuit 881 in FIG. 25 is prohibited from providing a positive output level by the negative signal on the line 371 labeled not I/O ready. The AND circuits 837 and 838 are prohibited from providing a positive output by the negative signal on the input line 507 since the CB2 signal is in its negative phase. The output of the AND circuit 839 is a negative level since the input line 823, labeled output finished has a negative level provided by the AND circuit 1806 in FIG. 44. The AND circuit 1806 is at a negative output level since the line 373 labeled not character request, from the master control has a negative level. The AND circuit 884 in FIG. 25, therefore, provides a positive output level on the line 159, designated satellite inactive, via the bus 51 to master control in FIG. 7. The latch 109 in FIG. 7 is set by this positive level, and its one output side provides a positive output level on the line 304 to the VRC 45 in FIG. 6. The remaining ones of the latches 107 through 117 in FIGS. 7 and 8 of the master control are reset during the first half of the access pulse S3. Therefore, when the VRC is sampled at CQ4 time, it provides a negative output level on line 540 certifying odd parity.

The activities which take place during the second half (CB2 portion) of the access pulse S3 now are discussed. The AND circuit 803 in FIG. 22 of the printer satellite control 25 still is conditioned during the second half of the S3 access pulse, and it continues to provide a positive output level along the line 854 to the printer in FIG. 44. This signal sets the latch 1801, as earlier described, and additionally it conditions the AND circuit 1803. The one output side of latch 1801 is supplied along the line 1802 to the AND circuit 1803, thereby to provide a positive output signal on the line 822, designated character taken. The signal on the line 822 is provided along the bus 53 to the AND circuit 804 in FIG. 22 in the printer satellite control. During CB2 time a positive signal on the line 507 is supplied to the AND circuit 804. The AND circuit 804 in turn provides positive output signal on the line 860 to the OR circuits 841 through 843 in FIG. 24. The OR circuits 841 through 843 provide positive output signals to the AND circuits 851 through 853, respectively, which in turn, during the S3 pulse, provide positive output levels on the associated lines 157 (invert check), 161 (insert/remove character request), and 158 (satellite active). This assumes that a positive level is supplied from the VRC 870 in FIG. 25 to the AND circuit 852 in FIG. 24. If the latches 868, 869 and 872 in FIG. 25 provide the correct parity to the VRC 870, then the output line from the VRC 870, labeled not VRC error, has a positive level which indicates correct parity. If, however, the data translators 864 or 865 in FIG. 23 the AND circuits 866, 867, or 871, or the latches 868, 869 or 872 should fail to operate correctly, such malfunction detected by the VRC 870 results in a negative output level to the AND circuit 852 in FIG. 24 which in turn provides a negative output level along the satellite active line 158. This inconsistency, if it occurs, is detected by the master control as a parity error as described more fully hereinafter. The AND circuit 838 in FIG. 25 receives positive levels on all inputs. That is, a positive CB2 on the line 507, a positive level on the new character line 374, and a positive level on the not control mode line 377 are provided from the master control via the bus 47, and the line 828 is provided with a positive signal level from the one output side of the latch 810 in FIG. 24. The AND circuit 838 thus provides a positive output signal to the OR circuit 882 in FIG. 25 which in turn passes the signal to the inverter 883. Once provided with a positive input signal, the inverter 883 therefore provides a negative output signal to the AND circuit 884 in FIG. 25 which in turn establishes a positive signal on the output line 159 (satellite inactive) for the duration of the S3 signal.

It is seen therefore that positive outputs are provided from the AND circuit 851,852 and 853 via the lines 157, 158 and 161 to master control in FIGS. 7 and 8. The positive signals on the lines 157 and 158 are supplied to the one input side of respective latches 107 and 108; whereas the positive input signal on the line 161 (insert/remove character request) is provided to the one input side of the latch 111 in FIG. 7. The VRC 45 in FIG. 6 is sampled at CQ4 time, and it provides a negative output level on the line 540 to OR circuits 541 and 542 since there are an odd number of latches in the group of latches 107 through 117 which are set. The positive signal from the one output side of the latch 107 is supplied along the line 300 to the AND circuit 570 in FIG. 10. A positive pulse at CQ3 time on the line 503 causes and the AND 570 to provide a positive output pulse which complements the latch 571 in FIG. 10 whereby it changes from the zero state to the one state. The latch 111 provides a positive output level on the line 307 to the AND circuit 351 in FIG. 11. The other input line 564 to the AND 351 has a positive level when the inputs to AND circuit 562 in FIG. 10 have positive levels. The inputs to AND circuit 562 each have a positive level during CQ4 time of the CB2 pulse. The AND circuit 351 then provides a positive output pulse to the zero input side of the latch 341, thereby resetting this latch and making the line 373 (not character request) positive and the line 372 (character request) negative. The control register 46 in FIGS. 11 and 12 then contain a binary one in the latches 340, 342 in FIG. 11 and a binary one in the latch 571 in FIG. 10. All other latches in the control register in FIGS. 11 and 12 are reset, and they provide positive output levels from their zero output sides to the VRC 49 in FIG. 10. Since an odd number of latches (340, 342, and 571) are set, the VRC 49 in FIG. 10 supplies a negative level on its output line 574 certifying odd parity.

The master control now terminates the S3 pulse and provides the S4 pulse which accesses the Serdes satellite control 26. This is followed by an S1 pulse which accesses the multipoint logic satellite control 23. Both the Serdes satellite control 26 and the multipoint logic satellite control 23 still remain inactive, and they operate in the manner earlier discussed. Following the S1 pulse an S2 pulse is generated by the master control which then accesses the keyboard satellite control 24 in FIG. 2. During the first half of the S2 access pulse the keyboard satellite control remains inactive, and therefore it provides a positive signal on the line 159 (satellite inactive) from the AND circuit 724 in FIG. 20 via the cable 51 to the master control. This positive output pulse during the S2 access time is provided because the inverter 771 in FIG. 20 provides a positive output signal to the AND circuit 724. The positive output from the inverter 771 is provided since the AND circuit 711 in FIG. 20, the AND circuit 773 in FIG. 20, and the AND circuit 687 in FIG. 18 each supply a negative input level to the OR circuit 770. The AND circuit 711 is inhibited from providing a positive output pulse by the character request line 372 which is negative at this time. The AND circuit 773 requires that the select allow latch 793 in FIG. 20 have a positive output on its one side which is not the case. The AND circuit 687 in FIG. 18 is prohibited from providing a positive output signal level because the CB2 pulse on the line 507 is in its negative phase at this time. Accordingly, the satellite inactive line 159 is positive at this time, and this level is supplied along the bus 51 to the latch 109 in FIG. 7. None of the other latches 107 through 117 are set at this time; therefore, when the VRC 45 in FIG. 6 is sampled at CQ4 time, a negative output pulse is provided on line 540 to certify odd parity. None of the other latches 110 through 117, FIGS. 7 and 8, are set; therefore, the content of the control register latches 340 through 347 in FIGS. 11 and 12 remain in their prior state. Hence the VRC 49 certifies odd parity at CQ5 time by a negative signal on the line 574.

It is the responsibility of the keyboard satellite control to remove the new character indication from the latch 342 in FIG. 11. This is done during the second half (CB2 portion) of the scan pulse S2, and this is discussed next.

It is pointed out that during the prior S2 pulse, the latches 741 in FIG. 17 and 760 in FIG. 20 were set. Latch 741 was reset at the termination of the prior S2 pulse by a positive level supplied to its zero input on the line 511 designated not S2. Therefore, at the start of the present S2 pulse only the latch 760 in FIG. 20 is set. During the second half of the scan pulse S2 the latch 760 in FIG. 20 provides a positive output signal through the AND circuit 709 during CB2 time to the OR circuit 753 in FIG. 19 which in turn provides a positive output signal to AND circuit 723 in FIG. 19. It is pointed out that the AND circuit 709 is activated by positive inputs from the one output side of the latch 760 and a positive pulse on the line 507 at CB2 time. It is assumed that the data in the data register 48 did not provide positive coincident inputs to the AND circuit 685 in FIG. 17 for this discussion. Coincidental inputs to this AND circuit are discussed hereinafter. It is assumed that the AND circuit 685 therefore provides a negative output level to the inverter 743 in FIG. 17 which in turn provides a positive output level to the AND circuit 708 in FIG. 20. The latch 741 in FIG. 17 (new character) provides a positive output from its zero output side to the AND circuit 708. Latch 760 in FIG. 20 provides a positive output from its one output side to the AND circuit 708, and the CB2 pulse on line 507 to the AND circuit 708 is positive at this time. Therefore, the AND circuit 708 provides a positive output signal to the OR circuit 752 in FIG. 19 which in turn provides a positive output signal to the AND circuit 722 in FIG. 19. The AND circuit 707 in FIG. 19 receives positive input signal from the zero output side of the latch 741 in FIG. 17, the one output side of the latch 760 in FIG. 20, and from the master control on the line 507 at CB2 time. Thus the AND circuit provides a positive output signal to the OR circuit 751 in FIG. 19 which in turn provides a positive output signal to the AnD circuit 721 in FIG. 19. The AND circuit 687 in FIG. 18 has positive signals on input lines as follows: (1) select on the line 733 from the one output side of the latch 732 in FIG. 19, (2) not control mode on the line 377 from the master control via the bus 47, (3) new character on the line 374 from the master control via the bus 47, and (4) CB2 on the line 517 from master control. Therefore, a positive output signal is supplied from the AND circuit 687 in FIG. 18 to the OR circuit 770 in FIG. 20. The OR circuit 770 provides a positive output signal to the inverter 771 which in turn provides a negative output signal to the AND circuit 724 in FIG. 20. The OR circuits 751 through 753 provide positive output signals to the AND circuits 721 through 723 in FIG. 19 which in turn provide positive output signals during the S2 pulse on the associated lines 157 (invert check), 158 (satellite active), and 162 (insert/remove new character) via the bus 51 to the master control. The positive signal on the line 157 sets the latch 107 in FIG. 7 of the master control. The positive signal on the line 157 sets the latch 108 in FIG. 7, and the positive signal on the line 162 sets the latch 112 in FIG. 7. The latch 107 provides a positive output signal from its one output side on the line 300 to the AND circuit 570 in FIG. 10 which in turn provides a positive output signal at CQ3 time which complement the latch 571 in FIG. 10 from the one state to the zero state. The latch 112 supplies a positive output signal on the line 308 to the AND circuit 352 in FIG. 11 which in turn passes a positive output signal to the zero input side of the latch 342 in FIG. 11 when a positive pulse appears on the line 564 at CQ5 time of a CB2 pulse. The positive pulse on line 564 is provided by the AND circuit 562 in FIG. 10 in response to a CB2 pulse along the line 507 and a CQ4 pulse along the line 504. Hence the latch 342 is reset at CQ4 time. The VRC 45 in FIG. 6 determines at CQ4 time that the latches 107 through 117 in FIGS. 7 and 8 of master control have an odd number which are set, thereby providing a negative output level on the line 540. The VRC 49 in FIG. 10 determines that the latches 340 through 347 in FIGS. 11 and 12 in conjunction with the latch 571 in FIG. 10 have an odd state which are set (i.e. the latch 340 only), and the VRC provides a negative output signal on the line 574. The AND circuit 761 in FIG. 18 of the keyboard satellite control 24 provides a positive output signal to the zero input side of the latch 760 in FIG. 20 thereby resetting this latch. The positive input signals to the AND circuit 761 include the zero output side of the latch 741 in FIG. 17, a CB2 pulse along the line 507 from the master control, a CQ5 pulse along the line 505 from the master control, and an S2 pulse on the line 510. The coincidence of these signals occur during the time period 20 as shown in FIG. 3.

Upon the termination of the S2 pulse the master control provides an S3 pulse which accesses the printer control satellite 25 in FIG. 2. Until such time as the print mechanism 1800 of FIG. 44 in the printer logic completes its printing cycle the printer satellite control 26 in FIG. 2 provides a positive output signal only on the line 159 (satellite inactive). The AND circuit 884 provides a positive output level whenever the inverter 883 provides a positive output level in response to a negative input level from the OR circuit 882. The OR circuit 882 provides a negative output level because each of the AND circuits 881, 837, 838, and 839, in FIG. 25 provide negative output levels. The AND circuit 881 in FIG. 25 has a negative input level on the line 371 (not I/O ready) whereas; the AND circuits 837 and 838 are provided with a negative input level on the line 374 (new character). The AND circuit 839 has as a negative input level on the line 823 (output finished) from the AND circuit 1806 in FIG. 44. Accordingly, the AND circuit 884 in FIG. 25 provides a positive output level on the line 159 via the bus 51 to the one input side of the latch 109 in FIG. 7. The VRC 45 in FIG. 6 checks the parity of the latches 107 through 117 in FIGS. 7 and 8 and certifies odd parity in the manner previously described.

For each sequential S4 pulse, S1 pulse, S2 pulse and S3 pulse each of the respective satellites, Serdes satellite control 26 of FIG. 2, multipoint logic satellite control 23, keyboard satellite control 24, and printer satellite control 25, provides the satellite inactive signal during their respective S pulses. After some given time period, determined by the print mechanism 1800 in FIG. 44, the print cycles is completed and a positive signal level is established on the line 1805 which resets the latch 1801 in FIG. 44. A positive level from the zero output side of the latch 1801 is supplied to the AND circuit 1806. The input line 373 (not character request) has a positive level. Therefore, the AND circuit 1806 provides a positive output level on the line 823 (designated output finished) via the cable 53 to the printer control satellite 25. This positive output signal is supplied to the AND circuit 805 in FIG. 22. The AND circuit 805 receives positive input signal on the lines 377 (not control mode), 506 (CB1 pulse), 828 (selected), 375 (not new character), and a positive level from the inverter 857 in FIG. 24. Thus the AND circuit 805 supplies a positive output signal to the OR circuits 841 through 843 in FIG. 24 which in turn supply positive output signals to associated AND circuits 851 through 853. The lines (invert check) 157, (satellite active) 158, and (insert/remove character request) 161 supply positive signals to the master control along the bus 51 during the first portion (CB1 time) of a positive S2 pulse on the line 512 after the print mechanism 1800 in FIG. 44 has completed its cycle. The operation of the printer satellite control during the remainder of this S3 access period continues in the manner previously described. Briefly summarized, the latches 107, 108, and 111 in FIG. 7 are set. Also, the latch 571 in FIG. 10 and the latch 341 in FIG. 11 are set. The latch 571 is complemented to the set condition. Parity checks by the VRC 45 in FIG. 6 and the VRC 49 in FIG. 10 certify correct parity.

The latches 340 and 341 of the control register 46 in FIG. 11 provide positive signals on respective lines 370 (I/O ready) and 372 (character request) via the bus 47 to the satellite controls. The events which take place are identical to those described above before the depression of a key 1701 on keyboard in FIG. 43. Upon depression of a key 1701 in FIG. 43 the system performs in the same manner to print out the next character depressed at the keyboard. As successive characters are typed at the keyboard they are printed out by the printer until a complete message is sent. Then an end of message symbol (code C) is sent by depressing a special control key on the keyboard. A different type of action then takes place, and this is described next.

The special key sends the code 1111001 as shown in table 1 above, and it enters the data register latches 240 through 246 in FIG. 5 the same as data from any other depressed key 1701 in FIG. 44. When a positive level on the line 162 (insert/remove new character) occurs during CB2 time of an S2 pulse, as earlier described, the AND circuit 683 in FIG. 17 provides a positive output to the AND circuit 735 in FIG. 17 and the AND circuit 704 in FIG. 19 during CB2 time. The AND circuit 735 in FIG. 17 receives a CQ1 pulse on the line 501 which allows the AND circuit 735 to provide a positive output signal during the time period 16 shown in FIG. 3. At this time the AND circuit 735 will provide a positive output signal to the zero input side of the select latch 732 in FIG. 19 thereby rendering the zero output side of the latch 732 positive. The AND circuit 704 in FIG. 19 receives (1) the positive input signal from the zero output side of the select latch 732, (2) a positive input signal from the AND circuit of 683, and (3) a positive level on the line 370 designated IO ready. Thus the AND circuit 704 supplies a positive output signal (remove-ready) to the OR circuit 750 in FIG. 19. The AND circuit 707 in FIG. 19 provides a positive output signal (remove new character) to the OR circuit 751 in FIG. 19. The AND circuit 685 in FIG. 17 receives data signals from the master control along the lines 260, 262, 264, 266, 269, 271, and 272, all of which have positive signal levels at this time representing the end of message symbol i.e. code C. The AND circuit 685 also receives a positive signal on the line 374 (new character). Therefore, the AND circuit 685 provides a positive output signal to the inverter 743 which in turn provides a negative input signal to the AND circuit 708 in FIG. 20. The AND circuit 708, therefore, provides a negative output signal (remove new character invert check) to the OR circuit 752. The OR circuit 752 supplies a negative output signal to the AND circuit 722 in FIG. 19 because all of its inputs are negative. The AND circuit 687 in FIG. 18, as previously explained, provides a positive output signal during this second half (CB2 portion) of the S2 pulse through the OR circuit 770 in FIG. 20 to the inverter 771. The inverter 771 therefore provide a negative output level to the AND circuit 724 in FIG. 20 which inhibits the generation of a positive output signal on the line 159 (satellite inactive). The AND circuit 709 in FIG. 20, as earlier described, provides a positive output signal to the OR circuit 753 which in return presents a positive output signal to the AND circuit 723 in FIG. 19.

During the last half (CB2 portion) of the S2 scan pulse for the keyboard satellite control, the AND circuits 720, 721 and 723 provide positive output signal along the lines 160 (insert/remove IO ready), 162 (insert/remove new character), and 158 (satellite active) via the bus 51 to the master control. The positive signals on the lines 158, 160 and 162 set the latches 108, 110, and 112 in FIG. 7. The VRC 45 in FIG. 6 checks parity of the latches 107 through 117 in FIGS. 7 and 8 at CQ4 time, and a negative output signal along the line 540 certified correct odd parity. The latch 110 in FIG. 7 provides a positive output signal on the line 306 to the AND circuit 350 in FIG. 11. The latch 112 in FIG. 7 provides a positive output signal along the line 308 to the AND circuit 352 in FIG. 11. At reset time a positive level from the AND circuit 562 in FIG. 10 is generated by a CB2 pulse on the line 507 and a CQ4 pulse on the line 504. The AND circuit 350 in FIG. 11 then passes a positive pulse to the zero input side of the latch 340, and the AND circuit 352 in FIG. 11 then passes positive signal to the zero input side of the latch 342. Only the latch 341 in the control register 46 remains set at this time. The VRC 49 in FIG. 10 checks the parity of the latches 340 through 347 in FIG. 11 and 12 in conjunction with the latch 571 in FIG. 10. Correct odd parity is certified by a negative level on the output line 574.

Any sequential home mode operation follows the pattern described from the insertion of the IO ready bit into latch 340 of FIG. 11 of the master control to the removal of the IO ready bit by the keyboard satellite control block 25. The cyclic pattern continues unless one of the components mentioned in the foregoing discussion fails to perform its function. Then an error signal is returned by the master control to the satellite in error. These error conditions are described later, and they demonstrate the diagnostic capability of this system.

Next the operation of the clock-scanner 50 in FIG. 2 is discussed, and for this purpose reference is made to FIGS. 14 and 15 for details of the clock-scanner and to FIG. 3 for the timing relationships. The oscillator 450 in FIG. 14 has a symmetrical output as illustrated by the oscillator wave train in FIG. 3. A positive output signal is provided from the On side of the Oscillator 450, and simultaneously a negative output is provided from the Off side along the line 520. At some predefined time the output signals from the oscillator become negative from the On side and positive from the Off side, and again some predetermined period later the polarity of the output signals return to the original state. This is shown in the timing chart of FIG. 3 as the oscillator train. The oscillator 450 in FIG. 14 preferably includes an internal network, not shown, which determines whether the output signal On and/or Off are changing at a predetermined frequency. Then, if the output signals On and/or Off are not changing state at the proper rate a positive output is provided along the line 526 (oscillator bad) to the OR circuits 522 and 523 in FIG. 15 which in turn pass the positive signal to the one input side of the latches 524 and 525. The one output side of the latch 524 provides a positive level to energize the indicator 400, and the latch 525 provide a positive level on its one output side to energize the lamp 401. This signifies an oscillator timing error so that corrective action may be taken. For the ensuing discussion let it be assumed that the oscillator wave train is symmetrical and properly timed.

Let it be assumed that time period 1 in FIG. 3 is reached. Hence the triggers 451 in FIG. 14 (labeled CQ1), 456 (labeled CB1), and 458 (labeled S1) provide positive output signals from their On sides. The remaining triggers 452 through 455, 457, and 459 through 461 provide positive output signals from their Off side. The VRC 462 in FIG. 15 performs a parity check on the output lines of the triggers 451 through 461 in FIGS. 14 and 15 at VRC gate time in response to a positive signal on the line 520 from the Off side of the oscillator 450 in FIG. 14. The VRC correctly determines that the parity is odd, and therefore it provides a negative output level along the 521 line to the OR circuits 522 and 523 in FIG. 15. As the oscillator 450 in FIG. 14 initiates the transition from a negative level to a positive level from its On side, the On state of the trigger 451 is shifted to the trigger 452. This is accomplished by providing the positive output signal from the On side of the trigger 451 to the set input side of the trigger 452 in coincidence with the positive signal from the On side of the oscillator 450 which is applied as a double input to the trigger 452 (labeled CQ2). The trigger 452 is thereby turned on. At the same time the Off output of the trigger 455 in FIG. 15 provides a positive level to the reset input of the trigger 451 in FIG. 14 coincident with the positive signal from the On side of the oscillator 450 which is applied as a double input. This turns off trigger 451, therefore providing a positive signal from the Off side of trigger 451. The result of the transition by the oscillator 450 in FIG. 14 is shown as time period 2 in FIG. 3; the trigger 452 provides a positive level from its On side; and the trigger 456 in FIG. 14 and the trigger 458 in FIG. 14 likewise provide positive output signals from their On sides. Again the VRC 462 in FIG. 15 checks the parity of the triggers 451 through 461 during the period when the oscillator 450 provides a positive output from its Off side and a negative output from its On side, and odd parity is certified by a negative output signal on the line 521. At the beginning of time period 3, as shown in FIG. 3, the oscillator 450 again undergoes a transition from a negative signal level to a positive signal level from its On side, and the content of the trigger 452 is shifted to the trigger 453 in FIG. 14. The On side of the trigger 452 provides a positive signal level to the set input of the trigger 453 in coincidence with the positive signal level from the On side of the oscillator 450. This turns on the trigger 453. Likewise, the trigger 451 in FIG. 14 provides a positive level from its Off side to the reset input of the trigger 452 in coincidence with the positive pulse from the On side of the oscillator 450 which is applied as a double input to the trigger 452 thereby turning off the trigger 452. It then provides a negative output from its On side and a positive output from its Off side. Again, the VRC 462 in FIG. 15 provides a negative output along line 521 to the OR circuits 522 and 523 in FIG. 14 when the parity is checked. At the beginning of time period 4 depicted in FIG. 3, the trigger 452 labeled CQ2 in FIG. 14 then provides a positive level from its Off side to the reset side of the trigger 453 labeled CQ3, and the trigger 453 then provides a positive signal level from its On side to the set input of the trigger 454. As the negative to positive transition appears from the On output side of the oscillator 450 in FIG. 14 the CQ3 trigger 453 is turned to the Off state as the CQ4 trigger 454 in FIG. 14 is turned to the On state. At a subsequent time the oscillator 450 provides a positive output from its Off side along the line 520 to the VRC 462 in FIG. 15. The VRC 462 provides a negative level on the output line 521 to the Or circuits 522 and 523 to certify odd parity. The time period 5 in FIG. 3 begins with the trigger 453 in FIG. 14 providing a positive level from its Off side to the reset input of the trigger 454 in FIG. 14. The trigger 454 at this time provides a positive output from its On side into the set input of the CQ5 trigger 455 in FIG. 15. The positive signal from the On side of the oscillator 450 in FIG. 14 is supplied as a double input to the triggers 454 and 455. Consequently, the trigger 454 in FIG. 14 is turned to the Off state and the trigger 455 is turned to the On state. The subsequent positive level provided from the off side of the oscillator 450 along the line 520 causes the VRC 462 in FIG. 15 to check the parity of the triggers 451 through 461. Odd parity is indicated by a negative level along the line 521 into the Or circuits 522 and 523.

Trigger 454 in FIG. 14 labeled CQ4 is providing a positive level from its Off side to the reset input of the trigger 455 in FIG. 15, and the trigger 455 provides a positive level along the line 505 from its one output side of the set input of the trigger 451 in FIG. 14 at the beginning of time period 6 in FIG. 3. At this time a positive signal from the On output side of the oscillator 450 turns Off the trigger 455 in FIG. 15 and turns on the trigger 451 in FIG. 14. The CB1 trigger 456 in FIG. 14 provides a positive level from its On side to the set input side of the CB2 trigger 457 at the beginning of time period 6 in FIG. 3, and the trigger 457 then provides a positive level from its Off side to the reset input of a trigger CB1,456. At the beginning of time period 6 in FIG. 3 the trigger 451 in FIG. 14 changes to the On state and supplies a positive signal from its On output side which turns the trigger 457 in FIG. 14 to the On state and the trigger 456 in FIG. 14 to the Off state. The trigger 456 then provides a positive output from its Off side, and the trigger 457 then provides a positive level from its On side along the line 507. When the oscillator 450 in FIG. 14 provides a positive level from its Off side along the line 520 to the VRC 462 in FIG. 15, a parity check is made, and odd parity is indicated by a negative output signal on the line 521.

The operation of the triggers 451 through 455 in FIGS. 14 and 15 is the same for time periods 6 through 10 in FIG. 3 as they are for the time periods 1 through 5 in FIG. 3. When time period 11 commences, the trigger 456 provides a positive level from its Off output to the reset input of the trigger 457 in FIG. 14, and the trigger 457 is providing a positive level from its On output to the set input of the trigger 456. The positive signal from the On side of the oscillator 450 in FIG. 14 sets the trigger 451 to the On state, and it provides a positive signal from its On side which turns On the trigger 456 and turns Off the trigger 457. Trigger 456 in FIG. 14 then provides a positive signal from its On side as a double input to the S1 trigger 458 in FIG. 14, thereby turning the trigger 458 to the Off state and turning the S2 trigger 459 to the On state. This is accomplished since the On output of the trigger 458 provides a positive level to the set input side of the trigger 459, and the trigger 461 in FIG. 14 provides a positive output signal from its Off side to the reset input of S1 trigger 458 in FIG. 14.

The operation of the triggers 451 through 457 in FIGS. 14 and 15 is the same for the time periods 11 through 20 as it is the time periods 1 through 10. When time period 21 commences, the trigger 456 in FIG. 14 provides a positive output signal from its On side as it does during the time period 11. This positive signal turns On the trigger 460 in FIG. 15 and turns Off the trigger 458 in FIG. 14 because at this time the trigger 459 provides a positive output signal from its On side and the trigger 458 provides a positive output signal from its Off side which allows these changes to occur. In the time periods 21 through 30 in FIG. 3 the triggers 451 through 457 repeat the same sequence of events they perform for the time periods 1 through 10. The events at the commencement of the time period 31 are as follows: the trigger 456 in FIG. 14 undergoes a change in state and provides a positive signal from its On output side which turns On the trigger 461 in FIG. 15 and turns Off the trigger 460 in FIG. 15. The trigger 459 in FIG. 14 provides a positive output from its Off side to the reset input of the trigger 460 in FIG. 15. The trigger 460 in FIG. 15 provides a positive output on its On output side to the set input side of the trigger 461 in FIG. 15. During time period 31 in FIG. 3 the oscillator 450 in FIG. 14 provides a positive output from its Off side along the line 520 to the VRC 462 in FIG. 15. The VRC 462 checks parity, and it provides a negative output signal along the line 521 to the Or circuits 522 and 523 which certifies odd parity. The operation of triggers 451 through 457 in FIG. 14 and FIG. 15 is the same for the time periods 31 through 40 as it is for the time periods 1 through 10.

The clock-scanner is cyclic in its operation. At the end of the time period 40 the triggers 451 through 461 repeat the foregoing sequence of operations, and the clock-scanner continues in this manner repetitiously. Therefore, the time period 41 is virtually time period 1 in FIG. 3. At the end of the time period 40 the trigger 461 in FIG. 15 provides a positive level from its On output side to the set input side of the trigger 458 in FIG. 14. The Trigger 460 in FIG. 15 then provides a positive level from its Off output side to the reset input side of the trigger 461. As the time period 1 begins the trigger 456 in FIG. 14 changes state and provides a positive signal from its On output side which thereby turns Off the trigger 461 in FIG. 15 and turns On the trigger 458 in FIG. 14. The preceding operations, as described from time period 1 through 40 in FIG. 3, continue repetitively until such time as power is removed from the clock scanner.

The foregoing discussion shows the interaction and relationship of the triggers 451 through 461 in FIGS. 14 and 15. Next the relationships of the triggers 451 through 461 are discussed with respect to the timing chart in FIG. 3. The CQ1 trigger 451 in FIG. 14 provides a positive output from its On side along the line 501 designated CQ1 to all the satellite controls i.e. the multipoint logic satellite control 23 in FIG. 2, the keyboard satellite control 24, the printer satellite control 25, and the serdes satellite control 26 via the bus 47. This output signal is positive during time periods 1, 6, 11, 16, 21, 26, 31, and 36. The CQ2 trigger 452 in FIG. 14 provides a positive output signal along the line 502 via the bus 47 during the time periods 2, 7, 12, 17, 22, 27, 32, and 37. The CQ3 trigger 453 in FIG. 14 provides a positive output signal along the line 503 via the bus 47 during time periods 3, 8, 13, 18, 23, 28, 33, and 38. The CQ4 trigger 454 in FIG. 14 provides a positive output along the line 504 via the bus 47 during the time periods 4, 9, 14, 19, 24, 29, 34, and 39. The CQ5 trigger 455 in FIG. 15 provides a positive output signal along the line 505 via the bus 47 during the time periods 5, 10, 15, 20, 25, 30, 35, and 40. The CB1 trigger 456 in FIG. 14 provides a positive output signal along the line 506 from its On output side during the time periods 1—5, 11—15, 21—25, and 31—35. The CB2 trigger 457 in FIG. 14 provides a positive output signal from its On side along the line 507 via the bus 47 during the time period 6—10, 16—20, 26—30, and 36—40. The S1 trigger 456 in FIG. 14 provides a positive signal level from its On output side along the line 508 via the bus 47 during the time periods 1—10. A positive level is provided from the Off side of the trigger 458 along the line 509 designated not S1 during the time periods 11—40. The S2 trigger 459 in FIG. 14 provides a positive signal level from its On output side on the line 510 via the bus 47 during the time periods 11—20 and a positive signal is provided from its Off output side along the line 511 during the time periods 1—10 and 21—40. The S3 trigger 460 in FIG. 15 provides a positive signal level from its On output side along the line 512 during the time period 21 through 30, and a positive signal level from its Off output side is provided along the line 513 via the bus 47 during the time periods 1-—20 and 31—40. The S4 trigger in FIG. 15 provides a positive signal level from its On output side on the line 514 via the bus 47 during the time period 31—40, and a positive signal is provided from its Off output side along the line 515 via the bus 47 during the time periods 1—30.

Next the operation of the system of FIG. 2 is discussed when it is not in the home mode. In this case the job switch 388 in FIG. 12 is placed in the not home mode (line) position. The line 387 is energized with a positive signal level. The system is then considered to be in the line mode of operation. The main components for the line mode of operation are the serdes 22 in FIG. 2, the serdes satellite control 26, the multipoint satellite control 23 and the master control 27. The control register 46 at the beginning of the line mode of operation provides no positive output signals from the one output sides of the latches 340 through 347 in FIGS. 11 and 12. Positive levels are provided, however, from the zero output sides of the latches 340 through 347.

Preliminary discussion evolves around the serdes 22 in FIG. 2, and its capability (1) to convert a parallel data character to a serial data character and (2) to convert a serial data character to a parallel data character. When receiving data, the serdes 22 must deserialize an incoming character, and the deserialization operation is first discussed.

It is assumed from a power on state that the triggers 1219-—1228 in FIGS. 32 and 34 provide positive levels from their zero output sides. The parity check trigger 1285 in FIG. 33 provides a positive level from its one output side. The interaction between the serdes 22 in FIG. 2 and the serdes satellite control 26 in FIG. 2 is described also in the ensuing discussion. Data is received from the transmission medium 13 in FIG. 2 via the line 30, and this line is labeled received data in FIG. 32. The received data is a mark condition when any significant bit (binary one) is to be recognized and a not mark condition or space when the data is not a significant bit (binary zero). The data received from the transmission medium is a stop/start type of transmission. That is, the first significant bit is a space called start, and the last significant bit is a mark called stop. The beginning transition from the stop to the start bit is recognized as the beginning of a serial character. The data character in serial form begins with a space or start bit followed by a 1 bit, then a 2 bit, then a 4 bit, then an 8 bit, then an A bit, a B bit, and a C or check bit followed by a mark or stop bit. When a received data mark is not present on the line 30 in FIG. 2, this line has a negative level, and this level is supplied to the inverter 1280 in FIG. 33 which provides an inverted positive output termed received data space. This positive signal is supplied on the line 1050 via the bus 54 to the one input sides of the triggers 970 and 972 in FIG. 28. A positive signal from the one output side of the trigger 970 passed the OR circuit 963 which in turn provides a positive output signal to the oscillator 971. The oscillator at that time provides a positive signal level along the line 1074 (not oscillator shift) for a period of time equal to one-half the fixed width of each of the significant bits. At the end of the one-half bit width time a positive pulse is provided from the oscillator 971 along the line 1073 (oscillator shift) via the bus 54 to FIG. 32. The positive going signal on the line 1073 is applied to the binary advance or shift input of the triggers 1219 through 1228 and the trigger 1285. Information in the triggers 1219 through 1228 is shifted one state to the right.

The negative input signal level on the line 30 in FIG. 32 is applied also to the OR circuit 1310 which in turn provides a negative output signal to the inverter 1311. The inverter 1311 provides output signal to the one input side of the trigger 1219, and the positive pulse on the line 1073 (oscillator shift) thereby causes the serdes stop trigger 1219 to be turned on. The triggers 1220 through 1228 remain in the Off state in this case since each has a positive signal level from their zero output sides. AND circuit 1281 in FIG. 33 receives an input from the inverter which is positive since receive data mark on the line 30 is a negative signal level. The other input to the AND circuit 1281 is a positive signal level from the zero output side of the transmit latch 961 in FIG. 28. The transmit latch 961 earlier was reset by a positive output from the AND circuit 944 whose positive inputs are (1) not transmit along the line 381 from master control and (2) empty from the inverter 942. The inverter 942 receives a negative level from the OR circuit 941 in FIG. 27 since none of the input lines 1051 through 1059 were at a positive level before the positive pulse (oscillator shift) was established on the line 1073. The AND circuit 1281 in FIG. 33 therefore provides a positive output signal to the OR circuit 1282 which in turn provides a positive output signal to the AND circuits 1283 and 1284. The parity trigger 1285 provides a positive level from its one output side to the AND circuit 1284 which in turn provides a positive signal level to zero input side of the parity check trigger 1285. The positive pulse on the line 1073 is effective to reset the parity check trigger 1285. The trigger 1285 thereby provides a positive level from its zero output side to the OR circuit 1287. The OR circuit 1287 therefore provides a positive output signal to the vertical redundancy check (VRC) 1260 in FIG. 35 which has as additional inputs both the one and zero outputs of the triggers 1219 through 1228. The inputs from the one output sides of the triggers 1219 through 1228 and the input from the OR circuit 1287 provide the VRC 1260 with odd parity. The VRC 1260 therefore provides a negative output signal to the AND circuits 1289 and 1290 in FIG. 35 and the AND circuits 1330 and 1331 in FIG. 34.

Let it be assumed that the first character received from a remote station has significant binary one bits in the 1, 2, 4, 8, and check bit positions. The start bit is binary zero, and the stop bit in binary one. The incoming character is shifted serially into the serdes 22 on successive oscillator shift pulses during the times where a positive pulse is presented on the line 1073 to the triggers 1219 through 1228, and the parity check trigger 1285 is operated simultaneously to indicate the proper parity for the triggers 1219 through 1228. The first input bit is a start bit. This is a negative level, and the events which take place are identical to those discussed above. The second input bit is a binary one which is represented by a positive input level. As the positive oscillator shift pulse on the line 1073 in FIG. 32 terminates at the end of the start bit time, the input level changes from a negative to a positive level on the line 30 in FIG. 32. The transition of input signal levels on the line 30 from a positive to a negative level or a negative to a positive level takes place within 30 percent of the bit width period defined by oscillator shift pulse. Received data mark line 30 in FIG. 32 is at a positive level for the second bit which represents a binary one, and it is supplied to the OR 1310 in FIG. 32. The output of the OR circuit 1310 is at a positive level which is supplied to the zero side of the trigger 1219 and to the inverter 1311. The inverter 1311 provides a negative output to the one input side of the trigger 1219. When the positive oscillator shift pulse occurs on the line 1073, the binary one stored in the serdes stop trigger 1219 is shifted right to the check trigger 1220 simultaneously as the serdes stop trigger 1219 is reset to the binary zero state. The state of the trigger 1285 is adjusted for the correct parity indication at this time, and its operation is considered next. The positive signal level on the input line 30 is supplied to the inverter 1280 in FIG. 33 which in turn provides a negative output signal to the AND circuit 1281 which consequently provides a negative output level to the OR circuit 1282. The OR circuit 1282 provides a negative output level to the AND circuits 1283 and 1284, and each provides a negative output level to both inputs of the parity check trigger. This inhibits any change in the state of the trigger 1285, and it continues in the zero state. The output of the triggers 1219 through 1228 in FIGS. 32 and 34 are supplied to the vertical redundancy check circuit (VRC) 1260 along with the output signal levels from the AND circuit 1286 and the OR circuit 1287. The VRC 1260 certifies odd parity and provides a negative output level on the output lines 1269 to the AND circuits 1289 and 1290 in FIG. 35 and the AND circuits 1330 and 1331 in FIG. 34.

The next serial data input bit is a binary one represented by a mark level. Therefore, the received data mark signal on the line 30 remains at a positive level. The received data mark line 30 in FIG. 32 therefore provides a positive level to the OR circuit 1310 in FIG. 32 which in turn provides a positive output level to the zero input side of the serdes stop trigger 1219 and the input to the inverter 1311. The inverter 1311 provides a negative output level to the one input side of the serdes stop trigger. The positive pulse on the oscillator shift line 1073 causes the serdes stop trigger 1219 to remain in the zero state, causes the check trigger 1220 to be reset, and causes the B trigger 1221 to be set to the binary one state. Trigger 1220 is reset since its zero input signal is a positive level, and the B trigger 1221 is set since its binary one input signal is a positive level when the positive shift pulse occurs. The parity check trigger 1285 remains in the zero state since the AND circuits 1283 and 1284 provide negative levels to both inputs of the trigger 1285. The VRC 1260 checks parity and certifies odd parity by providing a negative level along its output line 1269.

The next input bit is a binary one which is represented by a positive level on the line 30, and this positive level is supplied to the OR circuit 1310 in FIG. 32 and the inverter 1280 in FIG. 33. Again, the OR circuit 1310 provides a positive output to the zero input side of the trigger 1219, and the inverter 1311 provides a negative output to the one input side of the serdes stop trigger 1219. When the positive oscillator shift pulse occurs, the serdes stop trigger 1219 remains in the zero state, the check trigger 1220 remains in the zero state, the B trigger 1221 resets to the zero state, and the A trigger 1222 changes to the one state. These events take place since the triggers 1219, and 1221 receive positive levels on their zero input sides, and the A trigger 1222 receives a positive level on its one input side. The parity trigger continues in the zero state for reasons given above. The VRC 1260 again certifies odd parity.

The next received bit in a binary one, and positive level continues on the line 30. The OR circuit 1310 therefore provides a positive output level to the zero input side of the stop trigger 1219 and to the inverter 1311 in FIG. 32 which in turn provides a negative output level to the one input side of the trigger 1219. When the positive oscillator shift pulse arrives on the line 1073, the triggers 1219 through 1221 continues in the zero state, and the trigger 1222 is reset to the zero state and the trigger 1223 is set to the one state. The parity trigger 1285 again remains in the zero state and provides a positive output signal from the zero output side through the AND circuit 1287 in FIG. 33 to the VRC 1260. The output signal on the line 1269 is a negative level certifying odd parity since the input levels from the triggers 1219 through 1228 and 1285 represent that an odd number of these triggers which are set to the one state.

The next incoming bit is a binary zero, and it is represented by a negative level on the line 30. This negative level on the line 30 is supplied to the OR circuit 1310 which in turn provides a negative output level to the zero input side of the trigger 1219 and to the inverter 1311. The inverter 1311 thus provide a positive output level to the one input side of the trigger 1219 in FIG. 32. The negative level on the input line 30 is supplied also to the inverter 1280 in FIG. 33 which provides a positive output signal to the AND circuit 1281 in FIG. 32. The AND circuit 1281 supplies a positive output signal through the OR circuit 1282 to the AND circuits 1283 and 1284. The zero output side of the trigger 1285 in FIG. 33 provides a positive output signal to the AND circuit 1283 which in turn provides a positive level to the one input side of the parity check trigger 1285, thereby allowing this trigger to be set. The positive oscillator shift pulse on the line 1073 in FIG. 32 sets the serdes stop trigger 1219 to the one state, allows the trigger 1220 through 1222 in FIG. 32 to remain in the zero state, resets the trigger serdes 1223, and sets the trigger 1224 in FIG. 34. The serdes parity check trigger 1285 in FIG. 33 is set to the one state by the positive oscillator shift pulse since the one input side has a positive signal from the AND circuit 1283. Again, the VRC provides a negative output signal along the line 1269 to AND circuits 1289 and 1290 in FIG. 35 and the AND circuits 1330 and 1331 in FIG. 34.

Figure 35:
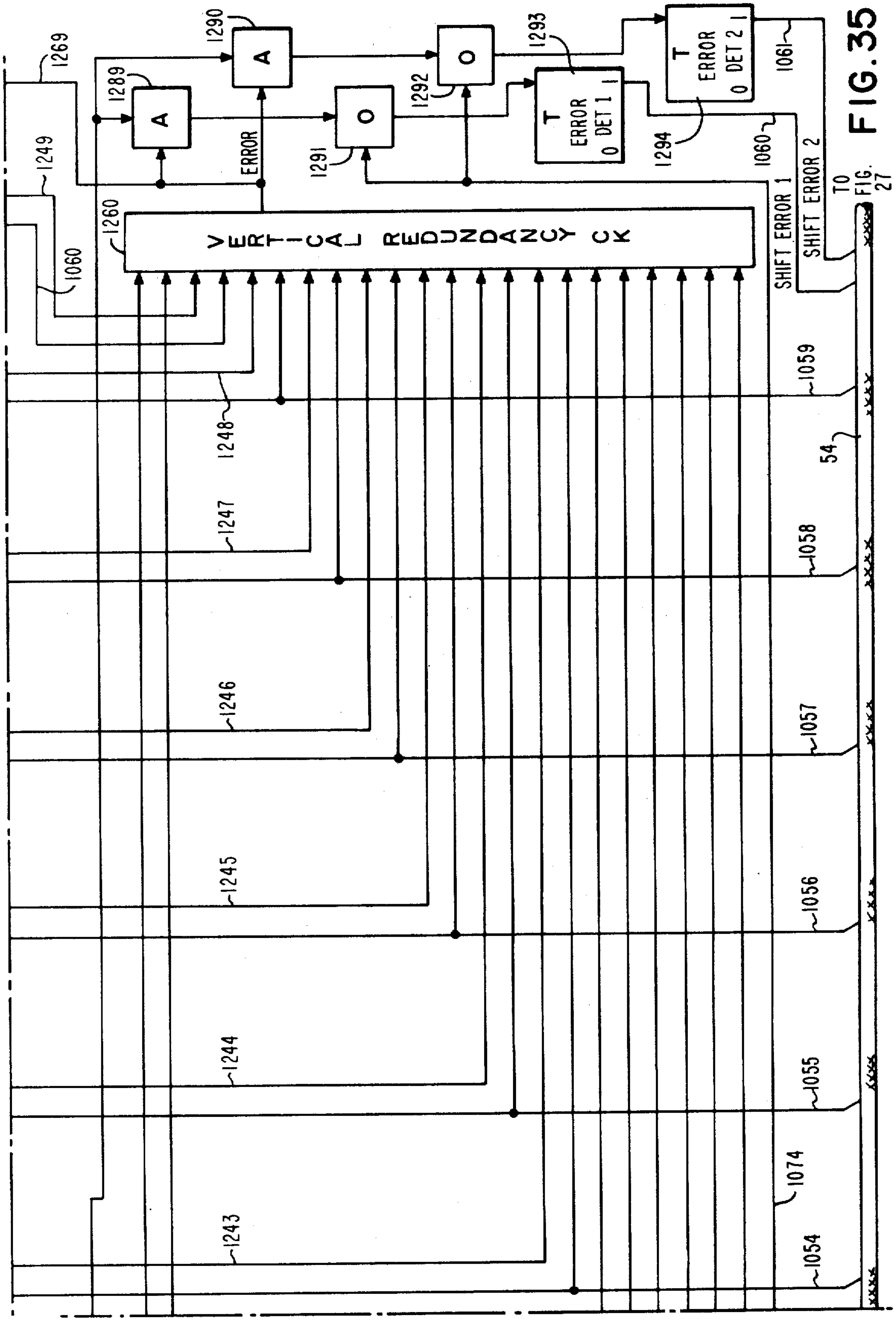

The next incoming bit is a binary zero, and the negative level continues on the line 30. This negative level is supplied (1) to the OR circuit 1310 which in turn supplies a negative level to the zero input side of the trigger 1219 and (2) to the inverter 1311 which in turn supplies a positive level to one input side of the trigger 1219 in FIG. 32. When the positive oscillator shift pulse occurs on the line 1073, the stop trigger 1219 remains on, the check trigger 1220 in FIG. 32 is set to the one state, the triggers 1221 through 1223 remain reset, the trigger 1224 is reset, and the trigger 1225 in FIG. 34 is set. These changes occurred since the triggers 1219, 1220, and 1225 receive positive levels on their one input side, and the triggers 1221 through 1224 receive positive levels on their zero input side. The negative level on the line 30 to the inverter 1280 in FIG. 33 is converted to a positive output which is supplied through the AND circuit 1281 and the OR circuit 1282 to the AND circuits 1283 and 1284 in FIG. 33. The AND circuit 1284 provides a positive output signal to the zero input side of the check trigger 1285. The VRC 1260 in FIG. 35 provides a negative output on the line 1269 certifying odd parity.

The next incoming bit is a binary one which is represented by a positive signal on the line 30 in FIG. 32. The OR circuit 1310 provides a positive output signal to the zero input side of the trigger 1219, and the inverter 1311 supplies a negative output signal to the one input side of the trigger 1219. The inverter 1280 in FIG. 33 supplies a negative output signal to the AND circuit 1281 which in turn supplies a negative signal through the OR circuit 1282 to the AND circuits 1283 and 1284. Hence the trigger 1285 does not change state. When the positive oscillator shift pulse occurs on the line 1073, the triggers 1220, 1221 and 1226 are set and the triggers 1219, 1222 through 1225 are reset. The VRC 1260 certifies odd parity with a negative output signal on the line 1269.

The last incoming bit for this character is a binary one, and the positive input level on the line 30 passes through the OR circuit 1310 in FIG. 32 to zero input side of the serdes Stop trigger 1219. The inverter 1280 in FIG. 33 provides a negative output signal to the AND circuit 1281 which in turn passes a negative level through the OR circuit 1282 to the AND circuits 1283 and 1284 which provide negative output levels to the one and zero input sides of the parity check trigger 1285 in FIG. 33. When the positive oscillator shift pulse occurs on the line 1073, the serdes stop trigger 1219 remains in reset state, the check trigger 1220 in FIG. 32 changes to the reset state, the trigger 1221 in FIG. 32 remains in the set state, the trigger 1222 changes to the set state, the triggers 1223 through 1225 remain in the reset state, the trigger 1226 in FIG. 34 changes to the reset state, the trigger 1227 in FIG. 34 changes to the set state, and the trigger 1285 in FIG. 33 remains in the reset state. Again, the VRC 1260 in FIG. 35 provides a negative output level on the line 1269 certifying odd parity.

The foregoing events relating to the assumed incoming character are tabulated in Table 2 below which shows the state of the trigger 1219 through 1227 after each incoming bit is entered and shifted.

TABLE 2

| Incoming bits | Trigger No. 1285 | 1219 | 1220 | 1221 | 1222 | 1223 | 1224 | 1225 | 1226 | 1227 |
|---|---|---|---|---|---|---|---|---|---|---|
| | Parity | Stop | C | B | A | 8 | 4 | 2 | 1 | Start |
| | 1 | 0 | 0 | 0 | 0 | 0 | 0 | 0 | 0 | 0 |
| 0-Start | 0 | 1 | 0 | 0 | 0 | 0 | 0 | 0 | 0 | 0 |
| 1-1 | 0 | 0 | 1 | 0 | 0 | 0 | 0 | 0 | 0 | 0 |
| 1-2 | 0 | 0 | 0 | 1 | 0 | 0 | 0 | 0 | 0 | 0 |
| 1-4 | 0 | 0 | 0 | 0 | 1 | 0 | 0 | 0 | 0 | 0 |
| 1-8 | 0 | 0 | 0 | 0 | 0 | 1 | 0 | 0 | 0 | 0 |
| 0-A | 1 | 1 | 0 | 0 | 0 | 0 | 1 | 0 | 0 | 0 |
| 0-B | 0 | 1 | 1 | 0 | 0 | 0 | 0 | 1 | 0 | 0 |
| 1-C | 0 | 0 | 1 | 1 | 0 | 0 | 0 | 0 | 1 | 0 |
| 1-Stop | 0 | 0 | 0 | 1 | 1 | 0 | 0 | 0 | 0 | 1 |

It is pointed out that the triggers in the reset state include the trigger 1220 in FIG. 32 and the triggers 1223 through 1226 in FIG. 34. These triggers represent the significant binary one bits of the received character to be deserialed. It is apparent that the content of the triggers 1220 through 1226 must be complemented, and this is done by reading out the content of these triggers from the zero output sides. This operation is discussed next. The trigger 1220 in FIG. 32 provides a positive level from its zero output side to the AND circuit 1261 in FIG. 32, and the triggers 1223 through 1226 in FIG. 34 provide output levels from their zero output sides to the AND circuits 1264 through 1267. The AND circuits 1261 and 1264 through 1267 are gated with a positive signal on the insert new character line 1077 from the serdes control via the bus 54, and at that time the complement of the content of the triggers 1220 through 1226 is forwarded via the cable 51 and then to the data register 43 as pointed out subsequently.

The start trigger 1227 in FIG. 34 provides a positive output at this time along the line 1059 via the buss 54 to the serdes satellite control 26 in FIG. 2. The positive signal on the start line 1059 is supplied, more specifically, to the AND circuit 920 in FIG. 27. This AND circuit receives positive input signals (1) on the line 387 (not home mode), (2) the line 1072 (not transmit latch) from the zero output side of the transmit latch 961 in FIG. 28 which is at a positive level, and (3) the line 514 (S4 pulse). During coincidence of the positive input levels the AND circuit 920 in FIG. 27 provides a positive output signal to the AND circuits 924, 926, 923 and inverter 921. The latch 940 in FIG. 27 provides a positive signal on its zero output side to the AND circuit 924 in FIG. 27. The CB1 pulse along the line 506 is positive during the first half of the S4 access pulse. The AND circuit 924 thus provides a positive output signal along the line 1077 in FIG. 27 designated insert new character, and this signal is supplied to the OR circuits 950, 952, and 953 in FIG. 29 and to the zero input side of the trigger 970 in FIG. 28. The positive level to the zero input of the trigger 970 causes that trigger to provide a negative level from its one output side to the OR circuit 963 in FIG. 28 which in turn provides the oscillator 971 with a negative input level which turns off the oscillator. The OR circuits 950, 952, and 953 in FIG. 29 in turn provide positive output signals to the AND circuits 954, 956, and 957, respectively, in FIG. 29. During the positive S4 pulse the AND circuits 954, 956, and 957 in FIG. 29 provide positive output signals along respective lines 162 (insert/remove new character), 157 (invert check), and line 158 (satellite active) via the buss 51 to the master control. In FIG. 30 the AND circuit 997 receives positive input signals on (1) the line 1072 (not transmit latch) from the zero output side of the transmit latch 961 in FIG. 28, (2) the line 1059 from the one output side of the trigger 1227 in FIG. 34 via the buss 54, and (3) the line 387 (not home mode) from the master control via the buss 47. The AND circuit 997 therefore provides a positive output signal to the OR circuit 993 which provides a positive signal to the inverter 994 which in turn provides a negative output to the AND circuit 995 in FIG. 30 which inhibits the AND circuit 995 from providing a positive level along the line 159 (satellite inactive) via the bus 51 to master control.

The positive signal on the line 1077 (insert new character) from the AND circuit 924 in FIG. 27 is supplied via the buss 54 to the And circuits 1261 through 1267 in FIGS. 32 and 34. The positive signal on the line 1077 also is supplied to the inverter 1288 in FIG. 33 which in turn provides a negative output level to the AND circuit 1286 in FIG. 33 and the AND circuits 1289 and 1290 in FIG. 35. This action allows the VRC 1260 in FIG. 35 to provide a check without parity of the triggers 1219 through 1228 in FIGS. 32 and 34. It is recalled at this time that the triggers 1221, 1222, and 1227 in FIGS. 32 and 34 are providing positive levels from their one output side to the VRC 1260, and they constitute an odd number which is verified by the VRC 1260 in FIG. 35. The VRC 1260 therefore provides a negative output signal along the line 1269. The triggers 1220, 1223, 1224, 1225, and 1226 provide positive levels from their zero output sides to the respective AND circuits 1261, 1264, 1265, 1266, and 1267 in FIGS. 32 and 34 which in turn provide positive levels on the associated output lines 156, and 153 through 150 via the buss 51 to the master control. The positive signals on these lines set respective latches 100 through 103 and 106 in FIG. 5 when the AND circuits 200 through 206 receive a positive pulse on the line 552 from the AND circuit 550 at CQ2 time of the CB1 pulse. These data signals are checked by the VRC 42 at CQ4 time of the CB1 pulse, and they are transferred via AND circuits 230 through 233 and 236 at CQ3 time of the CB1 pulse to respective latches 240 through 243 and 246. Thereafter the lines 260, 262, 264, 266, 269, 271, and 272 from the data register in FIG. 9 have positive signal levels which are conveyed via the cable 47 throughout the system. The serdes satellite control 26 provide positive signal levels along the lines 157 (invert check), 158 (satellite active), and 162 (insert/remove new character) in FIG. 29 to the one input side of latches 107, 108, and 112 in FIG. 7.

Referring to FIG. 27, the AND circuit 923 receives a positive input level from the AND circuit 920 and a positive pulse at CQ5 time on the line 505. This occurs during the time period 35 in FIG. 3. The AND circuit 923 therefore provides a positive level to the one input side of the latch 940, thereby setting this latch. The latch 940 in FIG. 27 thereby provides a negative output from the zero output side to the AND circuit 924 which thereby provide a negative output level on the line 1077 (insert new character). The one output side of the latch 940 provides a positive output level to the AND circuits 926 through 928 in FIG. 27, the OR circuit 993 in FIG. 30, and the zero input side of the trigger 972 in FIG. 28. The trigger 972 therefore provides a negative output level from its one output side to the OR circuits 964 and 965 in FIG. 28 which in turn provide negative signal levels to the AND circuits 975 and 976. These AND circuits supply negative output signal levels to corresponding OR circuits 980 and 981 in FIG. 29. Negative signal levels to the AND circuits 982 and 984 are ineffective to set the latches 983 and 985. This indicates that the oscillator has stopped. During the second half of the S4 access pulse the AND circuit 926 receives positive input signals from the one output side of the latch 940 in FIG. 27, from the AND circuit 920, and from the Master control on the line 507 at CB2 time. The output of the AND circuit 926 is a positive signal level (satellite active removed) to the OR circuit 953 in FIG. 29 which in turn provides a positive output signal to the AND circuit 957 which receives additionally a positive S4 along the line 514 from the master control. The positive signal on the line 158 (satellite active) is supplied via the bus 51 to master control, and all other lines to master control from the serdes satellite control are at a negative level. Thus only one line on this interface is at a positive level. The AND circuit 924 in FIG. 27 has a negative input level from the zero output side of the latch 940, and this AND circuit supplies a negative output level (1) through the OR circuit 950 to the AND circuit 954 which in turn supplies a negative output signal on the line 162 (the insert/remove new character) to master control and (2) through the OR circuit 952 to the AND circuit 956 which in turn supplies a negative output signal on the line 157 (invert check) to the master control. At the end of the S4 access pulse the master control supplies a positive signal (new character) along the line 374 from the one output side of the latch 342 in FIG. 11. The AND circuit 928 in FIG. 27 provides a positive output signal along the line 1076 (reset serdes received) via the bus 54 to the OR circuits 1312 in FIG. 32 and 1313 in FIG. 34 the output signals from which reset the triggers 1219 through 1228 in FIG. 32 and FIG. 34 and sets the trigger 1285 in FIG. 33.

Reference is made next to the multipoint logic satellite control 23 which is accessed by the next positive S1 pulse during the time periods 1—10 in FIG. 3. The AND circuit 1420 in FIG. 37 recognizes Code C from Table 1 above which code is now stored in the data register 43 of the master control. That is, positive levels are provided on the lines 260, 262, 264, 266, 269, 271, and 272 via the cable 47 to the AND circuit 1420 in FIG. 37. Positive signal levels are provided also on the lines 387 (not home mode) and 374 (new character) from the control register 46 of the master control via the buss 47 to the AND circuit 1420 in FIG. 37. The AND circuit 1420 therefore provides a positive output signal to the AND circuits 1421, 1422, 1423, 1433, and 1424 in FIG. 37. The AND circuits 1424 and 1433, however, does not provide a positive output signal since the line 384 (terminal address) is at a negative level. The AND circuit 1423 does not provide a positive output level since the line 382 (receive terminal) from the master control is at a negative level. The AND circuit 1422 does not provide a positive output level since the line 380 (transmit) from the master control is at a negative level. Therefore, the AND circuit 1421 is the only AND circuit in this group which provides a positive output level since the line 506 from the master control has a positive pulse during CB1 time of the S1 access pulse. The positive output signal from the AND circuit 1421 in FIG. 37 (insert control mode) is supplied to the OR circuits 1553 in FIG. 41, 1567 in FIG. 42, and 1568 in FIG. 42 which in turn provide positive levels to the respective AND circuits 1550 in FIG. 41, and 1562 in FIG. 42, and 1563 in FIG. 42. These AND circuits provide positive output signals on respective lines 163 (insert/remove control mode), 157 (invert check), and 158 (satellite active) during the positive S1 pulse on the line 508. The AND circuit 1511 in FIG. 40 has positive input signals from the data register 43 in FIG. 37 on the lines 260, 262, 264, 266, 269, 271, and 272. It also receives positive signal levels on the lines 387 (not home mode), 374 (new character) and from the OR circuit 1510 which receives a positive signal level on the line 377 (not control mode) from the master control via the bus 47. The AND circuit 1511 therefore recognizes Code C at this time, and accordingly it provides a positive output signal through the OR circuit 1512 to the inverter 1513 which in turn supplies a negative signal to the AND circuit 1514. This AND circuit thereby supplies a negative output signal along the line 159 (satellite inactive) to the master control via the bus 51. The positive levels supplied along the buss 51 to the master control cause the diagnostic register 40 and the control register 46 to operate in the manner previously explained.

During the second half of the positive S1 pulse shown in FIG. 3 as time period 6 through 10 the only control line from the multipoint satellite control 23 to the master control 27 with a positive signal level is the line 159 (satellite inactive). This line is energized with a positive signal by the inverter 1513 in FIG. 40 which receives a negative input signal from the OR circuit 1512. The OR circuit 1512 receives a negative signal from the AND circuit 1511. The AND circuit 1511 provides a negative output signal because it receives a negative input signal from the OR circuit 1510 which in turn receives negative levels at this time on all of its input lines 377, 382, and 380. The AND circuit 1515 in FIG. 40 receives a negative input level on the line 375 (not new character), and it therefore supplies a negative level to the OR circuit 1512. The AND circuits 1522 and 1529 provide negative output signals at this time, and their operation is described hereinafter.

During the positive S2 pulse in FIG. 3 the keyboard satellite control 24 provides a positive signal on the line 159, and the printer satellite control 25 provides a positive signal on the line 159 satellite inactive during the positive S3 pulse shown in FIG. 3. However, during the positive S4 pulse, the serdes satellite control 26 performs in the following manner. During the first half (CB1 time) of the positive S4 pulse the AND circuit 925 in FIG. 27 receives positive input signals as follows: (1) a positive output signal from the inverter 921 which is created in response to a negative output signal from the AND circuit 920 which in turn reflects a negative signal received from the one output side of the serdes start trigger 1227 in FIG. 34 on the line 1059 via the bus 54, (2) a positive level from the master control on the line 381 (not transmit) via the buss 47, (3) a positive signal level from the master control on the line 374 (new character) via the buss 47, (4) the positive CB1 signal on the line 506 from the master control, and (5) a positive signal on the line 387 (not home mode) from the master control via the cable 47. The AND circuit 925 therefore provides a positive output signal (satellite active insert) to the OR circuit 953 in FIG. 29 which in turn provides a positive output signal to the AND circuit 957 in FIG. 29. The latch 940 in FIG. 27 provides a positive output signal from its one output side to the OR circuit 993 in FIG. 30 which in turn passes this positive signal level to the inverter 994 which thereby provides a negative signal level to the AND circuit 995 in FIG. 30. This causes the AND circuit 995 to supply a negative signal level on the line 159 (satellite inactive). The serdes satellite control interface during the first half (CB1 time) of the positive S4 scan pulse therefore provides a positive signal level only on the line 158 (satellite active). This conforms to the odd parity discipline of the input signals to the master control.

During the second half (CB2 time) of the positive S4 scan pulse the following events take place. The AND circuit 927 in FIG. 27 receives a positive input signal from the inverter 921 which provides a positive output level since it receives a negative level from the AND circuit 920. The AND circuit 920 provides a negative output signal level since the line 1059 (start) has a negative level from the serdes via the bus 54 as explained above. The AND circuit 927 in FIG. 27 receives a positive CB2 pulse on the line 507 during the second half of the S4 scan when the one output side of the latch 940 in FIG. 27 provides a positive signal level to the AND circuit 927. The AND circuit 927 thereby provides a positive output level (remove new character) to the OR circuits 950, 952 and 953 in FIG. 29. The OR circuit 950 supplies a positive level to the AND circuit 954 in FIG. 29 which in turn passes a positive signal level on the line 162 (insert/remove character) at S4 time. The OR circuit 952 in FIG. 29 provides a positive signal level to the AND circuit 956 in FIG. 29 which in turn provides a positive signal level on the line 157 (invert check) at S4 time. The OR circuit 953 in FIG. 29 provides a positive signal level to the AND circuit 957 which in turn provides a positive signal level along the line 158 (satellite active) at S4 time. The positive signal level from the one output side of the latch 940 in FIG. 27 is supplied also to the OR circuit 993 in FIG. 30 which passes a positive signal to the inverter 994 which in turn provides a negative output signal to the AND circuit 995. The AND circuit 995 thereby provides a negative signal level on the line 159 (satellite inactive). The positive signal levels on the lines 162, 157, and 158 provide odd parity on the control lines from the serdes satellite control to the master control. These positive control signals operate the master control in the manner previously described. Therefore, at the end of the positive S4 pulse the only latch in the control register which is set is the latch 343 in FIG. 12.

In FIG. 27 of the serdes satellite control the AND circuit 922 is activated during time period 40 as shown in FIG. 3. It receives a positive signal level from the inverter 921 in FIG. 27, a positive CB2 pulse on the line 505 at time period 40, CQ5 on the line 505, and a positive signal level on a line 514 at S4 time. The positive output pulse from the AND circuit 922 is supplied to the zero input side of the latch 940 in FIG. 27, thereby resetting this latch.

It is seen therefore, that the first symbol (code C) is received and that appropriate responses pointed out above are made by the various components of the several stations in FIG. 1. The next symbol, pursuant to interstation line control discipline, is the station address which determines whether station 1, station 2 or station 3 is selected for operation. Let it be assumed for purposes of illustration that the next code symbol is an A which, as shown in Table 1 above, selects station or terminal 1. The code symbol A is received in serial fashion from the transmission medium 13, and it is acted on by the serdes 22 and the serdes satellite control 26. The events which take place within the serdes and the serdes satellite control are identical except for the sequential shifting operation in the triggers 1219 through 1227 in FIGS. 32 and 34 which difference is determined by the binary bit, which constitute the A code symbol. After the A code symbol is received and serialized in the serdes 22, the triggers 1221, 1222, and 1226 in FIGS. 32 and 34 are left in the binary zero state, and the remaining triggers 1219, 1220, 1223, 1224, and 1225, are left in the binary one state. Again a positive level from the one output side of the start trigger 1227 in FIG. 34 is provided along the 1059 line via the buss 54 to the AND circuit 920 in FIG. 27. It initiates the sequence of events in the serdes satellite control 26 which, as earlier described, results in establishing positive signals on the line 162 (insert remove/new character) in FIG. 29, the line 157 (invert check), and the line 158 (satellite active). These positive levels are supplied to master control during the first half (CB1 time) of the positive S4 access pulse. The AND circuits 1261 through 1267 in FIGS. 32 and 34 transfer the content of the serdes to the master control. More specifically, positive output signals are passed along the lines 155, 154, and 150 via the buss 51 to diagnostic register 40 in FIG. 5 and then to the data register 43 where code symbol A is stored with the bit configuration not check, B, A, Not 8, Not 4, Not 2, and 1. At the end of the positive S4 access pulse the control register 46 in FIGS. 11 and 12 provides positive levels along the line 374 (new character) and 376 (control mode).

During the positive S1 pulse at time periods 1 through 10 in FIG. 3 the multipoint satellite control 23 is accessed, and it performs the following functions. The AND circuit 1430 in FIG. 37 recognizes the code symbol A from the data register 43 in FIG. 9 by the positive levels on the lines 260, 263, 265, 267, 268, 270, and 273. A positive output signal is provided from the AND circuit 1430 in FIG. 37 to the AND circuit 1431. This AND circuit receives positive signal levels on the line 385 (not terminal address) from the master control, the line 376 (control mode), the line 374 (new character), and the line 506 at CB1 time which is positive during the first half of the positive S1 access pulse. Therefore, the AND circuit 1431 provides a positive output signal to the OR circuits 1566, 1567, and 1568 in FIG. 42 which in turn provide positive output signals to the respective AND circuits 1561, 1562, and 1563. During S1 time these AND circuits provide positive output signals on associated lines 167 (insert/remove terminal address), 157 (invert check), and 158 (satellite active) via the buss 51 to master control.

The AND circuit 1520 in FIG. 40 of the multipoint satellite control provides a positive output signal in response to the positive input signals from the data register 43 in FIG. 9 on the lines 260, 263, 265, 267, 268, 270, and 273. The positive signal from the AND circuit 1520 passes through the OR circuit 1521 to the AND circuit 1522. The AND circuit 1522 receives a positive signal from the AND circuit 1540 in FIG. 41 which in turn receives positive signals at this time (1) on the line 374 (new character), the line 376 (control mode), and the zero output side of the latch 1448 in FIG. 38. The AND circuit 1522 in FIG. 40 receives a positive CB1 pulse on the line 506 which is positive during the first half of the positive S1 access pulse. Therefore, the AND circuit 1522 in FIG. 40 provides a positive output signal to the OR circuit 1512. A positive output signal from the OR circuit 1512 to the inverter 1513 is converted to a negative level and applied to the AND circuit 1514 which in turn establishes a negative level on the line 159 (satellite inactive). The positive signals on the control lines 167 (insert/remove terminal address), 157 (invert check), and 158 (satellite active) are supplied via the cable 51 to the diagnostic register 40 and then to the central register during the first half (CB1 time) of the positive S1 pulse in the manner previously described.

During the second half (CB2 time) of the positive S1 pulse the AND circuit 1522 in FIG. 40 provides a negative output signal since the CB1 pulse on the line 506 is at a negative level. Likewise the AND circuit 1431 in FIG. 37 receives a negative level on the line 506, and it provides a negative output signal level to the OR circuits 1566 through 1568 in FIG. 42. Therefore, the associated AND circuits 1561, 1562, and 1563 provide a negative output signal levels on corresponding lines 167, 157, and 158. The AND circuit 1522 supplies its negative output signal level to the OR circuit 1512 in FIG. 40. The remaining inputs to this OR circuit are negative signal levels. Hence the inverter responds to a negative input level and supplies a positive output level to the AND circuit 1514 which passes a positive signal level on the line 159 (satellite inactive).

The keyboard satellite control 24 and the printer satellite control 25 remain inactive during the respective positive access pulses S2 and S3. During the next positive S4 pulse the serdes satellite control 26 performs as earlier described to remove the positive new character signal on the line 374 from the master control by forwarding a positive signal on the line 162 (insert/remove new character) at the same time positive signals are supplied on the line 157 (invert check) and the line 158 (satellite active) in FIG. 29 via the buss 51 to master control. At the end of the positive S4 access pulse the status of the latches in the control register providing a positive signal level from their one output side is as follows: (1) the latch 343 in FIG. 12 supplies a positive level on the line 376 (control mode); (2) the latch 347 in FIG. 12 supplies a positive level on the line 384 (terminal address); and the parity latch 571 in FIG. 10 provides a positive signal on the line 572. Thus terminal 1 is addressed and selected.

The next incoming character from the transmission medium 13 is a numeric character which indicates whether the selected terminal station is to transmit or receive data. Let it be assumed that the next character is a numeric five which has a bit configuration of 1, not 2, 4, not 8, not A, not B, and check. The serdes again deserializes the serial character received from the transmission medium, and during some subsequent S4 pulse a positive signal on the line 1077 new character activates the appropriate AND circuits in 1261 through 1267 in FIGS. 32 and 34 to transfer the numeric five character from the serdes 22 to the data register 43 in FIG. 9. This establishes positive output signals from the one output side of the latches 240, 242, and 246. At the end of such S4 pulse the latch 342 in FIG. 11 provides a positive signal level on the line 374 (new character). During the next S1 pulse the multipoint satellite control 23 recognizes that the data register in the master control contains a numeric character. This recognition is made by the AND circuit 1440 in FIG. 38 which receives positive input signals as follows: (1) on the line 384 (terminal address) from the master control, (2) on the line 374 (new character) from master control, (3) on the line 379 (not select I/O) from master control, (4) on the line 376 (control mode), (5) on the line 269 (not data register A), (6) on the line 271 (not data register B), and (7) on the line 506 (CB1 pulse which is positive during the first half of the S1 pulse). The coincident positive levels on these input lines to the AND circuit 1440 provide a positive output signal to the AND circuits 1441 and 1442 in FIG. 38 and the OR circuits 1565 and 1568 in FIG. 42. A positive level on the line 264 (data register 4) is supplied to the AND circuit 1441 in FIG. 38, and this AND circuit therefore provides a positive level (insert receive terminal) to the OR circuit 1555 in FIG. 41. The positive input signal to the OR circuit 1555 in FIG. 41 passes to the AND circuit 1552 which in turn passes a positive output signal level on the line 166 (insert/remove receive terminal). The OR circuit 1565 in FIG. 42 provides a positive output signal to the AND circuit 1560 which in turn provides a positive output signal on the line 164 (insert/remove select I/O). The OR circuit 1568 provides a positive signal to the AND circuit 1563 which in turn provides a positive signal level on the line 158 (satellite active).

The AND circuit 1526 in FIG. 40 of the multipoint satellite control receives positive input signals on the lines 269 (not data register A) and 271 (not data register B) which cause the AND circuit 1526 to provide a positive output signal to the AND circuit 1527 in FIG. 40. This AND circuit receives a positive signal on the line 384 (terminal address). The AND circuit 1527 supplies a positive output signal through the OR circuit 1521 to the AND circuit 1522. The AND circuit 1522 receives positive input signals (1) on the line 506 at CB1 time and (2) from the AND circuit 1540 in FIG. 41. The output signal from the AND circuit 1540 is a positive level since its inputs are positive levels (—b 1) on the line 374, (2) on the line 376 (control mode), and (3) from the zero output side of the latch 1448 in FIG. 38. The AND circuit 1522 in FIG. 40 therefore provides a positive output signal through the OR circuit 1512 to the inverter 1513. The negative output of the inverter 1513 causes the AND circuit 1514 to provide a negative output level on the line 159 (satellite inactive) via the buss 51 to the master control. Positive control signals are provided by the multipoint satellite control during the first half of the S1 access pulse as follows: (1) on the line 166 (insert/remove receive terminal), (2) on the line 164 (insert/remove select I/O), and (3) on the line 158 (satellite active). These lines satisfy odd parity in the master control since there are an odd number of them on the interface to the master control via the bus 51. The signals on these lines enter the diagnostic register, and the signals on the lines 164 and 166 then pass through to the control register in the manner described previously.

During the second half (CB2 time) of the S1 access pulse the line 159 (satellite inactive) in FIG. 42 is the only control line with a positive signal level. All remaining controls have a negative level. This adheres to the odd parity discipline of the interface. The AND circuit 1440 in FIG. 38 provides a negative output level since line 506 is at a negative level during the second half (CB2 time) of the S1 access pulse, and the AND circuit 1522 provides a negative output level since it also receives a negative level on the line 506. At the end of the positive S1 access pulse the control register 46 in FIGS. 11 and 12 provides positive output signals on the line 374 (new character), the line 376 (control mode), the line 378 (select I/O), the line 382 (receive terminal), and the line 384 (terminal address).

During the next S2 access pulse the keyboard satellite control 24 in FIG. 2 provides a positive signal on the line 159 (satellite inactive). During the following S3 access pulse the printer satellite control 25 selects the printer satellite if the printer is ready, and such selection is indicated by a positive level on the line 160 (insert/remove I/O) in FIG. 24. If the printer is selected, the AND circuit 800 in FIG. 22 provides a positive level on its output during the coincidence of positive signals on (1) the line 501, (2) the line 378 (select I/O), (3) the line 374 (new character), (4) the line 263 (not data register 2), (b 5) the line 271 (not data register 8), (6) the line 264 (data register 4), (7) the line 260 (data register 1), and (8) the line 820 (output ready) from the printer via the buss 53. The positive level from the AND circuit 800 is supplied to the OR circuit 809; the positive output of which sets the select latch 810. The ensuing sequence of events is the same as that previously described for the operation of the printer satellite control and the printer satellite in the home mode. The select latch 810 in FIG. 24 provides positive output signals to the AND circuits 830 through to 832 in FIG. 24 and they in turn provide positive output levels to the OR circuits 840 through 842 in FIG. 24. Consequently the AND circuits 850 through 852 in FIG. 24 provide positive output signals on the lines 160

(insert/remove I/O ready), 157 (invert check), and 158 (satellite active). The resulting action of these positive signals is the same as that operation. The AND circuit 836 in FIG. 25 receives positive input signals on the lines (1) 378 (select I/O), (2) 374 (new character), and (3) the data register signals on the lines 260, 263, 264, and 271. The AND circuit 836 provides a positive output signal level through the OR circuit 880 to the AND circuit 881. The AND circuit 881 receives positive input signals on the remaining lines (1) 506 at CB1 time, (2) 371 (not I/O ready), and (3) 820 (output ready). The positive output from the AND circuit 881 is supplied through the OR circuit 882 to the inverter 883 which in turn provides a negative output signal to the AND circuit 884, and it therefore provides negative signal level on the line 159 (satellite inactive).

During the second half of the S3 pulse the printer satellite control 25 provides a positive level on the line 159 (satellite inactive) and negative levels on the lines 160 (insert/remove I/O ready), 157 (invert check), and 158 (satellite active). The events which causes these levels to change are described above for operations in the home mode.

At the end of the S3 printer access pulse the master control 27 provides positive output levels on the following lines: (1) the line 370 (I/O ready), (2) the line 374 (new character), (3) the line 376 (control mode), (4) the line 378 (select I/O), (5) the line 382 (receive terminal), and (6) the line 384 (terminal address). During the next S4 pulse, shown in FIG. 3 as covering time periods 31 through 40, the serdes satellite control 26 operates, as earlier described, to change the positive level to a negative level on the line 374 (new character) from the master control by activating the AND circuits 954, 956, and 957 in FIG. 29 and thereby establishing positive levels on respective lines 162 (insert/remove new character), 157 (invert check), and 158 (satellite active) during the second half of the S4 access pulse.

The multipoint logic satellite control 23 next is activated by the S1 access pulse from the master control. The activities during this increment now are discussed. The line control discipline requires that the addressed terminal respond either positively (yes) or negatively (no) as to whether or not it desires to receive the data. This response is contingent upon the availability of the selected output device, which is the printer for this particular terminal under the assumed conditions. If the selected terminal is ready to receive the data to be transmitted, then the "yes" response (code Y) is sent to the transmitting terminal. Otherwise, a "no" response (code N) is sent to the transmitting terminal by the receiving terminal. Let it be assumed that a "yes" response is sent. The multipoint logic satellite control performs this function by determining from the I/O ready bit in the master control which of the two control characters is to be sent. The AND circuit 1460 in FIG. 38 receives positive input signals on the line 375 (not new character) from the master control, the line 378 (select I/O) from the master control, and the line 508 (S1 pulse). The output from the AND circuit 1460 is a positive level which therefore sets the latch 1448 in FIG. 38, thereby providing a positive output signal from its one output side. The positive level from the one output side of the latch 1448 is supplied to the AND circuit 1443 which also receives positive input signals on the line 506 (CB1) from the master control and from the zero output side of the latch 1449 in FIG. 38. The positive output signal from the AND circuit 1443 in FIG. 38 is supplied to the AND circuit 1444. This AND circuit also receives positive input signals on the line 370 (I/O ready) and the line 508 (S1 pulse). The AND circuit 1443 also provides a positive output level to the AND circuit 1445 which receives a negative input level on the line 371 (not I/O ready) that deconditions this AND circuit. The AND circuit 1444 therefore provides a positive output signal along the line 1446 (insert Y) to master control via the buss 51. AND circuit 1443 also provides a positive level to the OR circuit 1554 in FIG. 41, the OR circuits 1567, 1568, and 1569 in FIG. 42, and the AND circuit 1571 in FIG. 42. The OR circuit 1554 provides a positive output signal to the AND circuit 1551; the OR circuit 1567 provides a positive output signal to the AND circuit 1562; and the OR circuit 1568 provides a positive output signal to the AND circuit 1563; and the OR circuit 1569 provides a positive output signal to the AND circuit 1564. When the positive S1 pulse occurs on the line 508, the AND circuit 1551 provides a positive level to master control on the line 165 (insert/remove transmit); the AND circuit 1562 provides a positive level on the line 157 (invert check); the AND circuit 1563 provides a positive level on the line 158 (satellite active); the AND circuit 1564 provides a positive level on the line 162 (insert/remove new character); and the AND circuit 1571 provides a positive level on the line 161 (insert/remove character request). During the first half of the S1 scan pulse these lines and the line 1446 (insert Y) have a positive signal level, and they cause the master control to perform in the manner previously described. During the time period 5 as shown in FIG. 3 the AND circuit 1461 in FIG. 38 receives a positive input signal from the one output of the latch 1448 and a positive CQ5 pulse on the line 505 from master control. The positive output signal from the AND circuit 1461 sets the latch 1449, and it provides a positive output from its one output side and a negative output from its zero output side.

The AND circuit 1515 in FIG. 40 receives positive input levels on the line 378, (select I/O) from the master control, control mode on the line 376 and the line 375 (not new character) from the master control. This causes the AND circuit 1515 to provide a positive level to the OR circuit 1512 which in turn provides a positive output signal. The inverter 1513 transforms this positive input level to a negative output level which is supplied to the AND circuit 1514. Therefore, the line 159 (satellite inactive) has a negative level during the first half of the positive S1 access pulse. The number of positive control lines on the bus 51 to the control portion of the diagnostic register in FIGS. 7 and 8 is five, and odd parity is satisfied. A positive level to the data register is not included in the count of signals to the control portion. At the end of the first half of the positive S1 access pulse the control register 46 provides positive output signals on the line 372 (character request), the line 380 (transmit), and the line 374 (new character) in addition to those previously discussed, and the data register 43 provides output signals from FIG. 9 representing code Y which is the symbol for "yes."

During the second half of the positive S1 access pulse the AND circuit 1515 in FIG. 40 receives a negative level on the line And circuit (not new character) from the master control. The AND circuit 1443 in FIG. 38 is deconditioned by a negative level on its input from the zero output side of the latch 1449. Therefor, the negative output signal from the AND circuit 1443 deconditions the AND circuits 1551, 1562, 1571, 1563, and 1564 which then provide negative levels on respective lines 165 (insert/remove transmit), line 157 (invert check), line 161 (insert/remove character request), line 158 (satellite inactive), and line 162 (insert/remove new character) to master control. The negative level from the AND circuit 1443 in FIG. 38 deconditions the AND circuit 1444 which in turn supplies a negative level on the line 1446 (insert Y).

However, during the second half of the S1 pulse, the AND circuit 1463 in FIG. 38 has positive input levels provided from the one output side of the latch 1448 in FIG. 38, the one output side of the latch 1449 in FIG. 38, and a CB2 pulse on the line 507 from the master control. The positive signals from the AND circuit 1463 passes through the OR circuit 1568 in FIG. 42 and the AND circuit 1563 on the line 158 (satellite active). In addition the AND circuit 1540 in FIG. 41 provides a positive output signal to the AND circuit 1529 in FIG. 40 since the input lines 374 (new character) and 376 (control mode) are at positive levels. The OR circuit 1528 receives a positive signal from the AND circuit 1525. The AND circuit 1525 receives positive input signals (1) from the inverter 1524 (which output signal is positive since the OR circuit 1523 provides a negative output) and (2) on the line 384 (terminal address).

The positive signal from the AND circuit 1529 in FIG. 40 passes through the OR circuit 1512, and it is inverted by the inverter 1513 to a negative level which deconditions the AND circuit 1514, thereby providing a negative signal on the output line 159 (satellite inactive).

The keyboard satellite control again remains inactive during the S2 pulse, and the printer satellite control is inactive during the positive S3 access pulse since the master control still contains a positive level on line 376 (control mode).

The positive S4 pulse accesses the serdes satellite control, and the serdes satellite control responds to the positive level from the master control on the line 380 (transmit). This positive level is provided via the bus 47 from the master control to the AND circuit 960 in FIG. 28. The AND circuit 960 also receives a positive signal on the line 501 at CQ1 time; and it provides a positive output signal to set the latch 961.

A positive signal level from the one output side of the transmit latch 961 is supplied on the line 1071 to the OR circuits 963 through 965 in FIG. 28. The OR circuit 963 supplies a positive output signal to the oscillator 971 which initiates operation of the oscillator. The OR circuits 964 and 965 supply positive output signals to the AND circuits 975 and 976 which in turn provide positive output signals if the oscillator 971 does not operate in the correct manner. The AND circuit 962 in FIG. 28 receives as input signals the positive output signal from the transmit latch 961, the CB2 pulse which is at a positive level during the second half of the S4 pulse, and the new character signal on the line 374 which is a positive level from the master control. The AND circuit 962 therefore provides a positive output signal on the 1075 (remove character request) to the OR circuits 951 through 953 in FIG. 29. The OR circuits 951 through 953 in turn provide positive output signals to the AND circuits 955 through 957 which in turn provide positive output signals on the lines 157 (invert check), 158 (satellite active), and 161 (insert/remove character request). The AND circuit 962 providing a positive level on the line 1075 via the buss 54 to the serdes where it conditions the AND circuits 1200 through 1206 in FIG. 32 and FIG. 34 to pass positive signals received from the data register 43 in FIG. 9 in master control via associated lines 260, 262, 264, 266, 268, 270 and 272. The data register 43 holds code Y which is shown in Table 2 above, and this code is inserted in the latches 1220 through 1226. The serdes stop trigger 1219 in FIG. 32 and the line trigger 1228 in FIG. 34 are set by the positive signal on the line 1075. The Triggers 1219 through 1227 in FIGS. 32 and 33 and the parity trigger 1285 in FIG. 33 are reset at CQ2 time by a positive pulse from the AND circuit 1314 through the OR circuit 1312 to the reset input of these triggers. This is a short positive pulse, and after it terminates, the positive signal on the line 1075 persists, thereby setting the triggers 1219 and 1228. In like fashion any positive signals from the AND circuits 1200 through 1206 in FIGS. 32 and 33 persist after the positive reset signal terminates, thereby again setting the associated ones of the triggers 1220 through 1226. Therefore, in the group of triggers 1219 through 1228 in FIGS. 32 and 34 the triggers 1226, 1224, 1223, 1222, 1221, and 1219 are set, and the remaining triggers in this group are reset. The shifting of the character serially to the right from the serdes to the output line 29 in FIG. 34 is the same as that earlier described for the shifting operation during the receive operation. However, the OR circuit 1310 in FIG. 32 receives a positive input signal on the line 1071 which in turn passes this positive level to the inverter 1311, and this inverter supplies a negative level to the one input side of the latch 1219. The positive signal level from the OR circuit 1310 to the zero input side of the trigger 1219 resets this trigger in response to each positive oscillator shift pulse on the line 1073. Thus as information is shifted out to the right, zeros are inserted at the left in the serdes triggers. Each bit of information is shifted right, and it passes through the line trigger 1228 in FIG. 34. The one output side of the line trigger 1228 is supplied through the OR circuit 1273 in FIG. 34 to the And circuit 1270. Each time a binary one bit is shifted to the line trigger 1228 the one output side supplies a positive signal level through the OR circuit 1273 to the AND circuit 1270 in FIG. 34 which in turn provides a positive output signal on the line 29 to the transmission medium. These serializing operations take place after information bits have been set into the serdes shift register by a positive signal from the AND circuit 962 in FIG. 28. During the time that the AND 962 in FIG. 28 provides a positive output signal to insert a character or symbol, the AND circuit 996 in FIG. 30 provides a positive output signal to the OR circuit 993. The AND circuit 996 is conditioned with positive coincidence of input signals on the lines 380 (transmit), 374 (new character), 372 (character request), and 507 (CB2 pulse). The OR circuit 993 provides a positive output signal to the inverter 994 in FIG. 30 which in turn provides a negative output signal to the AND circuit 995 which thereby provides a negative signal on the line 159 via the bus 51 to master control. At this time the interface of the serdes satellite control and the master control has an odd number of lines with positive control signals. They are line 161 (insert/remove character request), line 157 (invert check), and 158 (satellite active). Thus odd parity on the interface is satisfied, and the events which take place in the master control are the same as those earlier described. At the end of the S4 pulse the master control provides positive output signal levels the following lines: (1) I/O ready on the line 370, (2) new character on the line 374, (3) control mode on the line 376, (4) select I/O on the line 378, (5) transmit on the line 380, (6) receive terminal on the line 382, (7) terminal address on the line 384.

The multipoint logic satellite control is accessed next by the master control during the following S1 pulse. The latch 1448 in FIG. 38 was reset when the previous S1 pulse changed from a positive to a negative level. The latch 1449 in FIG. 38 provides a positive level from its one output side. The AND circuit 1464 in FIG. 38 receives positive input signals (1) from the zero output of the latch 1448, (2) the one output side of the latch 1449, and (3) the line 506 (CB1 pulse). The AND circuit 1464 therefore provides a positive output level to the OR circuit 1568 in FIG. 42 which in turn provides a positive output level to the AND circuit 1563 during CB1 time. During the positive S1 pulse the AND circuit 1563 provides a positive level along the line 158 (satellite active). The AND circuit 1540 in FIG. 41 receives positive input signals on the line 374 (new character) from the master control, the line 376 (control mode) from the master control, and a positive level from the zero output of the latch 1448 in FIG. 38. The AND circuit 1540 therefore provides a positive output signal to the AND circuit 1522 in FIG. 40, and this AND circuit receives positive signals on the line 506 (CB1) from the master control and from the OR circuit 1521 which in turn receives a positive input signal from the latch 1449 in FIG. 38. The AND circuit 1522 provides a positive output level to the OR circuit 1512 in FIG. 40 which in turn passes it to the inverter 1513. The inverter 1513 provides a negative output level to the AND circuit 1514 which establishes a negative level on the line 159 (satellite inactive) to the master control via the bus 51. Therefore, during the first half of the positive S1 access pulse the line 158 has a positive level, and the line 159 (satellite inactive) has a negative level.

During the second half of the positive S1 pulse the AND circuit 1465 in FIG. 38 receives positive input levels (1) from the one output side of the latch 1449, (2) from the zero output side of the latch 1448, (3) from the master control on the line 507 (CB2 pulse). The AND 1465 provides a positive output level to the OR circuit 1553 in FIG. 41 which in turn provides a positive output level to the AND circuit 1550 which generates a positive output level during the positive S1 pulse along the line 163 (insert/remove control mode). The AND circuit 1465 provides a positive output level to the OR circuit 1565 in FIG. 42 which in turn provides a positive output level to the AND circuit 1560, and it provides a positive output level on the line 164 (insert/remove select I/O) to the master control during the remainder of the positive S1 pulse. The OR circuits 1568 and 1569 in FIG. 42 also receive a positive level from the AND circuit 1465 in FIG. 38, and they provide respective positive output levels (1) to the AND circuit 1563 which generates a positive output level on the line 158 (satellite active) and (2) the AND circuit 1564 which generates a positive output level on the line 162 (insert/remove new character) to the master control. The AND circuit 1474 in FIG. 39 receives positive input levels on the line 382 (receive terminal) and the line 370 (I/O ready) from the master control. The AND circuit 1474 provides a positive output signal through the OR circuit 1476 to the inverter 1482 which in turn provides a negative level to the AND circuit 1477. The OR circuit 1480 in FIG. 39 receives a positive input level on the line 382 (receive terminal) from the master control. Therefore, it provides a positive output level to the AND circuit 1478 which also receives a positive input level from the AND circuit 1465. The AND circuit 1478 provides a positive output level to the OR circuit 1554 in FIG. 41. A positive output from the OR circuit 1554 in FIG. 41 operates the AND circuit 1551 to provide a positive level on line 165 (insert/remove transmit) via the bus 51 to master control during the latter half of the positive S1 pulse.

Since there are five control lines with positive signals on the interface to the diagnostic register of the master control, odd parity is satisfied. The master control performs in the manner previously described. Upon termination of the positive S1 pulse the control register of the master provides positive control signals on the lines 370 (I/O ready), the line 382 (receive terminal), and the line 384 (terminal address). All other prior positive output levels from the latches 340 through 347 in FIGS. 11 and 12 are removed by the multipoint logic satellite control. The keyboard and printer satellite controls 24, and 25 remain inactive during the next respective positive S2 and S3 access pulses.

The serdes satellite control continues to shift out to the right the code symbol Y placed in its serializer during the last positive S4 access pulse. As this symbol Y is shifted to the right the OR circuit 941 in FIG. 27 continuously samples the signals from the one output sides of the triggers 1219 through 1227 in FIGS. 32 and 34 which are forwarded on the lines 1051 through 1059 via the buss 54 to the AND circuit 941. The original stop bit is a binary one which is shifted successively through the serdes, and it is positive signal which is supplied to the OR circuit 941 in FIG. 27. Therefore, a positive output signal is constantly supplied to the inverter 942 which in turn provides a negative output level which inhibits the operation of the AND circuit 943 and 944 in FIG. 28. When the stop bit is shifted through the triggers 1219 through 1227 in FIGS. 32 and 34 and into the line trigger 1228, the triggers 1219 through 1227 are all in the reset state since binary zeros are inserted at the left for each successive shift by the positive signal level on the line 1071. Therefore all of the lines 1051 through 1059 from the serdes via the bus 54, have negative signal levels, and the OR circuit 941 supplies a negative signal level to the inverter 942 which in turn provides a positive signal level to the AND circuit 944 which also receives a positive signal level on the line 381 (not transmit). The AND circuit 944 thus provides a positive signal to the zero input side of the transmit latch 961 which resets it to the off state providing a positive signal level from the zero output side. The AND circuit 944 in FIG. 28 also supplies a positive signal on the line 1070 to the serdes via the buss 54 to the OR circuit 1312 in FIG. 32 and to the OR circuit 1313 in FIG. 34. The positive signal from the OR circuit 1312 resets all of the serdes triggers 1219 through 1227, and the positive signal from the OR circuit 1313 resets the line trigger 1228 in FIG. 34 and the parity check trigger 1285 in FIG. 33. During the preceeding shifting operations the parity of the content of the serializer and the parity check trigger 1285 is continuously checked by the VRC 260 in FIG. 35. Its negative output signal changes to a positive level if any of the serdes shift triggers fails to shift correctly.

At this point the station addressed to receive a message has answered with a yes response by sending code Y to the sending station. The sending station then transmits its message. The transmitting station sends the data in the order in which it is to be delivered to the printer at the receiving station. Therefore, the sending terminal commences the transmission of serial data to the serdes of the receiving terminal. This data is deserialized by the serdes of the receiving terminal and presented to its master control for processing and delivery to the printer. When an incoming character has been shifted into the serdes shift register, the AND circuits 954, 956 and 957 in FIG. 29 of the serdes satellite control provide positive output signal levels to the master control. At the same time these lines are at a positive level during the positive S4 pulse the received data character is transferred in parallel from the AND circuits 1261 through 1267 in FIGS. 32 and 34 on respective lines 150 through 156 via the cable 51 to the diagnostic register 40 in FIG. 5 and then to the data register 43 in FIG. 9. However, the multipoint logic satellite control remains inactive at this time since the received character is presumed to be numeric alphabetic data, not a code symbol such as those shown in Table 1 above. In this connection it is pointed out that the multipoint control responds to the code symbols shown in Table 1 or a positive level on the line 376 (control mode). The keyboard satellite control also is not active during its positive S2 access pulse since its select latch 732 is not set. The printer satellite control is activated during the next positive S3 access pulse, and the content of the data register is transferred from the master control along the lines 260 through 273 in FIG. 9 to the printer 21 in FIG. 44. The control signals for executing a printout operation are identical to those described earlier for the home mode operation. The serdes, the serdes satellite control, the master control, the printer and the printer satellite control cooperate to receive and print successive characters as they are received. As each character is received and deserialized by the serdes satellite control 26, it is presented to the master control which in turn forwards it through the printer satellite control to the printer. This action continues until the character deserialized by the master control has the bit configuration of code C in Table 1, signifying end of message. When code C is received, termination takes place, and this is described next.

The serdes satellite control presents the code C bit configuration of data register 1, data register 2, data register 4, data register 8, not data register A, not data register B, and data register check along with a positive control signal on the line 162 (insert/remove new character) to the master control during the positive S4 access pulse. The multipoint logic satellite control during the next positive S1 access pulse recognizes the bit configuration of code C by the AND circuit 1420 in FIG. 37, and this AND circuit provides a positive output signal to the AND circuits 1421, 1422, 1423, and 1424. During the first half of the positive S1 pulse the AND circuit 1421 in FIG. 37 provides a positive output signal since the input line 506 has a positive level during CB1 time. This positive output is supplied to the OR circuits 1553 in FIG. 41 and 1567 and 1568 in FIG. 42 which in turn provides positive output signals to the respective AND circuits 1550 in FIG. 41 and 1562 and 1563 in FIG. 42. These AND circuits 1550, 1562, 1563 provide positive output signals on the lines 163 (insert/remove control mode), 157 (invert check), and 158 (satellite active) via the bus 51 to the master control. During the second half of the positive S1 access pulse the AND circuit 1423 provides a positive output signal since it receives positive input signals (1) from the AND circuit 1420, (2) on the line 507 (CB2 pulse), and (3) the line 382 (receive terminal). The AND circuit 1423 supplies a positive output signal to the OR circuit 1555 in FIG. 41. The AND circuit 1433 in FIG. 37 also provides a positive output signal to the OR circuit 1568 in FIG. 42 at this time since all of its inputs are positive. The positive input lines are: (1) the output of the AND 1420 in FIG. 37, (2) 376 (control mode), (3) 374 (new character), (4) 381 (not transmit), (5) 382 (receive terminal), (6) 384 (terminal address), and (7) 507 (CB2 pulse). During the second half of the positive S1 pulse the AND circuit 1552 provides a positive signal level on the line 166 (insert/remove receive terminal) and AND circuit 1563 provides a positive signal on the line 158 (satellite active) to the master control. The AND circuit 1424 in FIG. 37 receives positive input signals (1) from the AND circuit 1420 in FIG. 37, (2) on the line 507 (CB2 pulse), and (3) on the line 384 (terminal address). This AND circuit supplies a positive output signal to the OR circuit 1566 in FIG. 42. The OR circuit 1566 provides a positive output signal to the AND circuit 1561 which in turn provides a positive signal on the line 167 (insert/remove terminal address) via the buss 51 to the master control. Therefore at the end of this positive S1 pulse the master control provides positive output levels on the lines 376 (control mode), 370 (I/O ready), 374 (new character), and 372 (character request).

During the positive S3 pulse from the master control the printer satellite control is accessed, and the data register 43 in the master control holds code C which is recognized by the AND circuit 802 in FIG. 22, and it provides a positive output signal to the AND circuit 824 which receives positive levels on the input lines 387 (not home mode) and 501 (CQ1 pulse) which has a positive level during the time period 21 shown in FIG. 3. The positive output signal from the AND circuit 824 resets the select latch 810 which thereby provides a positive level from its zero output side to the AND circuits 833 through 835 in FIG. 34. The other input to the AND circuits 833 through 835 is the positive output signal from the AND circuit 802 in FIG. 22. The AND circuit 833 provides a positive output signal to the OR circuit 842; the AND circuit 834 provides a positive output signal to the OR circuit 843; and the AND circuit 835 provides a positive output signal to the OR circuit 840 in FIG. 24. These OR circuits in turn condition the AND circuits 850, 852, and 853 which in turn provide positive output signals on associated lines 160 (insert/remove I/O ready), 158 (satellite active), and 161 (insert/remove character request) via the cable 51 to the master control. The AND circuit 837 in FIG. 25 receives positive input signal representing code C (from FIG. 22), a positive level on the line 387 (not home mode), a positive signal on the line 507 (CB2 pulse), and a positive level on the line 374 (new character). The AND circuit 837 in turn provides a positive output signal to the OR circuit 882 which causes the inverter 883 to provide a negative output signal to the AND circuit 884. The AND circuit 884 therefore provides a negative output signal on the line 159 (satellite inactive) to master the control. The printer control satellite adheres to the odd parity discipline on the interface to the master control. During the next positive S4 pulse the new character latch 342 of the master control in FIG. 11 is reset by the serdes satellite control as earlier explained. Thus it is seen how a complete message is received from a remote station and printed out.

In the foregoing illustration the station 1 in FIG. 1 was addressed to receive information from a sending station, and the sending station was not identified. Let it be assumed for purposes of further illustration that station 3 in FIG. 1 is the controlling station, and it may be termed arbitrarily as the master station. Let it be assumed next that the master station (station 3) in FIG. 1 is to receive information from station 1. The master station provides the line control discipline for interstation communication on line 13 in FIG. 1. The master station first sends code C on the line 13, and it is received by stations 1 and 2. Since station 1 is to be selected to transmit, the events which take place at station 1 are considered first, and later the events which take at station 2 are considered. The code C is received at station 1 from the transmission medium 13 by the serdes 22 in FIG. 2 and deserialized. The bits representing code C are forwarded to the master control via the bus 51, and it is forwarded next to the multipoint logic control satellite 23 where events such as those previously described take place. Next code A is transmitted by the master station on the transmission medium 13, and it is received by station 1 in FIG. 1. Code A is deserialized by the serdes 22 in FIG. 2 and forwarded through the master control to the multipoint logic satellite control 23 where initial selection of station 1 takes place in the manner previously described. The master station then sends code 1 on the transmission medium 13 in FIG. 1 to station 1 where it is deserialized by the serdes 22 in FIG. 2, and the bits representing code 1 are forwarded in parallel via the bus 51 to the master control along with a positive signal on the control line 162 (insert/remove new character) from FIG. 29 of the serdes satellite control. It is recalled from the earlier description of the receive operation at station 1 that the master control, after accessing the multipoint logic satellite control 23, provides positive signal levels from the control register 46 in FIGS. 11 and 12 on the following lines: (1) the line 374 (new character), (2) the line 376 (control mode), (3) the line 378 (select I/O), and (4) the line 384 (terminal address). The line 382 (receive terminal) has a negative level since the AND circuit 1441 in FIG. 38 receives a negative signal level on the line 264 from the data register 43 in FIG. 9. The AND circuit 1442 in FIG. 38 receives a positive signal level from the AND circuit 1440 and a positive signal level on the line 265 (not data register 4). Therefore, the AND circuit 1442 supplies a positive output signal through the OR circuit 1567 in FIG. 42 to the AND circuit 1562, and it provides a positive output signal on the line 157 to the master control.

The keyboard satellite control 24 next is accessed by the positive S2 access pulse from the master control. Let it be assumed that prior to the positive S2 access pulse the start button 1720 in FIG. 43 is operated to supply a positive signal level on the line 650 and that the encoder 1700 in FIG. 43 provides a positive signal level on the line 651 (keyboard ready). The positive signal levels on the lines 650 and 651 cause the AND circuit 791 in FIG. 20 to supply a positive signal level to the one input side of the latch 793 (select allow), thereby setting this latch. The positive signal levels on the lines 650 and 651 are supplied to the AND circuit 680 in FIG. 17, and this AND circuit supplies a positive signal at CQ1 time of the positive S2 access pulse which sets the latch 730 (allow select). The AND circuit 682 in FIG. 17 receives positive input signals on the lines 378 (select I/O), 374 (new character), and the lines from the data register 260, 263, 265, and 267. The positive signal from the output of the AND circuit 682 is supplied through the OR circuit 734 to the AND circuit 731. It is readily apparent that the input lines to the AND circuit 731 are energized with positive signals, and the positive output signal from the AND circuit 731 sets the select latch 732. The positive signal from the one output side of the latch 732 conditions the AND circuits 700 through 703 to pass positive signals through respective OR circuits 753, 752 and 750 to corresponding AND circuits 723, 722, and 720. These AND circuits in turn supply positive output signals on respective output lines 158 (satellite active), 157 (invert check), and 160 (insert/remove I/O ready) to the master control. The AND circuit 724 in FIG. 20 is deconditioned by a negative level from the inverter 771. The events which take place in the master control are like those described earlier with respect to the operation of the keyboard satellite control in the home mode.

The printer satellite control 25 is inactive during the next positive S3 access pulse, and the serdes satellite control 26 removes the new character signal during the next positive S4 access pulse. During the next positive S1 access pulse the multipoint satellite control 23 responds to the positive signal from the master control on the line 370 (I/O ready), and this positive signal level conditions the AND circuit 1444 in FIG. 38 to pass a positive signal on the line 1446 in FIG. 41 via the cable 51 to the diagnostic register 40 in FIG. 5. The positive signal on the line 1446 causes code Y (yes) to be inserted in the latches 100 through 106 in FIG. 5, and this code is transferred to the data register 43 in FIG. 9. The multipoint logic satellite control 23 also supplies positive output signals on the control lines 161 (insert character request), 162 (insert new character), and 165 (insert transmit) as earlier explained.

During the following positive S4 access pulse the serdes 22 begins to serialize and transmit the bits of the code Y on the transmission medium 13 in the manner previously explained. During CB2 time of the next positive S1 access pulse the multipoint logic satellite control 23 supplies a positive signal on the control lines 164 (remove select I/O), 162 (remove new character) in FIG. 42 and 163 (control mode) in FIG. 41 via the cable 51 to the master control, and this signal removes the positive output signal on the line 374 from the master control in FIG. 11 in the manner previously explained when station 1 was to receive data. However, station 1 now is to transmit data, and the events which take place during the CB2 portion of the positive S1 access pulse are summarized next. The OR circuit 1480 in FIG. 39 receives negative signal levels on the input lines 371 (not I/O ready) and 382 (receive terminal), and it supplies a negative signal level which deconditions the AND circuit 1478 in FIG. 39. The negative output signal from the AND circuit 1478 in FIG. 39 is supplied to the OR circuit 1554 in FIG. 41. The remaining input lines to this OR circuit are energized with negative signal levels, and consequently the negative output signal from the OR circuit 1554 deconditions the AND circuit 1551. The negative output signal from the AND circuit 1551 prevents the master control from removing the positive signal level on the line 380 (transmit) from the output of the master control.

The master control continues to provide positive access pulses S1, S2, S3 and S4. However, no action takes place until such time as the serdes 22 has transmitted the code Y (yes). Upon completion of such transmission, the serdes 22 provides negative signal levels on the lines 1051 through 1059 to the OR circuit 941 in FIG. 27 and the OR circuit 990 in FIG. 30. The OR circuit 941 at this time supplies a negative signal level to the inverter 942 in FIG. 27 which in turn supplies a positive signal to the AND circuit 944 in FIG. 28, but this AND circuit is deconditioned by a negative signal level on the line 381 (not transmit). Consequently, the negative output signal from the AND circuit 944 is not effective to reset the transmit latch 961. The positive signal from the inverter 942 in FIG. 27 is applied also to the AND circuit 943 in FIG. 28, and this AND circuit receives positive signal levels on the remaining input lines 373 (Not character request), 506 (CB1 pulse), and 1071 from the one output side of the transmit latch 961. The AND circuit 943 in FIG. 28 provides a positive output signal through the OR circuits 951 through 953 in FIG. 29 to respective AND circuits 955 through 957 which in turn provide positive output signals on respective lines 161 (insert character request), 157 (invert check), and 158 (satellite active). The OR circuit 990 in FIG. 30 provides a negative output signal to the inverter 991 which in turn provides a positive output signal on the line 1078 (empty) to the AND circuit 992. The AND circuit 992 receives positive input signals on the remaining input lines 506, 373, and 380. The AND circuit 992 supplies a positive output signal through the OR circuit 993 to the inverter 994 which in turn supplies a negative signal which deconditions the AND circuit 995. Consequently, the AND circuit 995 supplies a negative output signal on the line 159 (satellite inactive).

During the CB2 portion of the positive S4 access pulse the serdes satellite control provides negative control signals from the AND circuits 955 through 957 in FIG. 29, and it supplies a positive signal level from the AND circuit 995 in FIG. 30.

The keyboard satellite control 24 responds to the positive control signal from the master control on the line 372 (character request), and it performs in the same manner previously explained with reference to the home mode type of operation involving the keyboard and the printer. Briefly stated, keyboard satellite control recognizes a depressed key and forwards positive control signals on the lines 157, 158, and 162 to the master control as previously described; data representing the depressed key is supplied to the master control and inserted in the data register 43; when the master control accesses the printer satellite control 25 during the ensuing positive S3 access pulse, it finds the printer inactive; during the following positive S4 positive pulse the serdes satellite control 26 and the serdes 22 cooperate with the master control, and the character in the data register is transferred to the serdes; and transmission of the bits representing the character are transmitted in serial form. The exchange of control signals between the serdes and the master control in this instance is identical to that between the serdes and the master control previously described with respect to the code Y transmission.

Characters from the keyboard of station 1 are transmitted in succession to the master station 3 until the text has been sent at which time code C in Table 1 is transmitted by station 1. The bits of code C are inserted in the serdes like any other character. However, during the positive S1 access pulse the multipoint logic satellite control recognizes the bit configuration of code C, and this recognition is made by the AND circuit 1420 in FIG. 37. As a result the multipoint logic satellite control, as previously explained, provides positive signal levels on the control lines 157 (invert check), 158 (satellite active), and 163 (insert/remove control mode) during CB1 time, and positive signals are provided on the output lines 158 (satellite active), 165 (remove transmit), and 167 (remove terminal address) during CB2 time. The principal difference in the operation of the multipoint logic satellite control when station 1 is receiving (as previously explained) versus its operation when transmitting lies in the use of the AND circuits 1551 and 1552 in FIG. 41. When station 1 serves as a receive station, the AND circuit 1552 is activated to insert in the master control the positive control signal on the line 382 (receive terminal) at the beginning of a message, and this signal is removed at the end of the message. When station 1 serves as a transmitting station, the AND circuit 1551 is operated to cause the master control to insert a positive signal on the line 380 (transmit) at the beginning of a message and to remove this signal at the end of the message. Consequently, in this instance, the AND circuit 1551 in FIG. 41 must be operated, and its operation is now described. The AND circuit 1420 in FIG. 37 detects the presence of code C which is represented by positive signals on the input lines 260, 262, 264, 266, 269, 271, and 272. The remaining input lines 374 (new character) and 387 (not home mode) are energized with positive signals, and the AND circuit 1420 thus provides a positive output signal to the AND circuit 1422. The AND circuit 1422 receives positive input signals on the remaining input lines 380 (transmit) and 507 (CB2 pulse). A positive output signal from the AND circuit 1422 is supplied through the OR circuit 1554 in FIG. 41 to the AND circuit 1551. A positive output signal from the AND circuit 1551 is supplied on the line 165 (insert/remove transmit) via the cable 51 to the master control, and this positive control signal is effective to reset the latch 345 in FIG. 12, thereby removing the positive signal level on the line 380 and establishing a positive signal level on the line 381 (not transmit).

The keyboard satellite control 24 is accessed by the next positive S2 pulse, and the AND circuit 683 in FIG. 17 detects the presence of code C by the positive signals on the input lines 260, 262, 264, 266, 269, 271, and 272. The remaining input lines 507 (CB2 pulse) and 374 (new character) are energized with positive signal levels along with the one output of latch 760 in FIG. 20 which is positive, and a positive output signal from the AND circuit 683 is passed by the AND circuit 704 in FIG. 19 through the OR circuit 750 to the AND circuit 720 which in turn provides a positive output signal on the line 160 (insert/remove I/O ready) to the master control. The keyboard satellite control performs in the manner previously explained to establish positive signal levels on the output lines 158 (satellite active) and 162 (insert/remove new character) in FIG. 19.

Thus it is seen how station 1 serves as a transmitting station to send information to the master station (station 3). After the master station receives code C, it is then able to address other stations to receive or send information.

Let it be assumed for purposes of illustration that the master station transmits the following information in the order listed: code C, A, and 5. This indicates that station 1 is addressed, and the printer is selected for use at station 1. Station 1 performs in the manner previously explained. Let it be assumed for purposes of illustration that the printer, for whatever reason, is not available, and it supplies a negative output signal on the line 820 in FIG. 44. The master control provides positive signal levels, it may be recalled from earlier discussion, on the following output control lines: (1) 374 (new character), (2) 376 (control mode), (3) 378 (select I/O), (4) 382 (receive terminal), (5) 384 (terminal address). During the next positive S1 access pulse the AND circuit 1443 in FIG. 38 of the multipoint logic satellite control provides a positive output signal which is passed by the AND circuit 1445 along the line 1447 via the cable 51 in FIG. 41 to the diagnostic register 40 in FIG. 5. This causes code N (no) to be inserted in the diagnostic register and subsequently be transferred to the data register. The serdes subsequently receives this data from the data register and transmits it to the master station. During the second half (CB2 time) of the next positive S1 access pulse under consideration, the multipoint logic satellite control deselects station 1, and the events which take place are described next. The AND circuit 1475 in FIG. 39 receives a negative input signal on the line 383 (not receive terminal), and the AND circuit 1474 receives a negative signal on the input line 370 (I/O ready). Consequently, the OR circuit 1476 receives negative input signals on both of its input lines, and it supplies a negative signal to the inverter 1482 which in turn supplies a positive signal to the AND circuit 1477. The OR circuit 1480 in FIG. 39 receives a positive input signal on the line 382 (receive terminal) and it provides a positive output signal to the AND circuit 1478. The AND circuit 1479 in FIG. 39 receives positive input signals on the lines 371 (not I/O ready) and 382 (receive terminal). The AND circuits 1477, 1478, and 1479 receive a positive input signal from the AND circuit 1465 in FIG. 38. Consequently, the positive output signals from the AND circuits 1477 through 1479 are supplied through respective OR circuits 1567 in FIG. 42, 1554 in FIG. 41, and 1555 in FIG. 41 to respective AND circuits 1562 IN FIG. 42, 1551 in FIG. 41, and 1552 in FIG. 41. The AND circuits 1551 and 1552 in FIG. 41 and 1562 in FIG. 42 supply positive output signals on respective lines 165 (remove transmit), 166 (remove receive terminal), and 157 (invert check). The positive signals on the lines 165 and 166 serve to deselect station 1. In addition to the positive signals on the lines 157, 165, and 166, the multipoint logic satellite control provides positive control signals on the output lines 163 (remove control mode), 164 (remove select I/O), 158 (satellite active), and 162 (remove new character).

The master control responds to these positive control signals from the multipoint logic satellite control to reset the associated latches in FIGS. 11 and 12, thereby deselecting station 1.

Let it be assumed for purposes of illustration that the master station next transmits the following sequence of codes in the order listed: code C, A, and 1. These codes are received by station 1, and it is selected to transmit information from its keyboard. Let it be assumed for purposes of illustration that the keyboard, for whatever reason, is unavailable. This is signified by a negative signal level on the line 651 in FIG. 43. The negative signal on the line 651 inhibits the operation of the AND circuit 680 in FIG. 17, and the negative output signal from this AND circuit prevents setting of the allow select latch 730. Consequently, the keyboard is not selected, and a negative signal is supplied by the AND circuit 720 in FIG. 19 on the line 160 to the master control. This inhibits the master control from providing a positive output signal on the line 370 (I/O ready). The multipoint logic satellite control supplies a positive signal on the line 1447 to the diagnostic register 40 in FIG. 5, and this inserts the code N in the latches 100 through 106 and new character on line 162. Code N is next transferred to the data register, and subsequently it is transferred by the serdes to the master station, thereby signifying that station 1 is unavailable to transmit. When the multipoint logic satellite control is accessed next, it deselects station 1 by providing positive output signals during CB2 time on the control lines 162 (remove new character) and 165 (remove transmit) to the master control. Positive control signals are provided on other other control lines from the multipoint logic satellite control as earlier explained. In this instance it is necessary to inhibit the generation of a positive signal on the control line 157 (invert check) because a positive signal is established on the additional control line 165 (insert/remove transmit) from the multipoint logic satellite control. The AND circuit 1562 in FIG. 42 is deconditioned because the AND circuit 1475 in FIG. 39 receives positive input signals on the lines 383 (not receive terminal) and 371 (not I/O ready); it supplies a positive signal through the OR circuit 1476 to the inverter 1482; the inverter 1482 supplies a negative output signal which deconditions the AND circuit 1477; and its negative output signal is supplied through the OR circuit 1567 to the AND circuit 1562. The remaining inputs the OR circuit 1567 are likewise negative. Consequently, the AND circuit 1562 supplies a negative signal on the line 157 (invert check) to the master control.

The master station must transmit code C and deselect station 1 before it can select another station in the network of FIG. 1. Let it be assumed, therefore, for purposes of illustration that code C is transmitted by the master station. The code C is received from the transmission medium 13 in FIG. 2 by station 1, and it is deserialized by the serdes 22 in FIG. 2 under control of the serdes satellite control 26. The code C is placed in the data register of the master control, and it is recognized by the multipoint logic satellite control 23 when next it is accessed. The AND circuit 1420 in FIG. 37 detects the presence of code C in the data register by positive signal levels on the lines 260, 262, 264, 266, 269, 271, and 272. The remaining input lines 374 (new character) and 387 (not home mode) to the AND circuit 1420 are energized with positive signals. Therefore, the AND circuit 1420 provides a positive output signal to the AND circuit 1424 which receives positive input levels on the remaining input lines 507 (CB2 pulse) and 384 (terminal address). The AND circuit 1424 thus provides a positive output signal level through the OR circuit 1566 in FIG. 42 to the AND circuit 1561. The AND circuit in turn supplies a positive output signal on the line 167 (insert/remove terminal address) to the master control. It is pointed out that the AND circuit 1422 in FIG. 37 is deconditioned because the input line 380 (transmit) has a negative signal level, and the AND circuit 1423 is deconditioned because the input line 382 (receive terminal) has a negative signal level. Other events take place in the multipoint logic satellite control, but they are not repeated here since they were earlier explained. The deviation from the normal events is characterized above by the operation of the AND circuit 1424 and the deactivation of the AND circuits 1422 and 1423 in FIG. 37.

The foregoing illustration set forth the events which take place at station 1 when it is addressed by the master station to transmit, and station 1 is unable to transmit. The events which take place at station 2 are considered next. When the master station transmits code C, A, and 1, stations 1 and 2 each recognize code C, and each reacts in the same manner. Consequently, station 2 performs in the same manner as explained above with respect to station 1 when code C is received. Basically, all stations are deselected, and each is placed in control mode by code C. When code A is transmitted by the master station, station 1 is selected, but station 2 is not selected. Station 2, however, continues in the control mode. The events which release station 2 from the control mode status are described next.

When station 1 is addressed, it responds with a yes or no answer to the master station as explained earlier. The transmission from station 1 to the master station with a yes or no response is received by station 2, and the response is deserialized by the serdes 22 in station 2 and transferred to the data register 43. The yes or no response in the data register 43 is supplied to the multipoint logic satellite control 23 at station 2 when it is accessed next. A yes response is detected by the AND circuit 1470 in FIG. 39 at station 2, and a no response is detected by the AND circuit 1471 in FIG. 39 of station 2

When either of these AND circuits is operated, a positive signal is supplied through the OR circuit 1472 in FIG. 39 of station 2 to the AND circuit 1473. In this case code N (no response) is received at station 2, and the AND circuit 1471 responds to code N and supplies a positive signal through the OR circuit 1472 to the AND circuit 1473. The AND circuit 1473 at station 2 receives positive input signals on the remaining input lines 381 (not transmit), 376 (control mode), 374 (new character), and 507 (CB2 pulse). Consequently, the AND circuit 1473 supplies a positive signal through respective OR circuits 1553, 1567, and 1568 to corresponding AND circuits 1550, 1562, and 1563. Positive control signals are thus supplied on lines 157 (invert check), 158 (satellite active), and 163 (insert/remove control mode) via the cable 51 to the master control at station 2. Since these signals are supplied at CB2 time to the master control, the positive signal on the line 163 is effective to reset the latch 343 in FIG. 12, thereby placing the master control at station 2 in the not control mode status. The AND circuits 1541 and 1542 in FIG. 41 receive the respective code Y and code N which are supplied to the corresponding AND circuits 1470 and 1471 in FIG. 39. A positive output signal from either the AND circuit 1541 in FIG. 41 or the AND circuit 1542 is supplied through the OR circuit 1528 in FIG. 40 to the AND circuit 1529. The AND circuit 1529 is activated by positive signals on the remaining input lines 507 (CB2 pulse) and from the AND circuit 1540. The AND circuit 1540 receives positive signal levels on the input lines 374 (new character), 376 (control mode), and the zero output side of the latch 1448 in FIG. 38. Therefore, the AND circuit 1529 in FIG. 40 provides a positive output signal to the OR circuit 1512 which in turn provides a positive signal to the inverter 1513. The inverter 1513, however, provides a negative output signal to the AND circuit 1514 which in turn provides a negative output level on the line 159 (satellite inactive) to the master control. Thus it is seen that the multipoint logic satellite control at station 2 continues in the not control mode status until code C is received again.

It is appropriate at this point to summarize the functions of the various satellite controls in terms of the commands they can insert in the master control as well as commands they may receive from the master control. For this purpose they are tabulated in Table 3 below:

TABLE 3

| Satellite control | Insert | Remove |
| --- | --- | --- |
| Multipoint logic Satellite control | Control mode<br>Transmit<br>Terminal addressed<br>Select I/O<br>Receiving terminal<br>New character<br>Character request<br>Data (Y)<br>Data (N) | Control mode.<br>Transmit.<br>Terminal addressed.<br>Select I/O.<br>Receiving terminal.<br>New character. |
| Keyboard Satellite (Input) Control | I/O ready<br>New character<br>Data | I/O ready.<br>New character. |
| Printer Satellite (Output) Control | I/O ready<br>Character required | I/O ready.<br>Character required. |
| Serdes Satellite (Line I/O) Control | New character<br>Character required<br>Data | New character.<br>Character required. |

The latches 340 through 347 in FIGS. 11 and 12 define the commands which may be inserted in the master control or removed therefrom. A command is inserted by setting a particular latch, and it is removed by resetting such latch. The various commands are defined below by way of summary. The full title of each command is given along with the abbreviated title which is used as the legend in the drawings.

A. I/O Ready (I/O Rdy.)

This bit position when set is used to indicate to all other satellite controls that a particular input or output device is capable of operation.

B. Character Request (Char. Req.)

The character request bit is set by the satellite controls. It is reset by any output device that is selected and has no need for a new character. An input device looks for this bit to determine if the central unit requires a new character.

C. New Character (New Char.)

This bit position is set by any satellite control when it or its associated device inserts data in the master control. It is used to indicate the presence of a new character in the central unit. It is reset by the inserting satellite control during its next access cycle, thereby assuring all satellite controls an opportunity to see the new character.

D. Control Mode (Ctrl. Mode)

This position designates the information in the central unit as data and the control required for terminal selection. It is manipulated by the line control satellite.

E. Select I/O (Sel. I/O)

The various I/O devices recognize this bit as a signal in conjunction with numeric data to turn on their select latches. It is inserted by any satellite which requires an I/O device selection.

F. Transmit (TSM)

When present, this bit indicates that the terminal is sending a character to a remote terminal. It is used by the satellite controls to inform the serdes to transmit the character in the central unit.

G. Receiving Terminal (Rec. Term.)

The status of the terminal is indicated independently of answer back characters or sequences by this bit. The transmit bit position shows the terminal status for single characters by way of contrast.

H. Terminal Address (Term. Add.)

This bit position is used to indicate that the terminal has been addressed or polled.

Figure 45:
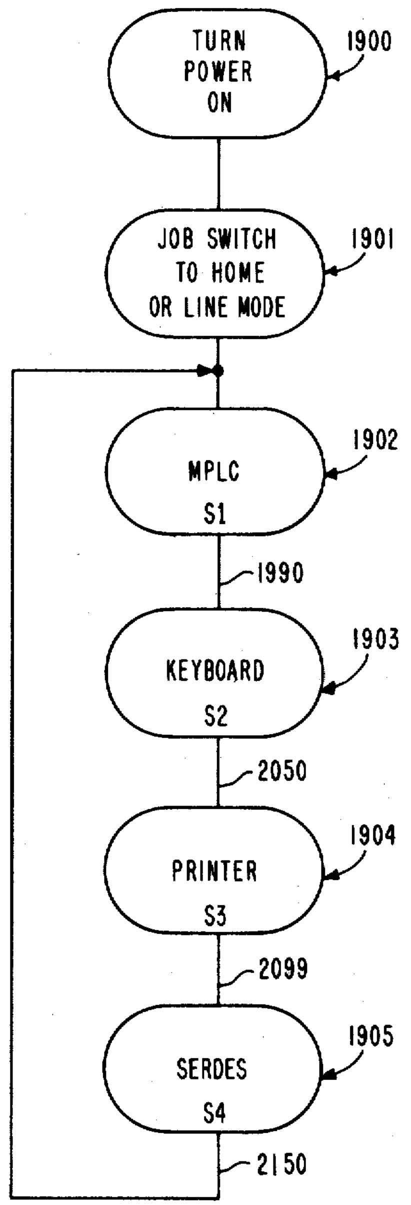
FIGS. 45 through 49 are flow charts which are helpful in explaining the operation of each terminal shown in block form in FIG. 2.

Next the operation of the system in FIG. 2 is discussed with respect to flow charts in FIGS. 45 through 49. Referring first to FIG. 45, the basic functions of the overall system are shown by the blocks 1900 through 1905. Once the power is turned on, as represented by the block 1900, the next step is to turn the job switch 388 in FIG. 12 to the home mode or the line mode. This step is represented by the block 1901. The operation of each satellite control in the home mode may vary from operations in the line mode. The master control at each station addresses the multipoint logic satellite control, represented by the block 1902 in FIG. 45, with a positive S1 pulse, and the various routines performed by the multipoint logic satellite control are outlined in FIG. 46.

Figure 47:
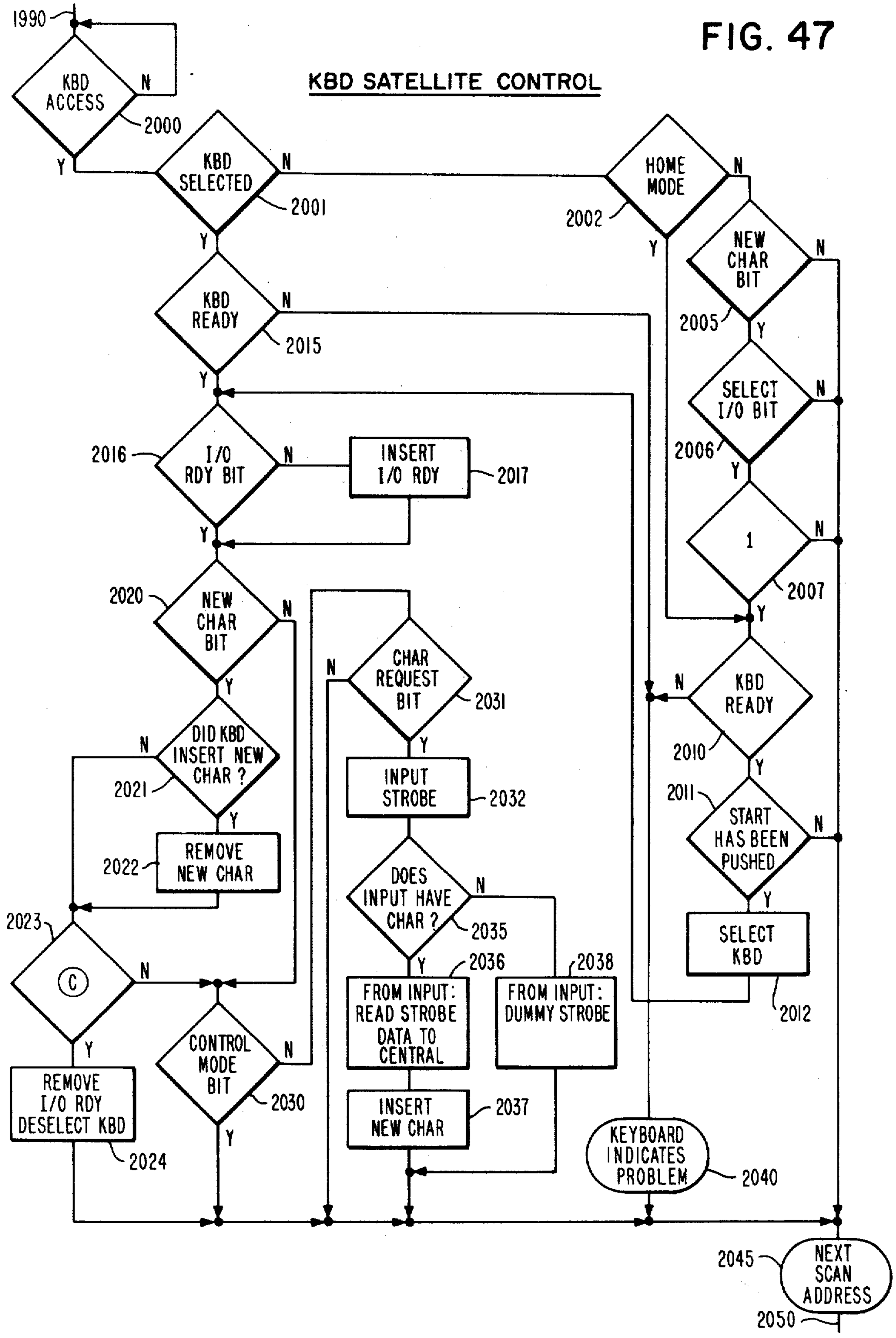
Figure 48:
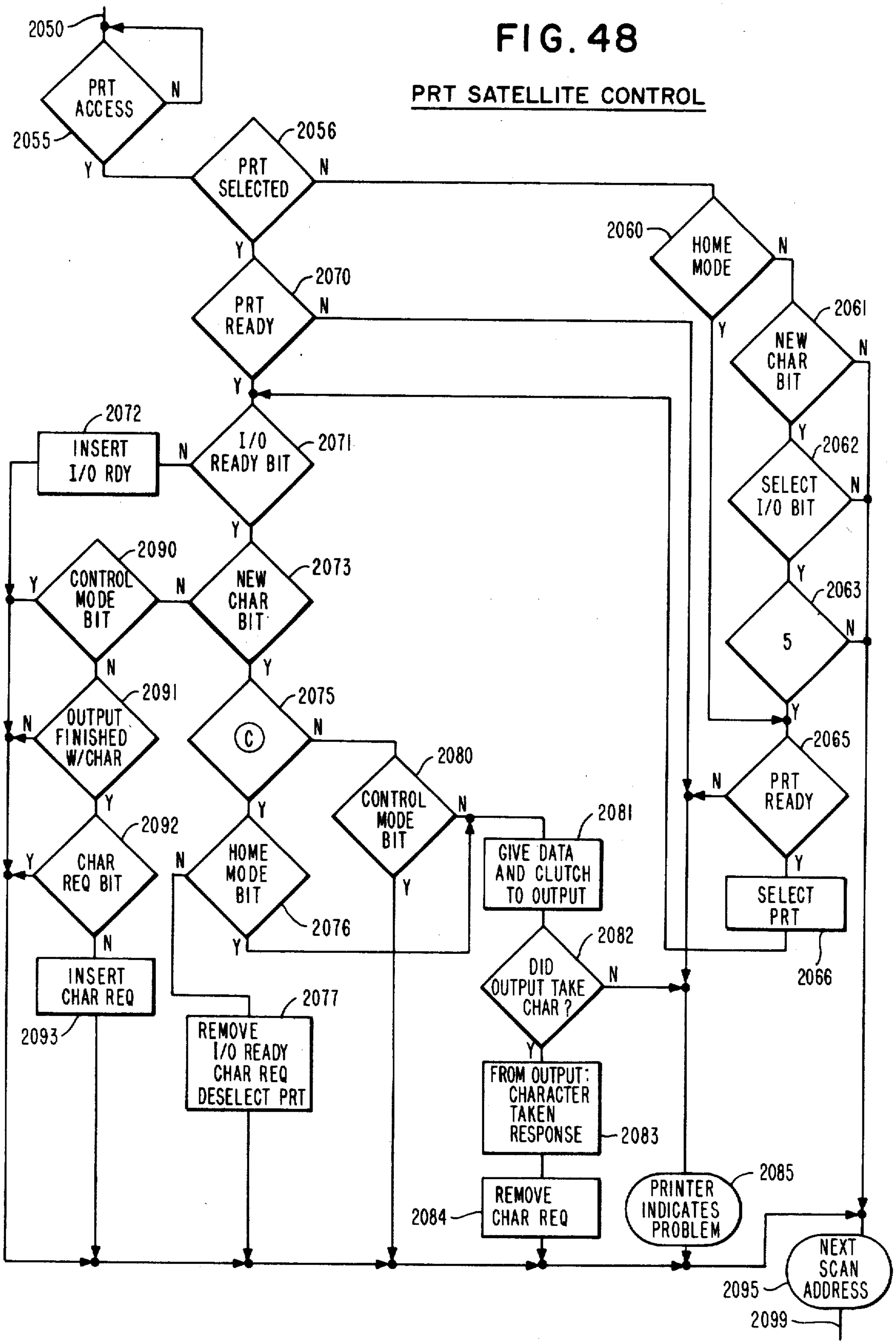
Figure 49:
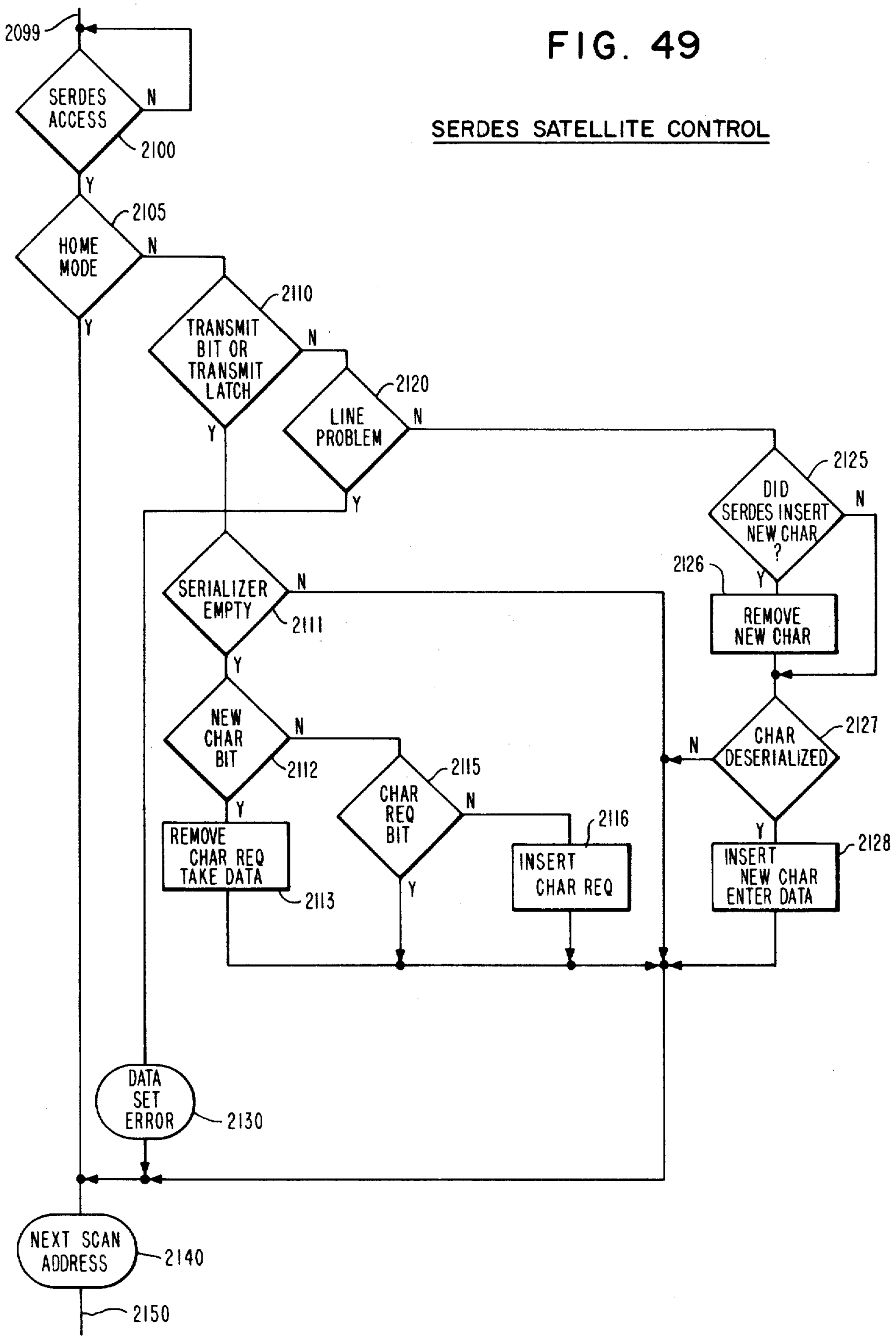

The keyboard satellite control, represented by the block 1903 in FIG. 45, is accessed by a positive S2 pulse, and the routines it performs are illustrated in FIG. 47. The printer satellite control, represented by the block 1904 in FIG. 45, is accessed by a positive S3 pulse, and the routines it performs are illustrated in FIG. 48. The serdes satellite control, represented by the block 1905 in FIG. 45, is accessed by a positive S4 pulse, and the routines it performs are illustrated in FIG. 49. It is pointed out that power may be cut off at any point in the operating cycle outlined in FIG. 45. However, the power on sequence is the important one because initialization is required, and under the power on conditions the first access pulse is a positive S1 pulse.

Figure 46:
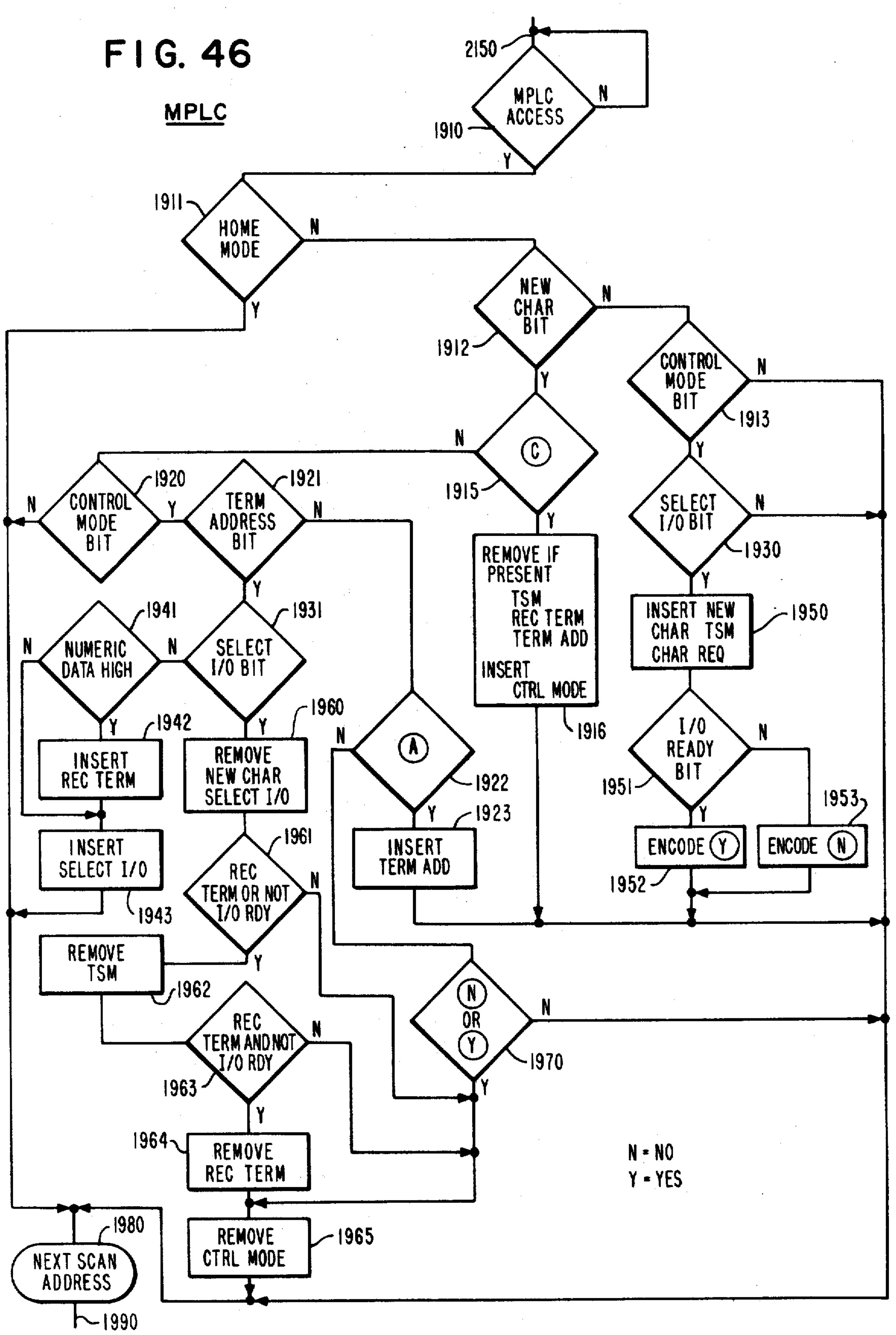

Reference is made next to FIG. 46 for a discussion of the flow chart for the multipoint logic satellite control 23 shown in block form in FIG. 2. A prerequisite for the activation for the multipoint logic satellite control is the presence of a positive S1 pulse, and this function is indicated by the block 1910. If a positive S1 pulse is not present, an exit from the block 1910 is made via the N exit point which signifies no or negative. If a positive S1 access pulse is present, the exit from the block 1910 is made via the Y exit point to the block 1911 which determines the mode of operation. The mode of operation is determined by the job switch 388 in FIG. 12. If this switch is in the home mode position, the exit from the block 1911 is from the Y output to the block 1980 labeled next scan address. It is readily seen that the multipoint logic satellite control performs no activities if the terminal is in the home mode of operation. If the job switch is set to the line mode of operation, the exit from the block 1911 in FIG. 46 is made via the N exit to the block 1912 labeled new character bit. If a new character bit is present an exit is made from the block 1912 to the block 1915 labeled code C. If a code C is present an exit is made to the block 1916 where deselection of the terminal is accomplished which includes the following steps: (1) If the transmit bit is present, it is removed. (2) If the receive terminal bit is present, it is removed. (3) If the terminal address bit is present, it is removed. (4) Insert the control mode bit. After this action is taken the exit from the block 1916 is made to the block 1980 (next scan address). Referring again to the block 1912, if the new character bit is present, an exit is made to the block 1913 labeled control mode bit. If there is no control mode bit, an exit is made to the block 1980 (next scan address). The Y (yes) exit of the block 1920 is considered subsequently.

Referring again to the block 1915, if code C is not present, then an exit is made to the block 1920 labeled control mode bit. If there is a control mode bit, an exit is made to the block 1921 labeled terminal address bit. If the terminal address bit is not set, an exit is made from the block 1921 to the block 1922 labeled code A. It is presumed for purposes of this discussion that the flow chart in FIG. 46 applies to station 1 since this station is addressed by code A. Each of the remaining stations would have its particular address code indicated in the block 1922. If code A is present in the block 1922, an exit is made to the block 1923 labeled insert terminal address. An exit from the block 1923 is made to the block 1980 (next scan address). If a terminal address bit is present in the block 1921, an exit is made to the block 1931 labeled select I/O bit. If a select I/O bit is not present, an exit is made to the block 1941 labeled numeric data high. If the numeric data in the data register is high, an exit is made from the block 1941 to the block 1942, and the receive terminal bit is inserted in the master control. The exit from the block 1942 is to the block 1943 which signifies that the select I/O bit is next inserted. Once this is done, an exit is made from the block 1943 to the block 1980 (next scan address). When the numeric data bit is high, the select I/O bit is not present, and the terminal address bit is present, this indicates that the selected station is being requested to receive data from a remote station. If the block 1941 does not have numeric data high, then an exit is made directly to the block 1943, thereby bypassing the block 1942. This indicates that the selected station is being requested to transmit data to a remote station, or it indicates that the selected station is being interrogated to determine whether or not it wishes to transmit data.

Referring again to the block 1913, an exit is made to the block 1930, labeled select I/O bit, if the control mode bit is set. If the select I/O bit is not set, an exit is made to the block 1980 (next scan address). If the select I/O bit is set, an exit is made from the block 1930 to the block 1950, and the following actions are taken: (1) Insert new character bit, (2) insert transmit bit, and (3) insert character request bit. An exit from the block 1950 is made to the block 1951, labeled I/O ready bit, and if this bit is set, an exit is made to the block 1952 which causes code Y to be sent to the master control, and an exit is made to the block 1980. If the I/O ready bit is not set, an exit is made from the block 1951 to the block 1953 which causes code N to be sent to the master control, and an exit is made from the block 1953 to the block 1980.

Let it be assumed that station 1 is in the line mode, the new character bit is set, and the new character is not code C. During the next positive S1 access pulse the multipoint logic satellite control proceeds in FIG. 46 from the block 1910 through the block 1911 to the block 1912 and then through the block 1915 to the block 1920. From the block 1920 the route is through the blocks 1921, 1931, and to the block 1960. The block 1960 signifies that the new character bit, inserted in the previous access period, is reset, and the select I/O bit is reset. Let it be assumed further at this point that station 1 is selected to receive and the output device (printer) is ready to receive data. In this case an exit is made from the block 1961 to the block 1962 where the transmit bit is reset, and an exit is made to the block 1963. Since the I/O ready bit is set, under the assumed conditions, an exit is made from the block 1963 to the block 1965 where the control mode bit is reset, and an exit is made to the block 1980.

Let it be assumed with respect to the block 1961 that station 1 has the transmit bit set and the I/O ready bit set. In this case an exit is made from the block 1961 to the block 1965 where the control mode bit is reset, and an exit is made to the block 1980.

Let it be assumed with respect to the block 1961 that station 1 has the receive terminal bit set and the I/O ready bit is reset. Then an exit is made to the block 1962 where the transmit bit is reset, and an exit is made through the block 1963 to the block 1964 where the receive terminal bit is reset. An exit from the block 1964 is made to the block 1965 where the control mode bit is reset, and an exit is made to the block 1980.

Let it be assumed with reference to the block 1961 that station 1 has its transmit bit set and the I/O ready bit is reset. In this case an exit is made from the block 1961 to the block 1962 where the transmit bit is reset. An exit is made from the block 1962 through the block 1963 to the block 1965 where the control mode bit is removed, and an exit is made to the block 1980.

The foregoing discussion covers the situations where station 1 is addressed in the various conditions as follows: (1) receiving terminal with the I/O device ready, (2) transmit terminal with the I/O device ready, (3) receiving terminal with the I/O device not ready, and (4) transmit terminal with the I/O device not ready. A situation not covered is the case where terminal 1 is not addressed. In this instance the route through FIG. 46 is through the blocks 1910, 1911, 1912, to the block 1915. If a code C is not received, an exit is made through the block 1920 to the block 1980. As long as code C is not received this path is repeated. When code C is ultimately received, however, an exit is made through the block 1916 where the indicated functions are performed and an exit is made to the block 1980 in one access cycle, and during the next access cycle with the new character bit on, an exit is made from the block 1915 through the block 1920 to the block 1921. Since station 1 is not addressed, under the assumed conditions, an exit is made to the block 1922. Since station 1 is not addressed, code A is not present in the block 1922, and an exit is made to the block 1970 where station 1 looks for the response code N or code Y from the addressed remote station. If the remote station makes no response or if the addressed remote station makes a response but station 1 does not receive it, then an exit is made from the block 1970 to the block 1980. If station 1 receives either code N or code Y from the addressed remote station, then an exit is made from the block 1970 to the block 1965 which resets the control mode bit and exits to the block 1980. Thereafter, until code C is received, the route in FIG. 46 for station 1 for each scan of the multipoint logic satellite control is through 1910, 1911, 1912, 1915, 1920, and 1980 for normal data transfer operations not in the control mode. By way of summary it is pointed out that the multipoint logic satellite control goes into control mode upon recognition of code C, and it stays in control mode until one of the following conditions occurs: (1) it receives a response from an addressed remote station, or (2) if it is addressed, it gives its response to the master station and resets the new character bit on the next positive S1 access pulse after giving the response to the master station.

Reference is made next to FIG. 47 for a discussion of the flow chart for the keyboard satellite control 24 shown in block form in FIG. 2. A prerequisite for activation of the keyboard satellite control is the presence of a positive S2 access pulse, and the presence of such pulse is indicated by the Y exit of the block 2000 in FIG. 47. If a positive S2 pulse is not present, the N exit is made, signifying deactivation of the keyboard satellite control. When a positive S2 pulse is present, an exit is made from the block 2000 to the block 2001 labeled keyboard selected. If the keyboard is not selected, an exit is made to the block 2002 labeled home mode.

The operation in the home mode is described next. When in the home mode, the keyboard satellite control exits from the block 2002 to the block 2010. If the keyboard is not ready, an exit is made from the block 2010 to the block 2040 and this indicates an electrical or mechanical fault in the keyboard. If the keyboard is ready, an exit is made from the block 2010 to the block 2011. If the start button has not been operated, an exit is made from the block 2011 to the block 2045 labeled next scan address. If the start button has been operated on the keyboard, an exit is made from block 2011 to the block 2012 which causes the keyboard to be selected. An exit is made from the block 2012 to the block 2016 which is discussed subsequently.

Referring again to the block 2002, an exit is made to the block 2005 when the job switch 388 in FIG. 12 is placed in the not home mode (line) position. If the new character bit is set an exit is made from the block 2005 to the block 2006. If the select I/O bit is set, an exit is made from the block 2006 to the block 2007. If a code 1 is in the data register of the master control, indicating that the keyboard should be selected, an exit is made from the block 2007 to the block 2010. It is pointed out with respect to the blocks 2005 through 2007 that if the new character bit is reset, if the select I/O bit is reset, or if code 1 is not presented in the data register, then in any one of these cases an exit is made to the block 2045 (next scan address). Thus, if anyone of these conditions is not met, the keyboard cannot be selected in the line mode. On the other hand, if the job switch is in the home mode, the keyboard can be selected provided the keyboard is ready as indicated by the block 2010 and the start button has been operated as indicated by the block 2011. The selection of the keyboard is indicated by the block 2012.

Referring again to the block 2016, if the I/O ready bit is set, an exit is made to the block 2020, but if the I/O ready bit is reset, an exit is made from the block 2016 to the block 2017. The I/O ready bit is set, and an exit is made from the block 2017 to the block 2020. During subsequent positive S2 access pulses an exit is made from the block 2000 through the block 2001, since the keyboard is selected, and through the block 2015, if the keyboard is ready, to the block 2016. In the event the keyboard is not ready, an exit is made from the block 2015 to the block 2040 thereby indicating a deficiency of a mechanical or electrical nature in the keyboard. An exit is made from the block 2040 to the block 2045.

Next the data insertion characteristics of the keyboard are considered. For this purpose reference is made again to the block 2020. If the new character bit is reset, an exit is made from the block 2020 to the block 2030 where the control mode bit is examined. If the control mode bit is set, an exit is made from the block 2030 to the block 2045, and no further action takes place during the current access. If the control mode bit is reset, an exit is made from the block 2030 to the block 2031 where the character request bit is examined. If either the serdes 22 or the printer 21 (FIG. 2) needs a character, the character request bit is set. In this event an exit is made from the block 2031 in FIG. 47 to the block 2032. A positive command signal "input strobe" is issued by the keyboard satellite control on the line 657 in FIG. 20 to the keyboard 20 in FIG. 2 as previously explained. The "input strobe" signal interrogates the keyboard to determine if a key has been depressed. If not, an exit is made from the block 2035 through the block 2038, which provides a "dummy strobe" signal for reasons earlier explained, to the block 2045. If the keyboard has a character, as indicated by depressed key, then an exit is made from the block 2035 to the block 2036 where the following functions are performed: (1) the keyboard issues a "read strobe" signal on the line 655 in FIG. 43 to the keyboard satellite control as earlier explained, and (2) the keyboard forwards data signals on the lines 150 through 156 in FIG. 43 to the master control. The exit from the block 2036 is through the block 2037 to the block 2045. The block 2037 causes the keyboard satellite control to set the new character bit in the master control. It is pointed out with respect to the blocks 2036 and 2038 that the keyboard always gives a response which is either "dummy strobe" if no character is available, or "read strobe" if a character is available. This response is given to the keyboard satellite control as earlier explained. In the event no output device requires a new character, then the exit from the block 2031 is made directly to the block 2045.

If the keyboard satellite control sets a new character bit in the master control during one access period, then it must reset the new character bit during the next access period. Referring again to the block 2020, if the new character bit is set, an exit is made to the block 2021. The keyboard satellite control remembers whether or not it set the new character bit. If so, an exit is made from the block 2021 through the block 2022 to the block 2023, and the new character bit is reset in the process. If the keyboard did not insert the new character bit during the preceeding access period, an exit is made from the block 2021 directly to the block 2023. If code C is not present in the data register, an exit is made to the block 2030, and if the control mode bit is reset, an exit is made from the block 2030 to the block 2031 as previously explained. If the control bit is set, an exit is made from the block 2030 to the block 2045. If Code C is present in the data register, an exit is made from the block 2023 to the block 2024, and the following functions are performed: (1) the I/O ready bit is reset, and (2) the keyboard is deselected. An exit is made from the block 2024 to the block 2045.

Reference is made next to FIG. 48 for a discussion of the flow chart concerning the printer satellite control 25 shown in block form in FIG. 2. A prerequisite for activation of the printer satellite control is the presence of a positive S3 pulse, and this is indicated by the block 2055 in FIG. 48. When a positive S3 pulse is present an exit is made from the block 2055 to the block 2056. If the printer is not selected, an exit is made from the block 2056 to the block 2060. If the job switch 388 in FIG. 12 is set to the home mode position, then an exit is made from the block 2060 in FIG. 48 to the block 2065. If the printer is ready, an exit is made from the block 2065 to the block 2066, and the printer is selected. If the printer is not ready, an exit is made from the block 2065 to the block 2085 which indicates a mechanical or electrical deficiency. An exit from the block 2085 is to the block 2095 labeled next scan address. When the printer is selected, an exit is made from the block 2066 to the block 2071.

Next the operations in the line mode are discussed. In the line mode (not home mode) an exit is made from the block 2060 to the block 2061, and if the new character bit is set, an exit is made to the block 2062. If the select I/O bit is set, an exit is made from the block 2062 to the block 2063. If the code 5 is in the data register, an exit is made from the block 2063 to the block 2065. If anyone of the blocks 2061 through 2063 yields a negative response, then an exit is made to the block 2095, and no further action is taken by the printer satellite control during this access period. Stated alternatively, each of the conditions specified in the blocks 2061 through 2063 must be affirmatively met for the printer to be selected in the line mode. An exit from the block 2063 is made to the block 2065, and if the printer is ready, it is selected by the block 2066. An exit is made through the block 2071 to the block 2072 where the I/O ready bit is inserted.

If the positive S3 access pulse from the block 2055 finds the printer selected in the block 2056, an exit is made to the block 2070. If the printer is ready, an exit is made from the block 2070 to the block 2071. If the printer is not ready, an exit is made from the block 2070 to the block 2085, thereby indicating an electrical or mechanical deficiency. If the printer satellite control finds the I/O ready bit is set, an exit is made from the block 2071 to to the block 2073.

Next the manner in which the printer requests a new character is discussed. If the new character bit is reset, an exit is made from the block 2073 to the block 2090. If the control mode bit is set, an exit is made from the block 2090 to the block 2095. If, however, the control mode bit is reset, an exit is made from the block 2090 to the block 2091. If the printer has not finished printing a previous character supplied to it, an exit is made from the block 2091 to the block 2095, and no further action is taken by the printer satellite control during the current access time. If the printer has finished printing a character previously supplied to it, it is ready for a new character, and an exit is made from the block 2091 to the block 2092. If the printer satellite control has not yet set the character request bit, an exit is made from the block 2092 to the block 2093, and the character request bit is set during the current positive S3 access pulse. When the character request bit is examined by the block 2092, an exit is made therefrom to the block 2095 if the character request bit is set. It is pointed out that the positive S3 access pulses occur at a rate which is relatively much greater than the print cycle of the printer. Therefore, many access cycles may occur before the printer has finished printing a character previously supplied to it. Alternatively, many access cycles may take place before an input device, such as the keyboard or the serdes, is ready to supply data to the data register for a print out operation by the printer.

Next the technique by which the printer takes a character is discussed. If the new character bit is set, an exit is made from the block 2073 to the block 2075 in FIG. 48. If the information in the data register of the master control is not code C, an exit is made from the block 2075 to the block 2080. If the control mode bit is set, an exit is made from the block 2080 to the block 2095, and no further action is taken during such access time. If the control mode bit is reset, an exit is made from the block 2080 to the block 2081. The printer satellite control supplies converted data and a positive output "clutch" signal to the printer, and this is indicated by the block 2081. An exit from the block 2081 is made to the block 2082. If the printer, for whatever reason, is unable to accept a character at this time, an exit is made from the block 2082 to the block 2085, thereby indicating an electrical or mechanical deficiency in the printer. If, however, the printer is able to take the available character, an exit is made from the block 2082 to the block 2083. When the printer takes a character, it supplies a positive signal "character taken response" back to the printer satellite control. When the "character taken response" is given to the printer satellite control, an exit is made from the block 2083 to the block 2084. The character request bit is reset, and an exit is made from the block 2084 to the block 2095. It is pointed out by way of summary that each action signal supplied to the printer is answered by a reaction signal. The printer provides a signal "character taken response" as a reaction to the "clutch" signal from the printer satellite control. It is pointed out further that the printer sets the character request bit (block 2093) and resets the character request bit (block 2084), and these actions take place in different access cycles.

When code C is detected by the printer satellite control, an exit is made from the block 2075 to the block 2076. If the home mode bit is set, an exit is made from the block 2076 to the block 2081. The functions set forth in the blocks 2081 through 2084 are performed, but the printer does not print a character. It merely terminates the printing operation.

If the home mode bit is reset, an exit from the block 2076 is made to the block 2077, and the printer satellite control performs as follows: (1) resets the I/O ready bit, (2) resets the character request bit, and (3) deselects the printer. The exit from the block 2077 is made to the block 2090.

It is pointed out by way of summary that the printer satellite control requests a data character by the setting of the character request bit. When the new character bit is set by the keyboard or serdes, it indicates the presence of a new data character or a control code in the data register. Such data character or control code is supplied to the printer along with a positive "clutch" signal, and the printer responds by taking the character and returning a "character taken response" signal to the printer satellite control.

Reference is made next to FIG. 49 for a discussion of the flow chart for the serdes satellite control 26 shown in block form in FIG. 2. A prerequisite for activation of the serdes satellite control is the presence of a positive S4 access pulse, as depicted by the block 2100 in FIG. 49. If the positive S4 access pulse is not present, a departure from the block 2100 is made by the exit N, and the serdes satellite control is not activated. If a positive S4 access pulse is present, an exit is made from the block 2100 to the block 2105. If the job switch 388 in FIG. 12 is set to the home mode position, an exit is made from the block 2105 to the block 2140, signifying that no further action is taken during this access pulse. In essence the serdes satellite control is inactive when the job switch is set in the home mode position.

When the job switch is set in the line mode (not home mode), an exit is made from the block 2105 to the block 2110. If the transmit bit is set, an exit is made from the block 2110 to the block 2111. In this case the serdes serves as an output device. If the serdes is in the process of serially shifting data out to the transmission medium 13 in FIG. 2, then an exit is made from the block 2111 to the block 2140, and the serdes satellite control takes no further action during this access pulse. If the serdes is empty, it is ready to receive another data character, and an exit is made from the block 2111 to the block 2112. If there is no new character waiting in the data register, as indicated by the setting of the new character bit, an exit is made from the block 2112 to the block 2115. If the character request bit is not set, an exit is made from the block 2115 to the block 2116, and the serdes satellite control sets the character request bit and exits to the block 2140. If the character request bit in block 2115 is set, an exit is made to block 2140.

When an input device places a new character in the data register of the master control, its associated satellite control sets the new character bit in the control register of the master control. Thus, when the serdes is accessed, an exit is made from the block 2112 in FIG. 49 to the block 2113. The serdes receives the data, and the serdes satellite control resets the character request bit. In this mode of operation the serdes performs as an output device, and it requests data, when needed, by operating the serdes satellite control to set the character request bit.

Whenever the serdes 22 in FIG. 2 receives data from a remote station, an exit is made from the block 2110 to the block 2120. If there is no problem in the transmission medium 13 in FIG. 2, an exit is made from the block 2120 to the block 2125 in FIG. 49. The serdes now serves as an input device. The serdes satellite control remembers whether or not the new character bit in the control register was set earlier. If so, an exit is made from the block 2125 to the block 2126. The new character bit is reset, and an exit is made from the block 2126 to the block 2127. If the serdes satellite control did not set the new character bit in the control register beforehand, an exit is made from the block 2125 directly to the block 2127. If an incoming character is completely shifted into the serdes, the serdes is full, and an exit is made from the block 2127 to the block 2128. The new character bit is inserted by the serdes satellite control, and the data in the serdes is transferred to the data register of the master control. Then an exit is made from the block 2128 to the block 2140. If the incoming character is partly shifted into the serdes, then an exit is made from the block 2127 to the block 2140, and no further action is taken by the serdes satellite control during this access pulse.

It has been assumed for the illustrations hereinbefore that in the system of FIG. 2 an output device has a higher data rate capability then then data rate capability of the transmission medium 13 and that an input device has a data rate capability which is lower than the data rate capability of the transmission medium 13. This insures that the terminal in FIG. 2 is always ready to receive data from the serdes whenever the serdes has a character available. When receiving, the terminal in FIG. 2 is able to detect line problems by a standard data set, not shown, which is presumed to be included as part of the transmission medium 13. If there is a line problem in the transmission medium 13, an exit is made from the block 2120 to the block 2130 in FIG. 49. The transmission medium 13 indicates its own errors, and this is signified by the block 2130. An exit from the block 2130 is made to the block 2140, signifying no further action is taken by the serdes satellite control during the current access pulse. Thus it is seen that the serdes serves as an input device when the terminal in FIG. 2 is receiving, and the serdes serves as an output device when the terminal in FIG. 2 is transmitting. It is pointed out with respect to FIG. 45 that the various satellite controls represented by the blocks 1902 through 1905 are accessed in sequence as indicated by the interconnecting lines 1990, 2050, 2099, and 2150. These satellite controls are repetitively sequenced in the manner previously described.

From the foregoing description the operation of the system according to this invention has been presented with the underlying assumption that all circuits work properly. If all of the circuits work correctly at all times, then the system performs in the manner described above. It is a feature, however, of this invention to provide diagnostic techniques whereby error signals may be developed to indicate circuit malfunctions as well as data errors. The objective is to provide 100 percent detection of abnormal operations. This is accomplished by using various fundamental guide lines or ground rules in constructing the system, and such basic rules and variations thereof, as incorporated in the system of this invention are discussed next.

As explained above with respect to the operation of the system in FIG. 2, the interface between each satellite control and the master control has an odd number of lines which are energized with positive signals during error-free operation. By this technique the master control is able to detect any condition which causes a change from odd parity to even parity. It is pointed out that two errors occurring simultaneously might create a situation which could not be detected by a parity check in the master control. In order to minimize this possibility the relationship of the control circuitry within each of the various satellite controls is arranged so that each output line is connected to an odd number of input connections. The result is to create an intercircuit arrangement whereby if a given circuit should malfunction, an odd number of succeeding circuits are affected, thereby causing an odd number of events to take place or not take place, as the case may be, on the interface lines between the associated satellite control and the master control. This provides 100 percent detection by the master control of single errors resulting from a malfunction. Statistically the likelihood of double errors occurring simultaneously is very low. However, such errors may be detected in the system of this invention if the two malfunctions are not related. As illustrated subsequently two circuits are related when one checks the other i.e. when one operates, the other does not, and vice versa. It is pointed out that certain errors may nevertheless be detected even in this situation as explained more fully hereinafter. Therefore, the probability of detecting malfunctions even in the worst case is accordingly increased in the diagnostic system arrangement according to this invention.

Reference is made next to the printer satellite control in FIGS. 22 through 25 for a discussion of the foregoing diagnostic techniques. First, the technique of having each output line go to an odd number of input connections is described. Referring to FIG. 22, the AND circuits 800, 801, 804, and 805 each has its output line connected to an odd number of inputs. For example, the AND circuit 800 has its output connected to the OR circuit 809. Since its output is connected to a single input, this is consistent with the basic rule that each output should be connected to an odd number of inputs. Likewise, the AND circuit 801 has its output connected to a single input. The output of the AND circuit 804 is connected to three inputs which are the OR circuits 841 through 843 in FIG. 24. The output of the AND circuit 805 is likewise connected to an odd number of inputs, and they are the OR circuits 841 through 843 in FIG. 24. Many of the logic circuits have their single output line connected to a single input. In this category are included the logic circuits 809, 824, 830, 831, 833 through 835, 840 through 843 and 857 in FIG. 24 and the logic circuits 836 through 839, and 880 through 883 in FIG. 25.

The AND circuit 802 in FIG. 22 is a special case since its output is connected to an even number of inputs, and it is discussed next. The output of the AND circuit 802 is supplied as an input to four other circuits which are the logic circuits 824 and 833 through 835. This appears to deviate from the basic premise that each output line must be connected to an odd number of input lines. However, it is pointed out that the basic function of the AND circuit 802 is to operate the AND circuits 833 through 835 which constitute an odd number. The fourth or even input from the AND circuit 802 is supplied to the AND circuit 824 which in turn resets the select latch 810, and the zero output side of this latch is supplied to all three of the AND circuits 833 through 835. In essence the AND circuit 824 must operate before the AND circuits 833 through 835 can be operated. Therefore, if the AND circuit 824 malfunctions, the AND circuits 833 through 835 are not operated, and this causes in effect an odd number of deviations. More specifically, these three output lines from the AND circuits 833 through 835 provide three distinct negative signals to their associated OR circuits 842, 843, and 840 at a time when these levels should be positive. Therefore, negative signals are established on the output lines 158, 160, and 161 when these levels should be positive. The negative level on the satellite active line 158 is supplied to the master control simultaneously as a negative level is supplied to the master control on the satellite inactive line 159. Consequently, all interface lines between the printer satellite control and the master control are negative, and the master control detects this even parity condition in the manner previously explained. Therefore, the master control detects this error and sends a positive signal on the lines 389 and 390. More specifically, the latches 107 through 117 in FIGS. 7 and 8 all remain in the reset condition, and the VRC 45 in FIG. 6 detects a parity error and forwards a positive signal on the line 540 through the OR circuits 541 and 542 in FIG. 10 to the associated lines 389 and 390. The positive signals on the lines 389 and 390 are conveyed via the cable 47 to the AND circuits 885 and 886 in FIG. 25 at CQ4 time of the CB2 portion of the S3 pulse. This causes the latches 887 and 888 to be set to the one state, thereby lighting the indicator lamps 410 and 411. Thus it is seen how a malfunction of the AND circuit 824 causes the master control to indicate an error to the printer satellite control. It should be pointed out further that if the AND circuit 824 in FIG. 24 operates correctly but the select latch 810 does not operate correctly, then the same result follows. That is, the master control signals an error to the printer satellite control in the manner just pointed out.

An AND circuit 855 in FIG. 24 is used to signal the printer that the printer has malfunctioned. The AND circuit 855 is not associated in any manner with the interface lines between the printer satellite control and the master control, and it can be disregarded since it need not comply with the basic ground rules relating to the interface.

The AND circuit 803 in FIG. 22 has an output line 854 which is supplied to the AND circuit 855 and via the cable 53 to the latch 1801 of the printer in FIG. 44. Since the AND circuit 855 in FIG. 24 has no relationship to the interface lines between the printer satellite control and the master control, this input connection can be disregarded for purposes of the ground rule under discussion. Consequently, the output of the AND circuit 803, for purposes of the ground rule under consideration, may be treated effectively as being connected to a single input.

The AND circuit 832 in FIG. 24 has its output connected to two inputs which are the OR circuit 842 and the inverter 857. When the AND circuit 832 is selected in the normal course of events, it supplies a positive output signal through the OR circuit 842 which causes the AND circuit 852 to supply a positive signal on the line 158 (satellite active). At the same time the positive signal from the AND circuit 832 operates the inverter 857 to inhibit the operation of the AND circuit 805 in FIG. 22. At other times the negative output signal from the AND circuit 832 is inverted by the inverter 857 to condition the AND circuit 805 if all other input signals are positive, and a positive signal from the AND circuit 805 in FIG. 22 is used in such instances to establish positive output signals on the respective control lines 157, 158 and 161 to the master control. This describes what would normally be the proper operation of the AND circuit 832 in FIG. 24. It is possible that the AND circuit 832 may malfunction (1) and provide a negative output signal when it should have been a positive output signal or (2) provide a positive output signal when it should have been a negative output signal. In case (1) the negative output signal from the AND circuit 832 is not effective to operate the AND circuit 852 and thereby provide a positive signal on the output line 158 (satellite active). However, the negative signal from the AND circuit 832 is inverted by the inverter 857 and supplied to the AND circuit 805. If the remaining inputs to the AND circuit 805 are positively energized, then the AND circuit 805 supplies a positive output signal to the OR circuits 841 through 843 in FIG. 24 which in turn cause positive output signals to be established on the control lines 157, 158, and 161 to the master control. It is pointed out that the AND circuits 830 and 831 have the same inputs as the AND circuit 832. Consequently, if they perform correctly, the AND circuit 830 supplies a positive signal to the OR circuit 840 which causes a positive signal to be established on the output line 160 to the master control. It is pointed out that the positive output signal from the AND circuit 831 is supplied to the OR circuit 841, but as pointed out above, the positive output signal from the AND circuit 805 is likewise applied to the OR circuit 841. Consequently the establishment of a positive output signal on the control line 157 is assured from two sources. It is seen, therefore, that four output lines on the interface are energized with positive signals. These output lines are 157, 158, 160, and 161. This represents an even parity situation, and the master control detects this and signifies an error by establishing positive signals on the lines 389 and 390 to light the indicators 410 and 411 in FIG. 25 in the manner explained above. Now, if the AND circuit 805 in FIG. 22 does not have positive levels on all of the input lines when a positive signal is received from the inverter 857, the AND circuit 805 supplies a negative signal level to the OR circuits 841 through 843. However, if the AND circuits 830 and 831 operate correctly and supply positive signal levels to the respective OR circuits 840 and 841, then positive signal levels are established on the control lines 157 and 160 to the master control. This is an even parity condition, and it likewise is detected by the master control which lights the indicator lamps 410 and 411 in the manner previously explained. Thus, it is seen how a malfunction of the AND circuit 832 is indicated for case (1)above.

Next case (2) is considered for the AND circuit 832. In this case the output of the AND circuit 832 is positive, but it should be negative. Therefore, the positive output signal from the AND circuit 832 is supplied through the OR circuit 842 to the AND circuit 852 which causes a positive output signal to be established on the control line 158 (satellite active). At this same time the AND circuit 884 provides a positive output signal on the control line 159 (satellite inactive). Therefore, two control lines on the interface to the master control are energized with positive signals, and this condition is detected by the master control which lights the indicators 410 and 411 in FIG. 25 in the manner previously explained. Therefore, it is ready seen how the malfunction for case (2) is detected for the AND circuit 832.

The AND circuits 806 through 808 in FIG. 23 and the AND circuits 866, 867, and 871 in FIG. 25 are concerned with gating data from the translators 864 and 865 in FIG. 23 to the latches 868, 869 and 872 in FIG. 25. Since the output signals from these latches are checked in the VRC 870, any malfunctions relating to the translation or transfer of data as well as any malfunctions in the operations of these latches are detected by the VRC 870. If the VRC 870 does not detect a malfunction, it supplies a positive signal to the AND circuit 852, and this permits the AND circuit 852 to supply a positive signal on the line 158 (satellite active) provided the other inputs to this AND circuit are positive. Now, if the VRC 870 in FIG. 25 detects a malfunction, it supplies a negative signal to the AND circuit 852 in FIG. 24 which inhibits the operation of this AND circuit. The AND circuit 852 is inhibited at a time when either the AND circuit 804 or the AND circuit 805 in FIG. 22 supplies a positive signal to the OR circuits 841 through 843 in FIG. 24. The positive signals to these OR circuits normally establishes positive output signals on the three control lines 157, 158 and 161. However, since the negative signal from the VRC 870 in FIG. 25 inhibits the operation of the AND circuit 852 in FIG. 24, a negative signal level is established on the control line 158 (satellite active). Therefore positive signals are established on the two control lines 157 (invert check) and 161 (insert/remove character request). This even parity condition on the interface to the master control is detected, and the indicator lamps 410 and 411 in FIG. 25 are energized in the manner previously explained to signal an error. Therefore, it is seen that the error resulting from a malfunction of the circuits in FIG. 23 or the AND circuit 866, 867, 871 in FIG. 25 or the latches 868, 869 and 872 in FIG. 25 is detected and indicated in the printer satellite control.

Reference is made next to FIGS. 17 through 20 for a discussion of the keyboard satellite control. All of the output lines of the circuits in FIG. 17 are connected to a single input except the AND circuit 683 and the latch 741. The output of the AND circuit 683 is connected to two inputs. It is connected to the input of the AND circuit 735 in FIG. 17 and the input to the AND circuit 704 in FIG. 19. However, the output of the AND circuit 735 is connected to the zero input side of the select latch 732 which in turn has its zero output side connected as an input to the AND circuit 704. It is pointed out that if the AND circuit 735 in FIG. 17 malfunctions or if the select latch 732 in FIG. 19 malfunctions, the AND circuit 704 in FIG. 19 cannot be activated. It is seen, therefore, that the activation of the AND circuit 704 in essence checks on or verifies the correct operation of the AND circuit 735 and the reset portion of the select latch 732. It is seen further that a malfunction in the AND circuit 683, the AND circuit 735, the reset portion of the latch 732 or the AND circuit 704 produces a negative output signal from the AND circuit 704 to the OR circuit 750 which in turn thereby establishes a negative output signal on the control line 160 to the master control. When the negative signal level appears on the output line 160, a positive signal level appears on the output lines 158 and 162. Consequently, this even parity condition on the interface is detected by the master control which establishes positive signal levels on the lines 389 and 390 thereby to operate the AND circuits 780 and 781 in FIG. 20 to set the latches 782 and 783 and light the indicator lamps 408 and 409. If the AND circuit 683 should malfunction and provide a positive output at a time when it should provide a negative output, the positive signal passed by the AND circuit 735 resets the select latch 732, and the positive signal from the zero output side is applied to the AND circuit 704. The AND circuit 704 may consequently provide a positive output signal through the OR circuit 750 to the AND circuit 720 which in turn supplies a positive signal on the control line 160 at such time. The AND circuit 724 in FIG. 20 normally supplies a positive output signal on the control line 159 at this time. Therefore, the positive signals on the two control lines 159 and 160 to the master control present an even parity condition which is detected by the master control and indicated in the keyboard satellite control as explained earlier.

All of the circuits in FIG. 18 except the AND circuit 686 have an output which is connected to a single input. The output of the AND circuit 686 is supplied to the AND circuits 1730 and 1731 of the encoder 1700 in FIG. 43. Depending upon whether a key 1701 has been depressed or not, a positive signal is returned on one of the lines 653 or 655, and a positive signal is returned on one of the lines 654 or 656 to the keyboard satellite control. If the lines 653 and 654 are positively energized, then the AND circuit 763 is activated. The output of the AND circuit 763 in FIG. 18 is connected also to the AND circuit 763 in FIG. 20, but the output of the AND circuit 763 is supplied to the keyboard indicator circuitry in FIG. 43. Since the output of the AND circuit 763 in FIG. 20 has no control over the lines between the keyboard satellite control and the master control, this connection may be disregarded and exempted from the basic ground rules under consideration. If the line 655 is positively energized it may activate an odd number of circuits i.e. the AND circuit 710 in FIG. 20, the AND circuit 684 in FIG. 17, and the AND circuit 706 in FIG. 19. The OR circuit 762 in FIG. 18 may be disregarded since it is basically an input to the AND circuit 710 in FIG. 20. If the line 656 is positively energized, it is effective to activate only the AND circuit 710 in FIG. 20. Either, but not both, of the lines 655 and 656 may be positively energized. Therefore it is seen that the output of the AND circuit 686 effectively is connected to an odd number of inputs i.e. one or three depending on whether the line 655 or 656 is positively energized.

Each of the circuits in FIG. 19 has an output connected to a single input. As discussed above the zero output side of the latch 732 is connected to a single input which is the AND circuit 704. The one output side of this latch is connected to the AND circuits 700, 702, and 703 in FIG. 19, the AND circuit 681 in FIG. 17, the AND circuits 710, 711 and 792 in FIG. 20, the AND circuit 686 in FIG. 18, and the AND circuit 687 in FIG. 18. The one output side of the select latch 732 is connected to an odd number of inputs. It is pointed out that the inputs to the AND circuit 700, 702, and 703 serve the error detection function during the first access cycle when the one output side of the latch 732 should be positive. Let it be assumed that the one output side of the latch 732 malfunctions and provides a negative output signal. In such case each of the AND circuits 700, 702, and 703 provides a negative output signal at a time when each should normally provide a negative output signal. Consequently, negative signals are established on the control lines 157, 158, and 160. The AND circuit 724 in FIG. 20 provides a negative output level on the control line 159 at this time. Consequently, all of the control lines from the keyboard satellite control to the master control are at a negative level, and this even parity condition is detected by the master control which in turn lights the indicator lamps 408 and 409 in FIG. 20 as explained earlier. Therefore, it is seen how this malfunction of the set portion of the select latch 732 causes the indicator lamps 408 and 409 to be lighted.

All of the circuits in FIG. 20 have an output line which is connected to an odd number of inputs except the latch 760. All of them are connected to a single input except the one output side of the latch 760, and it is connected to four inputs. It is noted here that the one output side of the latch 760 is connected to (1) the AND circuit 768 in FIG. 20, (2) the AND circuit 709 in FIG. 20, (3) the AND circuit 707 in FIG. 19, and (4) the AND circuit 683 in FIG. 17. It is further noted that in order for the AND circuit 683 to be conditioned to provide a positive output signal, the AND circuit 685 also must provide a positive output signal. The inverter 743 in FIG. 17 whose input is connected to the AND circuit 685, provides a negative output to the AND circuit 708 in FIG. 20, It is seen, therefore, that the AND circuit 683 in FIG. 17 and the AND circuit 708 in FIG. 20 cannot be conditioned simultaneously to provide positive output signals. Therefore the effective connections from the one side of the latch 760 is through either (1) the AND circuit 709 in FIG. 20, the AND circuit 707 in FIG. 19, and the AND circuit 683 in FIG. 17 or (2) the AND circuits 708 and 709 in FIG. 20 and the AND 707 in FIG. 19. In each case it is readily seen that an odd number of interface lines are impacted or affected by a failure. Consequently, each of the circuits in FIG. 20 are compatible with the basic ground rule under consideration.

Next the multipoint logic satellite control is discussed, and for this purpose reference is made to FIGS. 37 through 42. It is pointed out that most of the circuits in FIGS. 37 through 42 have an output line which is connected to an odd number of input lines, and the exceptions are discussed next. One exception is the AND circuit 1440 in FIG. 38. The output of this AND circuit is connected to four inputs which are the AND circuits 1441 and 1442 in FIG. 38 and the OR circuits 1565 and 1568 in FIG. 42. It is pointed out, however, that one and only one of the AND circuits 1441 and 1442 may provide a positive output signal at any one time. Consequently a positive output signal from the AND circuit 1440 is able to operate only an odd number of logic circuits at any given time and hence manipulate an odd number of control lines on the interface to the master control.

In FIG. 40 the AND circuit 1520 and the AND circuit 1526 have their outputs connected to two inputs. The output of the AND circuits 1520 is connected to the OR circuits 1521 and 1523, and the output of the AND circuit 1526 is connected to the OR circuit 1523 and the AND circuit 1527. Whenever the AND circuit 1520 provides a positive output signal, it may be effective to operate the AND circuit 1522 or the AND circuit 1529, assuming all other related conditions are met. It is noted that one, and only one of the AND circuits 1522 and 1529 may be operated at any one instant of time during the S1 access pulse. It is noted further that the outputs of the AND circuits 1522 and 1529 are connected to the OR circuit 1512 which in turn is connected through the inverter 1513 to the AND circuit 1514. Consequently, it is seen that the AND circuit 1520 may control the status of only one control line on the interface which is the control line 159 (satellite inactive). Similarly, a positive output signal from the AND circuit 1526 is able to control the output signal on the control line 159 only. In like fashion, the AND circuit 1540 in FIG. 41 is able to operate one or the other of the AND circuits 1522 and 1529 during a given S1 access pulse, and therefore it is seen that the AND circuit 1540 is able to control the output signal of the control line 159 only. Consequently, the AND circuits 1520 and 1526 in FIG. 40 and the AND circuit 1540 in FIG. 41 perform a function, at any one instant of time, which is compatible with the basic ground rule that in case of a malfunction an odd number of output interface lines must be affected.

Reference is made next to FIGS. 27 through 30 for a description of the serdes satellite control. It readily may be determined by inspection that the circuits in FIGS. 27 through 30 are compatible with the basic ground rule that each output is connected to an odd number of inputs. However, there are certain variations, and these are discussed next.

The AND circuit 924 in FIG. 27 has its output connected to the OR circuits 950, 952 and 953 in FIG. 29 and to the zero input side of the trigger 970 in FIG. 28. Actually, the output of the AND circuit 924 is connected also via the cable 54 to the serdes, but signals forwarded to the serdes do not directly affect the control lines on the interface from the serdes satellite control to the master control. Therefore, the output of the AND circuit 924 may be treated as being connected to four inputs in the serdes satellite control. The three inputs to the OR circuits 950, 952, and 953 in FIG. 29 are effective to control the output levels on the respective control lines 162, 157 and 158. It is pointed out that this is an odd number of control lines on the interface to the master control. The fourth input to the trigger 970 in FIG. 28 is effective to reset the trigger. However, the output from the trigger 970 is not effective to change the levels on the control lines from the interface of the serdes satellite control to the master control. Consequently, this fourth input connection from the AND circuit 924 in FIG. 27 is a proper variation since it does not effect the operation with respect to the basic ground rule. The AND circuit 928 in FIG. 27 has an output which goes to the serdes only, and the basic ground rule does not apply to this AND circuit.

The zero output side of the transmit latch 961 in FIG. 28 is connected to the input of the AND circuit 920 in FIG. 27 and the input of the AND circuit 997 in FIG. 30. The zero output side of the transmit latch 961 in FIG. 28 is connected via the cable 54 to the serdes, but this input connection may be disregarded since it does not affect the status of the control lines between the serdes satellite control and the master control. When the zero output side of the the transmit latch 961 in FIG. 28 is positive, it may cause positive signals to be established on the control lines 157, 158, and 162 on the interface to the master control. When the level on the zero output side of the transmit latch 961 is negative, and AND circuit 997 in FIG. 30 is inhibited from supplying a positive output signal, and the resulting negative output signal may, if all other inputs to the OR circuit 993 are negative signals, cause the signal level on the line 159 (satellite inactive) to become positive. Therefore, it is readily seen that the circuit interconnections are such that a control level from the zero output side of the transmit latch 961 affects an odd number of control lines on the interface to the master control, and in essence the basic ground rule is thereby satisfied.

The output of the AND circuit 920 in FIG. 27 is connected to four inputs which are the inverter 921, the AND circuit 923, the AND circuit 924, and the AND circuit 926. When the output of the AND circuit 920 is a positive signal, it is effective to establish positive signals on the control lines 157, 158 and 162 on the interface from the serdes satellite control to the master control during CB1 time. A positive signal from the AND circuit 920 is effective during the CB2 portion of an S4 access pulse to generate a positive signal on the control line 158 (satellite active) from the serdes satellite control to the master control. Therefore, although the output of the AND circuit 920 is connected to an even number of inputs, the effect is to control at any given time an odd number of control lines on the interface to the master control, and in essence the basic ground rule is satisfied.

The output of the inverter 942 in FIG. 27 is connected to two inputs which are the AND circuits 943 and 944 in FIG. 28. If a positive level is supplied from the inverter 942 to the AND circuits 943 and 944, the AND circuit 943 supplies a positive output signal if, and only if, the AND circuit 944 is not conditioned. This is readily seen by noting that a positive signal from the AND circuit 944 is effective to reset the latch 961, thereby causing a negative signal from the one output side to decondition the AND circuit 943. In such event the positive signal from the inverter 942 is ineffective to establish positive signal on any control lines from the interface to the master control. When a positive signal level from the inverter 942 is passed by the AND circuit 943, this positive output level is supplied to the OR circuits 951 through 953. Positive levels from these OR circuits are effective to establish positive signal levels on the control lines 157, 158 and 161 on the interface to the master control. Accordingly, it is seen that the output signal from the inverter 942 in FIG. 27 is effective to control an odd number of control lines on the interface, and in essence this satisfies the basic ground rule.

The circuits in FIG. 28 including the OR circuits 963 through 965, the triggers 970 and 972, the AND circuits 975 and 976, and the oscillator 971 do not come under the provisions of the basic ground rule since the output signals from these circuits do not affect the control levels on the control lines on the interface from the serdes satellite control to the master control. It is pointed out that signals from these circuits my operate the AND circuits 975 and 976, and signals from these AND circuits are supplied to the indicator circuitry in FiG. 29. Consequently the indicator lamps are lighted directly in case of a malfunction.

According to another feature of this invention a checking arrangement is provided wherein bistable devices employed throughout the various satellite controls are manipulated by pulse signals, where permissible, instead of continuous signals or levels. This is desirable as a checking feature for diagnostic purposes for several reasons. First, if pulses are used to set and reset a bistable device, it must undergo a change in state in response to each pulse and stabilize itself, and after the device is stabilized, its state affects the control lines on the interface to the master control. A parity check is made during the current access period on the interface control lines, and this constitutes a check on the operation of such circuits. If a malfunction occurs, the odd parity of the control lines on the interface between such satellite control and the master control signify the malfunction. Second, in some cases it is necessary to use certain information available only in the present access cycle to perform a function in the next access cycle at which time the information earlier available will not then be available. It is essential in these instances to use the information currently available in an access cycle to set or reset a bistable device, as the case may be, perform a check on the set or reset operation, and have the information available during the subsequent access cycle whereby appropriate action may then be taken to change the master control. It is in these instances that the only control line with a positive signal between the satellite control and the master control is the line 158 (satellite active). This technique is illustrated next.

For this purpose reference is made to the keyboard satellite control in FIG. 17 through 20. The latch 741 in FIG. 17 is considered first. This latch is normally set at CQ1 time by a read strobe signal on the line 655. When this latch is set, positive signals are established on the lines 157, 158, and 162 on the interface to the master control as earlier explained. Let it be assumed that the latch 741 fails to set when a positive pulse is supplied from the AND circuit 684. Consequently, the AND circuit 705 in FIG. 19 is not activated, and as a consequence a positive signal is not established on the control line 162. However, positive signal levels are established on the control lines 157 and 158 because the AND circuits 706 in FIG. 19 and 710 in FIG. 20 are operated independently in the manner earlier explained with reference to normal operations in the keyboard satellite control. The result, therefore, is an even number of control lines with positive signals, and this even parity condition is detected as an error by the master control in the manner previously explained. It is seen then how a malfunction in the latch 741 is detected when it fails to set when pulsed.

Referring next to the latch 760 in FIG. 20, this latch is set during one access cycle with information to be used during a subsequent access cycle. It is set during the current access cycle, checked as explained earlier, and the stored information is used during the next access cycle if there is not malfunction. If the latch 760 is set, the positive signal from the one output side is effective during CB2 time of the current access cycle to condition the AND circuit 709 and pass a positive signal which establishes a positive signal on the output control line 158 (satellite active). During normal operation this is the only control line with a positive signal level during CB2 time, and no error is indicated by the master control. Let it be assumed, however, that the latch 760 malfunctions by not setting to the one state in response to a positive pulse from the AND circuit 742 in FIG. 18. In this case a negative signal from the one output side inhibits the AND circuit 709 from supplying a positive signal during CB2 time. The result is to establish a negative signal level on the control line 158 (satellite active). Since no other control lines have a positive signal level at this time, an even parity condition exists which is detected by the master control and the error indicator lights 408 and 409 are lighted in the manner earlier explained. Thus it is seen how the malfunction is detected where the latch 760 fails to set in response to a positive pulse supplied to its one input side. This malfunction is detected in the current access cycle, and corrective action may be taken. If the latch 760 does not malfunction, it is set during the current cycle, checked, and its content is used during CB2 time of the next access cycle.

If the latch 760 receives a positive pulse from the AND circuit 761, it resets to the zero state. Let it be assumed that a malfunction occurs whereby the latch 760 fails to reset. It is pointed out that the reset operation normally takes place at the end of an S2 access pulse. The one output side of the latch 760 supplies a positive signal to the AND circuits 707 through 709 in FIGS. 19 and 20. These AND circuits cannot supply a positive output signal until CB2 time of the next S2 access pulse. At that time positive signal levels are established on the control lines 157, 158, and 162, and at such time the AND circuit 711 in FIG. 20 is not activated whereby a positive signal level is established on the control line 159 (satellite inactive). It is seen then that four control lines have positive signal levels established thereon, and this even parity condition is detected and indicated by the master control in the manner earlier explained. Thus it is seen how failure to reset by the latch 760 is detected, and this malfunction is detected as a result of the techniques set forth in the basic ground rule.

The foregoing example is given by way of illustration, and it should be pointed out that the same technique is used in other satellite controls. For example the latches 1448 and 1449 in FIG. 38 of the multipoint logic satellite control perform in similar fashion. Likewise, the AND circuit 920 and the latch 940 in FIG. 27 of the serdes satellite control cooperate in a similar fashion. It is seen then how the checking technique is employed of using current information in the form of pulses to set or reset, as the case may be, a bistable device, check the change in state of the bistable device during the current access cycle, and use the stored information in a subsequent cycle. It is noted that when used in the subsequent cycle, the stored information has been certified to be correct.

A further feature according to this invention is the checking technique of generating positive signals on the lines 158 (satellite active) and 159 (satellite inactive). One of these lines is energized with a positive signal at all times, but both lines are never energized simultaneously with positive signals or negative signals unless a malfunction occurs. This checking feature depends in part for its validity on the use of unrelated or independent circuits to generate these two control signals, and such has been demonstrated by numerous examples pointed out heretofore with respect to the construction and operation of the satellite controls.

It is pointed out by way of summary that each of the checking features of this invention provides a good measure of error detection capability as explained, and when taken in combination, their interaction itself provides a very great measure of error detection capability.

While the invention has been particularly shown and described with reference to a preferred embodiment thereof, it will be understood by those skilled in the art that various changes in form and details may be made therein without departing from the spirit and scope of the invention.

We claim:

1. A data processing system including:

a master control and a plurality of satellite controls, an input bus having a plurality of control lines connecting each satellite control to the master control, means in the master control for accessing or selectively connecting one satellite control at a time to said bus, means in each satellite control to energize an odd number of said control lines to the master control during each access, and said master control including parity checking means for checking the odd parity of said plurality of control lines, whereby a malfunction in any satellite control is detected when it is accessed by the master control.

2. The apparatus of claim 1 further including:

a plurality of satellites, means connecting each satellite to a given one of said satellite controls, and each satellite control having means to energize a given one of the control lines when it is active and a different one of the control lines when it is not active, whereby each satellite control is checked during its access for malfunctions when it is not active and as well as when it is active.

3. A system including:

a plurality of input-output devices, a plurality of satellite controls, one for each input-output device, means connecting given satellite controls to designated input-output devices, a master control, means connected between the master control and said plurality of satellite controls for connecting the master control selectively to each satellite control, said master control including first storage means to supply data signals to or receive data signals from any input-output device, and said master control including second storage means to supply control signals to or receive control signals from any input-output device, and whereby data signals may be exchanged between said input-output devices via said master control under the control of control signals from the master control.

4. The apparatus of claim 3 wherein the master control includes means to connect the master control to the satellite controls successively in turn.

5. The apparatus of claim 3 wherein the master control includes means which checks the parity of control signals received from each selected input-output device and indicates parity error if one is detected.

6. The apparatus of claim 5 wherein each satellite control supplies control signals on an odd number of control lines in normal operation, and said means which checks the parity of control signals verifies correct parity during normal operation and indicates a parity error if one is detected.

7. The apparatus of claim 6 wherein each satellite control supplies a control signal on a given control line when it is active, and each satellite control supplies a control signal on a different given control line when it is not active.

8. The apparatus of claim 7 wherein each satellite control includes a plurality of component circuits which are interconnected to perform the control function of each satellite control, and each component circuit has an output line connected to an odd number of other active component circuits, whereby a malfunction in any active component circuit affects an odd number of control lines from each satellite control and a parity error is detected by said means which checks the parity of control signals in said master control.

9. A data processing system including:

a plurality of input devices and a plurality of output devices, a master control and a plurality of satellite controls, means connecting each individual satellite control to a given individual input device or a given individual output device, an input bus having a plurality of control lines connected to the master control, means connected to said input bus for selectively connecting one satellite control at a time to said input bus, parity checking means connected to said input bus for checking the parity of said plurality of input lines whereby a malfunction in any satellite control is detected when it is accessed or selected by the master control, an output bus connected between the master control and each satellite control, said output bus supplying control signals to said satellite controls, and means connecting each input device to said input bus and each output device to said output bus whereby data may be exchanged between said input devices and said output devices.

10. The apparatus of claim 9 further including:

means in each satellite control to energize a given one of its control lines when it is active and a different one of its control lines when it is not active, whereby each satellite control is checked during its access for malfunctions when it is active and as well as when it is not active.

11. The apparatus of claim 9 wherein each satellite control supplies control signals on an odd number of control lines in normal operations, and said parity checking means verifies correct parity during normal operation and indicates a parity error if one is detected.

12. The apparatus of claim 11 wherein each satellite control supplies a control signal on a given control line when it is active, and each satellite control supplies a control signal on a different given control line when it is not active.

13. The apparatus of claim 12 wherein each satellite control includes a plurality of component circuits which are interconnected to perform the function of each satellite control, and each component circuit has an output line connected to an odd number of other active component circuits, whereby a malfunction in any active component circuit affects an odd number of control lines from such satellite control and a parity error is detected by said parity checking means.

14. The apparatus of claim 13 wherein:

a first group of component circuits in each satellite control generate said control signal on a given control line when each satellite control is active, and a second group of component circuits in each satellite control generate said control signal on a different given control line when each satellite control is not active, whereby a greater number of said component circuits are checked by said parity checking means.

15. The apparatus of claim 14 wherein:

one of said satellite controls includes means to operate said first group of component circuits during a first portion of its access by the master control and to operate said second group of component circuits during a second portion of its access by the master control.

16. The apparatus of claim 13 wherein:

one of said component circuits is employed as a bistable storage circuit, pulse operated means coupled to said bistable storage circuit for setting it during one access of the satellite control, and further means operated by the bistable storage circuit during the next access of the satellite control, whereby the bistable storage circuit is set and checked in one access to insure it correct operation prior to its use in the next access to operate said further means.

17. A data processing network including:

a plurality of terminals, transmission means connected between the plurality of terminals, each terminal including:

a plurality of input-output devices, a plurality of satellite controls, and a master control, means connecting each individual satellite control to a given individual one of the input-output devices, an input bus having control lines and data lines connected to the master control, means connected to the input bus and the plurality of satellite controls for selectively connecting one satellite control at a time via the input bus to the master control for applying data signals and control signals to the master control, an output bus connected between the master control and each satellite control, said output bus supplying control signals to said satellite controls, means connecting selected input-output devices to said input bus for supply data signals to the master control, and means connecting selected input-output devices to said output bus for receiving data signals from the master control, whereby data signals may be exchanged between said input-output devices via said master control, and means connecting one of said input-output devices of each terminal to said transmission means for sending or receiving signals between terminals.

18. The apparatus of claim 17 wherein the master control in each terminal includes parity checking means for checking the parity of signals on the control lines of the input bus.

19. The apparatus of claim 18 wherein each satellite control includes control means which supplies control signals on an odd number of control lines in normal operations, and said parity checking means verifies correct parity or indicates a parity error if one is detected.

20. The apparatus of claim 19 wherein each satellite control includes further control means which supplies a control signal on a given control line when it is active and on a different given control line when it is not active.

21. The apparatus of claim 20 wherein each satellite control includes a plurality of component circuits which are interconnected to perform the function of each satellite control, and each component circuit has an output line connected to an odd number of other component circuits within each satellite, whereby a malfunction in any component circuit affects an odd number of control lines from such satellite control and a resulting parity error is detected by said parity checking means.

22. The apparatus of claim 21 wherein:

a first group of component circuits in each satellite control generate said control signal on a given control line when each satellite control is active, and a second group of component circuits in each satellite control generate said control signal on a different given control line when each satellite control is not active, whereby a greater number of said component circuits are checked by said parity checking means.

23. A data processing system including:

a plurality of terminals, transmission means connected between said terminals for exchanging signals between terminals, each terminal including:

a master control, a plurality of satellite controls, and a plurality of input-output devices, an input bus having a plurality of data lines and a plurality of control lines connected to said master control, means connecting each individual satellite control to an individual input-output device, means connecting given input-output devices to the data lines of said input bus, means connected to said satellite controls and said input bus for accessing or selectively connecting one satellite control at a time on said input bus to the master control, first means in each satellite control which energizes at least one of said control lines during each access, parity checking means connected to said control lines of the input bus for checking the parity of said plurality of control lines during each access, whereby a malfunction in any satellite control or its associated input-output device is detected when the satellite control is accessed by the master control, an output bus having data lines and control lines connected between the master control and the satellite controls, means connecting selected input-output devices to the data lines of the output bus, and means connecting one of the input-output devices of each terminal to said transmission means for sending or receiving signals between terminals.

24. The apparatus of claim 23 wherein said first means in each satellite control includes further means to energize a given one of its control lines when it is active and a different one of its control lines when it is not active.

25. The apparatus of claim 24 wherein the first means in each satellite control includes additional means which supplies control signals on an odd number of control lines in normal operations, and said parity checking means verifies correct odd parity or indicates a parity error if one is detected.

26. The apparatus of claim 25 wherein said first means in each satellite control includes a plurality of individual circuits which are interconnected to perform the assigned functions, and each such circuit has an output line connected to an odd number of other individual active circuits within each satellite, whereby a malfunction in any individual active circuit affects an odd number of control lines from such satellite control and a resulting parity error is detected by said parity checking means.

27. The apparatus of claim 26 wherein said further means includes:

a first group of said individual circuits in each satellite control which generate a control signal on said given one of its control lines when each satellite control is active, and a second group of said individual circuits in each satellite control which generate a control signal on said different one of its control line when each satellite control is not active, whereby a greater number of said component circuits are checked by said parity checking means.

28. A data processing network including:

a plurality of terminals, transmission means connected between said plurality of terminals for sending and receiving signals between terminals, each terminal including:

a plurality of input-output devices, a plurality of satellite controls, one for each input-output device, means connecting given satellite controls to designated input-output devices, a master control, bus means connecting the master control, said plurality of satellite controls, and said input-output devices, said bus means including data lines and control lines, said master control including first storage means to supply data signals to or receive data signals from any input-output device via said bus means, said master control including second storage means to supply control signals to or receive control signals from any input-output device via said bus means, whereby data signals may be exchanged between said input-output devices via said master control under the control of control signals from the master control, and means connecting one input-output device in each terminal to said transmission means whereby data and control signals may be exchanged between terminals.

29. The apparatus of claim 28 wherein the master control includes means to connect the master control to the satellite controls successively in turn.

30. The apparatus of claim 28 wherein the master control includes means which checks the parity of control signals on the control lines from each selected input-output device and indicates parity error if one is detected.

31. The apparatus of claim 30 wherein each satellite control supplies control signals on an odd number of control lines in normal operations, and said means which checks the parity of control signals verifies correct parity during normal operation and indicates a parity error if one is detected.

32. The apparatus of claim 31 wherein each satellite control supplies a control signal on a given control line when it is active, and each satellite control supplies a control signal on a different given control line when it is not active.

33. The apparatus of claim 32 wherein each satellite control includes a plurality of distinct circuits which are interconnected to perform the control function of each satellite control, and each distinct circuit has an output line connected to an odd number of other such distinct active circuits, whereby a malfunction in any distinct active circuit in a selected satellite control affects an odd number of control lines from such satellite control and a parity error is detected by said means which checks the parity of control signals in said master control.

34. A data processing system composed of a network of terminals, transmission means connected between the plurality of terminals for sending and receiving data signals and control signals between terminals, each terminal including:

a plurality of input-output devices, a plurality of satellite controls, one for each input-output device, means connecting each individual satellite control to a given individual input-output device, a master control, an output bus connected to said master control, and an input bus connected to said master control, means connecting said plurality of satellite controls to said output bus, means connecting selected ones of said input-output devices to said input bus, and means connecting selected ones of said input-output devices to said output bus, means connected to said satellite controls and said input bus for selectively connecting each satellite control via said input bus to said master control, said master control including control storage for receiving control signals via said input bus from said satellite controls and for supplying control signals via said output bus to said satellite controls, first parity checking means connected to said input bus for checking the parity of control signals supplied from each satellite control to said master control, said master control including data storage means for receiving data signals via said input bus from said input-output devices and for supplying data signals via said output bus to said input-output devices, and means connecting one input-output device in each terminal to said transmission means whereby data and control signals may be exchanged between terminals.

35. The apparatus of claim 34 wherein the master control includes means to connect the satellite controls successively in turn to the master control.

36. The apparatus of claim 34 wherein the master control includes second parity checking means connected to said output bus for checking the parity of signals on the control lines to said satellite controls, whereby the parity of control signals supplied by the satellite controls to said master control are checked and the parity of control signals supplied by said master control to said satellite controls are checked.

37. The apparatus of claim 36 wherein the master control includes third parity checking means for checking the parity of signals supplied on said input bus from said input-output devices to said data storage, and said master control includes fourth parity checking means for checking the parity of data signals supplied from said master control on said output bus to said input-output devices.

38. The apparatus of claim 34 wherein each satellite control supplies control signals on an odd number of control lines in normal operations, and said first parity checking means verifies correct parity during normal operation and indicates a parity error if one is detected.

39. The apparatus of claim 38 wherein each satellite control supplies a control signal on a given control line when it is active, and each satellite control supplies a control signal on a different given control line when it is not active.

40. The apparatus of claim 39 wherein each satellite control includes a plurality of circuits which are interconnected to perform the control function of the given satellite control, and each circuit has an output line connected to control an odd number of other active circuits in its satellite control, whereby a malfunction in any active circuit in a selected satellite control affects an odd number of control lines from such satellite control whereby said first parity checking means is forced to detect a parity error of the control signals supplied via said input bus to said master control.

41. The apparatus of claim 40 wherein said plurality of circuits in each satellite control include a first group of such circuits which are interconnected to generate a control signal on said given one of said control lines when the satellite control is active and a second group of such circuits which are interconnected to generate a control signal on said different given control line when the satellite control is not active.

42. The apparatus of claim 41 wherein one of said plurality of circuits in at least one satellite control is employed as a bistable storage circuit, pulse operated means coupled to said bistable storage circuit for setting it with a pulse when its satellite control is connected via said input bus to said master control, and further means operated by said bistable storage circuit when its satellite control is connected the next time to said master control, whereby the said bistable storage circuit is set and checked in one time period to insure its correct operation prior to its use at a subsequent time to operate said further means.

43. The apparatus of claim 40 wherein said first group of circuits in at least one given satellite control is further divided into a third group of circuits and a fourth group of circuits, and during the time when said given satellite control is connected to said master control, the control signal on said given one of said control lines is generated (1) by said third group of circuits during one portion of such time and (2) by said fourth group of circuits during the remaining portion of such time.

44. A data processing system including a self-diagnostic capability for automatically detecting and indicating the location of malfunctions, said data processing system including:

a control device, a plurality of input-output devices connected via data and control lines to the control device, said input-output devices being operated to transfer and receive data under the direction of the control device, and said control device including first means to check the parity of signals on the control lines and second means to indicate an error or malfunction if such is detected by the first means.

45. The apparatus of claim 44 wherein the first means includes third means to check the parity of control signals supplied to the control device, and fourth means to check the parity of control signals supplied by the control device to the input-output devices.